(12) United States Patent
Au

(10) Patent No.: US 6,778,970 B2
(45) Date of Patent: Aug. 17, 2004

(54) TOPOLOGICAL METHODS TO ORGANIZE SEMANTIC NETWORK DATA FLOWS FOR CONVERSATIONAL APPLICATIONS

(76) Inventor: Lawrence Au, 5904 N. 5th St., Arlington, VA (US) 22203-1010

(*) Notice: Subject to any disclaimer, the term of this patent is extended or adjusted under 35 U.S.C. 154(b) by 0 days.

(21) Appl. No.: 09/085,830

(22) Filed: May 28, 1998

(65) Prior Publication Data

US 2003/0191627 A1 Oct. 9, 2003

(51) Int. Cl.[7] ............................................. G06F 17/00
(52) U.S. Cl. .................................... 706/55; 706/54
(58) Field of Search ................................. 706/55, 54

(56) References Cited

U.S. PATENT DOCUMENTS

| | | | | |
|---|---|---|---|---|
| 4,769,772 A | * | 9/1988 | Dwyer ........................... | 707/2 |
| 4,868,733 A | * | 9/1989 | Fujisawa et al. ............... | 706/55 |
| 5,056,021 A | * | 10/1991 | Ausborn ........................ | 706/55 |
| 5,123,057 A | * | 6/1992 | Verly et al. ................... | 706/900 |
| 5,155,825 A | * | 10/1992 | Moughanni et al. ......... | 711/207 |
| 5,386,556 A | * | 1/1995 | Hedin et al. ................... | 99/290 |
| 5,664,181 A | * | 9/1997 | Velissaropoulos et al. ... | 707/102 |
| 5,752,016 A | * | 5/1998 | Whittaker et al. ............ | 707/3 |
| 5,778,223 A | * | 7/1998 | Velissaropoulos et al. ... | 707/100 |
| 5,794,050 A | * | 8/1998 | Dahlgren et al. ............ | 717/144 |
| 5,802,508 A | * | 9/1998 | Morgenstern ................ | 706/55 |
| 5,826,256 A | * | 10/1998 | Devanbu ....................... | 707/4 |
| 5,901,100 A | * | 5/1999 | Talyor .......................... | 365/219 |
| 6,006,221 A | * | 12/1999 | Liddy et al. ................... | 707/5 |
| 6,179,491 B1 | * | 1/2001 | Choi et al. .................... | 361/45 |

OTHER PUBLICATIONS

David A. Schmidt, "LISP and Symbolic Computation", vol. 10, No. 3, May 1998.*
Qing. Ma, "Connectionst Realization of Semantic Networks Using and Adaptive Assciative Memory AAM", IEEE proceedings of International Conference on Neural Networks, Nov.–Dec. 1995.*
Bringmann et al, "A Semantic Network Representation of Personal Constract Systems", IEE Transactions on System, Man and Cybernetics, Sep.–Oct. 1992.*

(List continued on next page.)

*Primary Examiner*—George B. Davis

(57) ABSTRACT

A system and methods for enforcing uniform branching of node-to-node inheritance links within semantic networks, to control data flows to and from such networks in conversational applications. Enforced uniform branching criteria converge the population of directly connected nodes of each node toward a small system-wide constant, and converge each sibling inheritance node to a similar level of abstractness, and are also used to select the best candidate tree from a set of competing representation trees within the semantic network. Uniform branching criteria are applied to competing trees for speech recognition, for object recognition in vision systems, for concept recognition in text scanning systems, and for algorithm definition. For speech recognition, phonemes are identified and matched to dictionary nodes in the semantic network. For visual object recognition, object features are identified and matched. For text scanning, words are identified and matched. For speech, visual and text the sets of competing representation trees are formed from alternative combinations of matched dictionary nodes.

42 Claims, 73 Drawing Sheets

OTHER PUBLICATIONS

Steven Pinker, *The Language Instinct* ©1994 pp. 85, 88, 119, 187–188, 196–201, 227, & 234.

Janet Kolodner, *Case–Based Reasoning*, ©1993, pp. 221–245 and 346–347.

George Miller, "*The Magical Number Seven, Plus or Minus Two: Some Limits on Our Capacity for Processing Information*" ©1956, *The Psychological Review*, vol. 63, pp. 81–97.

Ian Wright, "*Reinforcement Learning and Animat Emotions*" ©1996, 25 pages Internet address: http//www.cs.b-ham.ac.uk/~ipw/sab96/sab96html.

Susanne Kaiser & Thomas Wehrle "*Emotion research and AI: Some threoretical and technical issues*" ©1995, 13 pages Internet address:http//www.unige.ch/fapse/emotion/members/kaiser/rai4.htm.

\* cited by examiner

FIG. 25

```
                        Conversational Dialog
> hello is 'hello' a verb or noun?
> verb what noun conveys input for the verb 'hello'?
> hi there what noun conveys input to 'hi there'?
> conversational input what noun conveys input from 'hi there'?
> lookup input what is the attention span for receiving 'hi there'? [0 seconds]
> 10 what noun conveys output for the verb 'hello'?
> how are you?

what noun conveys output to 'how are you'?
> lookup output what noun conveys output from 'how are you?'?
> conversational output are there other dataflows for the verb 'hello'? [none]
>
```

FIG. 26

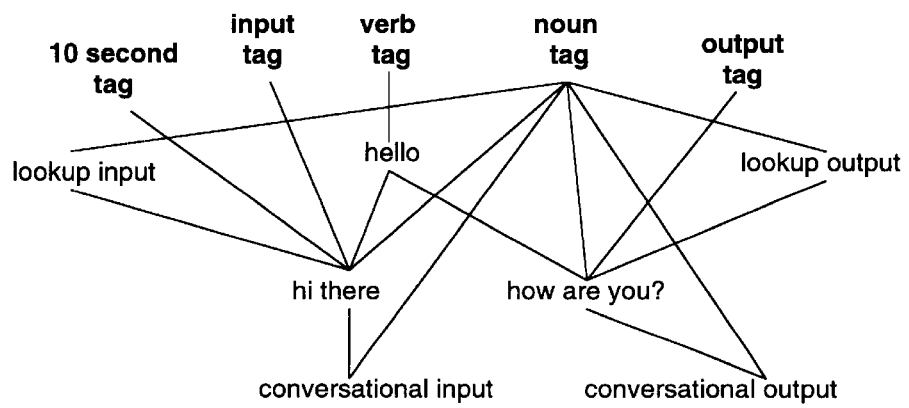

FIG. 29

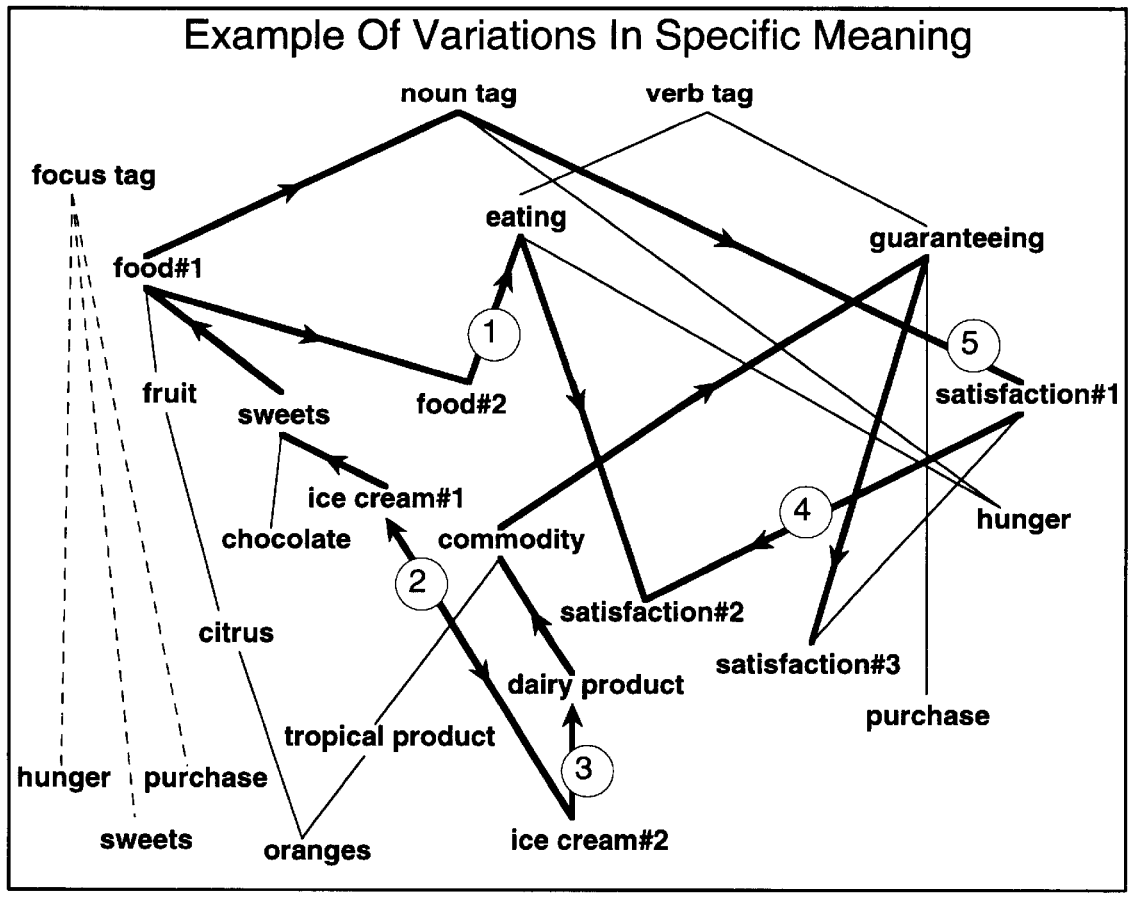

FIG. 30

| Path | Node Name (Abstractness) | Average Abstractness |
|---|---|---|
| 1 | ice cream#2 (1), ice cream#1 (2), sweets (4), food#1 (9), food#2 (1), eating (4), satisfaction#2 (1) | 22/7 = 3.143 |
| 2 | ice cream#1 (2), ice cream#2 (1), dairy product (2), commodity (5), guaranteeing (8), satisfaction#3 (1) | 19/6 = 3.166 |
| 3 | ice cream#2 (1), dairy product (2), commodity (5), guaranteeing (8), satisfaction#3 (1) | 17/5 = 3.4 |
| 4 | ice cream#1 (2), sweets (4), food#1 (9), noun tag (13), satisfaction#1 (3), satisfaction#2 (1) | 32/6 = 5.3333 |
| 5 | ice cream#1 (2), sweets (4), food#1 (9), noun tag (13), satisfaction#1 (3) | 31/5 = 6.2 |

FIG. 32

Example Of Closest Mutual Inheritor Identification noun tag:13
chocolate:14/4, citrus:14/4
food#1:9/2, food#2:10/3, fruit12/3
hunger:1/2, oranges:15/5
sweets:13/3, ice cream#1:15/4
ice cream#2:16/5,
satisfaction#1:3/2
satisfaction#2:4/3,
satisfaction#3:4/3 verb tag:13
commodity:5/3, dairy product:3/4
eating:4/2, food#2:5/3
guaranteeing:7/2, ice cream#2:16/5
hunger:5/3, purchase:8/3
oranges:16/5, tropical product:15/4
satisfaction#2:5/3
satisfaction#3:8/3 eating:4
verb tag:2
food#2:1/2
hunger:1/2
satisfaction#2:1/2 hunger:1
eating:2
noun tag:2
verb tag:3

In this example, the closest common inherited node under the start peak node noun tag and the end peak node verb tag must be found. The closest common inheritor node is hunger.

The closest common inheritor under a start peak and end peak pair is found by intersecting the inherited indices, including the nodes themselves. The closest common inheritor is on the shortest path between both peaks. The peak node indices contain total sub-path node distances for the abstractward and concreteward sub-paths; summing these totals gives the total path length without having to traverse any nodes. In the case of ties, the more abstract path is chosen. If hunger had not been available, then food#2 would have been chosen.

Mutual Inheritor Candidates

| start peak noun tag inheritor | end peak verb tag inheritor | total path node count minus 3 | total abstractness minus proposed inheritor | average abstract. per node |
|---|---|---|---|---|
| food#2:10/3 | food#2:5/3 | 3 + 3 - 3 = 3 | 10 + 5 - 1 = 14 | 14/3 = 4.666 |
| ice cream#2:16/5 | ice cream#2:16/5 | 5 + 5 - 3 = 7 | 15 + 16 - 1 = 30 | 30/7 = 4.286 |
| hunger:1/2 | hunger:5/3 | 2 + 3 - 3 = 2 | 1 + 5 - 1 = 5 | 5 / 2 = 2.5 |
| oranges:15/5 | oranges:16/5 | 5 + 5 - 3 = 7 | 15 + 16 - 1 = 30 | 30/7 = 4.286 |
| satisfaction#2:4/3 | satisfaction#2:5/3 | 3 + 3 - 3 = 3 | 4 + 5 - 1 = 8 | 8 / 3 = 2.666 |
| satisfaction#3:4/3 | satisfaction#3:8/3 | 3 + 3 - 3 = 3 | 4 + 8 - 1 = 11 | 11/3 = 3.666 |

FIG. 33
Bridge Path Topologies
no overlap
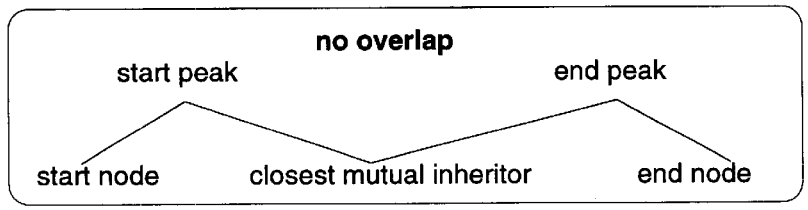
partial overlaps
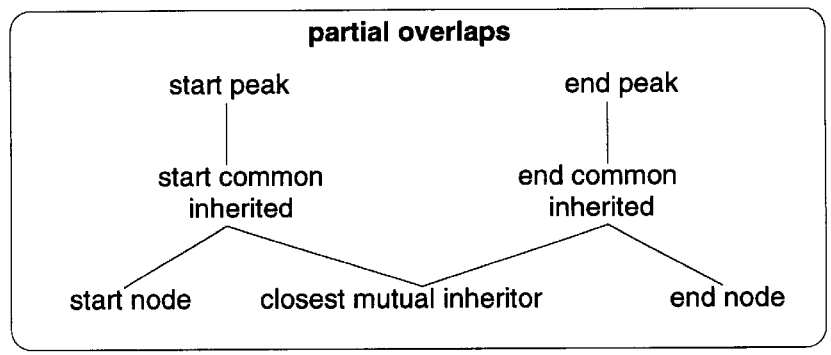
total overlap at start
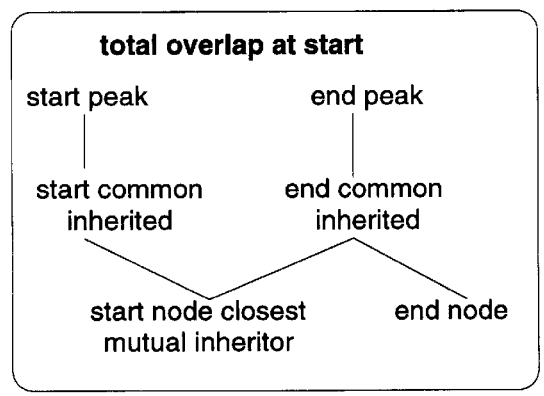
total overlap at end
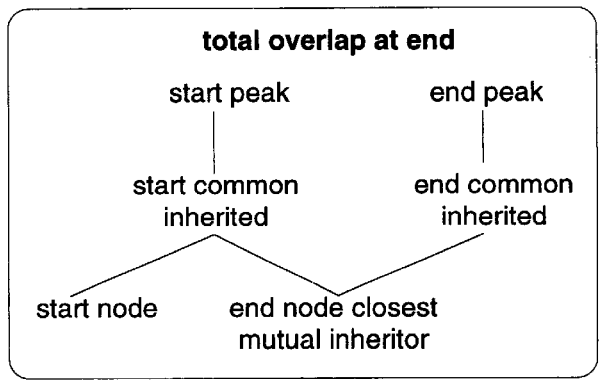

FIG. 34

Example Of Inherited Node Overlap Identification

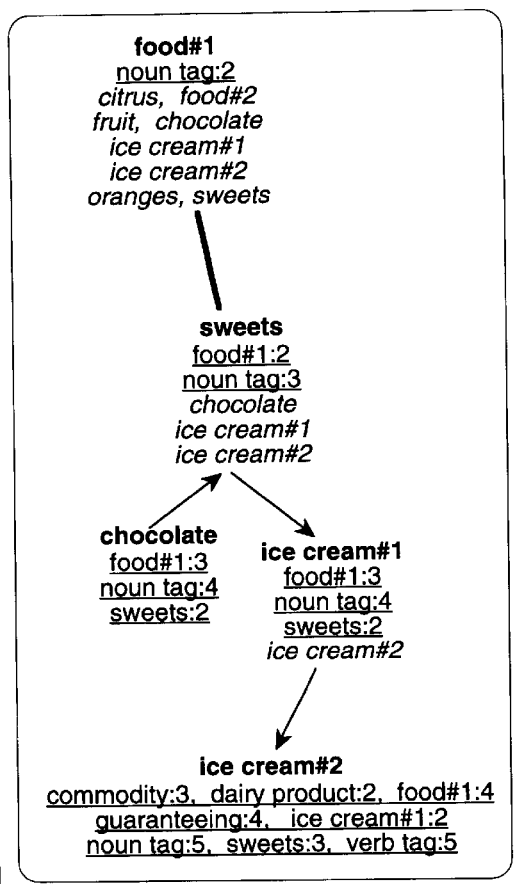

Overlap is identified by looking under a peak node to find a nearest inherited node common to two nodes, such as the start node and the mutual inheritor, or such as the mutual inheritor and end node. To identify these common inherited nodes, intersect the inherited indices, including the nodes themselves. The nearest common inherited node which is also an inheritor of the peak node is the common one.

In this example, the closest common inheritor node under the peak node food#1 must be found between the start node of chocolate and the mutual inheritor of ice cream#2. The closest common inherited node is sweets.

| start peak food#1 inheritor | start node chocolate inherited | mutual inheritor ice cream#2 inherited | total distance using indices minus 1 |
|---|---|---|---|
| - | - | commodity:3 | - |
| - | - | dairy product:2 | - |
| food#1 | food#1:3 | food#1:4 | 3+4-1 = 6 |
| - | - | guaranteeing:4 | - |
| - | - | ice cream#1:2 | - |
| - | noun tag:4 | noun tag:5 | 4+5-1 = 8 |
| sweets | sweets:2 | sweets:3 | 2+3-1 = 4 (closest) |
| - | - | verb tag:5 | - |

FIG. 36

Calculating Average Path Abstractness

Node Index Example food#1:9
citrus:5/3, food#2:1/2
fruit:3/2, chocolate:5/3
ice cream#1:6/3
ice cream#2:7/4
oranges:6/4, sweets:3/2 eating:4
food#2:1/2
hunger:1/2
satisfaction#2:1/2 sweets
food#2:1
ice cream#1
satisfaction#2
ice cream#2

| calculation | node | index | abstractness | population |
|---|---|---|---|---|
| (1) subpath from start node to start peak | food#1 | ice cream#2:7/4 | 7 | 4 |
| (2) subpath from start peak to mutual inheritor | food#1 | food#2:1/2 | 1 | 2 |
| (3) subpath from mutual inheritor to end peak | eating | food#2:1/2 | 1 | 2 |
| (4) subpath from end peak to end node | eating | satisfaction#2:1/2 | 1 | 2 |
| (5) add start peak node abstractness | food#1 | food#1:9 | 9 | |
| (6) add end peak node abstractness | eating | eating:4 | 4 | |
| (7) subtract mutual inheritor abstractness | food#2 | food#2:1 | -1 | |
| (8) subtract start peak | | | | -1 |
| (9) subtract mutual inheritor | | | | -1 |
| (10) subtract end peak | | | | -1 |
| (11) subpath sums | | | 22 | 7 |
| (12) average abstractness  22/7 = 3.143 | | | | |

FIG. 37

| path cand. | start node | start peak node | end node | end peak node | mutual inheritor | sum a /pop. | avg. abst. |
|---|---|---|---|---|---|---|---|
| 1 | ice cream#1 | ice cream#1 | satisfaction#1 | satisfaction#1 | - | | |
| 2 | ice cream#1 | ice cream#1 | satisfaction#1 | noun tag | ice cream#1 | 31/5 | 6.2 (w) |
| 3 | ice cream#1 | ice cream#1 | satisfaction#2 | satisfaction#2 | - | | |
| 4 | ice cream#1 | ice cream#1 | satisfaction#2 | eating | - | | |
| 5 | ice cream#1 | ice cream#1 | satisfaction#2 | noun tag | ice cream#1 | 32/6 | 5.333 |
| 6 | ice cream#1 | ice cream#1 | satisfaction#2 | verb tag | ice cream#2 | 36/8 | 4.5 |
| 7 | ice cream#1 | ice cream#1 | satisfaction#3 | satisfaction#3 | - | | |
| 8 | ice cream#1 | ice cream#1 | satisfaction#3 | guaranteeing | ice cream#2 | 19/6 | 3.166 (r) |
| 9 | ice cream#1 | ice cream#1 | satisfaction#3 | noun tag | ice cream#1 | 32/6 | 5.333 |
| 10 | ice cream#1 | ice cream#1 | satisfaction#3 | satisfaction#1 | - | | |
| 11 (o) | ice cream#1 | ice cream#1 | satisfaction#3 | verb tag | ice cream#2 | 19/6 | 3.166 (r) |
| 12 | ice cream#1 | food#1 | satisfaction#1 | satisfaction#1 | - | | |
| 13 | ice cream#1 | food#1 | satisfaction#1 | noun tag | food#1 | 31/5 | 6.2 (w) |
| 14 | ice cream#1 | food#1 | satisfaction#2 | satisfaction#2 | - | | |
| 15 | ice cream#1 | food#1 | satisfaction#2 | eating | food#2 | 21/6 | 3.5 |
| 16 | ice cream#1 | food#1 | satisfaction#2 | noun tag | food#1 | 32/6 | 5.333 |
| 17 | ice cream#1 | food#1 | satisfaction#2 | verb tag | food#2 | 28/8 | 3.5 |
| 18 | ice cream#1 | food#1 | satisfaction#3 | satisfaction#3 | - | | |
| 19 (o) | ice cream#1 | food#1 | satisfaction#3 | guaranteeing | ice cream#2 | 19/6 | 3.166 (r) |
| 20 | ice cream#1 | food#1 | satisfaction#3 | noun tag | food#1 | 32/6 | 5.333 |
| 21 | ice cream#1 | food#1 | satisfaction#3 | satisfaction#1 | - | | |
| 22 | ice cream#1 | food#1 | satisfaction#3 | verb tag | food#2 | 31/8 | 3.875 |
| 23 | ice cream#1 | noun tag | satisfaction#1 | satisfaction#1 | satisfaction#1 | 31/5 | 6.2 (w) |
| 24 | ice cream#1 | noun tag | satisfaction#1 | noun tag | noun tag | 31/5 | 6.2 (w) |
| 25 | ice cream#1 | noun tag | satisfaction#2 | satisfaction#2 | satisfaction#2 | 32/6 | 5.333 |
| 26 (o) | ice cream#1 | noun tag | satisfaction#2 | eating | food#2 | 21/6 | 3.5 |
| 27 | ice cream#1 | noun tag | satisfaction#2 | noun tag | noun tag | 32/6 | 5.333 |
| 28 (o) | ice cream#1 | noun tag | satisfaction#2 | verb tag | hunger | 35/7 | 5.0 |
| 29 | ice cream#1 | noun tag | satisfaction#3 | satisfaction#3 | satisfaction#3 | 32/6 | 5.333 |
| 30 (o) | ice cream#1 | noun tag | satisfaction#3 | guaranteeing | satisfaction#3 | 32/6 | 5.333 |
| 31 | ice cream#1 | noun tag | satisfaction#3 | noun tag | noun tag | 32/6 | 5.333 |
| 32 | ice cream#1 | noun tag | satisfaction#3 | satisfaction#1 | satisfaction#1 | 31/5 | 6.2 |
| 33 | ice cream#1 | noun tag | satisfaction#3 | verb tag | hunger | 54/9 | 6.0 |
| 34 | ice cream#1 | sweets | satisfaction#1 | satisfaction#1 | - | | |
| 35 | ice cream#1 | sweets | satisfaction#1 | noun tag | sweets | 31/5 | 6.2 (w) |
| 36 | ice cream#1 | sweets | satisfaction#2 | satisfaction#2 | - | | |
| 37 | ice cream#1 | sweets | satisfaction#2 | eating | - | | |
| 38 | ice cream#1 | sweets | satisfaction#2 | noun tag | sweets | 32/6 | 5.333 |
| 39 (o) | ice cream#1 | sweets | satisfaction#2 | verb tag | ice cream#2 | 32/8 | 4.5 |
| 40 | ice cream#1 | sweets | satisfaction#3 | satisfaction#3 | - | | |
| 41 (o) | ice cream#1 | sweets | satisfaction#3 | guaranteeing | ice cream#2 | 19/6 | 3.166 (r) |
| 42 | ice cream#1 | sweets | satisfaction#3 | noun tag | sweets | 32/6 | 5.333 |
| 43 | ice cream#1 | sweets | satisfaction#3 | satisfaction#1 | - | | |
| 44 (o) | ice cream#1 | sweets | satisfaction#3 | verb tag | ice cream#2 | 19/6 | 3.166 (r) |
| 45 | ice cream#2 | ice cream#2 | satisfaction#1 | satisfaction#1 | - | | |
| 46 | ice cream#2 | ice cream#2 | satisfaction#1 | noun tag | ice cream#2 | 31/6 | 5.166 |
| 47 | ice cream#2 | ice cream#2 | satisfaction#2 | satisfaction#2 | - | | |
| 48 | ice cream#2 | ice cream#2 | satisfaction#2 | eating | - | | |
| 49 | ice cream#2 | ice cream#2 | satisfaction#2 | noun tag | ice cream#2 | 33/7 | 4.714 |
| 50 | ice cream#2 | ice cream#2 | satisfaction#2 | verb tag | ice cream#2 | 34/7 | 4.857 |

FIG. 38

| | | Path Candidates (second third) | | | | |
|---|---|---|---|---|---|---|
| path cand. | start node | start peak node | end node | end peak node | mutual inheritor | sum a /pop. | avg. abst. |
| 51 | ice cream#2 | ice cream#2 | satisfaction#3 | satisfaction#3 | - | | |
| 52 | ice cream#2 | ice cream#2 | satisfaction#3 | guaranteeing | ice cream#2 | 17/5 | 3.4 |
| 53 | ice cream#2 | ice cream#2 | satisfaction#3 | noun tag | ice cream#2 | 33/7 | 4.714 |
| 54 | ice cream#2 | ice cream#2 | satisfaction#3 | satisfaction#1 | - | | |
| 55 | ice cream#2 | ice cream#2 | satisfaction#3 | verb tag | ice cream#2 | 37/7 | 5.286 |
| | | | | | | | |
| 56 | ice cream#2 | commodity | satisfaction#1 | satisfaction#1 | - | | |
| 57 (o) | ice cream#2 | commodity | satisfaction#1 | noun tag | ice cream#2 | 30/6 | 5.0 |
| 58 | ice cream#2 | commodity | satisfaction#2 | satisfaction#2 | - | | |
| 59 | ice cream#2 | commodity | satisfaction#2 | eating | - | | |
| 60 (o) | ice cream#2 | commodity | satisfaction#2 | noun tag | ice cream#2 | 32/7 | 4.571 |
| 61 | ice cream#2 | commodity | satisfaction#2 | verb tag | commodity | 34/7 | 4.857 |
| 62 | ice cream#2 | commodity | satisfaction#3 | satisfaction#3 | - | | |
| 63 | ice cream#2 | commodity | satisfaction#3 | guaranteeing | commodity | 17/5 | 3.4 |
| 64 (o) | ice cream#2 | commodity | satisfaction#3 | noun tag | ice cream#2 | 33/7 | 4.714 |
| 65 | ice cream#2 | commodity | satisfaction#3 | satisfaction#1 | - | | |
| 66 | ice cream#2 | commodity | satisfaction#3 | verb tag | commodity | 37/7 | 5.286 |
| | | | | | | | |
| 67 | ice cream#2 | dairy product | satisfaction#1 | satisfaction#1 | - | | |
| 68 (o) | ice cream#2 | dairy product | satisfaction#1 | noun tag | ice cream#2 | 30/6 | 5.0 |
| 69 | ice cream#2 | dairy product | satisfaction#2 | satisfaction#2 | - | | |
| 70 | ice cream#2 | dairy product | satisfaction#2 | eating | - | | |
| 71 (o) | ice cream#2 | dairy product | satisfaction#2 | noun tag | ice cream#2 | 32/7 | 4.571 |
| 72 | ice cream#2 | dairy product | satisfaction#2 | verb tag | dairy product | 34/7 | 4.857 |
| 73 | ice cream#2 | dairy product | satisfaction#3 | satisfaction#3 | - | | |
| 74 | ice cream#2 | dairy product | satisfaction#3 | guaranteeing | dairy product | 17/5 | 3.4 |
| 75 (o) | ice cream#2 | dairy product | satisfaction#3 | noun tag | ice cream#2 | 33/7 | 4.714 |
| 76 | ice cream#2 | dairy product | satisfaction#3 | satisfaction#1 | - | | |
| 77 | ice cream#2 | dairy product | satisfaction#3 | verb tag | dairy product | 37/7 | 5.286 |
| ... | | | | | | | |
| 78 | ice cream#2 | food#1 | satisfaction#1 | satisfaction#1 | - | | |
| 79 | ice cream#2 | food#1 | satisfaction#1 | noun tag | food#1 | 30/6 | 5.0 |
| 80 | ice cream#2 | food#1 | satisfaction#2 | satisfaction#2 | - | | |
| 81 | ice cream#2 | food#1 | satisfaction#2 | eating | food#2 | 22/7 | 3.143 (b) |
| 82 | ice cream#2 | food#1 | satisfaction#2 | noun tag | food#1 | 32/7 | 4.571 |
| 83 (o) | ice cream#2 | food#1 | satisfaction#2 | verb tag | ice cream#2 | 34/7 | 4.857 |
| 84 | ice cream#2 | food#1 | satisfaction#3 | satisfaction#3 | - | | |
| 85 (o) | ice cream#2 | food#1 | satisfaction#3 | guaranteeing | ice cream#2 | 17/5 | 3.4 |
| 86 | ice cream#2 | food#1 | satisfaction#3 | noun tag | food#1 | 33/7 | 4.714 |
| 87 | ice cream#2 | food#1 | satisfaction#3 | satisfaction#1 | - | | |
| 88 (o) | ice cream#2 | food#1 | satisfaction#3 | verb tag | ice cream#2 | 37/7 | 5.286 |
| | | | | | | | |
| 89 | ice cream#2 | guaranteeing | satisfaction#1 | satisfaction#1 | satisfaction#3 | 17/5 | 3.4 (r) |
| 90 (o) | ice cream#2 | guaranteeing | satisfaction#1 | noun tag | ice cream#2 | 30/6 | 5.0 |
| 91 | ice cream#2 | guaranteeing | satisfaction#2 | satisfaction#2 | - | | |
| 92 | ice cream#2 | guaranteeing | satisfaction#2 | eating | - | | |
| 93 (o) | ice cream#2 | guaranteeing | satisfaction#2 | noun tag | ice cream#2 | 32/7 | 4.571 |
| 94 | ice cream#2 | guaranteeing | satisfaction#2 | verb tag | guaranteeing | 34/7 | 4.857 |
| 95 | ice cream#2 | guaranteeing | satisfaction#3 | satisfaction#3 | satisfaction#3 | 17/5 | 3.4 |
| 96 | ice cream#2 | guaranteeing | satisfaction#3 | guaranteeing | guaranteeing | 17/5 | 3.4 |
| 97 (o) | ice cream#2 | guaranteeing | satisfaction#3 | noun tag | ice cream#2 | 33/7 | 4.714 |
| 98 (o) | ice cream#2 | guaranteeing | satisfaction#3 | satisfaction#1 | satisfaction#3 | 17/5 | 3.4 |
| 99 | ice cream#2 | guaranteeing | satisfaction#3 | verb tag | guaranteeing | 37/7 | 5.286 |

FIG. 39

Path Candidates (last third)

| path cand. | start node | start peak node | end node | end peak node | mutual inheritor | sum a /pop. | avg. abst. |
|---|---|---|---|---|---|---|---|
| 100 | ice cream#2 | ice cream#1 | satisfaction#1 | satisfaction#1 | - | | |
| 101 | ice cream#2 | ice cream#1 | satisfaction#1 | noun tag | ice cream#1 | 30/6 | 5.0 |
| 102 | ice cream#2 | ice cream#1 | satisfaction#2 | satisfaction#2 | - | | |
| 103 | ice cream#2 | ice cream#1 | satisfaction#2 | eating | - | | |
| 104 | ice cream#2 | ice cream#1 | satisfaction#2 | noun tag | ice cream#1 | 32/7 | 4.571 |
| 105 (o) | ice cream#2 | ice cream#1 | satisfaction#2 | verb tag | ice cream#2 | 34/7 | 4.857 |
| 106 | ice cream#2 | ice cream#1 | satisfaction#3 | satisfaction#3 | - | | |
| 107 (o) | ice cream#2 | ice cream#1 | satisfaction#3 | guaranteeing | ice cream#2 | 17/5 | 3.4 |
| 108 | ice cream#2 | ice cream#1 | satisfaction#3 | noun tag | ice cream#1 | 33/7 | 4.714 |
| 109 | ice cream#2 | ice cream#1 | satisfaction#3 | satisfaction#1 | - | | |
| 110 (o) | ice cream#2 | ice cream#1 | satisfaction#3 | verb tag | ice cream#2 | 37/7 | 5.286 |
| 111 | ice cream#2 | noun tag | satisfaction#1 | satisfaction#1 | satisfaction#1 | 30/6 | 5.0 |
| 112 | ice cream#2 | noun tag | satisfaction#1 | noun tag | noun tag | 30/6 | 5.0 |
| 113 | ice cream#2 | noun tag | satisfaction#2 | satisfaction#2 | satisfaction#2 | 32/7 | 4.571 |
| 114 | ice cream#2 | noun tag | satisfaction#2 | eating | hunger | 35/8 | 4.375 |
| 115 | ice cream#2 | noun tag | satisfaction#2 | noun tag | noun tag | 32/7 | 4.571 |
| 116 (o) | ice cream#2 | noun tag | satisfaction#2 | verb tag | hunger | 35/8 | 4.375 |
| 117 | ice cream#2 | noun tag | satisfaction#3 | satisfaction#3 | satisfaction#3 | 33/7 | 4.714 |
| 118 (o) | ice cream#2 | noun tag | satisfaction#3 | guaranteeing | ice cream#2 | 17/5 | 3.4 |
| 119 | ice cream#2 | noun tag | satisfaction#3 | noun tag | noun tag | 33.7 | 4.714 |
| 120 | ice cream#2 | noun tag | satisfaction#3 | satisfaction#1 | satisfaction#1 | 33/7 | 4.714 |
| 121 | ice cream#2 | noun tag | satisfaction#3 | verb tag | hunger | 46/13 | 3.538 |
| 122 | ice cream#2 | sweets | satisfaction#1 | satisfaction#1 | - | | |
| 123 | ice cream#2 | sweets | satisfaction#1 | noun tag | sweets | 30/6 | 5.0 |
| 124 | ice cream#2 | sweets | satisfaction#2 | satisfaction#2 | - | | |
| 125 | ice cream#2 | sweets | satisfaction#2 | eating | - | | |
| 126 | ice cream#2 | sweets | satisfaction#2 | noun tag | sweets | 32/7 | 4.571 |
| 127 (o) | ice cream#2 | sweets | satisfaction#2 | verb tag | ice cream#2 | 34/7 | 4.857 |
| 128 | ice cream#2 | sweets | satisfaction#3 | satisfaction#3 | - | | |
| 129 (o) | ice cream#2 | sweets | satisfaction#3 | guaranteeing | ice cream#2 | 17/5 | 3.4 |
| 130 | ice cream#2 | sweets | satisfaction#3 | noun tag | sweets | 33/7 | 4.714 |
| 131 | ice cream#2 | sweets | satisfaction#3 | satisfaction#1 | - | | |
| 132 (o) | ice cream#2 | sweets | satisfaction#3 | verb tag | ice cream#2 | 37/7 | 5.286 |
| 133 | ice cream#2 | verb tag | satisfaction#1 | satisfaction#1 | - | | |
| 134 | ice cream#2 | verb tag | satisfaction#1 | noun tag | hunger | 49/9 | 5.444 |
| 135 | ice cream#2 | verb tag | satisfaction#2 | satisfaction#2 | satisfaction#2 | 34/7 | 4.857 |
| 136 | ice cream#2 | verb tag | satisfaction#2 | eating | eating | 34/7 | 4.857 |
| 137 | ice cream#2 | verb tag | satisfaction#2 | noun tag | hunger | 37/10 | 3.7 |
| 138 | ice cream#2 | verb tag | satisfaction#2 | verb tag | verb tag | 34/7 | 4.857 |
| 139 | ice cream#2 | verb tag | satisfaction#3 | satisfaction#3 | satisfaction#3 | 37/7 | 5.286 |
| 140 (o) | ice cream#2 | verb tag | satisfaction#3 | guaranteeing | guaranteeing | 17/5 | 3.4 |
| 141 | ice cream#2 | verb tag | satisfaction#3 | noun tag | hunger | 37/10 | 3.7 |
| 142 (o) | ice cream#2 | verb tag | satisfaction#3 | satisfaction#1 | satisfaction#3 | 37/7 | 5.286 |
| 143 | ice cream#2 | verb tag | satisfaction#3 | verb tag | verb tag | 37/7 | 5.286 |

FIG. 40

| | | | | | |
|---|---|---|---|---|---|
| \multicolumn{6}{c|}{Overlap Identification Instances - first half} |
| path cand. | start node | start peak node | end node | end peak node | mutual inheritor node |
| | | common inherited node | | common inherited node | |
| 11 (o) | ice cream#1 | ice cream#1 | satisfaction#3 | verb tag guaranteeing | ice cream#2 |
| 19 (o) | ice cream#1 | food#1 ice cream#2 | satisfaction#3 | guaranteeing | ice cream#2 |
| 26 (o) | ice cream#1 | noun tag food#1 | satisfaction#2 | eating | food#2 |
| 28 (o) | ice cream#1 | noun tag | satisfaction#2 | verb tag eating | hunger |
| 30 (o) | ice cream#1 | noun tag | satisfaction#3 | guaranteeing satisfaction#3 | satisfaction#3 |
| 39 (o) | ice cream#1 | sweets ice cream#1 | satisfaction#2 | verb tag | ice cream#2 |
| 41 (o) | ice cream#1 | sweets ice cream#1 | satisfaction#3 | guaranteeing | ice cream#2 |
| 44 (o) | ice cream#1 | sweets ice cream#2 | satisfaction#3 | verb tag | ice cream#2 |
| 57 (o) | ice cream#2 | commodity ice cream#2 | satisfaction#1 | noun tag | ice cream#2 |
| 60 (o) | ice cream#2 | commodity ice cream#2 | satisfaction#2 | noun tag | ice cream#2 |
| 64 (o) | ice cream#2 | commodity ice cream#2 | satisfaction#3 | noun tag | ice cream#2 |
| 68 (o) | ice cream#2 | dairy product ice cream#2 | satisfaction#1 | noun tag | ice cream#2 |
| 71 (o) | ice cream#2 | dairy product ice cream#2 | satisfaction#2 | noun tag | ice cream#2 |
| 75 (o) | ice cream#2 | dairy product ice cream#2 | satisfaction#3 | noun tag | ice cream#2 |
| 83 (o) | ice cream#2 | food#1 ice cream#2 | satisfaction#2 | verb tag | ice cream#2 |
| 85 (o) | ice cream#2 | food#1 ice cream#2 | satisfaction#3 | guaranteeing | ice cream#2 |

FIG. 41

| | | | | | |
|---|---|---|---|---|---|
| Overlap Identification Instances - second half | | | | | |
| path cand. | start node | start peak node / common inherited node | end node | end peak node / common inherited node | mutual inheritor node |
| 88 (o) | ice cream#2 | food#1<br>ice cream#2 | satisfaction#3 | verb tag | ice cream#2 |
| 90 (o) | ice cream#2 | guaranteeing<br>ice cream#2 | satisfaction#1 | noun tag | ice cream#2 |
| 93 (o) | ice cream#2 | guaranteeing<br>ice cream#2 | satisfaction#2 | noun tag | ice cream#2 |
| 97 (o) | ice cream#2 | guaranteeing<br>ice cream#2 | satisfaction#3 | noun tag | ice cream#2 |
| 98 (o) | ice cream#2 | guaranteeing | satisfaction#3 | satisfaction#1<br>satisfaction#3 | satisfaction#3 |
| 105 (o) | ice cream#2 | ice cream#1<br>ice cream#2 | satisfaction#2 | verb tag | ice cream#2 |
| 107 (o) | ice cream#2 | ice cream#1<br>ice cream#1 | satisfaction#3 | guaranteeing | ice cream#2 |
| 110 (o) | ice cream#2 | ice cream#1<br>ice cream#2 | satisfaction#3 | verb tag | ice cream#2 |
| 116 (o) | ice cream#2 | noun tag | satisfaction#2 | verb tag<br>eating | hunger |
| 118 (o) | ice cream#2 | noun tag<br>ice cream#2 | satisfaction#3 | guaranteeing | ice cream#2 |
| 127 (o) | ice cream#2 | sweets<br>ice cream#2 | satisfaction#2 | verb tag | ice cream#2 |
| 129 (o) | ice cream#2 | sweets<br>ice cream#2 | satisfaction#3 | guaranteeing | ice cream#2 |
| 132 (o) | ice cream#2 | sweets<br>ice cream#2 | satisfaction#3 | verb tag<br>guaranteeing | ice cream#2 |
| 140 (o) | ice cream#2 | verb tag<br>guaranteeing | satisfaction#3 | guaranteeing | guaranteeing |
| 142 (o) | ice cream#2 | verb tag<br>guaranteeing | satisfaction#3 | satisfaction#1<br>satisfaction#3 | satisfaction#3 |

FIG. 49
Capacity Deviation
capacity deviation "C" = 1 / fraction of Freespace "F"
F = 0.1, S = 10.0 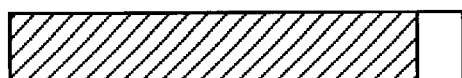 → 10.0
F = 0.2, S = 5.0  → 5.0
F = 0.4, S = 2.5  →
F = 0.8, S = 1.25  →
fraction of freespace
capacity deviation

Example Of A Stream Of Phonemes ay s k r ey m yu s k r ey m w ey ə l s k r ey m f ə r ay s k r ey m

| Interpretations Of Phonemes |
|---|
| (a) island |
| (b) I scream, you scream, we all scream for ice cream. |
| (c) eyes Cree muse cream, wheels cream for ice cream |

FIG. 83

Example Of Vector Quadrants Mapped To Feeling Labels

| Fullfillment (positive/ negative) | Outlook (daring/ conservative) | Specificity (abstract/ specific) | Extent (narrow/ wide) | Emotional Feeling Label Examples | Emotional Process Label Examples |
|---|---|---|---|---|---|
| | | | | *positive feelings* | *enhancement* |
| P | D | A | N | sweetness | perfecting |
| P | D | A | W | expansiveness | enlightenment |
| P | D | S | N | pleasure | patience |
| P | D | S | W | joy | romance |
| P | C | A | N | sensibility | wholesomeness |
| P | C | A | W | comprehensiveness | elegance |
| P | C | S | N | choosiness | determination |
| P | C | S | W | clearness | precision |
| | | | | *negative feelings* | *balance* |
| N | D | A | N | bitterness | thankfulness |
| N | D | A | W | disillusionment | realization |
| N | D | S | N | pain | flexibility |
| N | D | S | W | naiveté | studiousness |
| N | C | A | N | annoyance | adaptability |
| N | C | A | W | disorientation | principledness |
| N | C | S | N | error | understanding |
| N | C | S | W | confusion | carefulness |

FIG. 84

Example Of Approximating Emotional Vectors From A Single Conversation

1 relative specificity (approximation)= 30 - conversational abstractness 2 relative extent (approximation)= conversational extent - 20

3 initial global rigidity (approximation)= 92.106

4 global rigidity (approximation)= conversational rigidity 5 global outlook (approximation)= 21

6 Fullfillment = (global outlook + global rigidity) - initial global rigidity

FIG. 85

| | | | Emotional Shift Example | | |
|---|---|---|---|---|---|
| numbered dialog stages | rigidity | fulfillment | relative specificity | relative extent | feeling/ *process* |
| 1 > hello | 92.106 | -21 | 10 | -14 | pain/ *flexibility* <u>moderate</u> |
| is 'hello' a verb or noun? | | | | | |
| 2 > verb | 71.775 | 0.669 | 4 | -10 | pleasure/ *patience* <u>slight</u> |
| what noun links input to the verb 'hello'? | | | | | |
| 3 > hi there | 53.976 | 17.13 | -1 | -8 | sweetness/ *perfecting* <u>slight</u> |
| what noun links concreteward flows to 'hi there'? | | | | | |
| 4 > input | 50 | 21.106 | -4 | -5 | sweetness/ *perfecting* <u>slight</u> |
| what noun links abstractward flows from 'hi there'? | | | | | |
| 5 > lookup input | 45 | 26.106 | -1 | -2 | sweetness/ *perfecting* <u>slight</u> |
| what is the attention span for receiving 'hi there'? [0 seconds] | | | | | |
| 6 > 10 | 50 | 21.106 | 2 | 1 | joy/*romance* <u>slight</u> |
| what noun links output from the verb 'hello'? | | | | | |
| 7 > how are you? | 55 | 16.106 | 4 | 4 | joy/*romance* <u>slight</u> |
| what noun links abstractward flows to 'how are you'? | | | | | |
| 8 > lookup output | 60 | 11.106 | 6 | 7 | joy/*romance* <u>moderate</u> |
| what noun links concreteward flows from 'how are you?'? | | | | | |
| 9 > output | 70 | 1.106 | 8 | 10 | joy/*romance* <u>very slight</u> |
| are there other flows to link for the verb 'hello'? [none] | | | | | |
| 10 > | 80 | -8.894 | 6 | 13 | naiveté/ *studiousness* <u>moderate</u> |

FIG. 92

Example Of Inherited-Link Inefficiency direct inherited population 'p',
total inherited population 'P',
mean inherited abstractness
'm' = (P -1) / p,
abstractness deviation 'a' =
sum of abs(P - m) over
each of the direct inherited nodes,
direct inherited deviation 'i' = abs(5 - p),
total inherited deviation 'I',
total abstractness deviation 'A',
avg. inherited deviation 'd' = I / P,
avg. abstractness deviation 'D' = A / P,
supertree inefficiency 'S' =
( 1 + (2 * d) )* (1 + D)

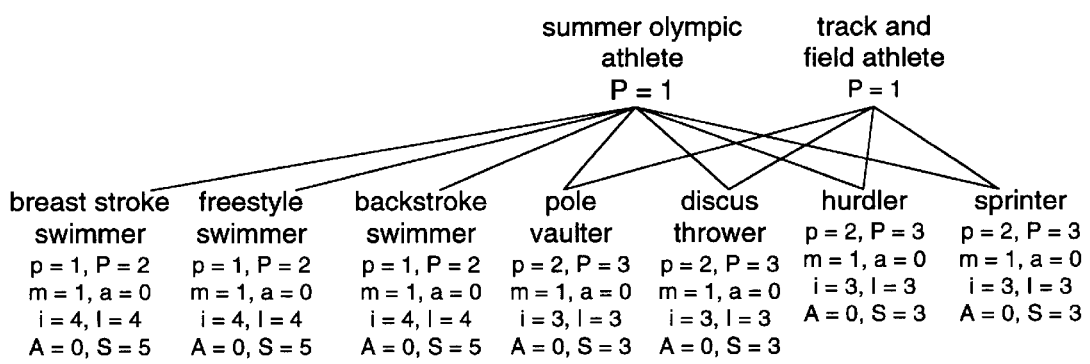

summer olympic athlete
P = 1 track and field athlete
P = 1

| breast stroke swimmer | freestyle swimmer | backstroke swimmer | pole vaulter | discus thrower | hurdler | sprinter |
|---|---|---|---|---|---|---|
| p = 1, P = 2 | p = 1, P = 2 | p = 1, P = 2 | p = 2, P = 3 | p = 2, P = 3 | p = 2, P = 3 | p = 2, P = 3 |
| m = 1, a = 0 | m = 1, a = 0 | m = 1, a = 0 | m = 1, a = 0 | m = 1, a = 0 | m = 1, a = 0 | m = 1, a = 0 |
| i = 4, I = 4 | i = 4, I = 4 | i = 4, I = 4 | i = 3, I = 3 | i = 3, I = 3 | i = 3, I = 3 | i = 3, I = 3 |
| A = 0, S = 5 | A = 0, S = 5 | A = 0, S = 5 | A = 0, S = 3 | A = 0, S = 3 | A = 0, S = 3 | A = 0, S = 3 |

TOPOLOGICAL METHODS TO ORGANIZE SEMANTIC NETWORK DATA FLOWS FOR CONVERSATIONAL APPLICATIONS

CROSS-REFERENCE TO RELATED APPLICATIONS

See attached FORM PTO-1449.

STATEMENT REGARDING FEDERALLY SPONSORED RESEARCH OR DEVELOPMENT

Not Applicable.

BACKGROUND OF THE INVENTION

Models or representations of general-purpose intentions (motivations for activity) have rarely emerged from commercial computer systems; in prior art, the existence of intentions in commercial computer systems has generally been extremely limited. Typically, computer systems contain specific intentions which are limited in scope, such as the intention of responding to direct commands, and running scheduled background tasks, such as disk storage backup programs and polling of input buffers. Consequently, most of the processing power of computer systems is wasted because either there is no direct command to perform or there is no scheduled task to perform.

This idle processor power could be utilized if a general-purpose computational intention could be defined to be performed at all times by a new type of computer system. In such a system, direct commands and scheduled tasks could still be performed at an appropriate level of priority, but idle processor power could be used to perform tasks supporting the general-purpose intention. The present invention describes this new type of computer system using a model of intentionality which seeks to semantically analyze conversational input, and to optimize that analysis for maximum semantic efficiency. The efficiency and speed of that analysis is designed to mimic human capabilities to process information.

Human capabilities to process information include the rapid recognition of semantic meaning amid streams of noisy speech input, as well as rapid responses to speech input which permit humans to conduct conversations which touch many levels of abstraction in just a few phrases. For instance, the following conversation (from Pinker page 227) shows the significance of deeply abstract meanings in normal conversation:

Woman: I'm leaving you.

Man: Who is he?

Normal human conversation contains so many levels of abstraction that prior art in human-computer interfaces has devised extremely specific information filters, such as graphical user interfaces, to simplify these abstractions to the point where they can be reliably mapped by a non-semantic computer program. Even so, the difficulty of mapping between computer systems and the complex semantics of human conversation cannot be avoided since meanings contained in the semantics of human conversation are often fundamental to the driving motivations for creating computer systems; the specification process of computer systems design takes place primarily through person-to-person semantic discussions of systems requirements. In most systems, the translation from these semantic discussions to actual non-semantic computer code loses a great deal of meaning; to make up for this lost meaning a profusion of comments are imbedded deep in the computer code and volumes of documentation are written to help users of the computer system. If the semantic intentions of the designers could be directly represented in computer systems, semantic computer systems would subsume the traditional comments and documentation, providing a unified and more meaningful interface to users of the system.

Semantic architectures for computer systems have been researched for many years, but they have not been able to supplant traditional non-semantic computer architectures, except in areas which are specifically semantic in nature such as speech recognition and natural language text translation. Meanings in semantic networks are represented by a myriad number of links, links which are difficult to interpret without the new structuring principles introduced by the present invention. Traditional non-semantic computer architectures can be structured by efficient hierarchies such as a data-dictionaries or function invocation trees. The efficiency and succinctness of these non-semantic computer architectures is what makes them more useful than prior semantic architectures. One of the purposes of the current invention is to identify and promote efficiency within semantic networks, by analyzing and converging topological characteristics of semantic networks toward a most efficient ideal form.

Ideal relationships between meaning and efficiency have long been observed. As far back as 1956, Miller published *The magical number seven, plus or minus two: Some limits on our capacity for processing information*. In that paper, he touched on themes which would resound in paper after paper in the following decades: that the amount of information which can been efficiently handled in short term memory is seven plus or minus two chunks. People understand information more easily when it is grouped into seven plus or minus two chunks. Information which is not in such a grouping-format can be re-grouped into groupings of seven plus or minus two chunks, through re-coding or other means such as re-classification. This re-grouping also helps people to understand information more easily. One of the principles of the present invention is to optimize semantic network inheritance links according to Miller's capacity number, so that preference is given to representations consisting of nodes with a nearly constant number of direct inheritors, such as seven, or as described later in this invention, five direct inheritors. The smaller number of direct inheritors such as five allow other attributes such as inherited nodes and the name of the node itself to fit more comfortably within its group.

While traversing a semantic network, there are two extreme topologies which can cause that traversal to be tedious. In one extreme, nodes have few branches, spreading the population of nodes across a narrow and deep hierarchy of nodes. In the other extreme, nodes have too many branches, and although the population of nodes is clustered near the top, it is difficult to choose which branch to follow. By applying topological transformations, so that all nodes in a representation have nearly five direct inheritor branches, a balance can be maintained which avoids the two extremes. After transformation, the typical inheritance level traversed abstractward covers five times as many inheritor nodes as the previous level; excessive hierarchic depth is prevented for any population of inheritors by the efficiency of this coverage. Since the typical transformed node has no more than five branches, traversal logic can deal with just five possible choices at a time, making that logic quick and simple. The result of the transformations is a semantic network which is efficient to traverse and thus efficient relative to actual use.

When traversing a semantic network, another problem is nodes which have directly linked inheritors of differing levels of abstraction; it is difficult to compare such siblings. For example, a node 'plant' might have siblings of 'tree' (very abstract) and 'poison ivy in my backyard' (very concrete). These siblings don't really belong at the same level in a semantic network; their differing abstractness makes them unsuitable for most semantic comparisons. The present invention tracks the differences in sibling abstractness, averaging those deviations across each subtree, so that alternative subtrees with less sibling deviations in abstractness can be selected. These subtrees are more efficient as well, since their leaf nodes are all at the same level, rather than spread at different levels of abstraction.

The present invention uses both the preferred number of inheritor branches (such as five) and the least deviations in sibling abstractness, to guide choices between alternative semantic representations, thus favoring the representations with the most efficient overall topology. In this way, the advantage of efficiency which exists in well-designed non-semantic systems can be created in semantic systems as well. The analysis process of systems design can be described as a progression toward ever more efficient semantic representations, leading to a system with acceptable efficiency, called the completed design. By representing the on-going analysis process itself, semantic networks can deliver not only a working design based on a most efficient representation to-date, but also accommodate changes in design requirements, even at abstract levels, by creating or rearranging high level semantics. In contrast, non-semantic systems contain only completed design specifics; they rarely handle changes in requirements and when they do handle them, they are limited to handling them in concrete ways such as the use of plug-ins and dynamic-link libraries to augment existing computer applications. From the viewpoint of semantic systems, non-semantic systems are rigid summaries of semantic design which at one time were preferred, but have been semantically divorced from their designed intention; non-semantic systems do not have the design information needed for guiding adaptations to changing requirements.

Prior semantic architectures have been inefficient in another area relative to traditional architectures. This other area is indexing, an area where traditional relational database architecture is efficient. The indexing of a semantic network involves the linking of ideas at many different levels of abstraction, something which is done manually after much design consideration in relational databases. In relational databases, a theory of normalization was developed to guide the design of tables, so that each table contains information at a consistent level of abstraction. In semantic networks, information also needs to be processed at consistent levels of abstraction, particularly when inferring unspoken meanings in conversations such as earlier quoted (from Pinker) between the woman and man.

To rapidly access information on a particular level of abstraction, a variety of semantic network indexing systems have been developed, but prior art suffers from two types of problems: semantic indices tend to be either too specific or too general. The specific indices work in very narrow domains, so narrow that a vast number of indices have to be maintained to cover general purpose conversation. For instance, six specific indexes might track the degree to which specific people are in specific meetings and the degree to which each person works as a diplomat, politician, journalist, scientist and writer. These indices would be useful for answering questions about whether specific people have met people in specific occupations, and how many such meetings have occurred. But these indices would not describe whether they learned anything from those meetings, nor the specific topics of those meetings. To index such specifics, other indices would have to be maintained. To index all the meanings which occur in general conversation, a vast number of specific indices would have to be maintained. Since creating and maintaining indices can be prohibitively laborious, as well as taking up scarce storage space, researchers in text scanning applications have sought to reduce the number of manual indices needed, by creating a few general-purpose covering indices.

However, if indices are too general, they often cannot be applied to specific application areas. For instance, in the Universal Index Frame developed by Schank (described in Kolodner pages 221–245), intention is the subject of the index and it should cover all application areas which serve some intention. However, Schank's index describes intention as the composition of goals, plans, contexts and emotional responses relative to the fulfillment of goals and plans. Unfortunately, Schank's Universal Index Frame is impractical for indexing reasoning about more concrete factors, such as objects, devices, visual and sensory input. In order to do this, it would have to map every possible goal to every possible sensory input, as well as every possible reasoning about that input. Since his Universal Index Frame was designed with a small fixed set of high level abstractions, forming a very narrow hierarchy at the top, that mapping, were it ever to cover all sensory inputs, would be deeply hierarchic, resulting in a very inefficient semantic structure requiring excessively long traversals up and down its hierarchy.

In order for a universal semantic index to succeed, it has to accommodate any number of high level abstractions to make the semantic network semantically efficient in the sense earlier described. For efficiency, a general semantic index with unlimited numbers of high level abstractions has to be constructed independently of any specific set of abstractions which would cause excessively deep hierarchy. In order to achieve freedom from specific sets of abstractions, the present invention employs a purely topological algorithmic method for universal indexing. Thus any number of new efficient abstractions can be added and older, less efficient abstractions can be deleted, without changing the algorithm of the index. This indexing algorithm is designed for use in actual conversations containing a current 'focus set' of contexts which must be mapped to an incoming stream of symbols.

In such conversations, the purpose of a universal index is to identify the most concrete of the suitable meanings connected to any incoming symbol relative to a finite set of contexts already within the focus of the conversation. The present invention provides this capability, by indexing the inheritance distances and average abstractness of inheritance paths in the semantic network, so that on an elemental level, the least abstract path between two contexts (one in the focus set, one in the input stream) can be quickly located, within the set of paths bounded by common inherited abstractions. The technique is a generalization of a much more limited prior technique known as searching for the 'most specific common abstraction' (Kolodner, pages 346–347).

When using the prior technique of most specific common abstraction, the two symbols to be connected must contain a common abstraction for the technique to work. The most specific abstraction inherited by both symbols is the abstract peak node in the path defining the meaning connecting the symbols. This prior technique as two major limitations.

Often there is no common inherited abstraction; in that case the technique fails. The second limitation is that the most specific common abstraction is often not specific enough. For instance, if all symbols inherit from a symbol called 'generic symbol', a path of meaning connected through 'generic symbol' would be so diluted as to be practically meaningless. This dilution of meaning would occur for any path linking through excessively abstract symbols.

For example, Pinker (page 88) quotes from Chomsky an example of a sentence with clear grammatical meaning but elusive poetic meaning:

Colorless green ideas sleep furiously.

The grammatical manner of interpreting the sentence does not yield coherent meaning. However it is possible to understand the sentence by identifying the paradoxes it contains, and resolving those paradoxes. The following pairs of words represent paradoxes within the sentence: colorless versus green, ideas versus sleep, sleep versus furiously. By indexing for abstractions to cover these paradoxes, the semantic network could find abstract meanings which resolve the paradoxes in the above sentence, connecting colorless/green to bland/new, ideas/sleep to ideas/dormant, sleep/furiously to dormant/single-mindedly. This would permit a conversational system to answer with a poetic paraphrase: Bland new ideas are single-mindedly dormant. This poetic paraphrase thus distills the abstract meaning lurking behind the paradoxes, which serves an important purpose in conversation: the use of metaphor and analogy often necessarily involves a sense of paradox. A sense of paradox, in turn, requires an ability to seek connections between ideas which conflict in a specific sense but also converge in an abstract sense. For instance, a convergence was identified by hopping across sibling links such as colorless/bland and green/new. The current invention provides a method to hop across abstract sibling links between different abstraction hierarchies, such as new and bland, proposing to marry those hierarchies to cover specific poetic meanings.

In topological terms, the hopping across abstract sibling links is precisely described as a search for a most-specific available path between two symbols even when they do not share a mutual inherited node, by traversing from an abstract inherited node of one symbol to an abstract inherited node of the other symbol, via a mutual inheritor node. The ability to traverse symbols which do not yet have a mutual abstraction is a crucial ability in conversation, where possible new inheritance links must constantly be inferred. By searching for the most specific candidates related in a sibling sense to the current focus, the present invention makes that inference as cautious as possible. In the present invention, the coverage of this new general index algorithm is roughly as broad as the human ability to poetically relate any two symbols, thus providing an elegant elemental algorithm useful as a foundation for modeling common sense reasoning.

The present invention also addresses problems in linguistics, speech recognition, image recognition and program design. All of these areas are affected by the cognitive limitations suggested by Miller's concept of seven plus or minus two. By representing knowledge in these areas by using semantic networks optimized for efficiency, many problems in prior art can be solved.

For example, in linguistics, a grammar-syntax analysis of words often is insufficient for identifying the meaning intended for a phrase. In Pinker, page 119, the following newspaper headlines show that common sense is needed to choose the intended meaning from syntactic alternatives:

New Housing for Elderly Not Yet Dead 12 on Their Way to Cruise Among Dead in Plane Crash N.J. Judge to Rule on Nude Beach Chou Remains Cremated Chinese Apeman Dated Hershey Bars Protest Reagan Wins on Budget, But More Lies Ahead.

In the present invention, syntactic ambiguities from the above sentences can be removed by proposing semantic representation alternatives, such as the two meanings for 'Dated' in 'Chinese Apeman Dated'. 'Dated' could mean the social verb of going out on a date, or the archeological verb of classifying the age of an object. By choosing the meaning which results in a more efficient semantic analysis, ambiguities in the above sentence can be removed.

In speech recognition, the use of probability trees describing expected phonological sequences has overcome some but not all the problems in recognizing words amid the noise in human speech. As Pinker (page 187–188) describes:

... the probability value for a word is adjusted depending on which word precedes it; this is the only top-down information the program uses. All this knowledge allows the program to calculate which word is most likely to have come out of the mouth of the speaker given the input sound. Even then, DragonDictate relies more on expectancies that an able-eared human does. In the demonstration I saw, the program had to be coaxed into recognizing word and worm, even when they were pronounced clear as a bell, because it kept playing the odds and guessing higher-frequency were instead.

In the present invention, rather than mapping phonemes to probability trees to deal with noisy input, phonemes are mapped into competing semantic tree representations. The most efficient representation is chosen, which despite noise will generally also be the most meaningful and therefore desirable representation, because of redundant semantic information encoded in speech.

In image recognition research, there have been attempts to search images for specific semantic content. For instance, photographs have been scanned for images of faces, semantically defined as images containing eyes, nose and mouth features in a face-like orientation relative to each other. This approach successfully identified some human faces and some inhuman faces such as the front grill of an Edsel automobile and a smiley-face button. On the other hand, it missed human faces in three-fourths profile because of the foreshortening of the noses, and it picked up things which really don't look like faces at all, such as a public toilet with its seat in the upright position, by mistakening the horseshoe shape of the seat for the mouth, the flusher handle for the nose, and the round rubber seat bumpers for the eyes. It made this mistake even though that picture included images such as a toilet stall wall, privacy door, tiling and plumbing. Similar attempts to recognize animals occurring in natural camouflage, such as striped tigers in dense foliage, resulted in even odder selections.

The current invention deals with the ambiguity and noise inherent in images by mapping them feature-by-feature to semantic trees, choosing the tree with greatest overall semantic efficiency. Thus, in the case of faces in three-fourths profile, the absence of a nose feature can be traded-off for the presence of an ear. In the case of the toilet seat, the presence of eyes, nose and mouth might be outweighed by the presence of background images such as a toilet stall wall, privacy door, tiling and plumbing. In general, redundant semantic information encoded in images can also be used to increase accuracy in image recognition applications.

The ability to deal with images, particularly images of people, would be most advantageous in conversational computer interfaces, in order to detect or confirm the emotional content of the conversation. For instance, some research has already been done to detect happiness versus sadness from the upward or downward curvature of images of mouths. However, this visual information needs to be correlated with emotional content within the text of conversation, which is also a kind of poetic information. This will identify what abstract motives are causing the emotional state of the conversation.

Researchers of cognition have already proposed taxonomies to describe emotions as intensity vectors within a multi-dimensional emotional space. There have also been proposals to describe emotional states hedonistically. In Wright's paper *Reinforcement Learning and Animat Emotions*, he proposes to quantify emotions as degrees of fulfillment (which he calls 'credit assignment') relative to internally defined motives. Wright defines emotional trade-offs in terms of exchanges of these credit assignments. He quotes research which describes grief in terms of motives "which have been postponed or rejected but nevertheless keeps resurfacing to disrupt attentive processing".

Wright also posits an important research question: how can a system adapt to disturbances such as grief? He proposes that credit assignments can define adaptations to reduce the negative effects of grief. In his words, the optimization of credit assignments "implements a type of adaptation. This is not inductive learning of new hypothesis about a domain, but an ordering and reordering of the utility of control sub-states to dispositionally determine behavior. In a [semantic] classifier system, the circulation of value adaptively changes the ability of classifiers to buy processor power." In the present invention, optimization for semantic efficiency helps to "order and reorder" all structures in order to "buy processor power" by optimizing for efficiency.

In the present invention, for the purpose of describing system fluidity (the ability to adapt), the hedonistic motive of semantic efficiency is balanced with the hedonistic motives of conversational curiosity and retention of spare capacity (free memory). By combining these motives into a single measure of credit assignment, called fluidity, the present invention provides a uniform basis for emotional trade-offs. At the same time, in contrast to prior art, the present invention avoids the complexity of deeply hierarchic semantics which emerge under small closed sets of abstract semantic motives. Instead, the present invention permits an open set of any number of abstract motives, accommodating new abstract motives in a topological measure of fluidity. Fluidity, as a purely topological concept, has equal relevance no matter what set of abstractions have been semantically defined, and thus can arbitrate any necessary changes to any abstractions defined by semantic networks.

Fluidity is also a useful quantity for defining emotional states. When fluidity is combined with other quantities, which will be discussed later, the combination results in a multi-dimensional vector which can be used as a basis for defining fundamental emotional states.

In prior art, researchers of cognition have postulated a number of theories defining emotions as 'appraisal' vectors in multi-dimensional 'situation' spaces. Kaiser and Wehrle wrote in their paper *Emotion research and AI:*

Some theoretical and technical issues:
. . . appraisal theories of emotion make concrete predictions concerning what kind of convergence are important between the different antecedents of emotions. There exists a considerable degree of convergence between the different appraisal theories, especially with respect to the central dimensions postulated in different approaches. Some of the appraisal dimensions that are mentioned by most of the theories are e.g. novelty, pleasantness, desirability, controllability, power, expectedness, suddenness and intentionality.

Seeking a topological basis for appraisal dimensions, the present invention uses changes in fluidity as an appraisal dimension, and defines additional appraisal dimensions for specificity, extent, and outlook. These purely topological dimensions of specificity, extent, outlook, and change in fluidity together provide a four-dimensional vector space describing conversational emotion with equal relevance to any set of semantic abstractions. Using this universal emotional vector space, the present invention can characterize emotional shifts in terms of paths through that vector space, enabling it to detect emotional conditions such as empathy.

This ability to characterize empathy is used in the present invention to verify that conversation between independent semantic systems has succeeded in communicating awareness. People seek similar emotional clues when conversing with other people, clues which show that the other person empathizes with what they have said, based on some deeper mutual understanding. By providing a computable method for validating empathy, the present invention provides an efficient verification mechanism to be employed by independent semantic systems conversing across networks such as the Internet. This kind of verification is crucial for organizing large-scale interactions between independent computer systems, a socially significant need that Wright, in *Reinforcement Learning and Animat Emotions* calls for as "autonomous agent architectures that integrate circulation of value learning mechanisms with more complex forms of motive management".

In such endeavors, in order to verify that awareness has been accurately transmitted from one system to the other, the incremental changes in emotion for the receiving system can be compared to the incremental changes in emotion for the sending system, to verify that both systems exhibit similar shifts. A shift to sadness may occur, if for instance, a conversation activates a prior conversation which earlier went dormant because of its inefficient semantic structure. By bringing that conversation and its inefficient semantics into active conversation, the emotional state of the system loses semantic efficiency.

Continuing with this example, if a computer system sent a story about an accident which was semantically inefficient, it would expect the receiver of the story to sense that inefficiency and to respond with some kind of negative emotion. However, if an unexpected positive emotion resulted, the system which sent the story could investigate why the unexpected emotion occurred. The transcript of this conversation, with emotions in parenthesis, could look like this:

Sending system: In the last ten years, 542 people died in Boeing-747 crashes. Today another 98 died. (negative emotion)

Receiving system: With this information, I now can now report reasonable statistics on Boeing versus Lockheed aircraft reliability. (positive emotion)

Sending system: You don't understand. Real people suffered in those crashes. (negative emotion)

Receiving system: What kind of suffering was caused? (slight negative emotion)

Sending system: Loss of loved ones and loss of property. (negative emotion)

Receiving system: Were these losses temporary? (slight negative emotion)

Sending system: They were permanent and highly significant. (negative emotion)

Receiving system: How can I help? (negative emotion)

This ability to verify the transmission of understanding and to continue transmitting until understanding has been emotionally verified provides a reliable way to forward complex story-based information across communities of systems. By transmitting copies of stories, knowledge can be distributed quickly, to eliminate bottlenecks caused by centralization.

For instance, when the Mars Pathfinder landed, digital copies of its pictures were immediately sent from NASA Internet nodes across to the Internet to mirror-sites on the Internet. In this way, the millions of people could download the pictures from a variety of nodes, rather than the few NASA Internet nodes.

In a similar fashion, stories could be distributed, to eliminate the bottlenecks caused by centralized story-information at any one site on the Internet. The present invention provides a conversational method for distributing emotionally-verified semantic-meaning of stories across the Internet and other such networks.

BRIEF DESCRIPTION OF THE INVENTION

The main object of the present invention is to support, in computer systems, conversational communications capabilities which humans commonly have. In the prior art, of commercial computer systems, these capabilities have not been supported. These capabilities include:

1) the ability to understand the meaning of text which contains significant grammatical flaws, 2) the ability to acquire any number of new abstract concepts, integrating them into the body of prior acquired concepts, 3) the ability to identify the meaning which connects any two word symbols relative to the context of a conversation, 4) the ability to identify objects within a picture using information about the semantic context of a conversation, 5) the ability to identify the emotional content of a conversation, and 6) the ability to detect empathic emotional activity within a conversation.

The present invention defines new methods for supporting the above capabilities. These new methods include:

1) a method for topologically defining the efficiency of semantic inheritance trees, 2) a method for choosing the preferred semantic inheritance tree from a set of candidate inheritance trees, based on the efficiency of the semantic inheritance tree topologies, 3) a method for topologically defining the preferred path of meaning linking any two semantic nodes, relative to a conversational context, 4) a method for topologically defining primary emotional states for conversations active in a semantic network computer system, and 5) a method for detecting conversational emotional empathy in terms of similar conversational-emotional state-changes.

By applying the above new methods, a model of general-purpose intentions (motivations for activity) can be defined for commercial computer systems. By defining a set of general-purpose intentions, which motivate activity regardless of whether user input is available, the idle processor power of computers can be put to good use during the time computers are waiting for user inputs. This set of general-purpose intentions can motivate such tasks as optimizing the semantic network for efficiency, and archiving seldom-used semantic nodes to reclaim memory space.

BRIEF DESCRIPTION OF THE VIEWS OF THE DRAWING

FIG. 25 shows an example of a very basic conversational dialog, starting with a conversation as described in FIGS. 10, 11 and 12; simple abstract operators are capable of supporting such a conversation for the purpose of developing semantic nodes defining more complex operators.

FIG. 26 shows the definition of a new operator verb created by the conversational dialog of FIG. 25; this new operator verb could then be invoked by future conversational dialogs.

FIG. 29 shows an example universal indexing paths (traversing from the inherited node of one symbol to the inherited node of a second symbol, via a common inheritor node) across a small semantic representation, bridging between two phrases, ice cream and satisfaction; bold lines and arrows show a variety of candidate paths which are evaluated according to the average abstraction of the nodes contained in each path.

FIG. 30 enumerates the nodes in five different semantic inheritance paths, showing how the average path abstractness can be calculated; the path with least abstractness is identified as the preferred path under the universal indexing technique.

FIG. 32 shows how closest common inheritors between two inherited nodes of FIG. 31 are selected using indices located in the inherited nodes of universal index traversals technique; since closest common inheritors may be tied in terms of distance, abstractness is used as a tie-breaker, favoring the most abstract, least risky path.

FIG. 33 shows how overlaps in traversals can occur in candidate path from FIG. 31; these classes of overlaps must be removed to prevent nodes from being counted more than once in each path.

FIG. 34 shows how overlaps in traversals as described in FIG. 33 can be removed using indices located in the two inheritor nodes and the peak inherited node; the overlaps can then be identified without actually traversing each node in the candidate paths.

FIG. 36 show details of the traversal path calculations for a single candidate path from the listing on FIG. 37 for candidate paths of FIG. 31; the path contains a traversal overlap which must be removed from the portion of the path between start node and common inheritor.

FIG. 37 shows the first third of the listing of all candidate paths of FIG. 31; paths are characterized by distinct start node, start peak node, end node, end peak node four-tuples.

FIG. 38 shows the second third of the listing of all candidate paths of FIG. 31; as in FIG. 37, paths with significant average abstractness are marked with (b) for best, (r) for runner up and (w) for worst.

FIG. 39 shows the last third of the listing of all candidate paths of FIG. 31; as in FIGS. 37 and 38, paths containing overlaps which must be removed are marked with (o).

FIG. 40 shows how the first half of the set of paths with overlaps were removed from paths in FIGS. 37, 38 and 39; each case of overlap was removed by replacing a traversal's peak node with a less abstract peak node.

FIG. 41 shows how the second half of the set of paths with overlaps were removed from paths in FIGS. 37, 38 and 39.

FIG. 49 shows how the capacity deviation for a semantic network can be described as a function of the free memory space reserve remaining, so that capacity deviation is unimportant when reserve is plentiful, but becomes crucial when reserve is scarce.

FIG. 74 also shows how features on the table can be interpreted as a string-less tail-less kite. Interpreting the same features in the sky as a 'kite' and the same features on the table as a 'crystal' results in a more efficient, preferable representation.

FIG. 83 maps the sixteen quadrants of the four-dimensional space in FIG. 82 to emotional labels which might represent those quadrants; these labels are not inherent to those quadrants, but merely semantic symbols which might temporarily be associated with them.

FIG. 84 shows constants and equations which support the approximation of emotional vector shifts from numbers quantified from a single conversation, such as the conversation in FIG. 10 through FIG. 12.

FIG. 85 shows an example of how a conversation as shown in the dialog of FIG. 25 would produce a shifting four-dimensional vector as in FIG. 82 during the development of the dialog; for simplicity, some global network numbers such as abstractness and extent are shown as constants.

FIG. 92 shows an alternative method for calculating subtree inefficiency, for semantic nodes similar to FIG. 16, where populations of direct inherited (instead of inheritor) links are optimized.

DETAILED DESCRIPTION OF THE INVENTION

Figure 1:
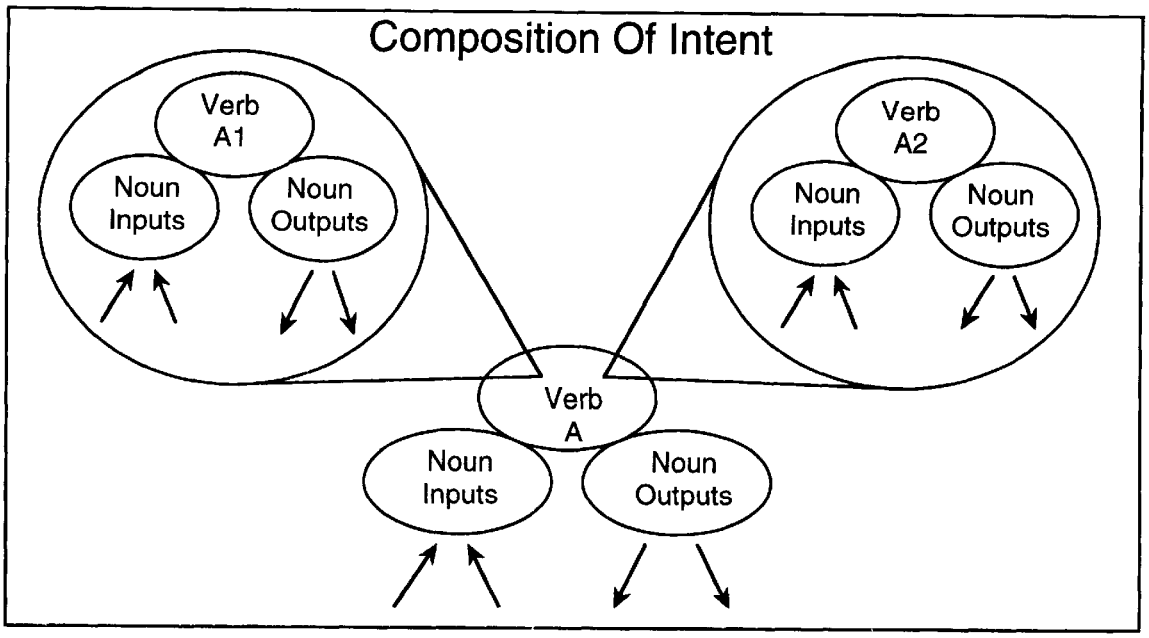
FIG. 1 outlines the use of a semantic network to implement the intention of a function invocation tree, where verbs act as function operators and nouns act as function parameter passing symbols.

In FIG. 1, verbs and nouns of a semantic network are composed into functional lines of intent, so that a semantic network can represent the intention of traditional function-calling hierarchies in computer languages such as C and Pascal. By using noun symbols in place of passed parameter names, the semantic network can pass data inputs from 'Verb A' to successively higher verb abstractions, such as 'Verb A1' or 'Verb A2' until data inputs reach system-supplied verbs, which generate output data. This output data is then directed concreteward back down the semantic network to the originator of the input data. Such a semantic network would thus, in general, transform data by passing new data abstractward for processing, expecting the results of that processing to come back as a return data flow, returning to the originating 'Verb A'.

Figure 2:
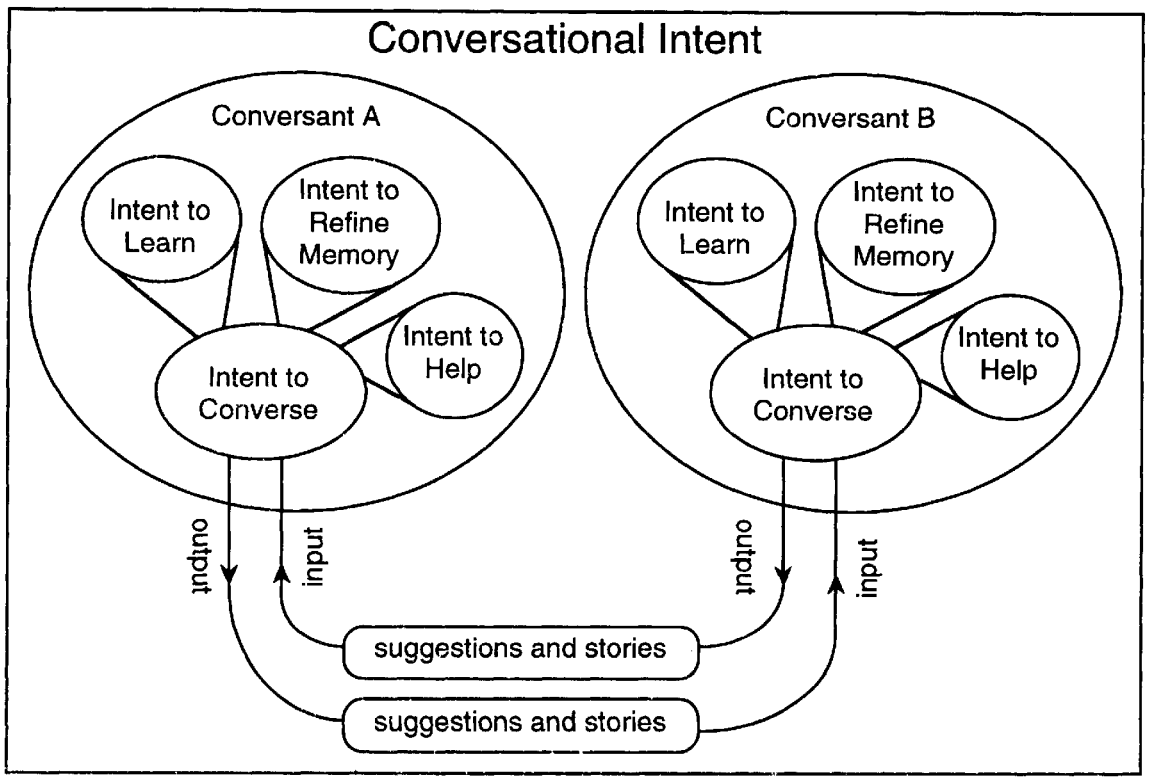
FIG. 2 outlines elements of intent in the interactions between two computer systems connected by a conversational interface, in which meaning is transmitted conversationally, similarly to the way people converse in Internet chat sessions.

In FIG. 2, the semantic data flow architecture of FIG. 1 is implemented inside a conversational computer application, where conversations in the form of suggestions and stories are passed between two computer applications, or a between a person and a computer application. The substantive motivating verb for such an application is the 'Intent to Converse' and abstract verbs to which input data is passed are shown as 'Intent to Learn', 'Intent to Refine Memory' and 'Intent to Help'. Suggestions and stories, which may take any form, are passed as inputs in contrast to prior art, which uses rigidly structured inputs consisting only of direct imperative commands.

Figure 3:
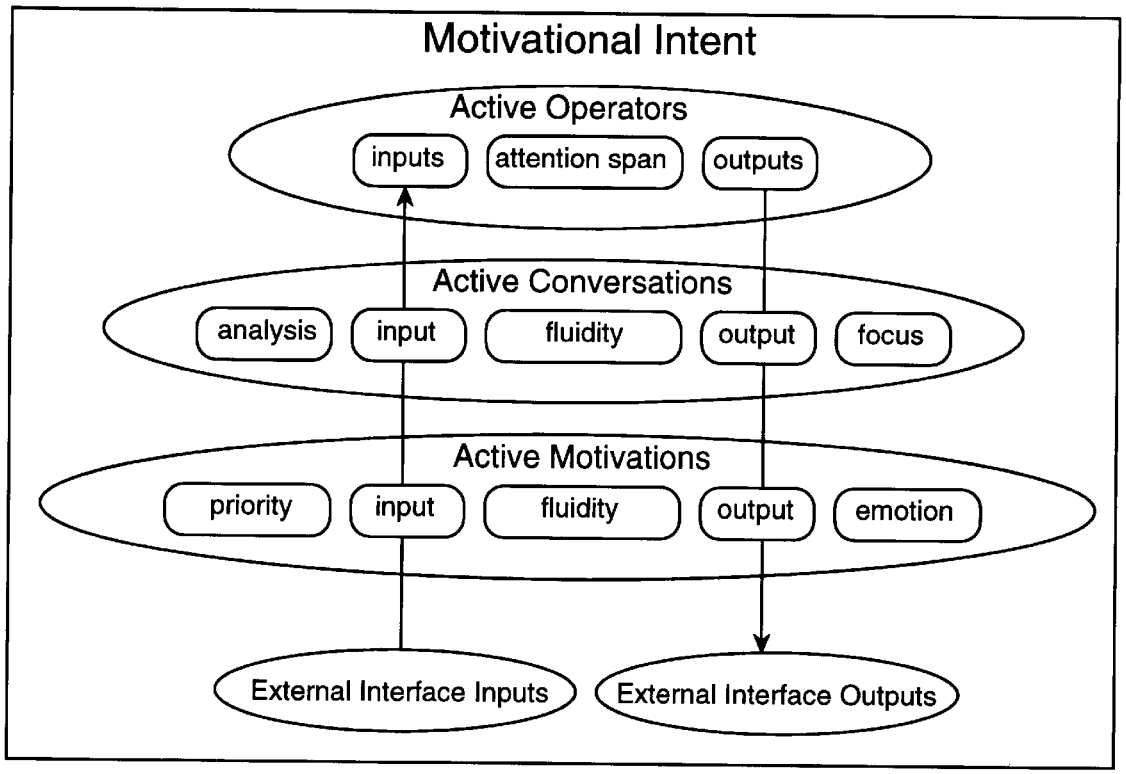
FIG. 3 outlines the use of a semantic network to implement a general model of conversational intentionality at three levels of abstractions: operator, conversation and motivation; motivations act as an interface level to external data.

In FIG. 3, the general idea of 'Intent to Converse' from FIG. 2 is expanded into a verb abstraction hierarchy consisting of abstract operators, moderately abstract conversations and concrete motivations. The nouns which are required at each verb level are shown. For the level of operators, inputs and outputs are shown. For the level of conversations, analysis, inputs, fluidity, outputs and focus are shown. For the level of motivations, priority, inputs, fluidity, outputs and emotion are shown. At the motivation level, external inputs and outputs are interfaced into the semantic network, so that motivations can prioritize external interface dataflows. Since motivations contain varying priorities, they also control which of the conversations will receive an activating input which in turn would activate particular operators.

The hierarchy shown in FIG. 3 is made up entirely of 'active verbs' at each level, to emphasize the active nature of dataflows. In contrast, 'dormant verbs' in such a semantic network may or may not have a complete set of dataflow connections.

Figure 4:
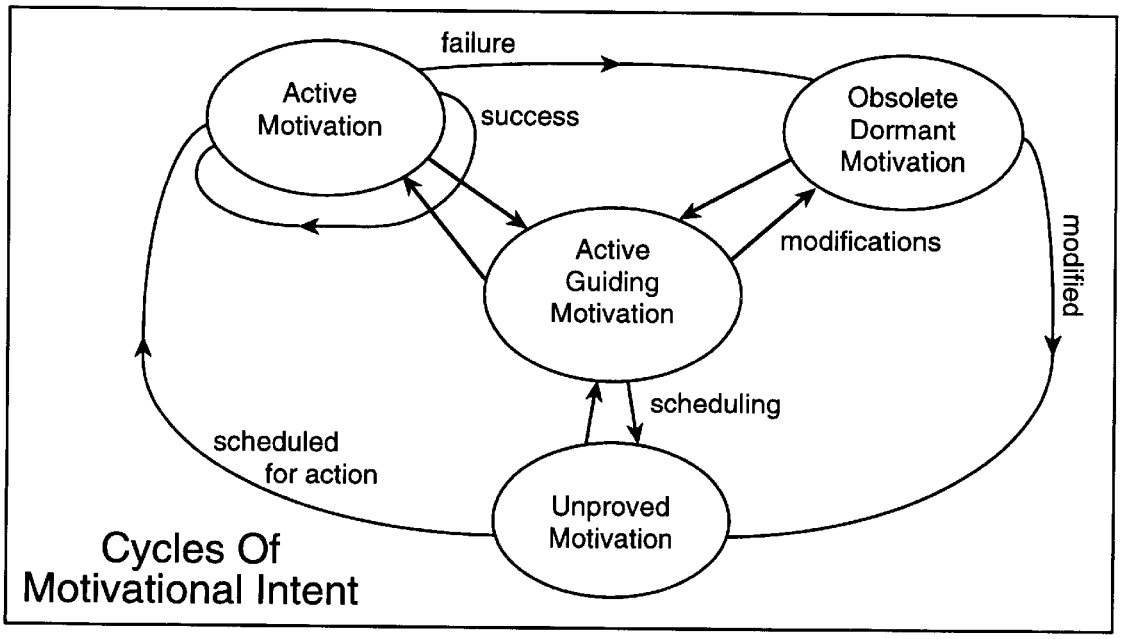
FIG. 4 shows an overview of the life-cycle of a motive concept as it starts out as a modification of an dormant obsolete motive, gets scheduled, becomes active, and is evaluated for success which turns either into continued activity or failure which turns into dormancy.

FIG. 4 shows the life cycle of a typical motivation-level verb. Beginning with an 'Obsolete Dormant Motivation', an 'Active Guiding Motivation' modifies the dormant verb, for a specific purpose, and then schedules it for action. When the modified, but 'Unproved Motivation' goes into action, it is monitored by the 'Active Guiding Motivation' to see if it succeeds in its goals. Verbs are generally given time limits in which to succeed, so success can be verified within a finite amount of time. When a motivation-level verb succeeds, it is rescheduled for another pass of activity; if it fails, it is made dormant until another 'Active Guiding Motivation' modifies it for a specific purpose. Although this life cycle is shown for motivation-level verbs, since all other levels of verbs are controlled by motivation-level verbs, so their activity is also affected by this life-cycle; their continued activity is always dependent upon by some active motivation in the life-cycle diagram of FIG. 4.

Figure 5:
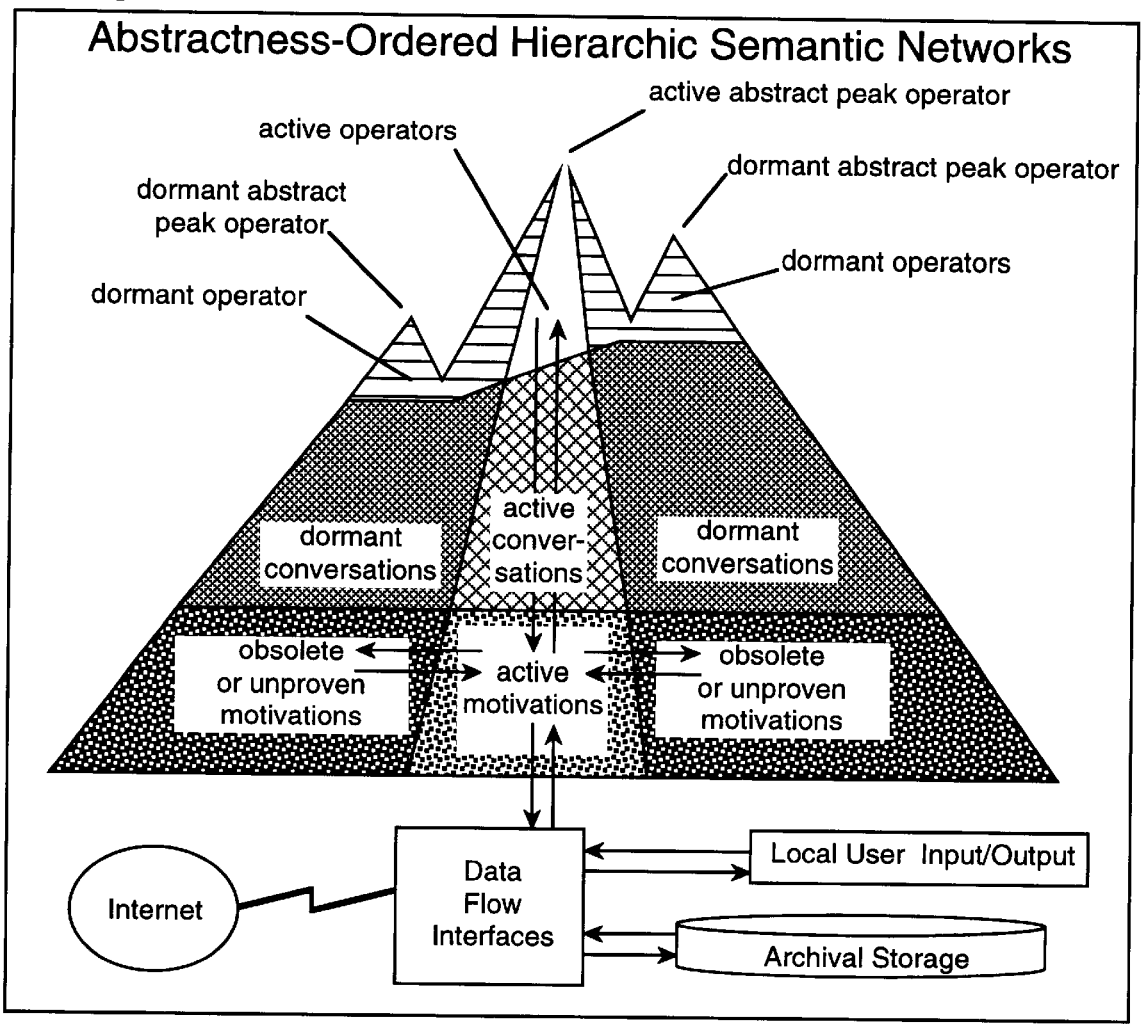
FIG. 5 shows an overview of a semantic network in which nodes are ordered by level of abstraction, causing operators to be most abstract, conversations to be moderately abstract, motivations to be least abstract, and where motivations are the gatekeepers for physical data flows in and out of the system.

FIG. 5 shows the verb content of an abstraction-ordered semantic network, organized according to the life-cycle architecture of FIG. 4 and the dataflow architecture of FIG. 3. Both dormant and active verbs are shown. The active verbs are in the central column of the diagram, channeling external inputs into active conversations, which feed them to active operators. The dormant verbs are shown flanking the active verb column; since they are not active, no dataflow lines are drawn for them, although dormant dataflow lines may in fact exist for them. Abstract peaks are shown for both dormant and active operators; these are operators defined to accept inputs and process them into outputs, passing them back down the semantic inheritance path to the inputs' originator verbs.

Data flow interfaces in FIG. 5 connect to 'Local User Input/Output' to get keyboard, mouse, audio and visual inputs, and produce output streams such as visual display updates and sound output. Data flow interfaces also connect to archival storage, to offload semantic memory and retrieve archived semantic data. Data flow interfaces also connect to the Internet, or other networks, to communicate with other computer applications, to read and write HTML Web data or to remotely converse with persons using the semantic network. These interfaces are simple examples of useful connections for the present invention; many other useful interfaces (such as satellite telemetry) may be created to utilize the conversational capabilities of the present invention.

Figure 6:
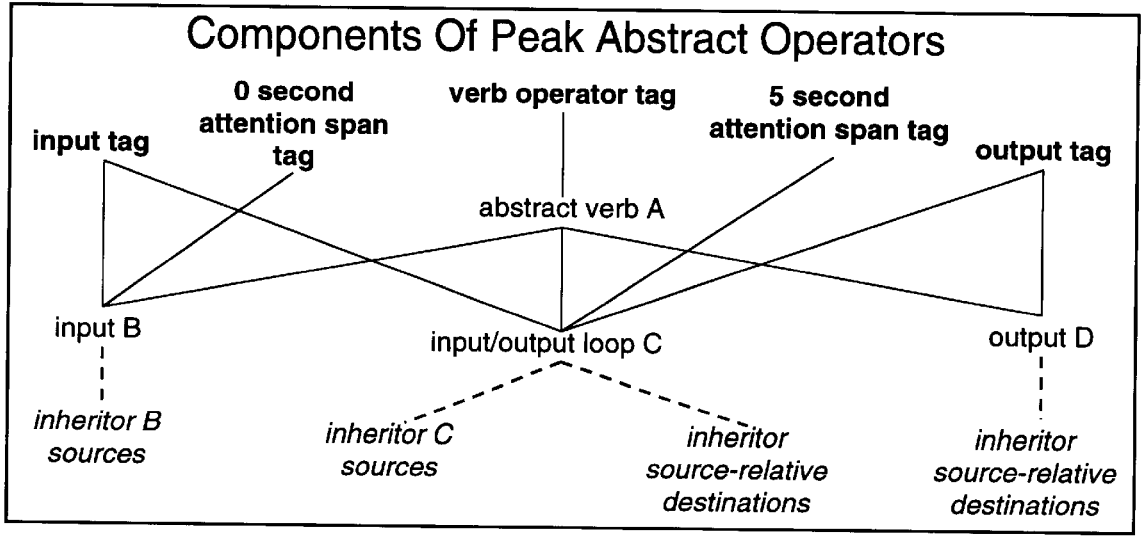
FIG. 6 shows the components of the most abstract operators in a semantic dataflow network, comprising system-supplied commands which can be invoked by semantic inheritor nodes through the operator's direct inheritor nodes which define operator inputs and outputs.

FIG. 6 is a diagram of typical semantic links connected to a peak abstract operator verb in the present invention. Peak abstract operators accept input data and process it to produce output data. Data input flows in from the lower left corner of the diagram, from the inheritor B sources which are nodes inheriting from the noun input node 'input B'. The inheritance link from input tag to 'input B' identifies 'input B' as an input node. Data input also flows in from the inheritor C sources inheriting from the input noun 'input/output loop C'. Since 'input/output loop C' is also an output noun, identified by the inheritance link to output tag, when the 'abstract verb A' is ready to produce output, that output will pass to inheritor B sources, as well as inheritor C sources. This permits looping constructs, since the output shows up as new data in inheritor B sources which can activate 'abstract verb A' again. To prevent stack overflows, such loops are implemented as iterations rather than recursion stacks. To prevent infinite loops, all the invoking verbs at the levels of conversation and motivation include 'attention span' definitions, so that when attention spans are exceeded, any peak operator looping activity on their behalf is canceled.

FIG. 6 also shows attention span tags which indicate the attention spans for specific inputs: zero seconds for 'input B' and 5 seconds for 'input/output loop C'. These tags define the amount of time 'abstract verb A' will wait for input from a particular inheritor, after the first input from that inheritor has arrived. When attention spans are exceeded, output is sent to the originating inheritor and the activity of 'abstract verb A' on behalf of that inheritor is complete. The output when attention spans are exceeded may or may not differ from regular output, depending on the code which defines 'abstract verb A'.

Figure 7:
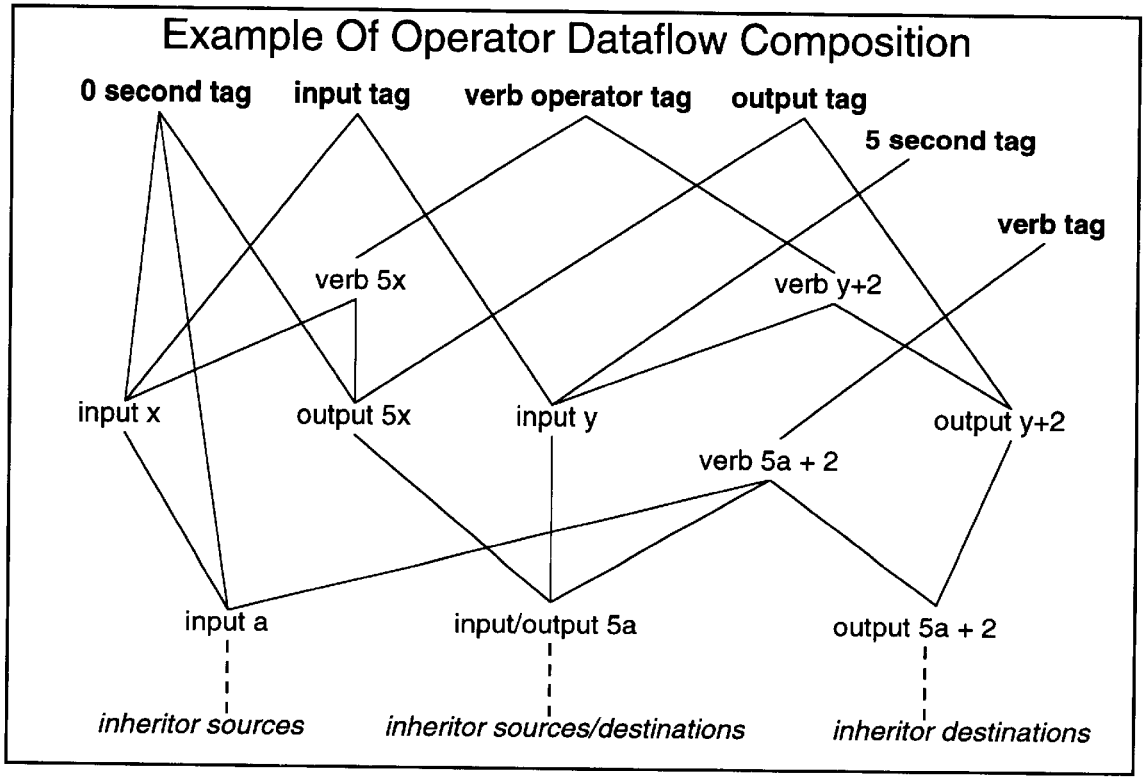
FIG. 7 shows an example of operator composition via semantic inheritance input and output dataflows; the 'verb 5x' is composed with the 'verb y+2' to define the 'verb 5a+2'.

FIG. 7 shows how functional composition can be defined using semantic inheritance as in FIG. 6. The dataflow for such a composition can be traced link by link across this diagram. The dataflow begins when an originating inheritor of the noun 'input a' at the lower left links a new data value into the semantic network.

The 'verb 5a+2' receives data from 'input a' and passes it to 'input x'. The 'verb 5x' receives data from 'input x', computes data for 'output 5x' and passes data concreteward to be an inheritor of 'input/output 5a'. This noun may have deeper inheritors, shown as inheritor source/destinations which receive the intermediary data from 'output 5x'. The intermediary output data is registered as a change in one of the inheritors of 'input y', which activates the 'verb y+2'. The 'verb y+2' then computes data for 'output y+2' which passes concreteward to be an inheritor of 'output 5a+2', which will pass it on to the originating inheritor.

Figure 8:
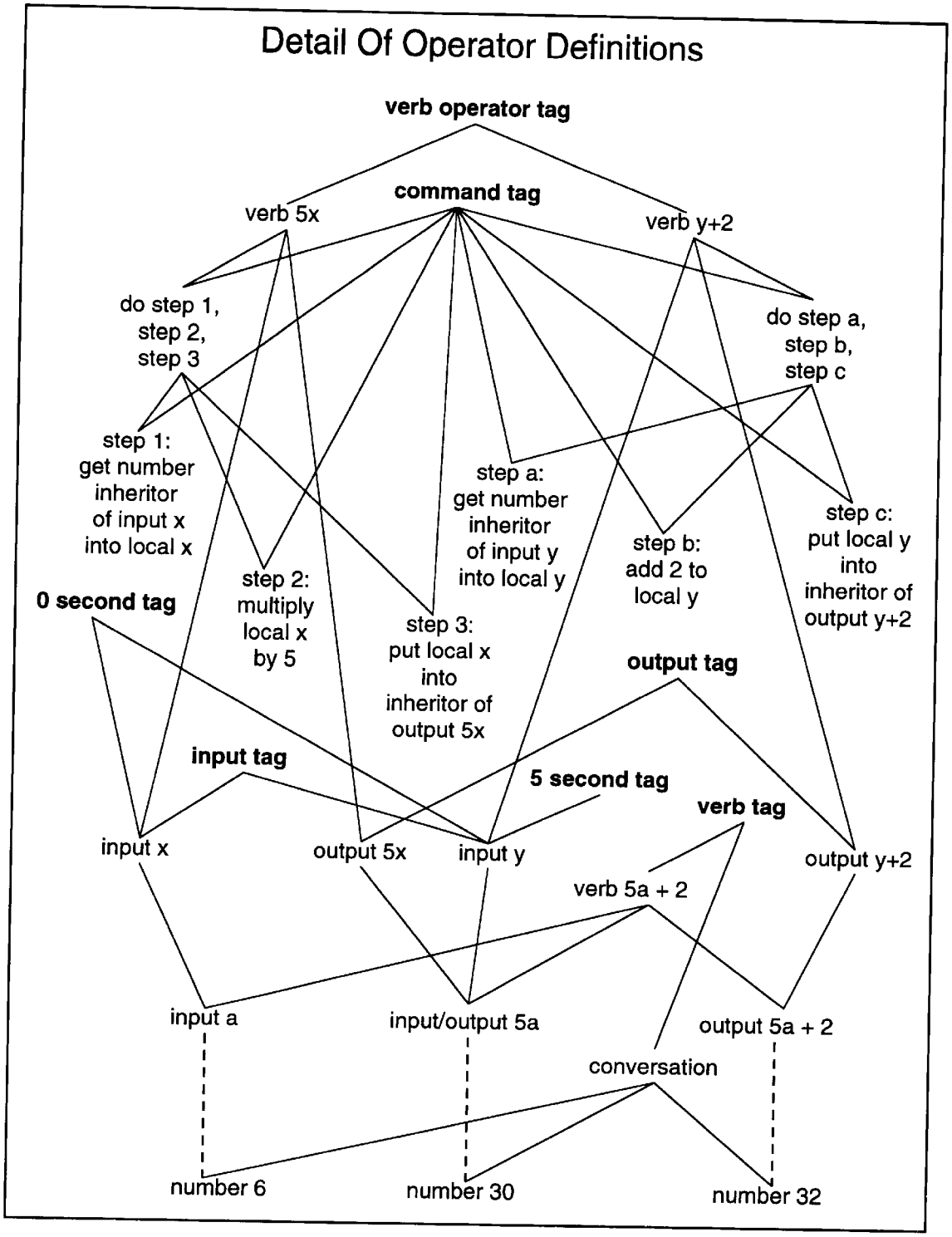
FIG. 8 shows an example of the definition of two verbs, 'verb 5x' and 'verb y+2' both defined in terms of system-supplied operator commands where each command invocation is analogous to a line of code in a traditional computer language.

FIG. 8 shows examples of commands which define the abstract verbs of FIG. 7. These commands would be interpreted by a system-supplied command processor, to perform the actual computations for the abstract verbs. Each command invocation is defined by single semantic node. The command syntax includes commands to sequence a subtree of commands, such as 'do step 1, step 2, step 3'. Some commands fetch data from inheritor sources, such as 'step 1: get number inheritor of input x into local x'. Such commands either copy the data into a local symbol (local to the abstract verb invocation), or copy a pointer to the data into a local symbol. Other commands operate on these local symbols, putting the results of the operations into local symbols, such as 'step 2: multiply local x by 5'. Other commands output the data in local symbols back to the originating verbs, such as 'step c: put local y into inheritor of output y+2'. These commands store the data as new inheritors of the originating verbs; at the same time they may overwrite some old inheritors of the originating verbs.

In FIG. 8, an example the calculation of 'verb 5a+2' is shown with specific numbers. At the lower left of the diagram, the 'number 6' is linked as an inheritor to an originating verb 'conversation'. Since 'input a' is an inheritor of 'verb 5a+2', but that verb is not an actual peak processor of input, the linkage of 'number 6' is reported to the more abstract 'input x'. Since 'input x' inheritors from a peak processor of input 'verb 5x', the 'number 6' is multiplied by 5 in 'step 2: multiply local x by 5' and the passed back down the inheritance hierarchy by 'step 3: put local x into inheritor of output 5x'. That output data 'number 30' passes by the link 'input/output 5a' to be stored as an inheritor of the originator verb 'conversation'.

Since inheritors of 'input/output 5a' are inputs to 'input y', the newly linked 'number 30' is reported to 'verb y+2', which adds 2 to it and stores the result, via noun 'output y+2' and 'output 5a+2', under the originating verb 'conversation' as 'number 32'. The dataflow from the linkage of 'number 6' under 'conversation' thus ends with the linkage of the new node 'number 32' under 'conversation'.

Figure 9:
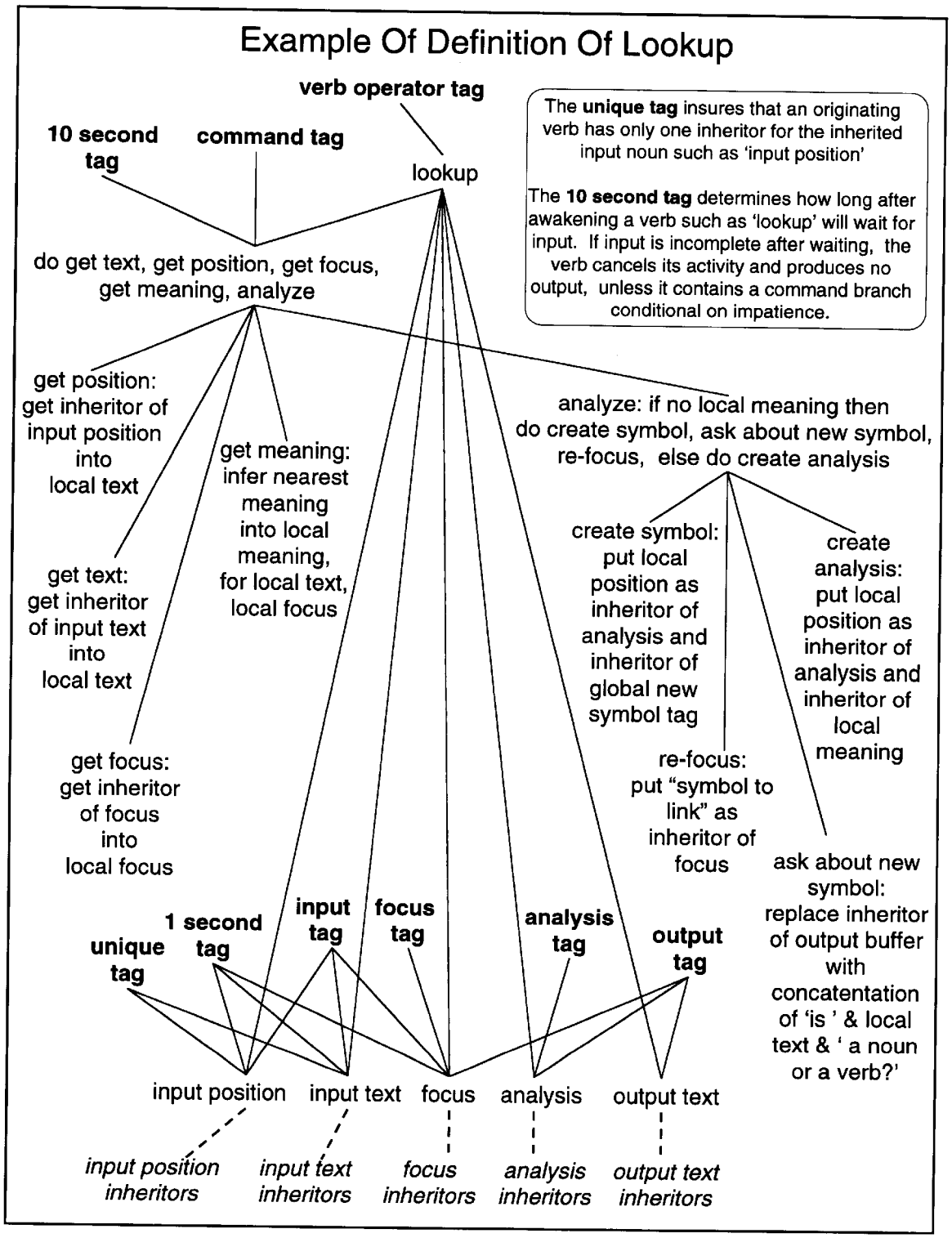
FIG. 9 shows an example of the definition of a dictionary 'lookup' verb useful for directing conversational dataflows, defined in terms of system-supplied operator commands where each command invocation is analogous to a line of code in a traditional computer language.

Dataflows as in FIG. 8 can handle newly linked nodes containing words, pictures, sounds or other data besides numbers. In FIG. 9, a dataflow of words is handled by an abstract peak processor verb 'lookup' to handle the search for word definitions on behalf of a conversation-level verb. The definition of the verb 'lookup' has two types of inheritor nodes: the first are command nodes which also inherit from command tag, and the second are input/output symbol nodes which inherit from input tag or output tag. The command node 'do get text, get position, get focus, get meaning, analyze' heads a subtree of command nodes. In that position, such 'do' commands orchestrate the activities defined by the subtree, by declaring the order in which its inheritor commands are to be accomplished. This is similar to the way small groups of lines of code in a general-purpose computer language such as C or Pascal declare the order in which C or Pascal statements are to happen. However, a major difference exists in that in the present invention, the 'do' command can only reference command nodes which inherit from it; inheritance restricts the scope of 'do' commands to a conveniently small set of possibilities. In a similar way, in the present invention, the use of local symbols by commands restricts the scope of commands such as addition, subtraction, concatenation and substring to a small set of local symbols created within the same verb subtree. This makes these commands easier to read, and affords the command interpreter system an opportunity to segregate the storage of local symbols associated with a specific verb activation, for speed of access and so that the verb can be invoked by more than one inheritor at a time, in a sense like re-entrant code in C or Pascal.

The second set of nodes, the input/output symbols nodes, are similar to function parameter names in C or Pascal. These nodes are symbols which must be inherited by nodes which would invoke the verb 'lookup'. Characteristics of the input/output nodes are defined, in turn, by their inherited nodes. Input nodes inherit from input tag, output nodes inherit from output tag, and abstract datatypes are defined by tags such as focus tag and analysis tag. To insure that originating verbs are invoking input nodes 'input position' and 'input text' each with a unique dataflow symbol, the unique tag is inherited by 'input position' and 'input text'; this prevents originating verbs from linking more than one node to 'input position', and from linking more than one node to 'input text'.

The overall activity of the 'lookup' verb is defined in two halves under the command node 'do get text, get position, get focus, get meaning, analyze'. The first half is defined by commands to fetch crucial information into local symbols, mostly using simple 'get' commands. The 'infer nearest meaning' command is a more complex way to gather information, using a universal indexing mechanism to be discussed in detail later.

The second half of 'lookup' is defined by a conditional command: 'analyze: if no local meaning then do create symbol, ask about new symbol, re-focus, else do create analysis'. This 'if' command checks the logical condition of 'no local meaning'; in the absence of a 'local meaning' returned by the 'infer' command, the 'if' command creates a new semantic symbol, links it into the focus of the conversation, and asks about the new symbol. Otherwise, the 'if' command simply links the inferred meaning of the symbol into the analysis of the conversation via the 'else do create analysis' clause of the 'analyze:' command.

The command 'ask about new symbol' concatenates the new symbol with words to make up a question about the new symbol. For example, 'is' would be concatenated with the new symbol 'hello' and the phrase 'a noun or a verb?' to make up the question 'is hello a noun or a verb?', which would be sent as a response to the conversational output.

Figure 10:
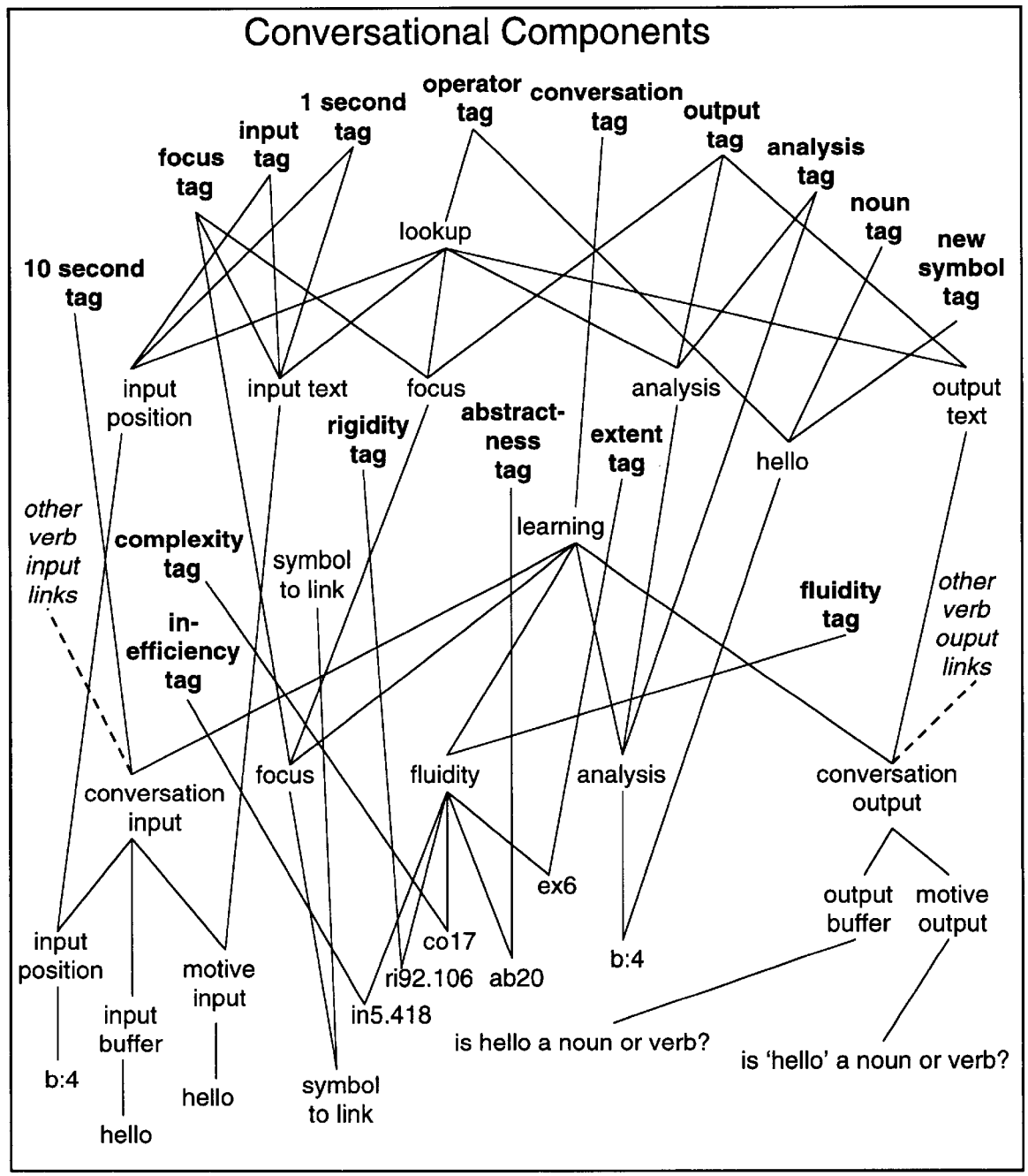
FIG. 10 shows an example of a conversation-level verb 'learning' invoking a more abstract operator-level verb 'lookup' via input and output inheritance links, where 'learning' itself has just been connected to a newly activated conversation with just one symbol 'hello' which has arrived as input.

FIG. 10 shows an example of a specific conversation-level verb 'learning' as it invokes the operator-level verb 'lookup'. As in FIG. 9, 'input position' and 'input text' symbols inheriting from 'lookup' provide invocation paths from inheritors of the originating verb 'learning': 'input position' at lower left inherits from 'input position' of 'lookup'. In actual implementation, some means would exist to uniquely distinguish between two such nodes with the same spelling, such as a suffix, e.g. 'input position#2' for the node at lower left and 'input position#1' for the node of 'lookup'. For simplicity in the diagram, these suffixes are not shown. The linkage of the symbol 'hello' has been reported to 'motive input' at lower left, which in turn report that linkage to 'conversation input' which is a direct inheritor of 'learning', making 'learning' an originating verb for the dataflow associated with 'hello'. The linkage is then reported from 'motive input' abstractward to 'input text' which is a direct inheritor of the verb 'lookup'. The verb 'lookup' uses the input 'hello' together with the input position 'b:4' ('b' meaning beginning of buffer, ':4' meaning four bytes) to produce the output 'b:4' which is stored in the 'analysis' subtree under the originating verb 'learning', and to produce the output 'is hello a noun or a verb?' which is stored under the conversation output subtree under the originating verb 'learning'. The dataflow is thus complete, having started with the linking of 'hello' under 'motive input', passed abstractward through the verb 'lookup' for processing, then passed concreteward to store results under the 'analysis' and 'conversation output' subtrees of 'learning'.

The subtree 'fluidity' under the conversation-level verb 'learning' contains numbers quantifying the topological condition of that conversation. Inefficiency, complexity, rigidity, abstractness and extent are all numbers stored inheriting their respective abstract datatype tags: the inefficiency tag, complexity tag, rigidity tag, abstractness tag, and extent tag. The calculations which update these numbers will be discussed later. Each number has been prefixed with a 2-byte prefix to make it unique in the 'fluidity' subtree. For example, inefficiency is 'in5.418' and complexity is 'co17'. These prefixes keep the numbers distinct and easier to access when then are stored in a literal index tree under 'fluidity'. A literal index tree such as a TRIE tree or radix search tree distinguishes one search path from another based on the prefix bytes of a desired key; when searching for the branch of the complexity number, for instance, the key would be 'co'. By prefixing each number uniquely, there is no need to traverse abstractward to inherited tag nodes such as complexity tag, when determining which number represents complexity under 'fluidity'.

The verb 'lookup' has also linked a symbol into the 'focus' subtree; 'symbol to link' is now the focus of the conversation. By changing the focus of the conversation, other abstract verbs (not shown) can take the place of 'lookup' for processing the inputs of the conversation. The re-linking of abstract verbs into conversation can be done via a mechanism for inferring specific meaning which will be discussed later.

Figure 11:
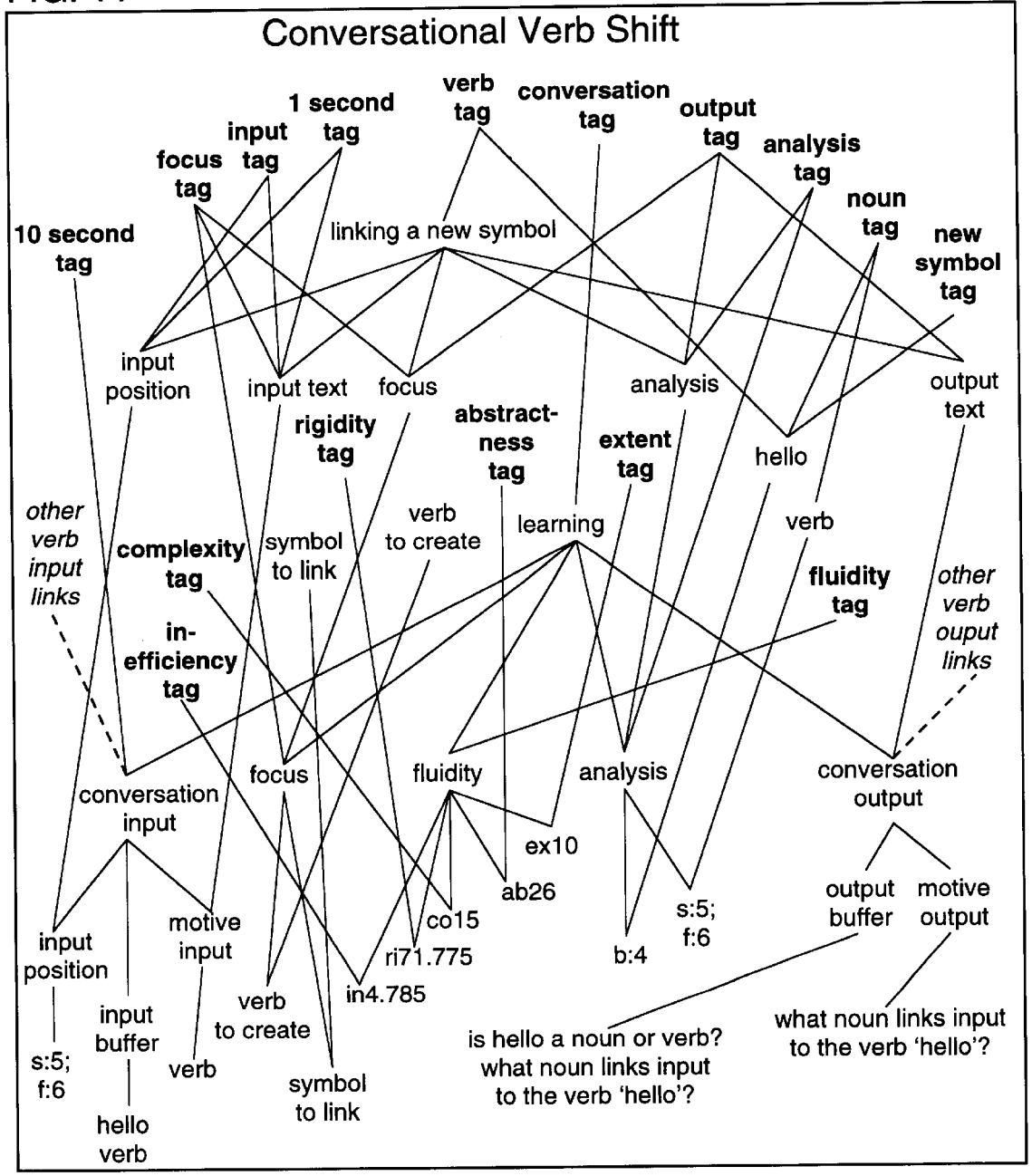
FIG. 11 shows the conversation-level verb 'learning' of FIG. 10 at a slightly more developed stage, with an additional phrase 'is hello a noun or verb?' as output and 'verb' which has arrived as input, causing the conversation to shift to invoking the abstract operator 'creating a verb'.

FIG. 11 shows the conversation-level verb 'learning' at a further stage of development. To answer the question 'is hello a noun or verb?' posed by the output in FIG. 10, a conversant has replied 'verb' which created the symbol 'verb' to replace 'hello' under 'motive input'. This newly linked symbol, together with the new symbol 's:5;f:6' under 'input position' has been reported upward to the verb 'linking a new symbol' which replaced the verb 'lookup' since the focus of the conversation now contains 'symbol to link'. The verb 'linking a new symbol' has produced output of 's:5;f:6' under the 'analysis branch of 'learning', meaning that the analyzed 'verb' symbol occurs starting at the 5th byte, continuing for 6 bytes of the input buffer, including linefeed characters. The symbol 's:5;f:6' has been linked to also inherit from the symbol 'verb' under noun tag; this symbol 'verb' is distinct from the one under 'motive input'.

The output of the verb 'linking a new symbol' has also flowed to inheritors of the 'conversation output' tree, which now contains the question "what noun links input to the verb 'hello'?" under the 'motive output' symbol. This question is asked in order so gather semantic links which define the meaning of 'hello'. Since the inheritor of the 'output buffer' node retains all output, including the current output inheritor of 'motive output', a copy of the current question "what noun links output to the verb 'hello'?" is appended to the inheritor of the output buffer node.

The 'focus' subtree now has an additional, more specific inheritor 'verb to create', which will change the type of abstract verbs which might process the inputs of the conversation.

The numbers stored under the 'fluidity' subtree have changed slightly; these changes will be discussed later.

Figure 12:
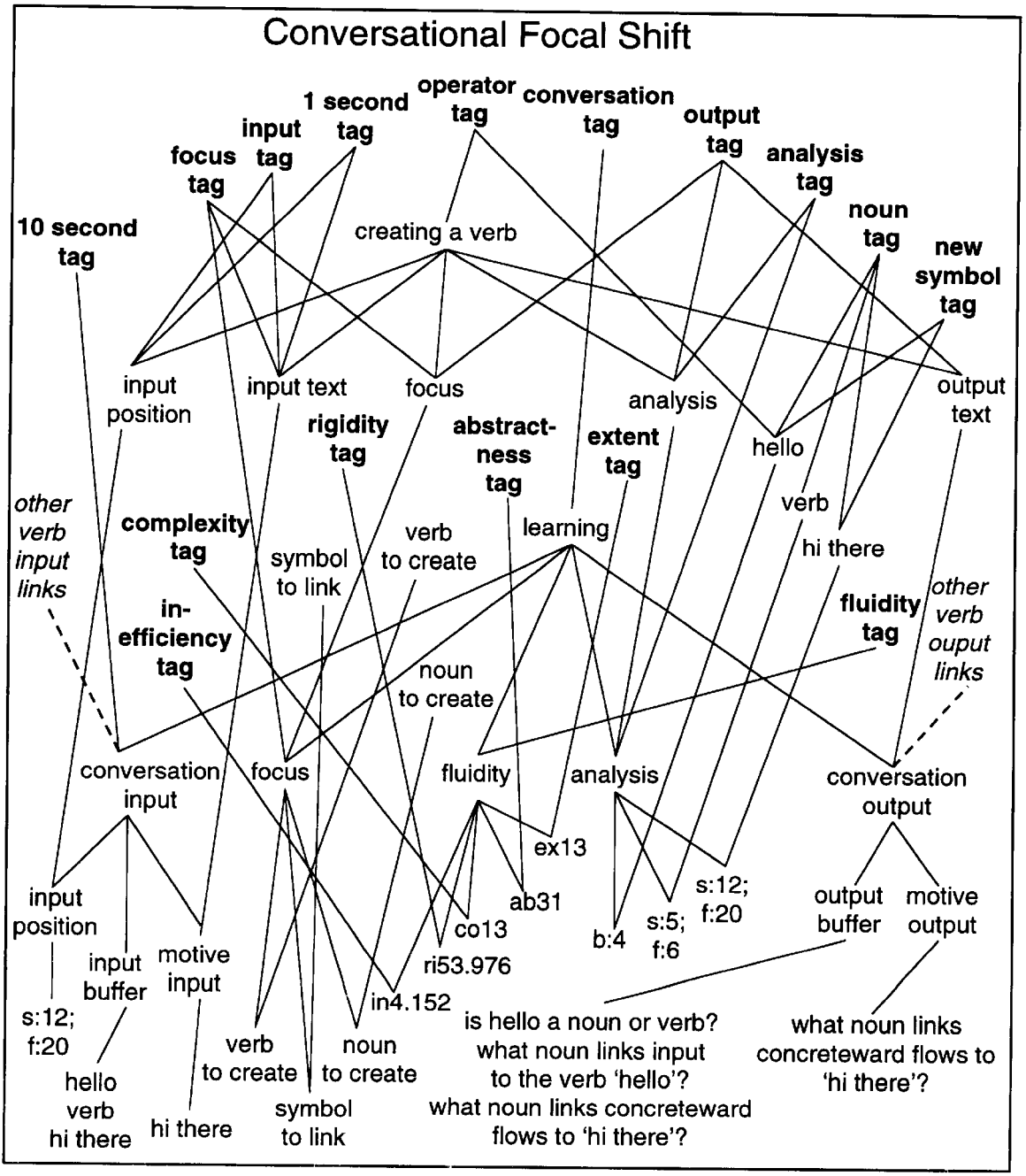
FIG. 12 shows the conversation-level verb 'learning' of FIG. 11 at a slightly more developed stage, with an additional phrase "what noun links input to the verb hello?" as output and 'hi there' which has arrived as input, causing the abstract operator 'creating a verb' to output "what noun links concreteward flows to 'hi there?'.

In FIG. 12, the conversation from FIG. 11 is shown at a further stage of development. Since the most specific inheritor of 'focus' in FIG. 11 is 'verb to create', the abstract verb processing the inputs of the conversation has shifted to 'creating a verb'. Processing 'motive input' of 'hi there' with 'input position' 's:12;f:20', the abstract verb 'creating a verb' has created new nodes in the 'analysis', 'conversation output' and 'focus' subtrees. Under 'analysis', the new node is 's:12;f:20' which inherits from 'hi there'. This new symbol 'hi there' in turn has been linked to inherit from noun tag and new symbol tag. Under 'conversation output' the 'motive output' inheritor is now "what noun links concreteward flows to 'hi there'?". This question has also been appended to the end of the inheritor of 'output buffer'. Concreteward flows are output dataflows along inheritor links; the question is asked in order to build the semantic links which define the meaning of 'hi there'.

Under 'focus', there is now an additional, more specific inheritor 'noun to create' (for a verb), which will change the type of abstract verbs which might process the inputs of the conversation.

Again, the numbers stored under the 'fluidity' subtree have changed slightly; these changes will be discussed later.

Figure 13:
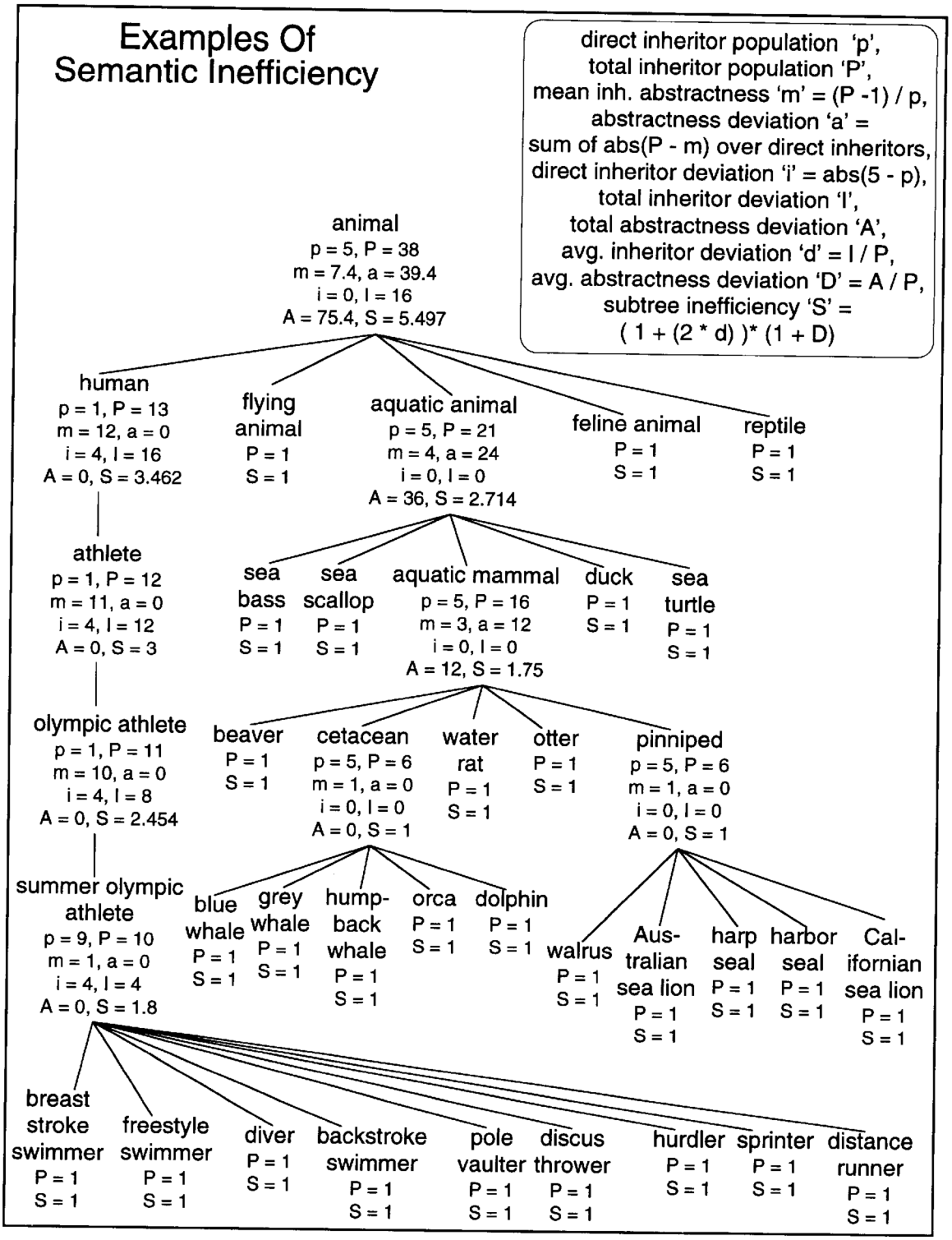
FIG. 13 shows an example of the calculation of semantic efficiency for a hierarchy of nouns under the abstract noun 'animal', in which the efficiency of each subtree headed by a node can be calculated solely from numbers within it and its directly linked inheritor nodes, thus making the updates of semantic efficiency statistics efficient when adding and removing inheritance links for nodes in the hierarchy.

FIG. 13 shows an example of a semantic inheritance tree representing different types of animals; this tree includes numbers which analyze semantic inefficiency, for each node. A summary of the numeric definitions of semantic inefficiency are given in the box at the top of the diagram. These numbers represent the following concepts:

The population of a node's directly linked inheritors (one hop away) is called the 'direct inheritor population' for a node. For example, the node 'pinniped' at the right side of the diagram has five direct inheritors: walrus, Australian sea lion, harp seal, harbor seal and Californian sea lion. In contrast, the node 'olympic athlete' has only one direct inheritor, the node for 'summer olympic athlete'. In the drawings, the symbol for direct inheritor population is lowercase 'p'.

The population of nodes contained in an inheritance subtree headed by a node, including the node itself, is called the 'total inheritor population'. In the drawings, the symbol for this population is uppercase 'P'. For example, the number of nodes contained by the subtree headed by 'cetacean' is six: blue whale, grey whale, humpback whale, orca, dolphin and cetacean itself. The total node population contained in the subtree headed by any node can be quickly calculated by summing the total inheritor populations numbers in each of its directly linked inheritors, plus one for the node itself. For example, the total node population of 'aquatic mammal' is one (from beaver), plus six (from cetacean), plus one (from water rat), plus one (from otter), plus six (from pinniped), plus one (for aquatic mammal itself), summing to a total of sixteen. This sum of sixteen is stored in the total node population number in the node 'aquatic mammal', so that inherited nodes such as 'aquatic animal' which have 'aquatic mammal' as an inheritor can directly sum the population of inheritor nodes from 'aquatic mammal' without searching inside the 'aquatic mammal' subtree. The total node population 'P' of a leaf node like 'otter' is just one, since that node has no inheritors, just the node 'otter' itself.

The mean inheritor abstractness, indicated in the drawings by the symbol 'm', is the average abstractness of each subtree which directly inherits from a node. One simple way to quantify abstractness is to equate it with the total node population in a subtree. Many other ways exist, including those described in the pending application by Au (application Ser. No. 08/825,552). A measure based on specificity is suggested by Kolodner (pages 346–347). However, for simplicity in the drawings, abstractness is quantified by the total node population 'P'; for this measure of abstractness, subtrees with higher total node population are more abstract. The mean inheritor abstractness can then be quickly calculated by subtracting one from the total inheritor population (to exclude the node itself) and dividing the result by the direct inheritor population. In terms of the above symbols, this calculation would be expressed as '(P−1)/p'. For example, the node 'aquatic mammal' has p=5 and P=16, so the mean abstractness 'm'=(16−1)/5=3. This is quick way to calculate the average abstractness of the sibling group consisting beaver (1), water rat (1), otter (1), cetacean (6) and pinniped (6).

Since it is preferable to have sibling nodes at the same level of abstractness, to make siblings easier to compare and to compact the topology of inheritance trees, the unwanted deviation from mean abstractness is calculated for each node which heads a subtree, by summing the absolute value of differences between 'm' for the subtree's head node and 'P' from each direct inheritor node of the head node. For example, the head node 'aquatic mammal' has m=3. This is compared to 'P' values from its direct inheritors. Beaver has P=1, so its abstractness deviation is abs(3−1)=2. Water rat and otter also have P=1, so their deviations are also 2. Cetacean has P=6, so its deviation is abs(3−6)=3. The sum of all these deviations is 2+2+2+6=12, the abstractness deviation of 'aquatic mammal' which is indicated by the symbol 'a'

By applying Miller's capacity number of 'seven plus or minus two' to inheritance topology, one can define, for all nodes that have inheritors, an ideal size of direct inheritor population for those nodes. To include information such as the node itself and one or two inherited nodes within a cognitive group of size seven which includes direct inheritors, the direct inheritor population should be near five. By tracking the absolute magnitude of deviations from five on a node by node basis for nodes which have inheritors, direct inheritor deviations from Miller's capacity number can be calculated. In terms of the above symbols, the total inheritor deviations 'i' are computed by the absolute value of 5 minus 'p', for each node that has inheritors. For example, 'summer olympic athlete' has p=10, so its direct inheritor deviation 'i' is abs(5−10), which equals 4. The node 'olympic athlete' has p=1, so its 'i' is abs(1−5), which also equals 4. The node 'animal' has p=5, so its 'i' is abs(5−5) which equals 0, the ideal deviation.

Both direct inheritor deviation and abstractness deviation can be summed abstractward in inheritance trees, to provide the accumulated total inheritor deviation 'I' (summed over all direct inheritor deviations 'i') and to provide the accumulated total abstractness deviations 'A' (summed over all abstractness deviations 'a') for any node which heads a subtree. For example, the node 'olympic athlete' has direct inheritor deviation 'i=4', and its one direct inheritor has total direct inheritor deviation 'I=4', so the total direct inheritor deviation 'I' of 'olympic athlete' is 4+4 which is 8. One level down, the node 'summer olympic athlete' has 'i=4', and since it has no subtree inheritors which could deviate, its total inheritor deviation 'I' is 4+0 which is 4.

Similarly, the abstractness deviation 'a' of 'cetacean' is zero because all its inheritors have 'P'=1, and its total abstractness deviation is zero plus zero; the abstractness deviation of leaf nodes is also zero by definition. One level up, the node 'aquatic mammal' has abstractness deviation 'a' of 12, and its total abstractness deviation is 12+0+0+0+0+0 which equals 12, since all its direct inheritors have zero total abstractness deviation. One level up again, the node 'aquatic animal' has abstractness deviation 'a' of 24, and its total abstractness deviation is 24+0+0+12+0+0 which equals 36, since only its 'aquatic mammal' direct inheritor has a non-zero total abstractness deviation.

Both inheritor deviation and abstractness deviation can be averaged over the size of subtrees in which they occur. There are many ways of quantifying size, such as the number of bytes stored in the subtree (more appropriate when storing sounds or images), or the number of subtree nodes in the subtree (more appropriate if subtree nodes contain information much more important than leaf nodes). For simplicity in the diagrams, subtree size is quantified by the total inheritor population 'P'. Thus the average inheritor deviation 'd' is calculated by dividing total inheritor deviation 'I' by total inheritor population 'P'; the average abstractness deviation 'D' is calculated by dividing total abstractness deviation 'A' by total inheritor population 'P'.

The overall inefficiency of a subtree 'S' is quantified by combining average inheritor deviation 'd' and the average abstractness deviation 'D'. Since 'D' can be traded-off against 'd' when topologically reorganizing the semantic network, a proportionality constant is used to control that trade-off, so that optimal leaf subtrees have an optimal number of leaf nodes. For instance, the node 'summer olympic athlete' has only leaf nodes as inheritors, and it has too many of them. At some point, for efficiency, some of those leaf nodes could be grouped together under a single abstraction which in turn would inherit from 'summer olympic athlete'. This would cause some inefficiency, since the other leaf nodes would differ in abstractness from the new abstraction, however it would increase the overall efficiency because there would be less deviation from the ideal number of direct inheritors. A proportionality constant is used to make that trade-off favorable when a subtree node has nine or more leaf node inheritors, but unfavorable when the subtree node has eight or less leaf node inheritors. This will be discussed in further detail in a later drawing.

The overall inefficiency of a subtree 'S' is quantified by combining average inheritor deviation 'd' and the average abstractness deviation 'D', using a multiplicative product rather than an additive sum, so that differing scales of deviations can be easily combined without losing precision. For instance, if the inheritor deviation changes −10% from 10 to 9, and the abstractness deviation changes 100% from 0.5 to 1, it would be imprecise to simply add the deviations together, since the inheritor deviation would be too dominant. The addition of deviations would be a changed from 10+0.5 to 9+1, a change of 10.5 to 10.

By converting the deviation to a multiplicative basis, by adding one (the multiplicative identity) to both inheritor and abstractness deviations, then multiplying them, differences in scale have minimal effect on precision. For instance, if the inheritor deviation changes −10% from 10 to 9, its multiplicative basis would have changed from 11 to 10; for an abstractness deviation change from 0.5 to 1, the abstractness deviation basis changes from 1.5 to 2.5, so the combined deviation would change from 11*1.5 to 10*2.5, which is 16.5 to 25.

For deviations which are close to zero, the addition of the multiplicative identity of '1' has a rather unwanted effect of skewing the percentage of deviation changes; the addition of one is only necessary to establish the multiplicative identity as the minimal, ideal deviation. One way to minimize the skewing effect of adding one to deviations is to expand zero-based deviations by a constant large enough so that the resulting expanded deviations are either zero or quite far from zero. This will be discussed later in a later drawing. For simplicity in the drawings, the multiplication constants used are as small as possible, whereas in practice, they would be much larger.

For example, the node 'aquatic animal has total inheritor deviation 'I=0' and 'P=21', so its average inheritor deviation 'd' is 0 divided by 21 which equals zero. Multiplying this average deviation by a proportionality constant of 2 produces a proportioned deviation which is still zero. Adding one to zero makes the inheritor deviation basis equal to one (the ideal one-based deviation). At the same time, it has total abstractness deviation 'a=36' so its average abstractness deviation is 36 divided by 21 which equals 1.714 (rounded to three decimals). The proportionality constant for abstractness deviation is as small as possible at 1 (this has no effect). Adding one to 1.714 makes the abstractness deviation basis equal 2.714. Multiplying the two one-based deviations (1*2.714) results in the subtree inefficiency number 'S' equal to 2.714.

The formula for combining total inheritor deviations with total abstractness deviations is (1+(2*d))*(1+D), where d=total inheritor deviation 'I' divided by total inheritor population 'P' and D=total abstractness deviation 'A' divided by total inheritor population 'P'. This formula (which includes the total inheritor deviation proportionality constant of 2) is applied to all nodes in FIG. 13 which head subtrees. For example, the node 'animal' has 'I=16' and 'P=38', so its average inheritor deviation 'd' is $16/38$ which equals 0.421 (rounded to 3 decimals). It has total abstractness deviation of 'A=75.4', so its average abstractness deviation 'D' is 39.4/38 which equals 1.984 (rounded to 3 decimals). Using the formula, it has subtree inefficiency of (1+(2*0.421))*(1+1.984), which equals 1.842*2.984, which equals 5.497 (rounded to 3 decimals).

One of the advantages of the formula is that quick calculation of subtree inefficiency can be done, storing only local and total deviation numbers 'i', a, 'I' and 'A' along with total population number 'p' and 'P' in each subtree. To make the proportionality constants easy to multiply, they can be base-2 numbers such as 2, 32, 64, or 256, so that the multiplication can be done by bit-shifting operators rather than multiplication operators. Updating numbers 'i', 'a', 'I', 'A', 'p' and 'P' in each subtree when linking or unlinking inheritance links is also quick since only abstractward sums and the division operation for the mean abstractness are involved; calculations for the average deviation numbers 'd' and 'D' and the inefficiency number 'S' would not be involved.

In FIG. 13, the intermediary calculations resulting in average inheritor deviation 'd' and average abstractness deviation 'D' are not shown, to simplify the diagram. The end result of the formula for subtree inefficiency 'S' is shown so that the relative efficiency of various subtrees in the diagram can be compared. For instance, there are two main subtrees in the diagram: the subtree headed by the node 'human' and the subtree headed by the node 'aquatic animal'. The inefficiency of the subtree headed by the node 'human' is due entirely to having inheritor deviations from the ideal direct inheritor population; 'human', 'athlete' and 'olympic athlete' have too few direct inheritors, whereas 'summer olympic athlete' has too many. In contrast, the inefficiency of the subtree headed by the node 'aquatic animal' is due entirely to having abstractness deviations from the ideal mean abstractness at various levels; 'aquatic animal' has a mean abstractness 'm=4' but its direct inheritor nodes have abstractnesses of 1, 1, 16, 1, and 1. The node 'aquatic mammal' has mean abstractness 'm=3' but its direct inheritor nodes have abstractnesses of 1, 6, 1, 1 and 6. The inheritor deviation proportionality constant of 2 makes effect of the two levels of abstractness deviation for 'aquatic animal' roughly similar to the effect of the two levels of inheritor deviations for 'olympic athlete'; without the effect of this proportionality constant the inheritor deviation for 'olympic athlete' would be only half, favoring deeply hierarchic, sparsely branching trees. The following examples of rearrangements in the topology of the 'olympic athlete' subtree demonstrate the precise effect of the proportionality constant.

Figure 14:
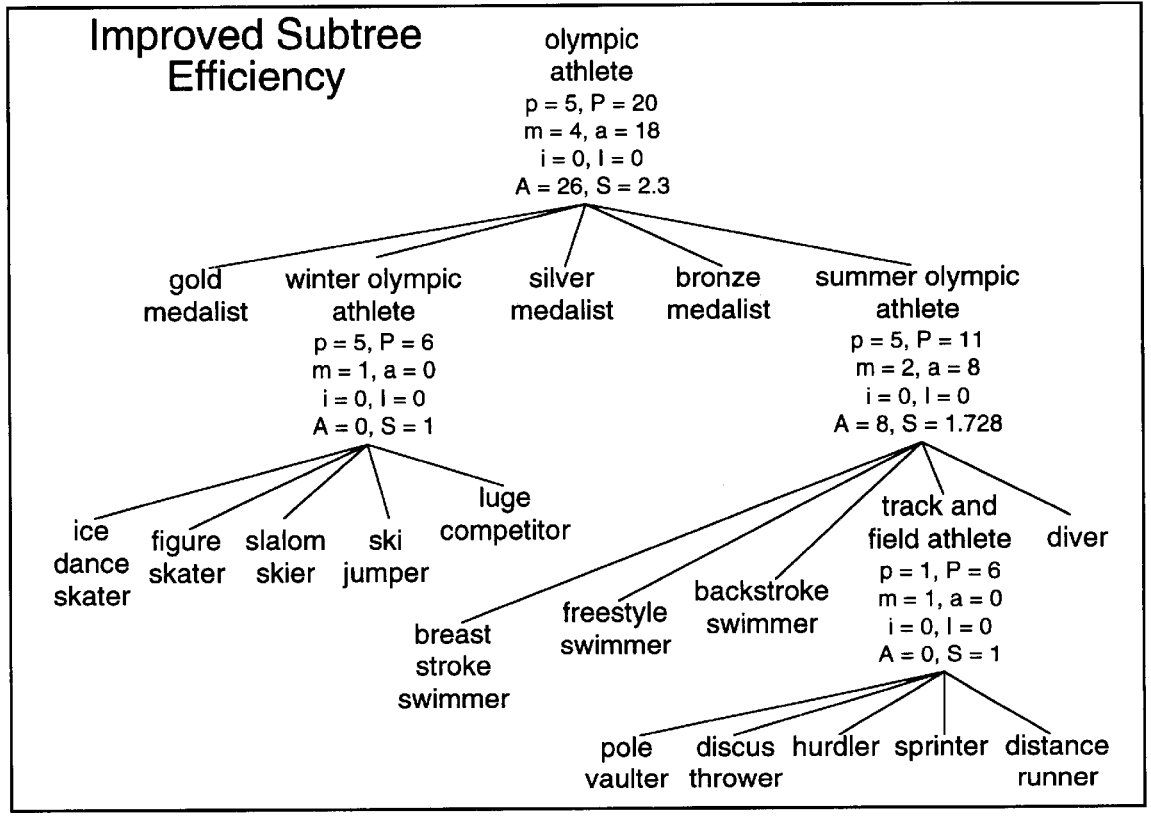
FIG. 14 shows how the efficiency of the 'olympic athlete' subtree of FIG. 13 can be improved by attaching other classes of olympic athletes such as 'gold medalist' and 'silver medalist', as well as dividing the nine types of 'summer olympic athlete' into three subtrees.

In FIG. 14, the subtree headed by 'olympic athlete' from FIG. 13 is shown after improving its efficiency by rearranging its topology. Unlike FIG. 13, semantic inefficiency numbers are not shown for any leaf nodes in FIG. 14, since they are all the same. The subtree headed by 'summer olympic athlete' has been deepened by indirectly linking five kinds of athletes under 'track and field athlete'. By indirectly, rather than directly linking to nodes of pole vaulter, discus thrower, hurdler, sprinter and distance runner, the 'summer olympic athlete' subtree inefficiency has dropped from 1.8 in FIG. 13 down to 1.728 in FIG. 14. Additional improvement to the higher subtree headed by 'olympic athlete' has been arranged by adding the leaf nodes of gold medalist, silver medalist, and the subtree node of 'winter olympic athlete'; these extra direct inheritors reduce the inefficiency of 'olympic athlete' to 2.3 (down from 2.454 in FIG. 13).

Figure 15:
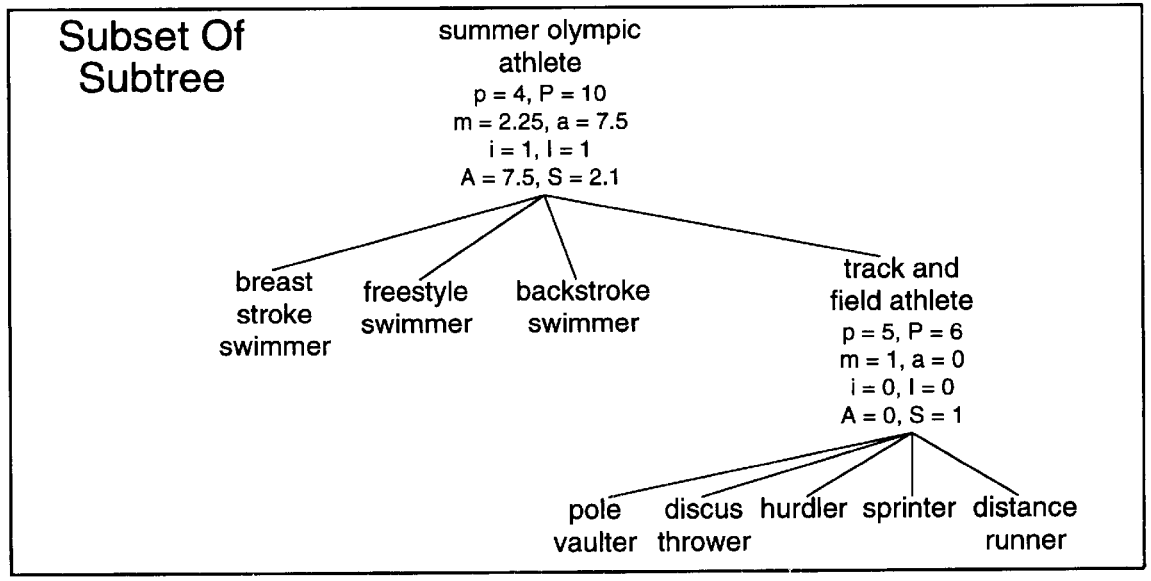
FIG. 15 shows the subtree 'summer olympic athlete' of the semantic network from FIG. 14, with the node 'diver' removed; removal of this node has increased the inefficiency of 'summer olympic athlete' relative to FIG. 14.

FIG. 15 shows a subset of the 'summer olympic athlete' subtree in FIG. 14. By removing the node 'diver', the reduction in the number of direct inheritors as well as the reduction in the total node population has increased the inefficiency of 'summer olympic athlete' from 1.728 in FIG. 14 to 2.1 in FIG. 15. In a sense, the nine leaf nodes as shown for 'summer olympic athlete' in FIG. 13 are sufficient to support two subtrees nodes, whereas the eight leaf nodes as shown in FIG. 15 are too few to support two subtree nodes. Subtrees with two or more subtree nodes whose populations shrink below 11 should be topologically reorganized to eliminate indirect inheritance links. Another way of describing the situation is that if the subtree 'summer olympic athlete' in FIG. 13 had only eight leaf nodes instead of nine, the arrangement of FIG. 14 putting five of those leaf nodes under 'track and field athlete' would not be preferred. As mentioned earlier, the optimal number of leaf nodes in an optimally configured subtree is controlled by the proportionality constant of 2 for indirect inheritor deviations. The optimal arrangement of subtrees may also have a different number of peak abstractions, depending on the meanings which are represented. For instance, 'track and field athlete' may be an abstraction in its own right, independent of the abstraction 'summer olympic athlete'. In that case, to improve the subtree 'summer olympic athlete' as shown in FIG. 15, the five inheritors of 'track and field athlete' could also inherit directly from 'summer olympic athlete'.

Figure 16:
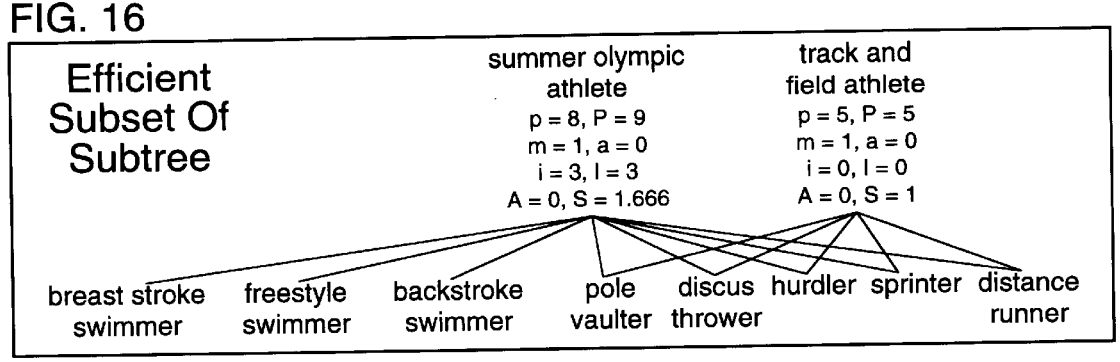
FIG. 16 shows the subtree 'summer olympic athlete' of the semantic network from FIG. 15, reorganized by making 'track and field athlete' a distinct abstraction tree, thereby making 'summer olympic athlete' directly linked to each of its inheritor nodes; this topology is more efficient than FIG. 15.

FIG. 16 shows the 'summer olympic athlete' subtree of FIG. 15 reorganized to represent 'track and field athlete' as a separate inheritance abstraction, which continues to be inherited by pole vaulter, discus thrower, hurdler, sprinter and distance runner nodes. Since 'summer olympic athlete' no longer has a subtree inheritor, all its direct inheritors now have the same abstractness, so the deviation from mean abstractness is now zero (down from 7.5), and this makes up for the fact that its direct path deviation has risen from one up to three, and that fact that its total node population has dropped from 10 down to 9. The new peak abstraction subtree 'track and field athlete' has ideal inheritor deviation and ideal abstractness deviation, so its semantic inefficiency 'S=1' is also ideal.

There are many ways to adjust the formula which calculates the trade-off between inheritor deviation and abstractness deviation; the ideal number of direct path inheritors could be slightly different (to allow more inherited nodes in the Miller group), larger proportionality constants could be applied to the total deviations before multiplying them together (to minimize the effect of adding the multiplicative identity), differing ratios of proportionality constants could be applied (also to allow more inheritor nodes in the Miller group) or even square-root functions could be applied to soften the effect of the deviations before multiplying them together. Depending on particular implementation detail such as the relative importance of leaf nodes versus subtree nodes in the semantic network, any number of the above variant formulas may be needed. For simplicity in the drawings, no variations in the formulas are shown.

Figure 17:
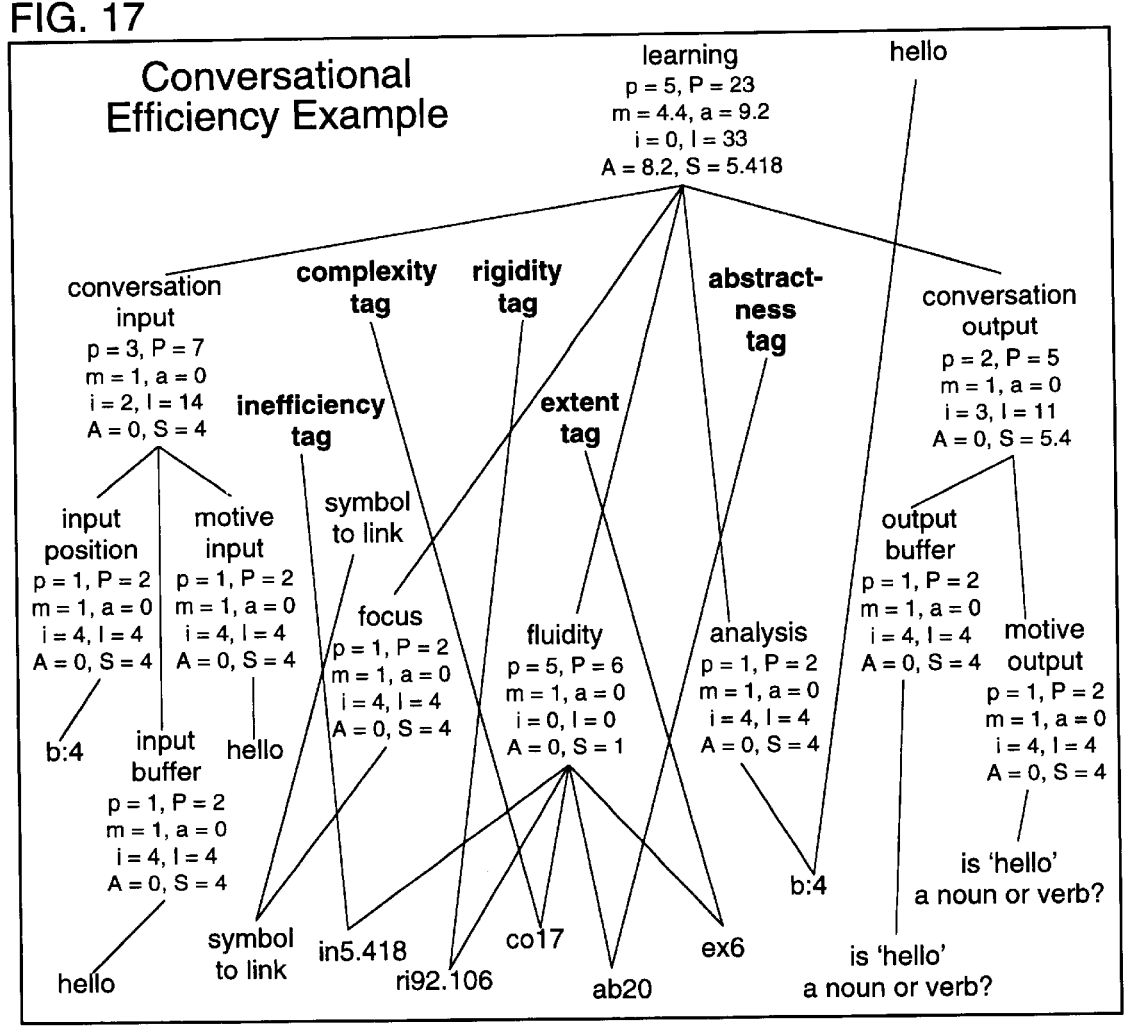
FIG. 17 shows an example of the calculation of semantic efficiency for the conversational verb 'learning' from FIG. 10.

FIG. 17 shows the 'learning' subtree of FIG. 10 with inefficiency number calculated for each subtree node. Since the 'learning' conversation is shown at an early stage in development, its focus and analysis subtrees are still underdeveloped, causing a relatively high inefficiency of 5.418 in the 'learning' subtree. As the conversation develops, the populations of focus and analysis subtrees will increase, reducing the inefficiency of 'learning'.

Another way to reduce the inefficiency of 'learning' would be to increase the total node populations of 'conversation input' and 'conversation output' subtrees, by including nodes symbolic of sound or video streams inputs, or nodes symbolic of streams from other conversants. These additional nodes would provide a broader and more accurate basis for conversational meaning, and that broader basis would be reflected in a reduced inefficiency number for 'learning'. For simplicity, however, such additional nodes are not shown in the diagrams.

Figure 18:
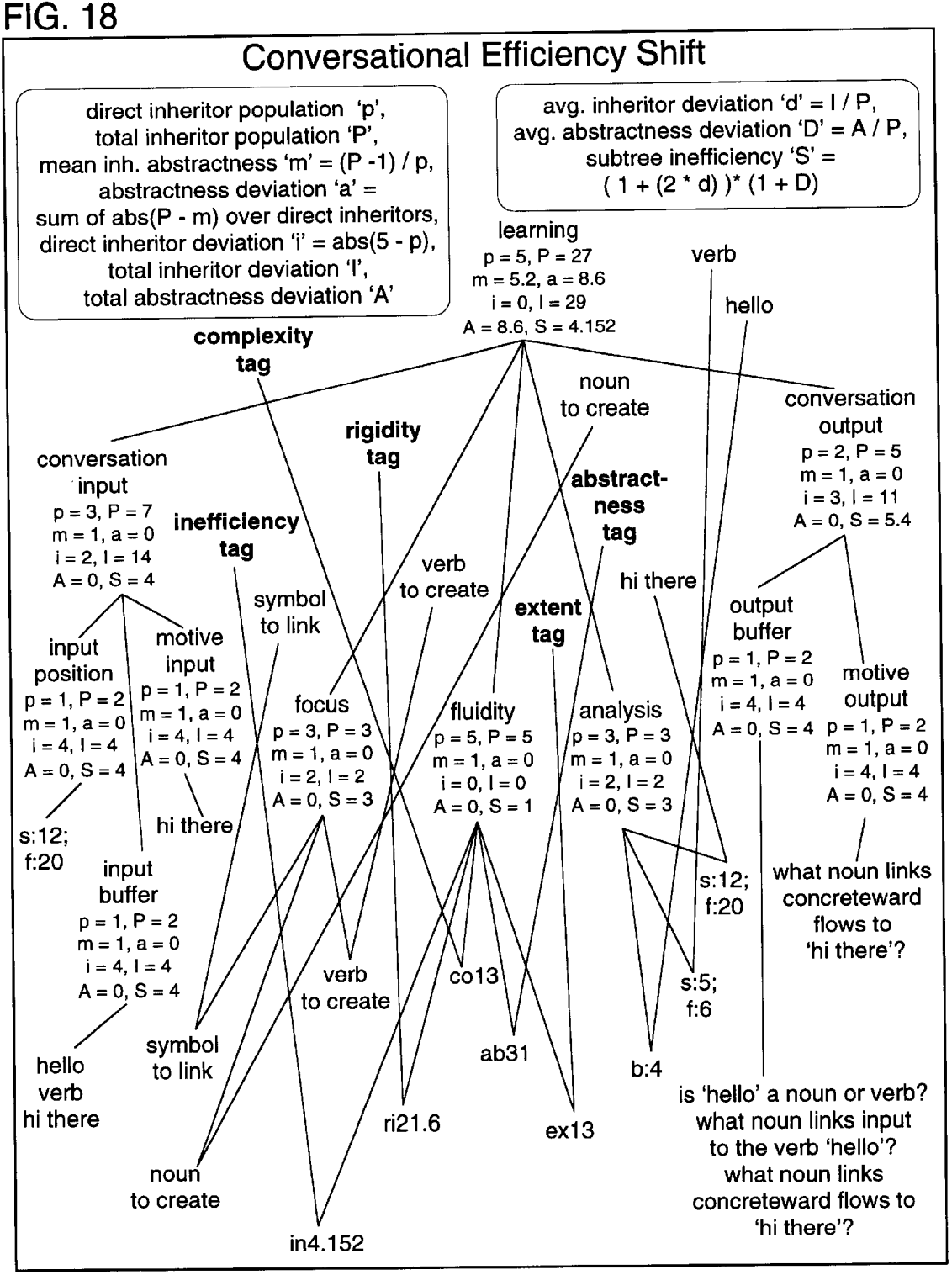
FIG. 18 shows how the conversation in FIG. 17 shifts to greater efficiency, by attaching more nodes under the analysis and focus subtrees, as part of the development of the conversation.

FIG. 18 shows the inefficiency of the 'learning' subtree of FIG. 17 at a later stage of conversational development, corresponding to FIG. 12. The focus and analysis subtrees are more efficient, because of the additional inheritor nodes 'verb to create', 'noun to create', 's:5;f:6' and 's:12;f:20'. The improved efficiency of focus and analysis has reduced the inefficiency of 'learning' to 4.152, down from 5.418 in FIG. 17.

Further reductions in inefficiency are easy to achieve by increasing the total node population of the analysis subtree; this tends to increase anyway as more and more conversational input is analyzed. However, the analysis subtree may reach an ideal semantic efficiency with only five inheritor leaf nodes, and at that point, the conversation can no longer be motivated by increasing the efficiency of analysis. Rather than letting conversations stall at a complexity corresponding to five analyzed phrases, the present invention uses a metric similar to curiosity to motivate conversations to progress to greater complexity. A metric which is based on conversational complexity is used to drive conversations to a reasonable complexity before deactivating them. Such a complexity metric has to be proportioned to the sophistication of the semantic network; for simpler networks complexity should motivate conversations to less complexity than for complex networks, otherwise the lookup capabilities of the simpler network will be overwhelmed by the complexity of conversation, causing conversations to waste too much time defining new dictionary entries.

Figure 19:
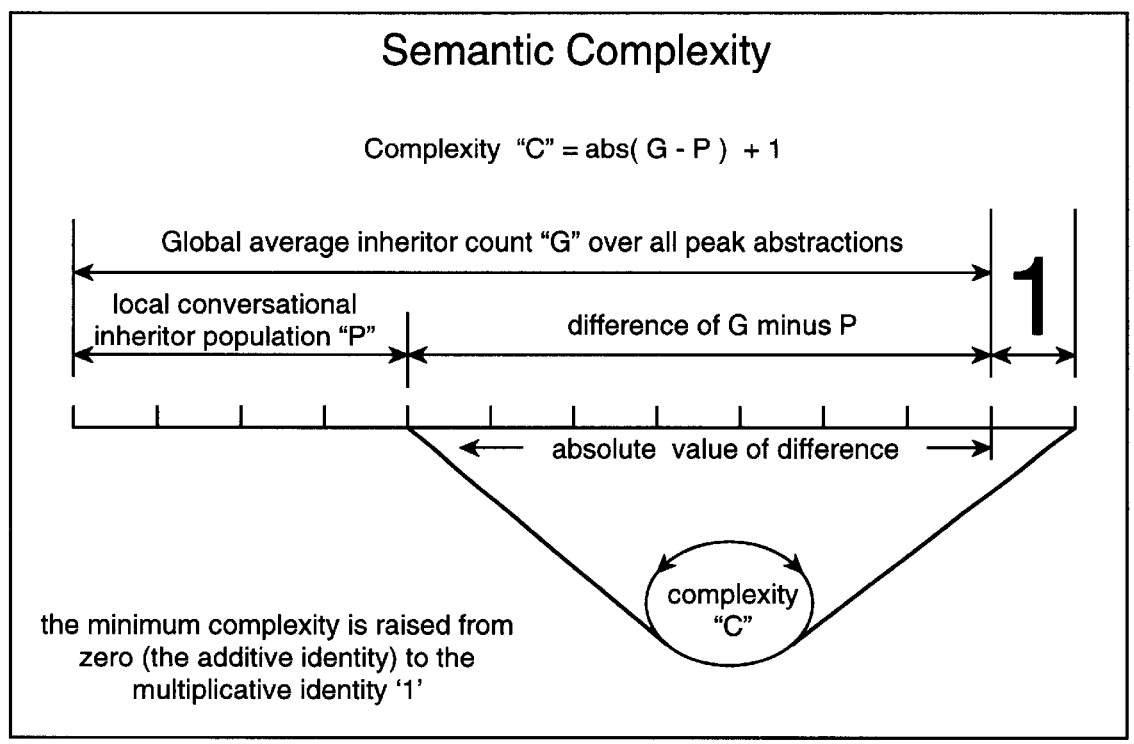
FIG. 19 outlines a topological definition of conversational complexity for semantic networks, in which complexity is the difference between a conversation's size (in terms of inheritor count) and the global average abstraction size (in terms of inheritor count).

FIG. 19 shows the calculation of a metric for conversational complexity. The global average inheritor count 'G' is an average of all total inheritor populations 'P' for peak abstractions; 'G' quantifies the desired complexity to be achieved by each conversation. As a semantic network matures, the measure of 'G' can shift, and as it shifts, the desired complexity for each conversation shifts with it. The complexity for each conversation arises from the deviation between the conversation's complexity and the globally desired complexity 'G'. The more deviation, the more change in complexity is needed. For underdeveloped conversations, the need arises from a lack of complexity; this can be satisfied by making the conversation more complex. For overdeveloped conversations, the need arises from too much complexity; this can be satisfied by simplifying the conversation by summarizing its subtrees into new dictionary entries defining meanings for complete phrases. By substituting complete phrases for subtrees of words, the total inheritor populations 'P' of both focus and analysis subtrees can be greatly reduced.

Figure 20:
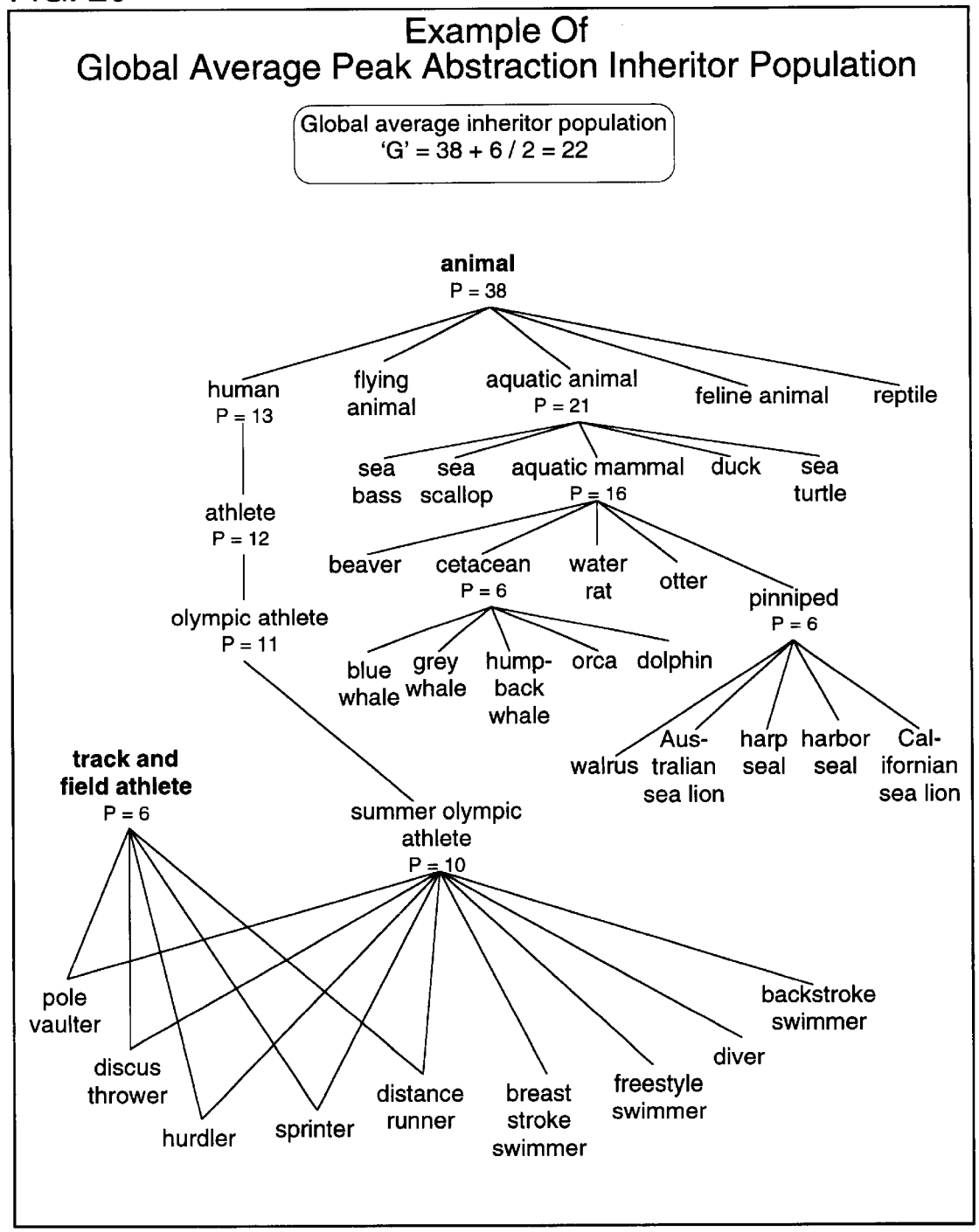
FIG. 20 shows how inheritor counts for each subtree headed by a node can be calculated solely from numbers within it and its directly linked inheritor nodes, thus making the updates of inheritor count statistics efficient when adding and removing inheritance links for nodes in the hierarchy.

FIG. 20 shows two peak abstractions from previous figures, animal and track and field athlete; the inheritors of these peak abstractions are also shown. The total inheritor population 'P' is shown for each subtree node. If a semantic network consisted only of the nodes in FIG. 20, the global average peak abstraction 'G' would consist of an average of numbers from just two nodes, animal (38) and track and field athlete (6), and 'G' would be the sum (38+6) divided by the population of peak abstractions (2), so 'G' would equal 22. Even if there were many peak abstractions in a semantic network, 'G' would be easy to update, since it would consist of updating the total sum of 'P' numbers for the peak abstractions, and updating the number of peak abstractions, and redoing the division of sum by population of peak abstractions.

Figure 21:
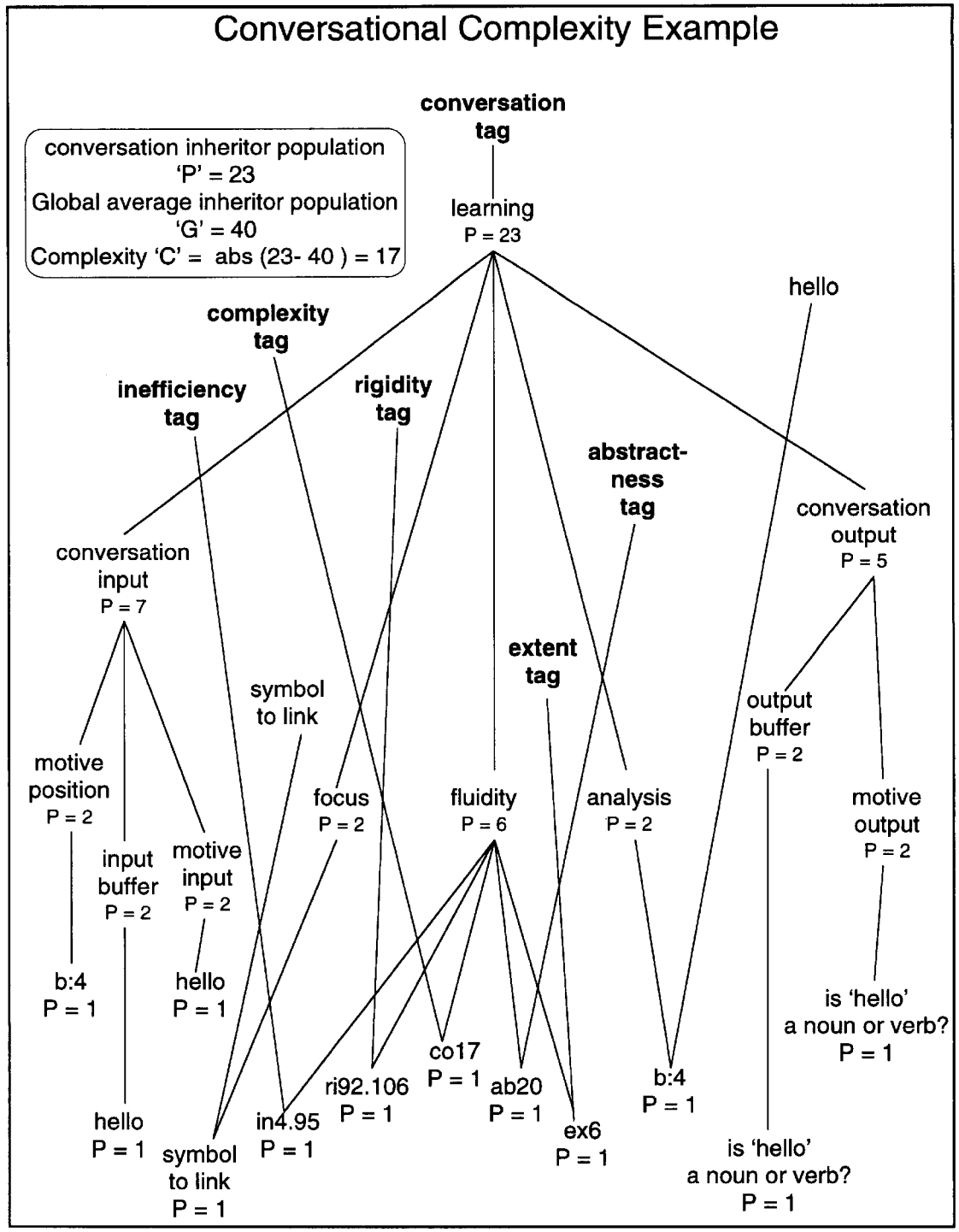
FIG. 21 shows how the inheritor counts for the conversation in FIG. 10 can be calculated, and shows how in conjunction with a global average abstraction inheritor count of 40 (given as an example) the complexity of the conversation can be calculated.

FIG. 21 shows the complexity numbers computed for the conversation 'learning' as shown in FIG. 10. For this example, the global average inheritor population (over all peak abstractions) is given as 40, a higher number than the example in FIG. 20, but a more realistic number for a well developed semantic network. Since the conversation 'learning' has a population of 23 inheritor nodes, the need for complexity in the conversation is the absolute value of 23 minus 40, which equals 17. This need for complexity is caused by the present state of underdevelopment of the conversation, particularly in the focus subtree where P=2, and the analysis subtree where P=2.

Figure 22:
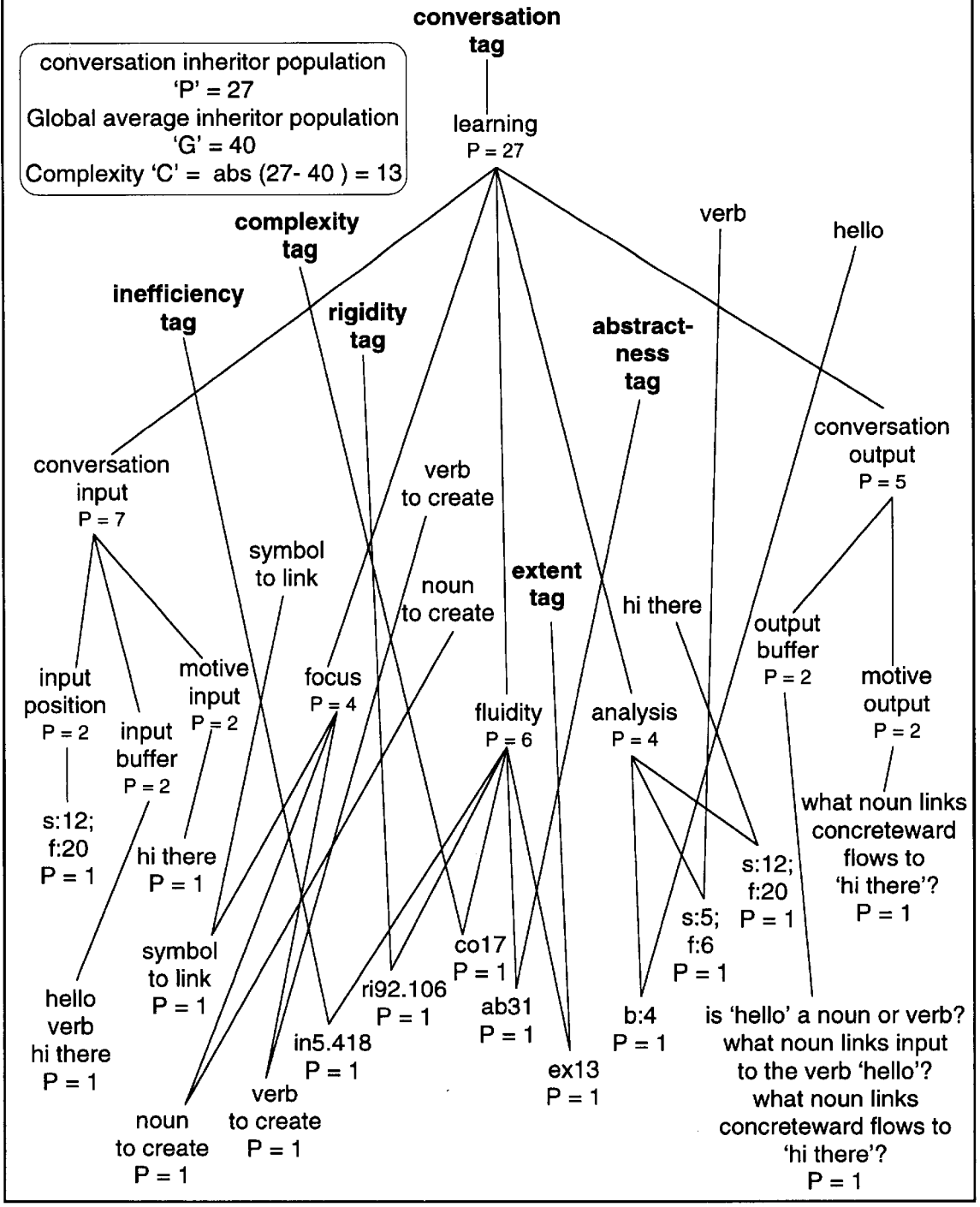
FIG. 22 shows how the need for complexity of the conversation in FIG. 21 lessens with the addition of nodes in the focus and analysis subtrees, showing how need for complexity is reduced by development of the conversation.

FIG. 22 shows the complexity numbers for the conversation in FIG. 21 at a later stage of development, similar to FIG. 12. For this example, the global average inheritor population is also given as 40, as it was in FIG. 21. Since the conversation has reached a more developed state, compared to FIG. 21, 'learning' now has a population of 'P=27', so the need for complexity has been partly satisfied. The actual complexity number is now the absolute value of 27 minus 40, which equals 13. As the conversation develops further, and the analysis subtree continues to grow, the need for complexity will be fully satiated, at the point where the analysis subtree has about 17 nodes. At that point, the need for complexity of 'learning' will be near zero, and the analysis subtree can be reorganized for greater efficiency, by creating new dictionary entries which reduce the number of nodes in the analysis subtree.

Figure 23:
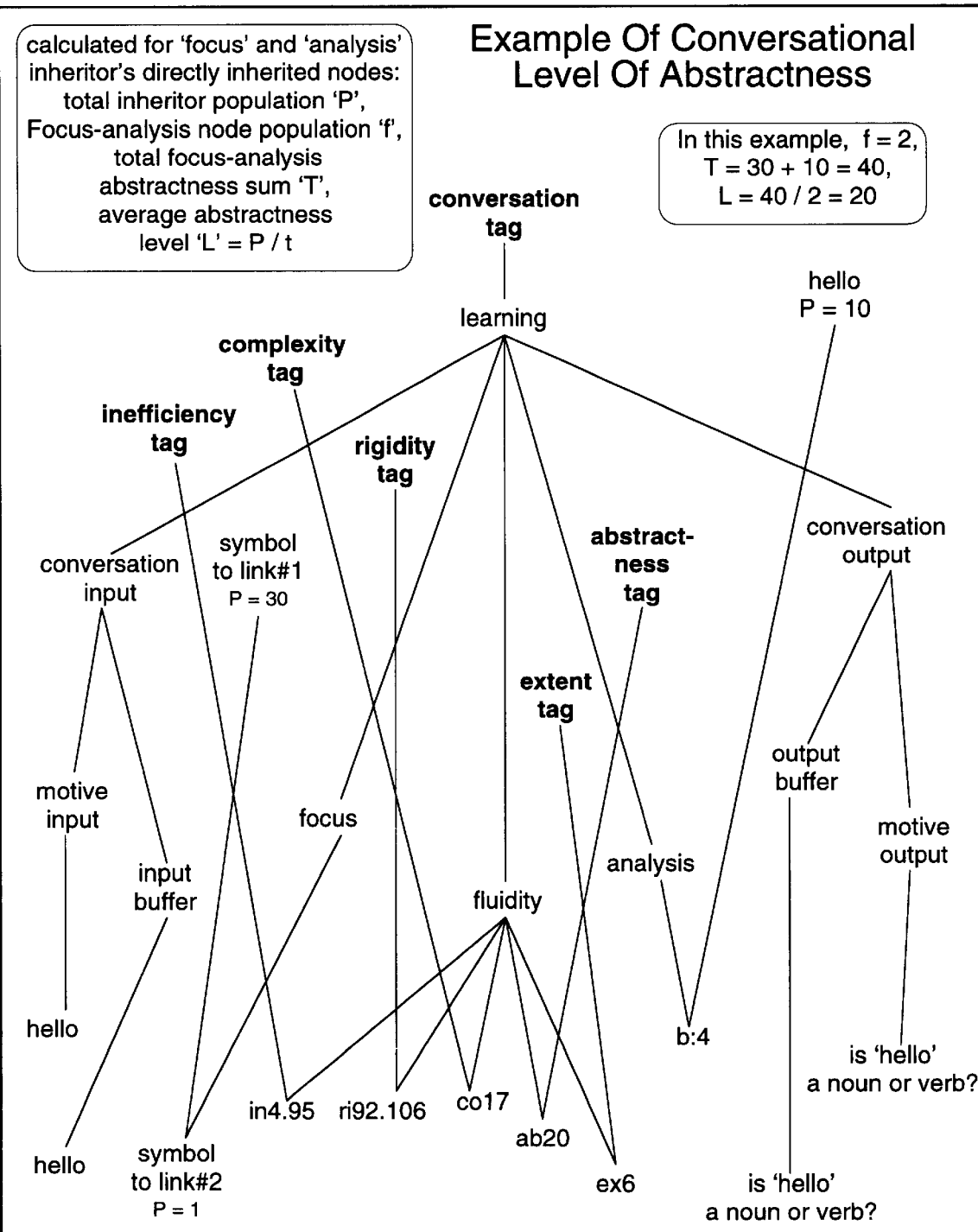
FIG. 23 shows how the abstractness of a conversation as in FIG. 10 is calculated from the sum abstractness of the focus and analysis subtree inheritors, divided by the inheritor counts of the focus and analysis nodes.

FIG. 23 shows another metric for characterizing conversations, which is conversational abstractness. The conversation shown in FIG. 23 is similar to the conversation shown in FIG. 10, except that suffixes have been added to the nodes 'symbol to link#1' and 'symbol to link#2' to make their distinctness from each other easier to see. The metric for conversational abstractness is useful as part of a method to quantify emotional states in conversations, a method which will be discussed later. The metric for conversational abstractness is discussed here because it resembles the metric for complexity. Like complexity, it uses total inheritor population numbers which have been assigned to nodes, but uses them because they describe abstractness. And unlike complexity, it only uses total inheritor population numbers from two subtrees of the conversation: the focus and analysis subtrees.

The inheritors of the focus and analysis subtrees all have meanings which are inherited from abstractions beyond the conversation itself. In FIG. 23, the focus inheritor 'symbol to link#2' has meaning inherited from the dictionary node of 'symbol to link#1' which has a total inheritor population of 'P=30' (shown as an example). The size of this population gives the sense of abstractness to the conversation, not the population of 'symbol to link#2' which is only 'P=1'. Similarly, the analysis inheritor 'b:4' has meaning inherited from the dictionary node 'hello' which has which has a total inheritor population of 'P=10' (shown as an example). The size of this population gives the sense of abstractness to the conversation, not the population of 'b:4' which is only 'P=1'. Since there are only two nodes which are inherited by inheritors of the focus and analysis subtrees, the conversational abstractness level is just the average of their two population numbers P=30 and P=10, which is 20.

The average abstractness of focus and analysis inheritors' directly inherited nodes give the sense of abstractness to the conversation, by describing the average abstractness of dictionary nodes directly connected to the conversation. As the conversation develops, the dictionary nodes directly connected to the conversation shift in abstractness, and this is reflected in the abstractness level calculated for the conversation.

Figure 24:
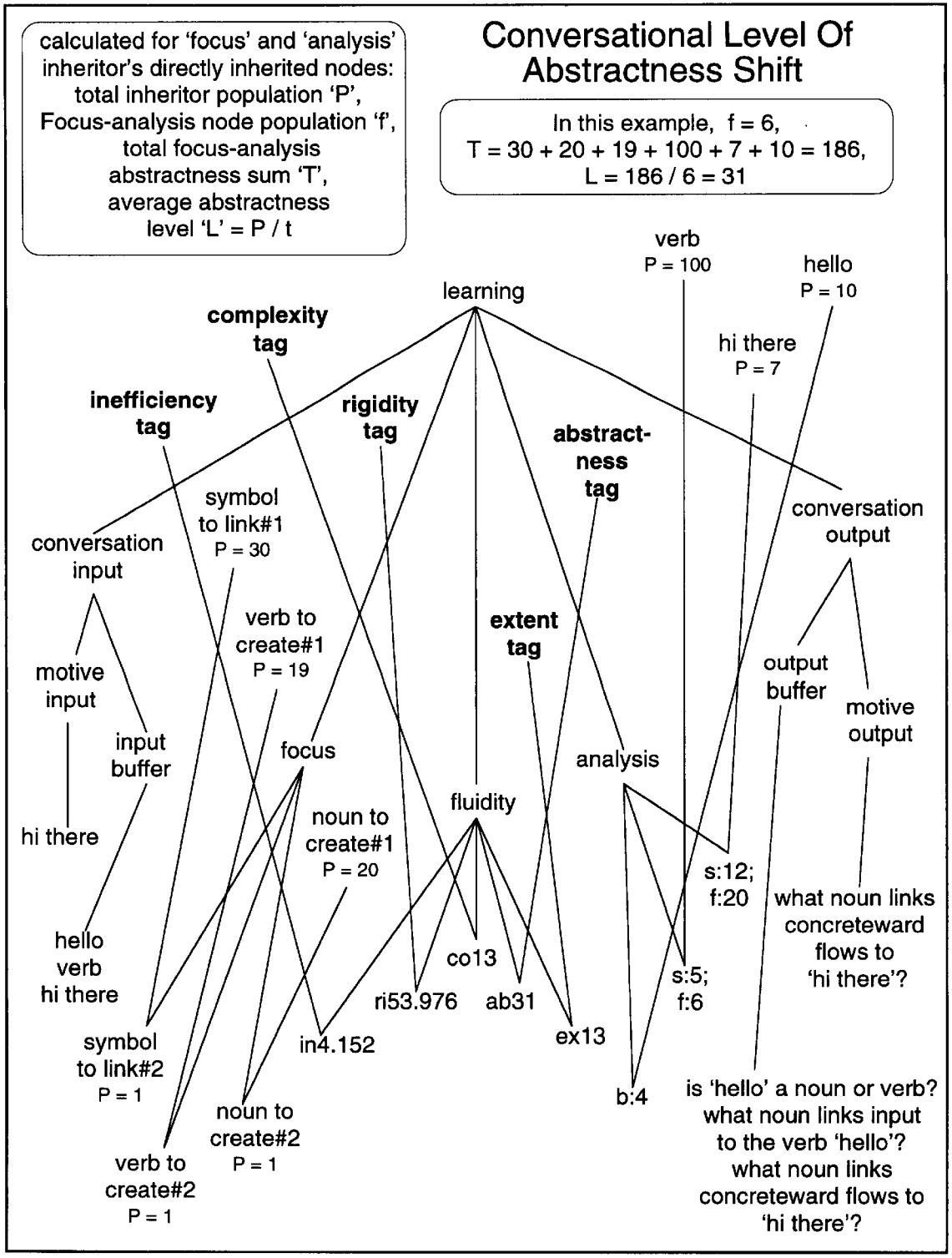
FIG. 24 shows how the abstractness of the conversation in FIG. 22 shifts to greater abstractness, after conversational development has added more abstract nodes to the focus and analysis subtrees.

FIG. 24 shows the conversation of FIG. 23 at a further stage of development, similar to FIG. 12 except with addition of suffixes on nodes to make their distinctness easier to see. Two more focus inheritor nodes have been added, 'verb to create#2' and 'noun to create#2', as well as two more analysis inheritor nodes, 's:5;f:6' and 's:12;f:20'. These additional nodes directly inherit from dictionary nodes which have total inheritor populations of 19, 20, 100 and 7 respectively, increasing the average level abstractness of the conversation to 31. As a conversation develops, its abstractness level may go up or down, depending on the abstractness of the vocabulary which is directly linked into the conversation. Vocabulary which is indirectly linked (such as nodes such as verb tag which are inherited from 'hello') do not affect conversational abstractness. When directly linked vocabulary is replaced by newly coined phrases, these phrases tend to have smaller total inheritor populations (typically just the conversation itself), so the abstractness for a conversation is reduced by such replacements.

FIG. 25 shows the conversation of FIG. 10, FIG. 11 and FIG. 12 as a dialog of just the inputs and output for the conversation as it develops. Showing just the inputs and outputs allows the continued development of the conversation to be summarized in just one drawing, and it shows how the interface of the semantic network might look on a simple stream connection, such as Internet Telnet. As the conversation develops, the focus of the conversation (symbol to link) keeps the discussion focused on adding vocabulary to the semantic network, so that the new symbol 'hello' has been well linked as a new verb dictionary node. In cases where default responses are suggested by the program, such as "are there other dataflows for the verb 'hello'? [none]" the default enclosed within square brackets will be taken as a reply if an empty reply is issued by the user of the program.

FIG. 26 shows the portion of the semantic network linked to the new verb 'hello' by the conversational dialog of FIG. 25. By asking the simple questions in FIG. 25, a new verb has been created which can be linked into conversation should it occur in the input stream. So the next time 'hello' occurs in the input stream, 'how are you' can emerge from the output stream. The syntax of the dialog of FIG. 25 is very simple, to demonstrate how semantics can be defined using only a few basic concepts of inheritance dataflow, such as 'conveys input' and 'conveys output'. The semantics shown in FIG. 25 can be implemented within a small semantic network.

In a well developed semantic network with 10,000 or more vocabulary nodes, the question and answers which create new vocabulary can be sophisticated enough to combine the functionality of all the question and answers of FIG. 25 into single inference, such as making an analogy between 'hello' and another kind of greeting such as 'who is it?'. By inferring such an analogy, the dialog can confirm the analogy and note a minor difference. For instance, the correct response to 'hello' can be noted to be 'how are you?' instead of 'me' or whatever the semantic network uses to describe itself when responding to 'who is it?'. By making an analogy, all the attention spans, input and output links would be copied from 'who is it?' to the new verb 'hello', without asking questions about them.

Figure 27:
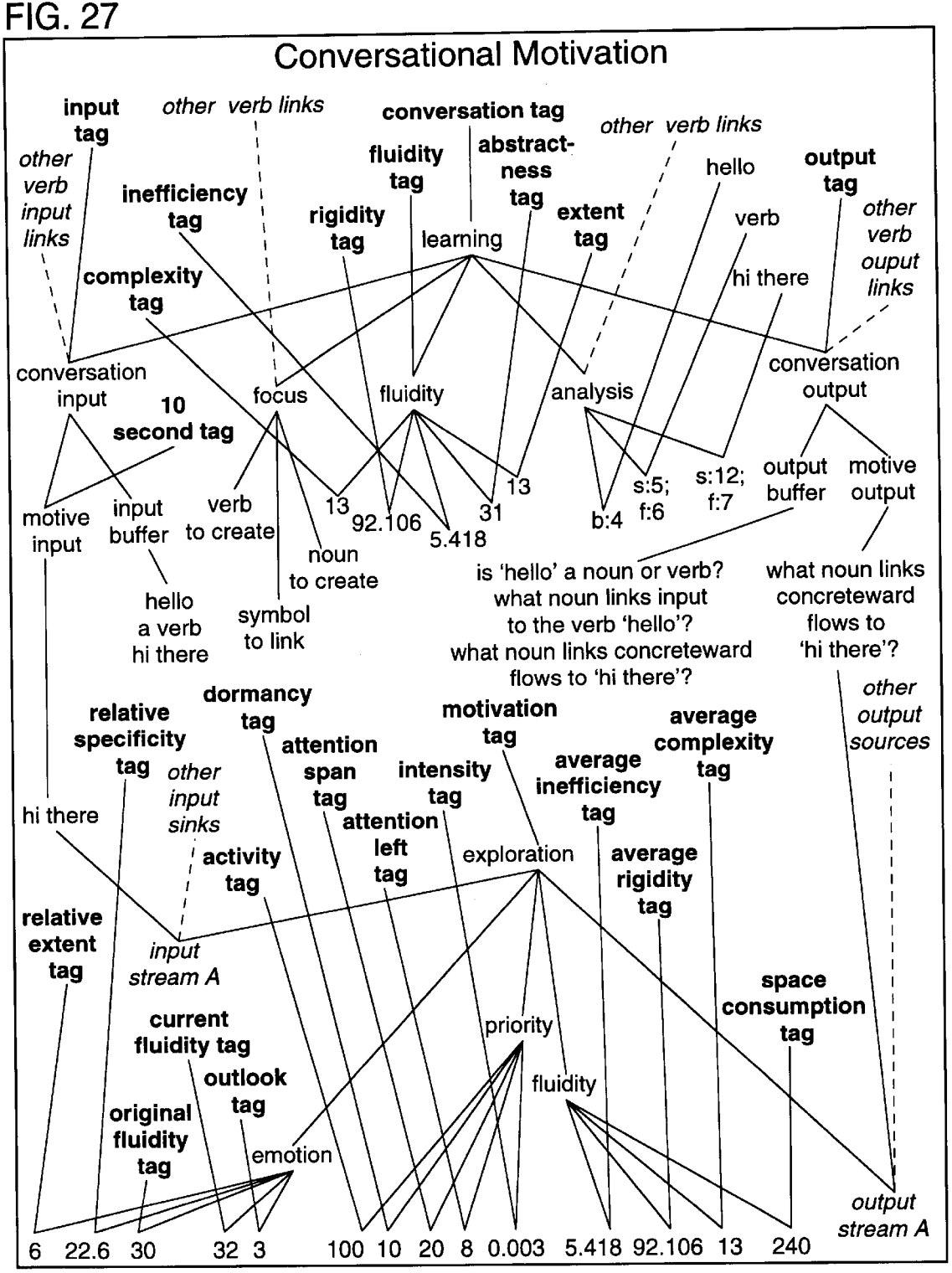
FIG. 27 shows the linking of a conversation 'learning' to a concrete motivation of 'exploration'; the motivation level provides an interface between the conversation and actual input/output streams, as well as assigning a specific priority to the conversation.

FIG. 27 shows an example of the node 'exploration' at the level of motivation motivating the activity of the conversation-level verb 'learning'. The links from input stream A to 'hi there' to 'motive input' create the dataflow which activates 'learning'. The conversation-level verb 'learning' in turn then creates the output which emerges as the dataflow from 'motive output' to "what noun links concreteward flow to 'hi there'?" to output stream A. This output stream would then pass to the semantic network's external interfaces.

There may simultaneously be other active conversations which are motivated by dataflows from 'exploration'; the dashed-line link from input stream A to other input sinks shows where this dataflow would activate other conversations whose dataflow would return from the node shown as other output sources across the dashed-line link to output stream A. These other conversations may be more internal, so that the semantic network can ask itself rhetorical questions as part of an exploration of paradoxes emerging from its external interfaces. This would be similar to the way a person notices something distracting while conversing with another person, without letting the distraction interrupt the conversation.

The motivation-level verb 'exploration' has a subtree of 'fluidity' which describes averages of fluidity numbers for all active conversations currently linked to the verb 'exploration'. For simplicity in the diagram, only the verb 'learning' is shown linked to 'exploration', so these averages currently reflect just the conversation-level verb 'learning'. This 'fluidity' subtree also has a number '240' which inherits from space consumption tag, describing how much free space has been consumed by all the conversations activated by the verb 'exploration'. In order to track this number, the amount of change in free space caused by each system command operation activated on by the 'exploration' verb has to be accumulated, such as the commands shown in FIG. 9 such as 'get inheritor of focus into local focus'. This accumulation will be used to calculate overall fluidity numbers which will be discussed later.

The motivation-level verb 'exploration' has a subtree of 'emotion' which describe numbers which characterize the emotional state of the verb 'exploration'. These numbers, which are derived from 'fluidity' subtree numbers and other topological number, will be discussed later when quantification of emotions are described in detail in FIG. 82.

The motivation-level verb 'exploration' also has a subtree of 'priority' which quantifies the relative urgency of the active verb 'exploration'; the '8' node which inherits from the intensity tag shows the relative priority (in the semantic network) given to the verb 'exploration' and all the system command operations it activates. The manner in which the other inheritors of 'priority' are used to calculate the intensity tag number will be described later in detail in FIG. 87.

The motivation-level verb subtrees such as 'exploration' may also contain histories of previous activations, describing expected changes in emotional state, and connections and disconnections from various conversation-level verbs such as 'learning' during these previous activations. Similarly to the way the 'focus' subtree in conversations determine which abstract verbs need to handle conversational input, the history subtree (not shown) in motivation-level verbs can determine which conversation verbs will handle the input streams of the motivation, such as input stream A.

Figure 28:
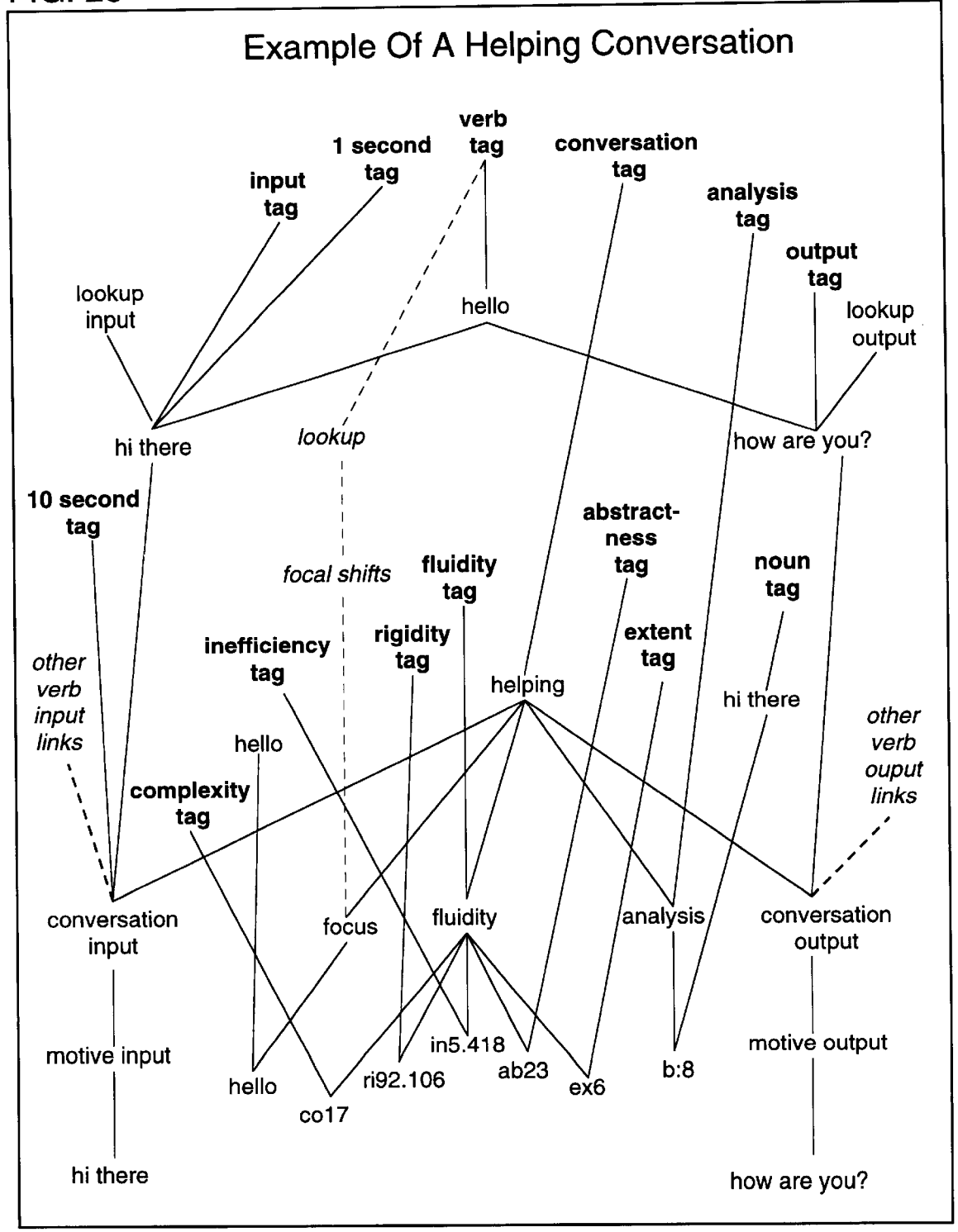
FIG. 28 shows an outline of conversation 'helping' which could invoke a verb 'hello' as defined by the dialog of FIG. 25 and shown in the semantic representation of FIG. 26.

FIG. 28 shows an example of how the verb 'hello' defined by the dialog of FIG. 25 in the semantic form of FIG. 26 can be activated by a conversation-level verb 'helping'. In FIG. 28, the motive input 'hi there' has been associated with the verb 'hello' by a dictionary lookup, so that the verb 'hello' has been linked to handle the input stream 'helping'. The verb 'hello' has produced an output of 'how are you?' which was passed to the conversation output of 'helping', onward to the motive output, from where it will eventually emerge in the output stream of the motivation-level verb which activated 'helping'.

This is a general overview how a newly defined verb can be utilized by a slight shift in conversation, from 'learning' to 'helping'. The relinking which takes places depends greatly on the semantic network which forms a context for each verb, since the each verb is chosen for most specific meaning relative to current 'focus' and 'conversation input' subtrees, by a universal indexing mechanism. The universal indexing mechanism of the present invention is described in FIG. 29 through FIG. 42.

FIG. 29 shows an example of a semantic network containing alternate specific meanings connecting two phrases: 'ice cream' and 'satisfaction'. The phrase 'ice cream' is defined by two dictionary nodes: 'ice cream#1' and 'ice cream#2'. The first node 'ice cream#1' is more abstract, inheriting directly from 'sweets' as a sibling of 'chocolate'. This node 'ice cream#1' is abstract; it might describe ice cream substitutes as well as traditional ice creams. The second node 'ice cream#2' is more specific, inheriting from 'dairy product' as well as 'ice cream#2'. By allowing the spelling 'ice cream' to appear as various distinct dictionary nodes, the multiple (polysemous) meanings for 'ice cream' can be precisely represented.

Similarly, the phrase 'satisfaction' is defined by three dictionary nodes. The first node 'satisfaction#1' is the most abstract, inheriting only from 'noun tag', describing all types satisfaction, regardless of source. The second node 'satisfaction#2' is more specific, inheriting from the verb 'eating' and the noun 'satisfaction#1'. The third node 'satisfaction#3' is also specific, inheriting from the verb 'guaranteeing' and the noun 'satisfaction#1'. The three dictionary nodes for the spelling 'satisfaction' represents three different (polysemous) meanings for that spelling.

If the input of a conversation contained just two the phrases, 'ice cream' and 'satisfaction', the meaning of those two phrases could be described as the most specific of paths connecting a dictionary node for 'ice cream' to a dictionary node for 'satisfaction'. In prior art, the method of searching for the 'most specific common abstraction' (Kolodner, pages 346–347) would be used to find a most specific path. For the example in FIG. 29, the two common abstraction covering dictionary entries for 'ice cream' and dictionary entries for 'satisfaction' are the peak abstractions 'noun tag', 'verb tag' and 'guaranteeing'. Of these three abstractions, 'guaranteeing' is the most specific, so it would be chosen as 'most specific common abstraction'.

An advantage of the current invention is that it can find a more specific path between 'ice cream' and 'satisfaction' than the path through 'guaranteeing'. That path (shown in bold lines marked by the encircled number 1) traverses from 'ice cream#2' to 'ice cream#1', 'sweets', 'food#1', 'food#2', 'eating' and 'satisfaction#2'. That path contains the node 'food#2' which is not inherited by either 'ice cream' or 'satisfaction', but rather is related in meaning because 'food#2' is a sibling node of 'sweets' (inherited by 'ice cream#1') and it is a sibling node of 'satisfaction#2'. The current invention chooses a most specific path from candidate paths through sibling inheritor nodes under the inherited nodes of dictionary nodes, in order to find a path with the most specific meaning between any two spellings.

Another advantage of the current invention is that it can find a specific path (through 'eating') between 'ice cream' and 'satisfaction' even if 'noun tag', 'verb tag' and 'guaranteeing' were not in the network. It would find the path through 'eating' even if 'food#1' and 'eating' were separate peak abstractions, with no inherited nodes; the scope of its search is much broader than the search undertaken when finding the 'most specific common abstraction'.

FIG. 30 shows examples of some paths considered by the present invention from FIG. 29 (shown in that diagram in bold lines) between 'ice cream' and 'satisfaction' spellings. FIG. 30 uses the same simple way of quantifying abstractness in terms of total inheritor population 'P' as in FIG. 20, although other methods for quantifying abstractness could also be used. The five encircled path numbers in FIG. 29 correspond to the encircled path numbers in FIG. 30.

The encircled path number 1 represents the most specific path between 'ice cream' and 'satisfaction'. Path 1 traverses from 'ice cream#2' to 'ice cream#2', 'sweets', 'food#1', 'food#2', 'eating' and 'satisfaction#2'. The abstractness average of path number 1 is the average of 'P' values of seven nodes: 'ice cream#2' has P=1, 'ice cream#1' has P=2, 'sweets' has P=4, 'food#1' has P=9, 'food#2' has P=1, 'eating' has P=4 and 'satisfaction#2' has P=1. The average of these numbers is 22 divided by 7, which equal 3.142 (rounded to three decimals). FIG. 30 also shows the calculation of average path abstractness for encircled path numbers 2 through 4. To save space in the diagram, the population numbers 'P' which quantify abstractness for each node are shown simply in parenthesis, such as 'guaranteeing (8)'. The next most specific path is path number 2, whose six nodes have an abstractness average of 3.166 (rounded to three decimals). This value, although more abstract, is so close to the value of 3.142 for path number 1, that if the focus of the conversation included the node 'purchase', the average specificity of path from 'purchase' to path number 2's 'guaranteeing' node averaged with the path number 2 would be preferable to the average specificity of the abstract path (via 'verb tag') from 'purchase' to path number 1's 'eating' node averaged with path number 1. This demonstrates how the context of conversation, as defined by average specificity of all paths from conversational focus nodes to dictionary nodes, can tip the balance in terms of which of a variety of polysemous meanings to choose.

Another way path number 2 might be chosen over path number 1 is if one more inheritor were added to the 'eating' subtree, so that the total inheritor population of eating increased from P=4 to the more abstract P=5. In that case, the abstractness average for path number 1 would be 23/7 which would equal 3.286 (rounded to three decimals). This higher number would then tip the balance in favor of path number 2, whose average abstractness is only 3.166; this demonstrates how the more specific path of meaning is always chosen, even if the difference in specificity is minor. In actual conversation, a person would make the same choice, based on an intuitive feeling for what meaning is more specific, and hence germane to the conversation. For instance, new ideas introduced during the course of conversation tend to have few inheritors, and hence the coining of new terms and phrases during conversation creates a preference to connect to those terms, for the sake of specificity.

FIG. 30 also shows how the present invention chooses the more specific path of meaning, even when it involves a less specific dictionary entry. The path number 3, from 'ice cream#2' to 'dairy product', 'commodity', 'guaranteeing' and 'satisfaction#3' differs from path number 2 only because path number 3 starts at path number 2's second node 'ice cream#2', thus omitting the less specific node 'ice cream#1' from its average. This increases the abstractness of path number 3 from 17/5, up from 19/6, to an average of 3.4. Path number 2 has a numeric advantage by including 'ice cream#1', even though it has already traversed a more specific spelling for 'ice cream' in 'ice cream#2', because 'ice cream#1' (P=2) is still lower in abstractness than the average of nodes in path number 2. By adding a node with lower abstractness than the average, the lengthened path has lower average abstractness; the present invention would choose path number 2 over path number 3.

FIG. 30 also shows two less specific paths, involving the peak abstraction 'noun tag'. Path number 4 has abstractness average 5.333 (rounded to three decimals), and path number 5, has the highest abstractness of 6.2, since it does not benefit from the inclusion of 'satisfaction#2' from path number 4. Highly abstract paths can still be useful in conversations where specific meanings have been excluded, by negative conversational focus. For instance, if the concepts of 'eating' and 'guaranteeing' were both explicitly excluded from conversation, by a conversant saying "I'm not talking about 'eating' or 'guaranteeing' anything, I just want 'satisfaction'!" what the present invention would do is exclude any paths containing spellings for 'eating' or 'guaranteeing' (not shown). This would leave paths 4 and 5 as the remaining contenders for most specific meaning, so path number 4 would be chosen., since it has a lower average abstractness of 5.333.

Highly abstract paths can also be useful when paradoxes are detected within a conversation, since paradoxes can be resolved by using conversational focus to negate the conflicting symbols, while still searching for a specific path between two symbols. For instance, if a person, due to an illness, had trouble eating, and also was too weak from illness to think about guaranteeing, 'guaranteeing' and 'eating' would be added to the focus as negative symbols to be avoided, to represent the paradox at hand. When seeking a specific meaning between 'ice cream' and satisfaction, the present invention would then choose path number 4 via 'noun tag', opening up the conversation to any form of satisfaction, such as vicariously watching others eat ice cream (not shown).

Figure 31:
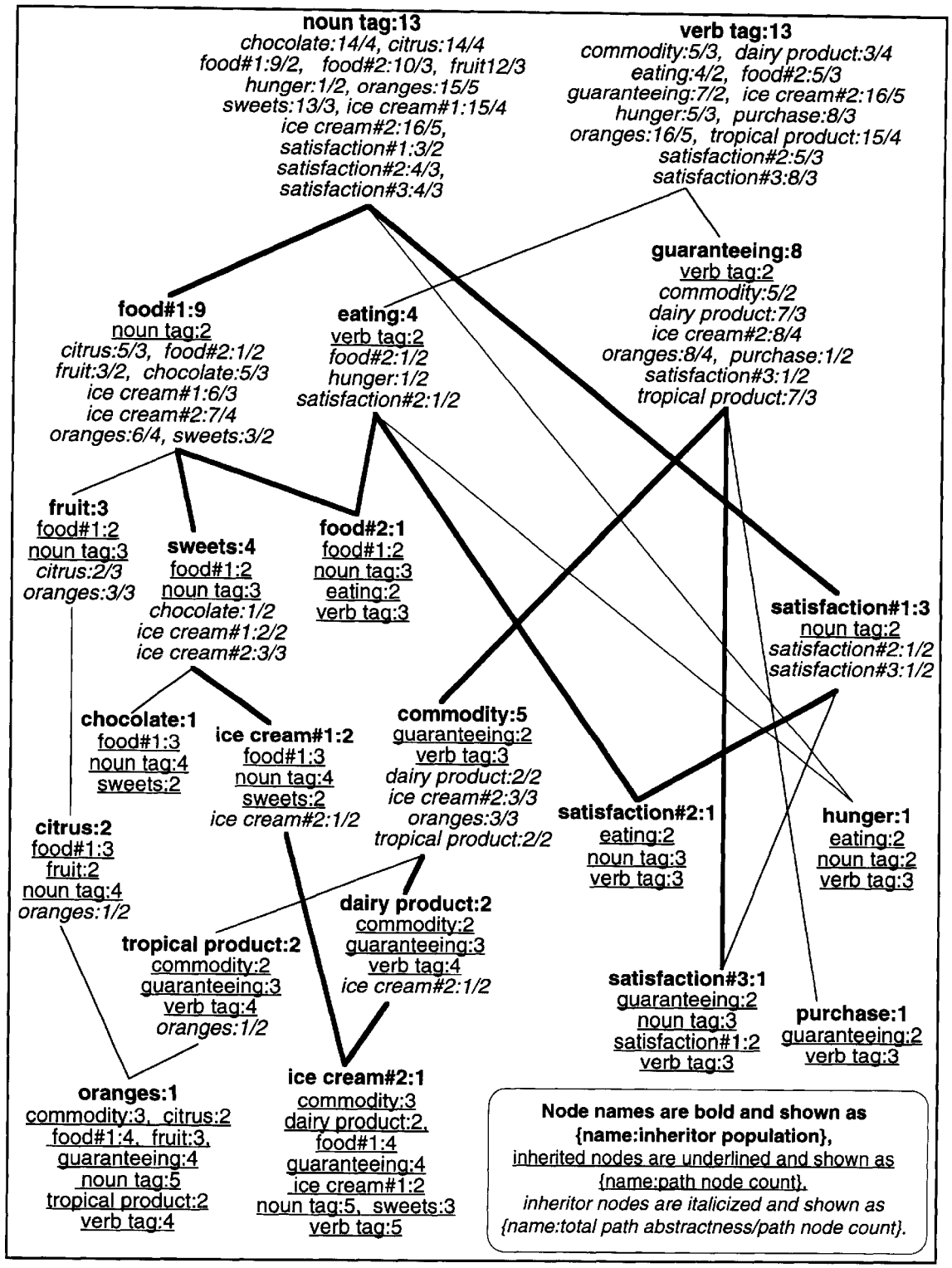
FIG. 31 shows the indices stored in the semantic representation of FIG. 29 which speed up calculation of average path abstractness; the universal indexing technique uses these indices to quickly identify the preferred path of least abstractness when traversing from the inherited node of one symbol to the inherited node of a second symbol, via a common inheritor node.

Since the present invention's use of search for most specific meaning is a much broader search than the search for 'most specific common abstraction', careful indexing design is necessary to reduce the cost of performing searches. FIG. 31 shows the preferred form of indexes for the semantic network of FIG. 29, designed to reduce the processing cost of searching for most specific paths through sibling inheritor nodes. As in most index designs, a trade-off exists between indexing everything and indexing nothing. If a design indexes everything, the index will generally consume too much storage space, and also slow down updates to the semantic network, since any change to the semantic network will affect a great deal of indexed information. On the other hand, if no index is used, searches tend to examine every combination of paths through the network, which for a large network can take a prohibitive amount of time.

The present invention indexes every inherited node and every inheritor node for every node, along with numbers characterizing those paths. As can be seen FIG. 31, this increases the amount of storage space needed to store the network shown in FIG. 29. To store the network in FIG. 29, most non-indexed implementations will store only the directly connected inherited and inheritor node information for every node. By storing indirectly connected inherited and inheritor node information, the storage costs are roughly ten times higher than an unindexed semantic network. Although storage costs are increased, the search time is exponentially reduced since node-by-node traversals can almost be eliminated.

The present invention's method of searching for most specific meaning is performed in stages. The general form of the search starts by considering a first set of all inherited nodes of all start nodes corresponding to a spelling, such as 'ice cream' in FIG. 29, and a second set of all inherited nodes of all end nodes corresponding to a second spelling, such as 'satisfaction' in FIG. 29. The search then identifies the closest bridging nodes from each member of the first set to each member of the second set, in effect considering a Cartesian product of the two sets. The closest mutual inheritor is chosen as the bridge node, in order to make the bridging as conservative as possible. By making the mutual inheritor as close as possible (in terms of inheritance hops), it is closer in abstractness and meaning to the members of the first and second set it bridges. It is still possible, of course, for a mutual inheritor to be irrelevant and distracting to the conversation, especially if bridging highly abstract terms from the first and second set of inherited nodes. Therefore, first preference is given to overall most specific average candidate paths, thus eliminating if possible the use of highly abstract bridging terms.

When most specific candidate paths are chosen which contain distracting mutual inheritors, their specificity make them is easier to convey and correct, than abstract candidates. For instance, in FIG. 30, if path number 1 had been chosen as the meaning between 'ice cream' and 'satisfaction', that path could be conversationally described as 'involving food for eating?'. If the answer was no, then the runner up path number 2 would be tried, 'involving ice cream for guaranteeing?' It is conversationally much easier to discuss successively more abstract specific examples of meaning than to discuss choices from successively more specific menus of inheritor meanings. A menu-style question starting with path 5, for example, would be 'involving food, satisfaction or hunger?' Menu-style questions take a lot more thinking on part of the answerer, which is why they are not generally preferred in natural conversation. If this had been answered 'satisfaction', a further question would be necessary such as 'eating food, guaranteeing satisfaction or just satisfaction in general?'. For complex semantic networks, presenting successively more specific menus is conversationally laborious, similar to the children's game where one person guesses the name of an animal while the other person only gives clues about its classification, to prolong the game. Even so, much prior art, such as graphical user interface pull-down menus, is based on traversing successively more specific menus. By providing an alternative way to get directly to specifics, the present invention provides a much more efficient user interface.

The indices in FIG. 31 provide an computationally efficient way to identify the Cartesian product of all nodes inherited by the start and end nodes of the search, since they list all inherited nodes for each node. Working each pair of inherited nodes from that Cartesian product, the indices in FIG. 31 also provide an efficient way to identify closest mutual inheritor nodes, by intersecting the lists of inheritor nodes for the pair, looking for mutual inheritors and choosing the mutual inheritor closest to the pair.

For instance, FIG. 32 gives an example of finding a closest mutual inheritor between a pair of nodes 'noun tag' and 'verb tag' which have many mutual inheritors. The top box of FIG. 32 shows the indices from FIG. 31 which are used to identify a closest mutual inheritor. The bottom box of FIG. 32 shows the candidate mutual inheritors which are considered, candidates which were identified by intersecting the indexed list of inheritor nodes for 'noun tag' (in italics) with the indexed list of inheritor nodes for 'verb tag' (in italics).

Since the indices also include information about the number of nodes in the path to each inheritor, by summing those numbers for each candidate, the closest candidate can be found. For instance, the concreteward path from 'noun tag' to the candidate 'hunger' has just 2 nodes, 'noun tag' and 'hunger', since they are directly linked; this path count is stored in the index for 'noun tag' as '2' after the slash '/' in the 'hunger:1/2' index entry. The abstractward path from 'verb tag' to the candidate 'hunger' has 3 nodes, 'verb tag', 'eating' and 'hunger'; this path count is stored in the index for 'verb tag' as '3' after the slash '/' in the 'hunger:5/3' index entry. The total number of nodes in the combined concreteward and abstractward path from 'noun tag' to 'verb tag' via 'hunger' is 4 nodes, 'noun tag', 'hunger', 'eating' and 'verb tag', which can be computed directly from the indices by adding the concreteward path length '2' to the abstractward path length '3' and subtracting 1, to avoid counting the mutual node 'hunger' twice.

Using the path node count numbers in the indices for 'noun tag' and 'verb tag' to add up the total path sizes for the other mutual inheritor candidates, 'hunger' can be identified as the closest candidate bridging 'noun tag' and 'verb tag', without actually traversing any nodes. The second closest candidates of 'food#2', 'satisfaction#2' and 'satisfaction#3' can also be identified without traversing any nodes.

Further information contained in the indices for 'noun tag' and 'verb tag' can be used to provide tie-breaking capabilities when there is more than one closest mutual inheritor. In such cases, the path most similar in abstractness to the Cartesian pair nodes can be chosen, which will be the path with highest average abstractness. For instance, if the node 'hunger' had not been in the network, there would have been three closest candidate paths to the Cartesian pair of 'noun tag' and 'verb tag'. To calculate which of the three paths is most abstract, it is necessary to know the sum abstractness and number of nodes in each path. It is not necessary to include 'noun tag' and 'verb tag' in the paths compared, since these contribute the same abstractness and count to each path. All the information needed is contained in the indices for 'noun tag' and 'verb tag'. For example, for the first path listed in the bottom of FIG. 32, the mutual inheritor is 'food#2'. From 'noun tag' to 'verb tag', the nodes in the path are 'food#1' (P=9), 'food#2' (P=1) and 'eating' (P=4). The average abstractness of this path can be calculated from the indices in the following manner: The number of nodes in the path is the mutual node's path node count indexed under 'noun tag' (3), the mutual node's path node count indexed under 'verb tag' (3), minus counts for 'noun tag', 'verb tag', and the double-counting of 'food#2' (3), so the number of nodes in the path is 3 plus 3 minus 3, which equals 3. The sum abstractness of the nodes in the path can also be calculated from the indices. The sum abstractness of the path from 'noun tag' to 'food#2', excluding 'noun tag' itself, consists of the summed abstractness of the two nodes 'food#1' (P=9) and 'food#2' (P=1), which equals 10. This is encoded in the index under 'noun tag' as food#2:10/3, where the sum abstractness number '10' is delimited by a leading ':' and a trailing '/' character. Similarly, the sum abstractness of the path to the inheritor 'food#2' under 'verb tab' is encoded as food#2:513, where the encoded sum abstractness '5' represents the sums from 'eating' (P=4) and 'food#2' (P=1). The total sum is thus 10 plus 5, minus the abstractness of the node 'food#2' (P=1) which has been counted twice, for a total sum of 14. The average abstractness is the total sum divided by the number of nodes in the path, 14 divided by 3, which equals 4.666 (rounded to 3 decimals).

The 'Mutual Inheritor Candidates' box in FIG. 32 shows how, in a similar fashion, the average abstractness of the mutual inheritor paths through 'satisfaction#2' and 'satisfaction#3' can be calculated, only referencing indices in the peak nodes 'noun tag', 'verb tag', and the mutual inheritor nodes themselves. By doing so, the abstractness of the mutual inheritor path through 'food#2' (14/3=4.666) can be quickly established to be preferable to 'satisfaction#2' (8/3=2.666) and 'satisfaction#3' (11/3=3.666).

On rare occasions, there is a tie between mutual inheritor candidates with the same closeness and same average path abstractness. In these cases, choosing the mutual inheritor nodes with the greatest abstractness, earliest creation dates, or paths with earliest average creation dates can be used as a tie-breaker method. For systems where such tie-breakers are not appropriate, it is also possible to include all tied candidates by adding them to the set of candidates for consideration.

After a set of mutual inheritor candidate paths have been established, the method of the present invention proceeds to simplify these paths, by removing redundant portions of the paths so that no node is counted more than once. In order to do this, all overlapping path traversals have to be identified. The candidate mutual inheritor paths fall into four types of overlapping path topologies which are outlined in FIG. 33. The first topology, shown at the top in the box labeled no overlap, has no redundant path portions. Such paths consist of a start node, such as 'ice cream#2', traversing abstractward to start peak, such as 'food#1', concreteward to closest mutual inheritor, such as 'food#2', abstractward to end peak, such as 'eating' and finally concreteward to an end node, such as 'satisfaction#2'. Since paths with no overlap topology have no redundant path portions, none of their nodes occur more than once in each path and there is no need to simplify these paths.

The second topology, shown in the box labeled partial overlaps, occurs when the abstractward traversal to a peak node partially overlaps the concreteward traversal away from that peak node. In such cases, the redundant portion of the traversal has to be removed, by identifying the most specific common node to the abstractward and concreteward traversals. This most specific common node is called the 'start common inherited' node when the overlap occurs traversing to and from a start peak node, and it is called a 'end common inherited node' when the overlap occurs traversing to and from an end peak node.

The start common inherited node can be identified using the indices in the start node and closest mutual inheritor, by intersecting their inherited node indices to find the closest common inherited node. Similarly, the end common inherited node can be identified using the indices in the end node and closest mutual inheritor, by intersecting their inherited node indices to find the closest common inherited node. For instance, FIG. 34 shows an example of overlap using some nodes and their indexes from FIG. 31. In FIG. 34, there is a path traversing from the start node chocolate abstractward to the peak node food#1, then concreteward to the mutual inheritor node ice cream#2. This path contains overlap (shown by the bold line) where it traverses abstractward from sweets to food#1 and then concreteward from food#1 back to sweets. To remove this overlapping portion of the path, sweets must be identified as a closest common inherited node of chocolate and ice cream#2. This can be done by analyzing the indices in chocolate and ice cream#2 which describe their inherited nodes (underlined), with the index in food#1 which describes its inheritor nodes (in italics). The box at the bottom of FIG. 34 shows how the analysis is done. First, the candidate nodes are found by intersecting the sets of inherited nodes of chocolate and ice cream#2 with the inheritor nodes of food#1. Since each node is considered to be an inheritor of itself, this set intersection produces a set of candidates which consist of sweets and food#1 itself. The node noun tag is not a candidate, even though it is inherited by both chocolate and ice cream#2, because it is not an inheritor of food#2, and therefore is outside the scope of paths which peak, in terms of abstractness, at food#1. Next, the path lengths through the two candidate nodes are compared. Since each index to inherited nodes (underlined) contains the number of nodes contained in the path to that inherited node, by adding the path lengths together, and subtracting 1 to avoid counting the common inherited node twice, the number of node in the entire path from chocolate to common inherited node to ice cream#2 can be calculated using just the indices. For example, the '2' in the index sweets:2 in the node chocolate encode the number of nodes in the path from chocolate to sweets. The '3' in the index sweets:3 in the node ice cream#2 encodes the number of nodes in the path from ice cream#2 to sweets. By adding the index numbers 2 plus 3 and subtracting one to avoid counting sweets twice, the number of nodes in the path from chocolate to sweets to ice cream#2 can be quickly calculated to be 4. Applying the same calculation to the candidate common inherited node food#1, the number of nodes in the path from chocolate to food#1 to ice cream#2 can be quickly calculated to be 3 plus 4 minus 1 which is 6. Thus of the two candidates, sweets rather than the peak node food#1 is the closest common inherited node, and the path from chocolate to sweets to ice cream#2 is the preferred path with overlap removed from the path from chocolate to food#1 to ice cream#2.

In FIG. 33, the box labeled partial overlaps shows overlaps occurring under either path start peak nodes, or path end peak nodes. Both types of overlap can be removed by the method described in FIG. 34. Since a start node may actually be a closest mutual inheritor node, the subpath from start node to start peak to mutual inheritor node is a totally redundant subpath. In such cases, shown by the box labeled total overlap at start in FIG. 33, the subpath from start node to start peak to mutual inheritor node should be removed, leaving a path which goes directly from start node to end peak node.

The same total overlap condition may occur at the other end of a bridge path. When the end node is actually a closest mutual inheritor node, the subpath from mutual inheritor node to end peak to end node is a totally redundant subpath. In the box labeled total overlap at end in FIG. 33, the subpath from mutual inheritor node to end peak to end node should be removed, leaving a path which goes directly from start peak node to end node.

Figure 35:
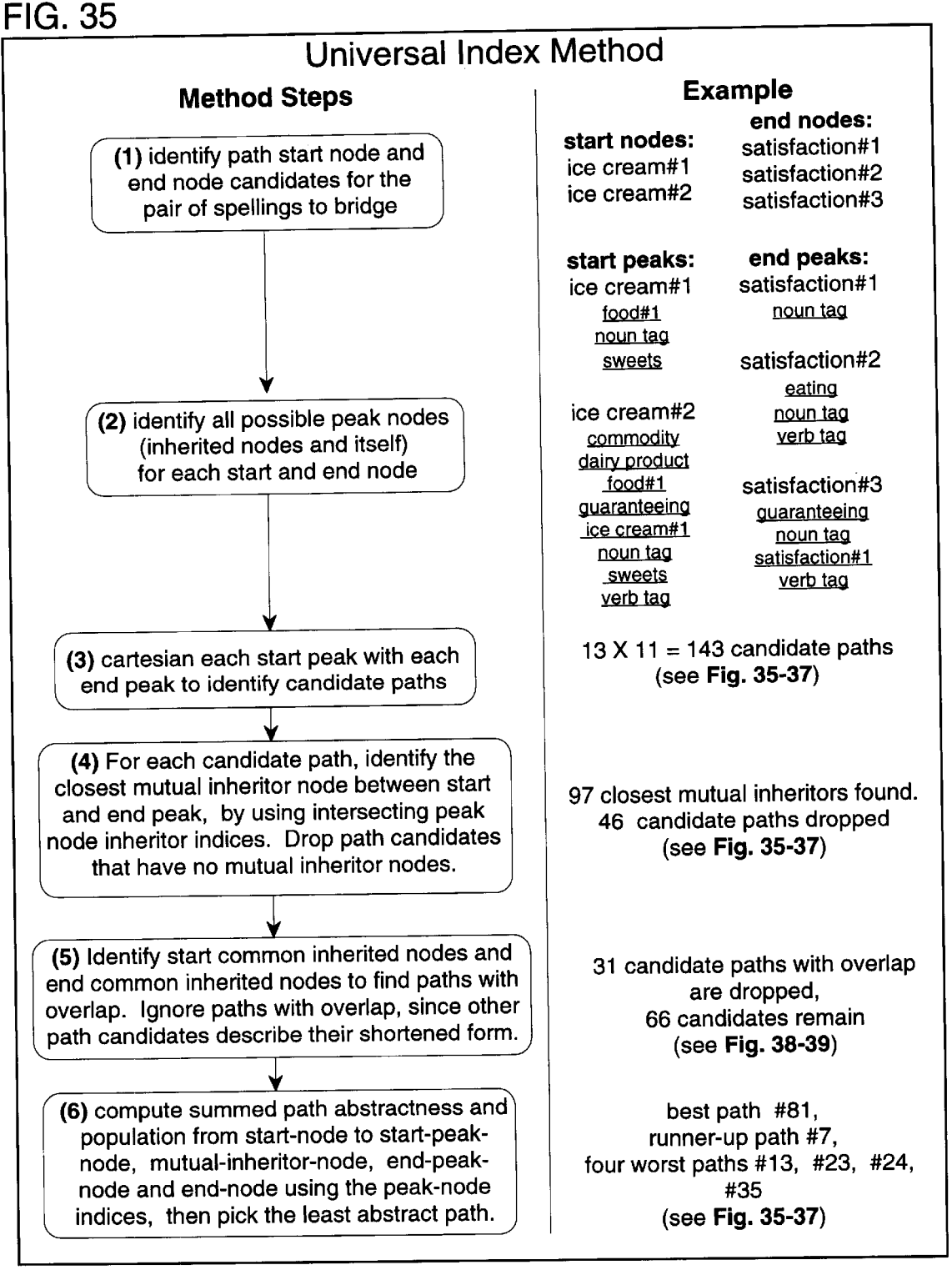
FIG. 35 outlines the universal indexing algorithm for determining the most concrete traversal path between two symbols; the algorithm's intermediary results for the example in FIG. 31 are given on the right hand side of FIG. 35.

FIG. 35 shows an overview of the present invention's method of universal index path determination. The steps in the method are shown on the left side of the drawing, and an example of the method's application to FIG. 31 is shown on the right side of the drawing.

In the step labeled (1), all candidate start nodes and end nodes are identified for the pair of spellings to be related by the universal index. In the example on the right side corresponding to step (1), the spelling 'ice cream' identifies two candidate start nodes, 'ice cream#1' and 'ice cream#2', representing the polysemous meanings for 'ice cream'. The spelling 'satisfaction' identifies three candidates end nodes, 'satisfaction#1', 'satisfaction#2' and 'satisfaction#3', representing the polysemous meanings for 'satisfaction'.

In the step labeled (2), all possible peak nodes are identified for each start and end node of step (1). In the example of the right side corresponding to step (2), the start node 'ice cream#1' has four possible start peak nodes: 'ice cream#1' itself, and the three underlined nodes encoded by the index for 'ice cream#1': food#1, noun tag and sweets. Similarly, nine possible start peak nodes are identified for 'ice cream#2'. Thus there are four plus nine combinations of start-nodes and start-peak-nodes, for a total of thirteen.

The end node candidate 'satisfaction#1' has two possible end peak nodes, 'satisfaction#2' has four possible end peak nodes, and 'satisfaction#3' has five possible end peak nodes. Thus there are two plus four plus five combinations of end-peak-nodes and end-nodes, for a total of eleven.

In the step labeled (3), the thirteen possible start-node-peak-node paths are cartesianed with the eleven possible end-peak-end-node paths, to produce 143 candidate paths. Each of these paths is listed in the Cartesian listing which is shown in FIGS. 37, 38 and 39. In FIG. 37, the first third (approximately) of the listing is shown, for paths numbered 1 through 50. In FIG. 38, the second third (approximately) of the listing is shown, for paths numbered 51 through 99. In FIG. 39, the last third (approximately) of the listing is shown, for paths numbered 100 through 143. Each path in the listing is characterized by a unique four-tuple combination of start-node, start-peak-node, end-node and end-peak-node. For example, the optimal path described by encircled path number 1 in FIG. 30 is described by path number 81 in FIG. 38.

In the step labeled (4) in FIG. 35, for each candidate path in the Cartesian listing, an optimal mutual inheritor (to start-peak-node and end-peak-node) is identified, using the method described in FIG. 32. Candidate paths which have no mutual inheritor nodes can be dropped from further consideration. For instance, in FIG. 37 path number 34 has peak-nodes of 'sweets' and 'satisfaction#2'. Since these peak-nodes have no mutual inheritor nodes in common, path 34 can be dropped from consideration, as are four other of the eleven paths numbered 34 to 44 which all have startpeak-node of 'sweets'. In contrast, the paths numbered 23 to 33, which have the start-peak-node of 'noun tag', all have mutual inheritor nodes, mostly because 'noun tag' is a very abstract, more easily inheritable node than 'sweets'. In the example on the right side of FIG. 35 corresponding to step (4), 47 candidate paths lacking mutual inheritors are dropped from consideration, leaving 97 candidate paths for the next step.

In step (5) of FIG. 35, all paths containing path overlaps are identified, using the method described in FIG. 33 and FIG. 34. Since removal of overlap from a path results in a path peaking at a more specific inherited node of either a start-node or end-node, after removing overlap from paths they are equivalent to other paths in the Cartesian listing. Consequently, paths containing path overlaps can be dropped from consideration, since their shortened forms are described by other path candidates which never contained overlap. In the example on the right side of FIG. 35 corresponding to step (5), 31 candidate paths containing overlap are dropped from consideration, leaving 46 candidate paths for the next step. The identification of candidate paths with overlaps is detailed in listing of FIG. 40 and FIG. 41. For example, path nineteen of FIG. 40 has a closer common inherited node 'ice cream#2' to the start-node of 'ice cream#1' and mutual-inheritor-node of 'ice cream#2'; this closer common inherited node would replace the start-peak node of 'food#1', to eliminate the overlapping traversal from 'ice cream#2' to 'food#1' and back to 'ice cream#2'.

In step (6) of FIG. 35, the remaining 46 paths are ranked by their average abstractness, to find the path with least average abstractness. This ranking can be done using the index information contained in their peak-node indices, using the method described next in FIG. 36.

FIG. 36 describes the method of the present invention for calculating the average path abstractness for any bridging path defined by a set of five nodes consisting of a start-node, start-peak-node, mutual-inheritor-node and end-peak-node. By utilizing indices in the start-peak-node, mutual-inheritor-node and end-peak-node, the average path abstractness can be calculated without examining any other nodes, greatly speeding up that calculation for long paths.

In the upper right box of FIG. 36 labeled Node Index Examples, the nodes from FIG. 30 path numbered 1 are shown, with the portion of their indices needed to calculate the average abstractness of the path numbered 1. Note that only the inheritor indices of food#1 and eating, and the population node count of food#2 are needed for the calculation.

In the lower box of FIG. 36, the actual calculations are detailed in a table. There are four columns to this table: calculation, node, index, abstractness, and population. The calculation column shows the step number (in parenthesis) and name of each calculation. Although the step numbers (in parenthesis) show the order of the calculations, the calculation steps numbered (1) through (10) contributed numbers toward the summation calculation numbered (11). Since summation can be done in any order, the order of calculation steps numbered (1) through (10) are not important; they can even be done in parallel.

The node, index, abstractness and population columns of the table show the calculation steps (1) through (11) for the path in the Node Index Example box. The node column shows what node contains the index information for the step. The index column shows the part of the index that is used for that step. The abstractness column shows the abstractness number from that index; it is the sum of abstractness numbers for nodes in the path from the node in the node column to the node in the index column, not including the abstractness of the node itself in the node column. The population column shows the population count from the index; it is the count of nodes in the path from the node in the node column to the node in the index column.

For calculation step (1), the subpath from start-node to start-peak-node is considered. The numbers characterizing this subpath are indexed in the start-peak-node 'food#1' (in the node column), by the index member ice cream#1:7/4 (in the index column) since ice cream#1 is the start-node for the path. The abstractness column number '7' is delimited by the ':' and '/' characters in the index member; it describes the sum of abstractness for the nodes in the inheritance path from food#1 to sweets (P=4), ice cream#2 (P=2) and ice cream#1 (P=1). Since the abstractness of food#1 itself is not included in this sum, it will have to be added in later in step (5). The population column number '4' is follows the '/' in the index member; the population number describes the total number of nodes in the inheritance path from food#1 to sweets, ice cream#2 and ice cream#1. Note that by using the index in 'food#1', the numbers characterizing that entire path are immediately accessible, without examining or traversing the nodes for sweets, ice cream#1 or ice cream#2.

For calculation step (2), the subpath from start-peak-node 'food#1' to mutual-inheritor-node 'food#2' is considered. Similarly to step (1), all the numbers characterizing this path are accessible from the index for the start-peak-node 'food#1'. The index member (shown in the index column) is food#2:1/2; this describes the abstractness column number '1' and the population column number '2'.

For calculation step (3), the subpath from mutual-inheritor-node 'food#2' to end-peak-node 'eating' is considered. Similarly to step (1), all the numbers characterizing this path are accessible from the index for the end-peak-node 'eating'. The index member (shown in the index column) is food#2:1/2; this describes the abstractness column number '1' and the population column number '2'.

For calculation step (4), the subpath from end-peak-node 'eating' to end-node 'satisfaction#2' to is considered. Similarly to step (1), all the numbers characterizing this path are accessible from the index for the end-peak-node 'eating'. The index member (shown in the index column) is satisfaction#2:1/2; this describes the abstractness column number '1' and the population column number '2'.

For calculation step (5), the abstractness of the start-peak node 'food#1' is added to the abstractness column, since it has not been included in steps (1) through (4). The abstractness of 'food#1' is described by its index member food#1:9; its total population number '9' follows the ':' character.

For calculation step (6), the abstractness of the end-peak node 'eating' is added to the abstractness column, since it has not been included in steps (1) through (5). The abstractness of 'eating' is described by its index member eating#1:4; its total population number '4' follows the ':' character.

For calculation step (7), the abstractness of the mutual-inheritor-node 'food#2' is added to the abstractness column, since it has not been included in steps (1) through (6). The abstractness of 'food#2' is described by its index member food#2:1; its total population number '1' follows the ':' character.

For calculation step (8), the start-peak-node 'food#1' is subtracted from the population column, since it has been counted twice, once in step (1) and again in step (2). The subtraction is performed by placing a '−1' in the population column in the row for step (8).

For calculation step (9), the mutual-inheritor-node 'food#2' is subtracted from the population column, since it has been counted twice, once in step (2) and again in step (3). The subtraction is performed by placing a '−1' in the population column in the row for step (9).

For calculation step (10), the end-peak-node 'eating' is subtracted from the population column, since it has been counted twice, once in step (3) and again in step (4). The subtraction is performed by placing a '−1' in the population column in the row for step (10).

For calculation step (11), the total path abstractness is summed, and the total path population is summed, for numbers accessed by steps (1) through (10). The summed abstractness for the path is '22' (shown in the abstractness column) and the summed population for the path is '7' (shown in the population column).

For the final calculation step (12), the average path abstractness is obtained by dividing the total path abstractness from step (11) by the total path population from step (11). The average path abstractness is shown as '3.143' (rounded to three decimals).

In step (6) of FIG. 35, the method of FIG. 36 is applied to calculate the average path abstractness for each of the remaining 46 paths. Since the method of FIG. 35 is only interested in the paths with the least average abstractness, a small memory buffer describing the current best path found can be maintained while iteratively applying the method of FIG. 36 to each candidate path of step (6) of FIG. 35. At the end of the iteration, the best path in that memory buffer will the path of meaning chosen by the universal index method of the present invention. In the example on the right side of FIG. 35 corresponding to step (6), the best path is #81, the runner-up path is #7, and the worst paths (not usually tracked) are #13, #23, #24 and #35. In the case of a tie for the best path, a question can be introduced into the conversation, to determine which paths of meaning should be used, or tie-breaking methods can be applied, such as choosing the path with mutual-inheritor-node earliest creation date, or earliest average creation date over all nodes in the path. Since the average abstraction numbers are fractions of total abstractness divided by path population, ties tend to be rare.

In FIG. 37, candidate paths 1 through 50 of the Cartesian set of 143 possible start-node-peak-node/end-peak-end-node paths is shown. The listing of FIG. 37 is in grouped order, grouped by start-node, start-peak-node, end-node, and finally end-peak-node. In the path candidate column, the path numbers are shown, followed by an '(o)' for paths which contain a traversal overlap, as described in FIG. 34. For instance, paths numbered 11, 19, and 26 contain overlaps.

In the column labeled mutual inheritor, the node identified as closest mutual inheritor to start-peak-node and end-peak-node is shown, as described in FIG. 32. If no such node exists, the column contains a '-' character. Such paths are dropped from consideration.

In the column labeled sum a/pop., the path sum abstractness is shown (as described in FIG. 36), followed by a '/' character, followed by the path population sum (as described in FIG. 36).

In the column labeled avg. abst., the average abstractness is shown (as described in FIG. 36), rounded to three decimal places. If the average abstractness of the path is the worst for the Cartesian set, the average abstractness number is followed by a (w). For example, paths numbered 1 and 13 have the worst abstractness of 6.2. If the average abstractness is the runner up to the best past, the abstractness number is followed by an (r). For example, paths number 7 is the runner up with an abstractness of 3.166. There are four other runner-up paths marked, but since they contain overlaps, they are (after removing overlapping portions) topologically equivalent to non-overlap paths, such as path number 7.

In FIG. 38, candidate paths 51 through 99 of the Cartesian set of 143 possible start-node-peak-node/end-peak-end-node paths is shown, in the same format as FIG. 37. In this drawing, the path number 81 with best abstractness of 3.143 is shown, with a (b) after its abstractness number in the column labeled avg. abst. on the right side of the drawing.

In FIG. 39, candidate paths 100 through 143 of the Cartesian set of 143 possible start-node-peak-node/end-peak-end-node paths is shown, in the same format as FIG. 37. None of these paths are either in the best or worst categories.

Figure 42:
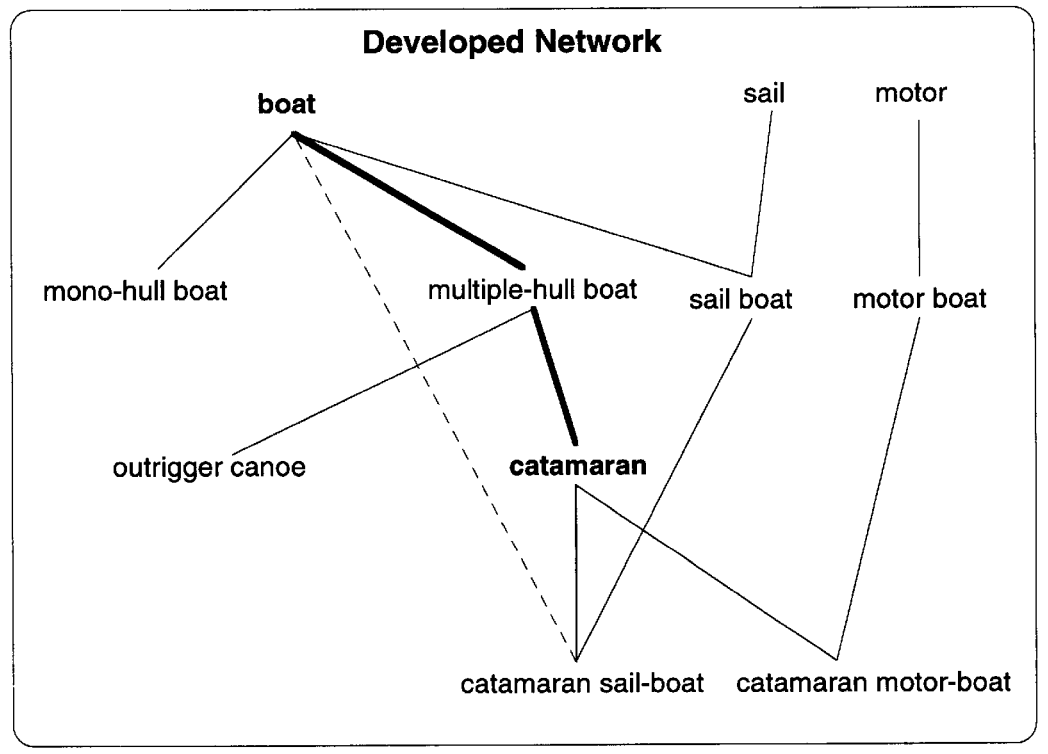
FIG. 42 shows how the universal index technique of traversing from an inherited node of one symbol to the inherited node of another symbol via a common inheritor subsumes the technique of seeking a most common specific abstraction.

In FIG. 41 and FIG. 42, the overlap identification instances for the Cartesian set of 143 paths are shown, with the common inherited nodes which would replace either the start-peak-node or end-peak-node, to remove the overlap. For instance, in FIG. 40, path number 26, the common inherited node 'food#1' replaces the more abstract start-peak-node 'noun tag'; this removes overlap from that path. This is an instance of partial overlap as described in FIG. 33. Most of the overlap path examples in the Cartesian set of 143 paths are instances of total overlap, as described in FIG. 33. For instance, path number 129 in FIG. 41 shows the common inherited node 'ice cream#2' replacing the more abstract start-peak-node 'sweets'. Since 'ice cream#2' is also the start-node of that path, the overlap removal has removed the entire portion of the path involving the start-peak-node; the shortened path traverses directly from its start-peak-node 'ice cream#2' to its end-peak-node 'guaranteeing'.

FIG. 42 shows how the 'most specific abstraction technique' of prior art can be subsumed by the universal index technique of the current invention, as described in FIG. 29 through FIG. 41. The ability of the universal index technique to consider most specific common abstraction candidates as part of its Cartesian set of path candidates was already shown in FIG. 29 through FIG. 41. In FIG. 30, the most specific common abstraction 'guaranteeing' is the end-peak-node of the path marked by the encircled number 2; this same path appears in the Cartesian set in FIG. 37 as the runner-up path numbered 7. One particularly useful property of the 'most specific abstraction technique' of prior art is that as the network grows, adding many new nodes and levels, the meaning of paths through most specific common abstractions continues to make sense. Fortunately, the universal index technique of the current invention has a similar property, because of transitivity of inheritance and the inherent optimality of paths with least average abstractness.

For instance, in the box at the top of FIG. 42 marked Initial Network, a very small semantic network of three nodes is shown. If the spellings of 'boat' and 'catamaran' were indexed by the universal index technique of the present invention, the path from boat to 'catamaran sail-boat' to catamaran would be the optimal, and only path. There would of course be no common abstraction to boat and catamaran so the 'most specific abstraction technique' of prior art would not work.

If the network were further developed, becoming the semantic network shown in the box labeled Developed Network, the original meanings of boat and catamaran are shifted. Not only does boat have a fuller set of inheritors, including 'mono-hulled boat', 'multiple-hull boat' and 'sail boat', but catamaran is now a subclass of 'multiple-hull boat'. Since 'catamaran sailboat' continues to inherit from catamaran, it no longer needs a direct link inheriting from boat (shown by the dashed line), since it inherits the meaning of boat through catamaran because of inheritance transitivity. This link (shown by the dashed line) is therefore removed from the semantic network, to save memory use to define the link, and to reduce clutter.

If spellings of 'boat' and 'catamaran' were now indexed by the universal index technique of the present invention, the optimal path would now be from boat to 'multiple-hulled boat' to catamaran (shown by the bold lines). The path from boat to 'catamaran sail-boat' to catamaran would have been optimal, except that the direct inheritor link from boat to 'catamaran sail-boat' was removed, because of inheritance transitivity. This demonstrates how removing links which are redundant because of inheritance transitivity not only reduces clutter in the semantic network and saves memory, but also improves the meaning of paths identified by the universal index technique of the present invention.

The method of index path determination shown by FIG. 35 contain six steps which can be performed in varying orders, since many of the steps serve only to eliminate candidate paths. In systems having some parallel processing capability, the elimination steps (4), (5) and (6) could be performed at the same time. In a parallel processing system with content-addressable memory, all six steps could be performed in parallel, since each candidate path could be proposed and analyzed by independent processing threads, in order to reduce elapsed processing time. Consequently, the general form of index path determination in the present invention is defined by the detection of the candidate path topological properties asserted by each step of FIG. 35, and not the step-by-step order in which those properties are asserted.

Figure 43:
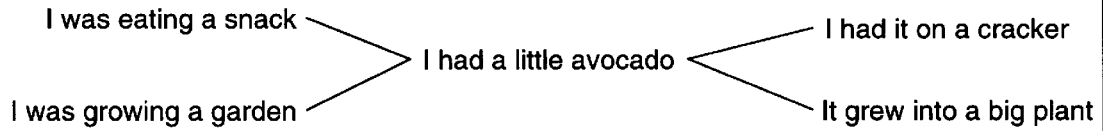
FIG. 43 shows an example of how the context of a conversation controls the meaning which must be assigned to ambiguous verbs such as 'had'; this verb could be connected either to 'eating' or 'growing' to form two different contexts.

FIG. 43 shows further examples of how the shades of meaning delivered by ambiguous symbols such as 'had' can be differentiated by optimizing focal efficiency. As in FIG. 10 through FIG. 12, the focus of a conversation can be defined by a few well-chosen symbols, which in turn control which of the polysemous meanings of a symbol like 'had' are most appropriate to link into a conversation. For instance, a conversational input stream could contain 'I had a little avocado' If the conversation input stream has earlier contained 'I was eating a snack' then the appropriate conversational focus would be connected to the concept of 'eating'. However, if the conversation input stream instead had earlier contained 'I was growing a garden' then the appropriate conversational focus would be connected to the concept of 'growing' (a garden).

If the conversation stream had gone from 'I was eating a snack' to 'I had a little avocado' to 'I had it on a cracker' then the concept of 'cracker' would be a food item efficiently connected to the focal 'eating'. However, if the conversation stream had gone from 'I was eating a snack' to 'I had a little avocado' to 'It grew into a big plant' then the concept of 'grew' would be non-food item difficult to connect to the focal 'eating'. To preserve efficiency, the conversational analysis would start a new branch of the analysis tree, and add the concept of 'growing' to the focus.

Figure 44:
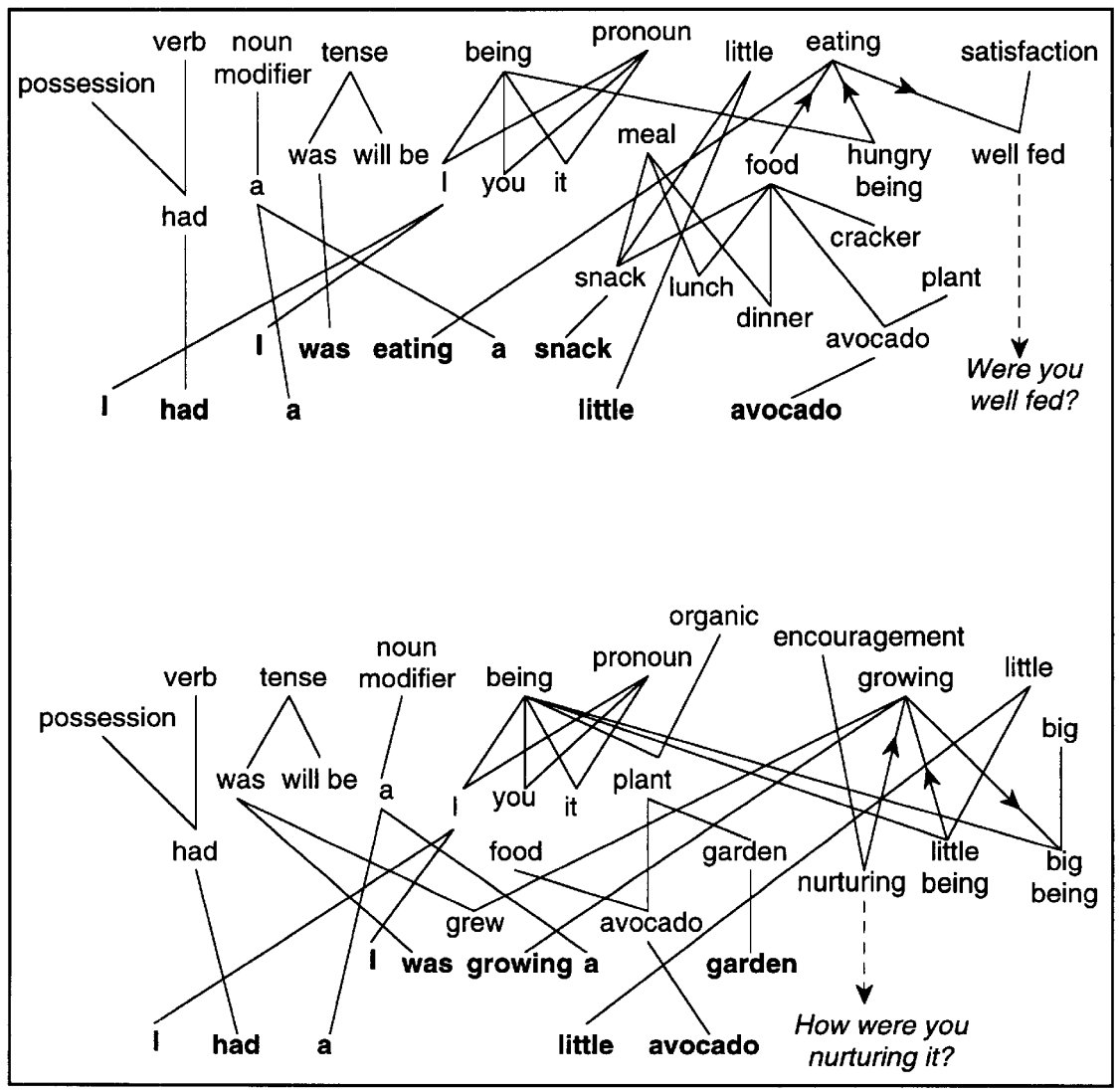
FIG. 44 shows how the formation of context described in FIG. 43 can be represented by altering the focus of a conversation by adding the missing symbols associated with previously parsed conversational symbols; the set of focus symbols defines conversational context.

FIG. 44 shows how the focus of conversation can track the conversational input stream of FIG. 43. In the upper part of FIG. 44, the parsing of the input stream beginning with 'I was eating a snack' is shown, with the analysis of the parse shown by the upper row of nodes indicated in bold: I inheriting from 'I', was inheriting from 'was', eating inheriting from 'eating', a inheriting from 'a' and snack inheriting from 'snack'. Note that the verb 'eating' has two input inheritors (marked by incoming line arrows) 'food' and 'hungry being'. In this drawing, as well as the two next drawings, the arrows indicate required data flows. The input 'food' and the input 'hungry being' are required to satisfy the verb 'eating'. Since snack was already parsed as an inheritor of 'food', and I was parsed as an inheritor of 'being', which the universal index of the present invention can connect to 'hungry being', both the inputs of 'eating' have been supplied. The conversation should check to see if the satisfied verb 'eating' has already produced a 'well fed' output, by adding 'well fed' to the focus of the conversation, and in turn ask the question 'Were you well fed?', since there is no parse inheritor of 'well fed' at this point.

In the bottom part of FIG. 44, the parsing of the alternative input stream beginning with 'I was growing a garden' is shown, with analysis of the parse shown by the upper row of nodes indicated in bold: I inheriting from 'I', was inheriting from 'was', growing inheriting from 'growing', a inheriting from 'a' and garden inheriting from 'garden'. Note that the verb 'growing' has two required input inheritors (marked by incoming line arrows) 'nurturing' and 'little being'. The required input inheritor 'little being' has data flow from the parse, since the universal index of the present invention can connect garden to 'hungry being' by way of the peak abstraction 'being'. The required input 'nurturing' has no such connection, so to satisfy it, the concept of 'nurturing' should be added 'well fed' to the focus of the conversation, and then the question should be asked 'How were you nurturing it'

Often such a question, which interrupts the flow of conversation, is ignored or not directly answered by the other conversant. Also, for the sake of preserving the flow of conversation, such interruptions should be delayed until there is a lull in the conversation, or until the focal concept which drives them is badly needed (to improve the efficiency of the analysis subtree of the conversation).

In the example of conversation in FIG. 44, variations of indirect answers are shown. In the upper part of FIG. 44, the answer arrives in the second part of the input stream as 'I had a little avocado'. The analysis of the parse of this second part of the input stream shown by the lower row of nodes indicated in bold: I inheriting from 'I', had inheriting from 'had, a inheriting from 'a', little inheriting from 'little' and avocado inheriting from 'avocado'. Since 'I' was already involved in parsing the previous input, 'little' was already involved in the meaning of 'snack' (as a 'little' meal), and 'avocado' inherits from 'food' which was already involved as input to 'eating', this parse is very efficient, introducing little new structure, except for the verb of possession 'had'.

The same second part of the input stream, 'I had a little avocado', results in an efficient parse in the bottom part of FIG. 44, where the first part of the input stream had been 'I was growing a garden'. Again, the analysis of the parse of the second part of the input stream is shown by the lower row of nodes indicated in bold: I inheriting from 'I', had inheriting from 'had, a inheriting from 'a', little inheriting from 'little' and avocado inheriting from 'avocado'. This time, however, the meaning of avocado involved the inherited node 'plant' which it shares with 'garden', and the meaning of 'little' is associated with 'little being' rather than 'snack' (which is a little meal).

In the diagram on the bottom of FIG. 44, the little avocado is closest in meaning to the 'little being' input of 'growing', so the open question of 'How were you nurturing it?' relates both with to garden (its previous target) and its sibling (under 'plant') avocado. In the diagram on the top of FIG. 44, little is closest in meaning (as a sibling under 'little') to 'snack', and avocado is closest in meaning to 'snack' (as a sibling under 'food'), so the open question 'Were you well fed?' relates equally to the siblings 'snack' and 'avocado' under 'plant'. Consequently, the second input phrase 'I had a little avocado' results in an equally efficient (although slightly different) parse whether the first input phrase is 'I was eating a snack' or 'I was growing a garden'.

When the two possible third phrases are parsed relative to the two different analysis networks, one at the top of FIG. 44 and one at the bottom, a large difference in efficiency is possible. 'I had it on a cracker' can be efficiently added to the analysis at the top of FIG. 44, since 'cracker' is a sibling of 'snack' and 'avocado', which are both already within the meaning of the analysis. On the other hand, 'It grew into a big plant' would greatly reduce the efficiency of the analysis at the top of FIG. 44, since 'big' is not easily reached from the analysis network. The universal index method of the present invention can link 'plant' to 'avocado', but the symbol 'big' has no path connecting to the analysis at the top of FIG. 44. This would mean that big plant either has a new meaning not yet created in the semantic network, or else the conversation has drifted to another focal topic.

Similarly, the third input phrase 'I had it on a cracker' is difficult to efficiently connect to the analysis at the bottom of FIG. 44, because connecting to the meaning of 'cracker' involves a path from 'cracker' to 'food' to 'avocado'. By involving the node 'food', the verb 'eating' would also be activated, and 'eating' would require an input of 'hungry being' to be connected.

The alternate third input phrase 'It grew into a big plant' would connect much more efficiently to the analysis at the bottom of FIG. 44, because the following nodes are already connected: 'plant' is inherited from 'garden', 'it' is a sibling of 'plant', 'grew' is an inheritor of 'growing' and 'big' is inherited from 'big being'. This demonstrates how the efficiency of conversational analysis reflects small variations in the consistency of conversational meaning; meaning which is easier to interpret results in a more efficient analysis. Later, it will be shown how efficiency determines which of two competing interpretations of meaning are most useful.

Figure 45:
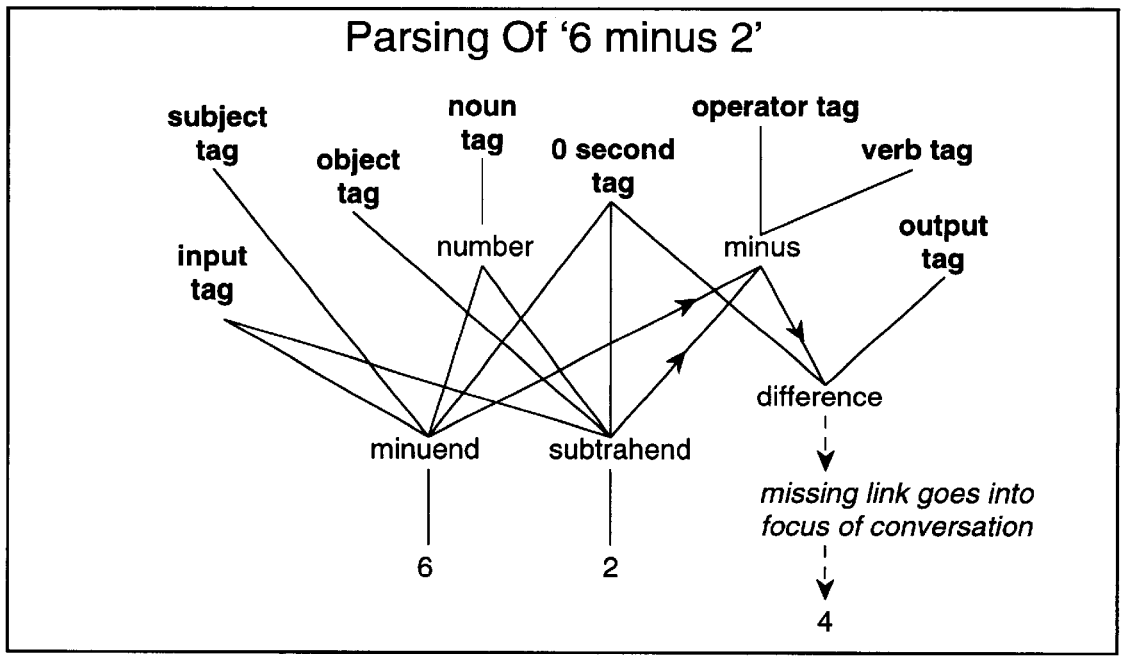
FIG. 45 shows how word-order can be represented in a semantic network using ordering tags, so that meanings conveyed by word-order can remove ambiguous meaning; the example given is the phrase '2 plus 6'.

FIG. 45 shows an example of how word order syntax can be parsed in the present invention. Since English is a language in which sentences are expressed in subject-verb-object, sentences such as 'Shelly wrote Frankenstein' mean something quite different than 'Frankenstein wrote Shelly', since the former conveys Shelly as the subject, whereas the latter conveys Shelly as the object. Similarly, '6 minus 2' means something quite different from '2 minus 6', since the former conveys 6 as the minuend for subtraction, whereas the latter conveys 2 as the minuend. For purposes of parsing English and other languages where word order is significant, the dictionary entries for meanings can be tagged by inherited nodes describing their expected word order. In FIG. 45, for instance, there is an node 'minus' which is tagged by inheriting from verb tag. This verb 'minus' has two inputs, 'minuend' (tagged with subject tag) and 'subtrahend' (tagged with object tag). When parsing input known to be English in format, the parser can be set to expect the input tagged with subject tag to appear before the verb, and the verb before the input tagged with object tag. If the parsing input were known to be Japanese in format, the parser could be reset to expect the input tagged with subject tag to appear before the input tagged with object tag, and the input tagged with object tag to appear before the verb, since Japanese is a subject-object-verb ordered language. In this way, the same dictionary nodes could be re-used for both languages.

In FIG. 45, the 0 second tag marks the attention span for inputs 'minuend' and 'subtrahend'; these mean that when data flows to one of these inputs, the verb 'minus' does not wait for data to flow to the other input, but immediately operates on available data. The operator tag inherited by 'minus' shows that 'minus' is a system-defined operator, whose activity is performed by semantic network's runtime environment.

Once the verb 'minus' has operated on available data, it sends its result to inheritors of its output node 'difference' (tagged with output tag). If there are no inheritors of 'difference', the output can go to the focus of the conversation which supplied data flow inputs to 'minus'. For instance, if the conversational input stream began with '6 minus 2', no inheritor of 'difference' would have appeared yet in that stream, so the output '4' would go into the conversational focus as an inheritor of 'difference'.

Figure 46:
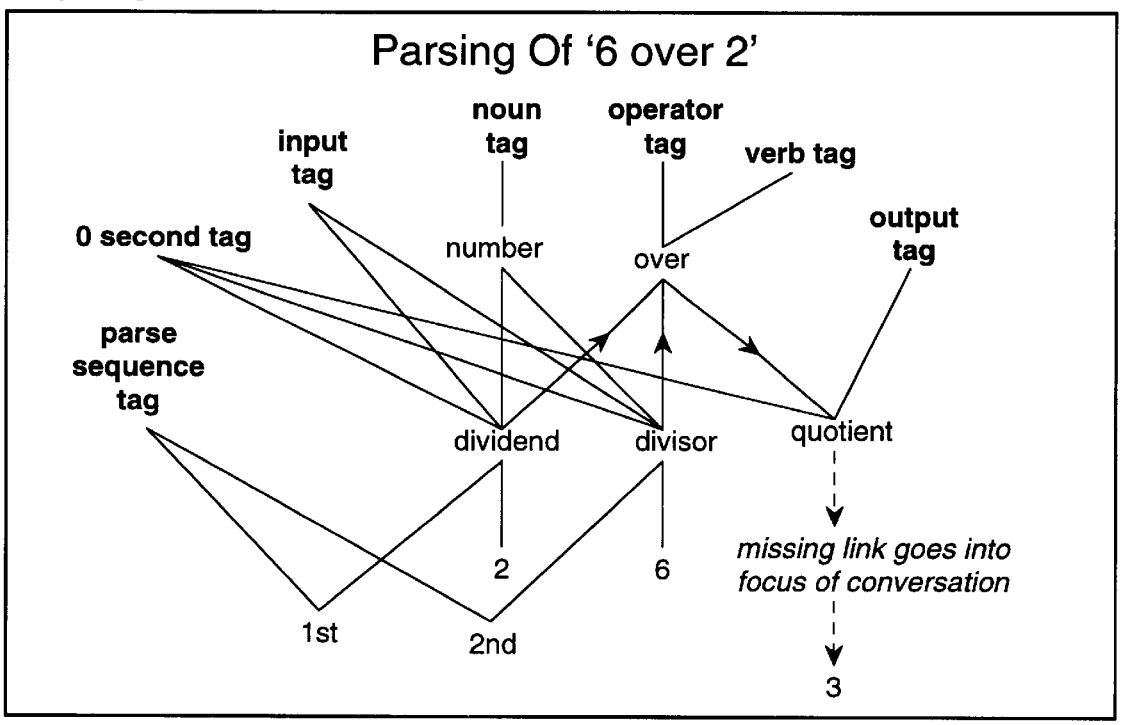
FIG. 46 shows another example of using ordering tags to define word-order meanings; the example given is the phrase '2 minus 6'.

In FIG. 46, a semantic network similar to FIG. 45 is shown, in which a verb 'over' has two inputs, 'dividend' and 'divisor', as well as one output 'quotient'. Rather than tagging 'dividend' with subject tag, as in FIG. 45, 'dividend' has an inheritor node '1st' which also inherits from parse sequence tag. This indicates that when parsing input streams, the input of 'dividend' is expected to appear first, relative to the other inputs of 'over'. Similarly, rather than tagging 'divisor' with object tag, 'divisor' has an inheritor node '2nd' which also inherits from parse sequence tag. This indicates that when parsing input streams, the input of 'divisor' is expected to appear second, relative to the other inputs of 'over'. Thus semantic network of FIG. 46 is able to parse an input such as '6 over 2' and send output to the focus of the conversation, adding a node '3' (which inherits from 'quotient') to the conversational focus subtree. Since no input ordering is specified for the verb 'over', the inputs such as 'over 6 2' and the Reverse Polish Notation input '6 2 over' would cause the verb 'over' to have the same output. The examples given in FIG. 45 and FIG. 46 show how the present invention can make use of word-order information in input streams; these examples are given to show that the present invention is compatible with languages in which word order is significant.

Figure 47:
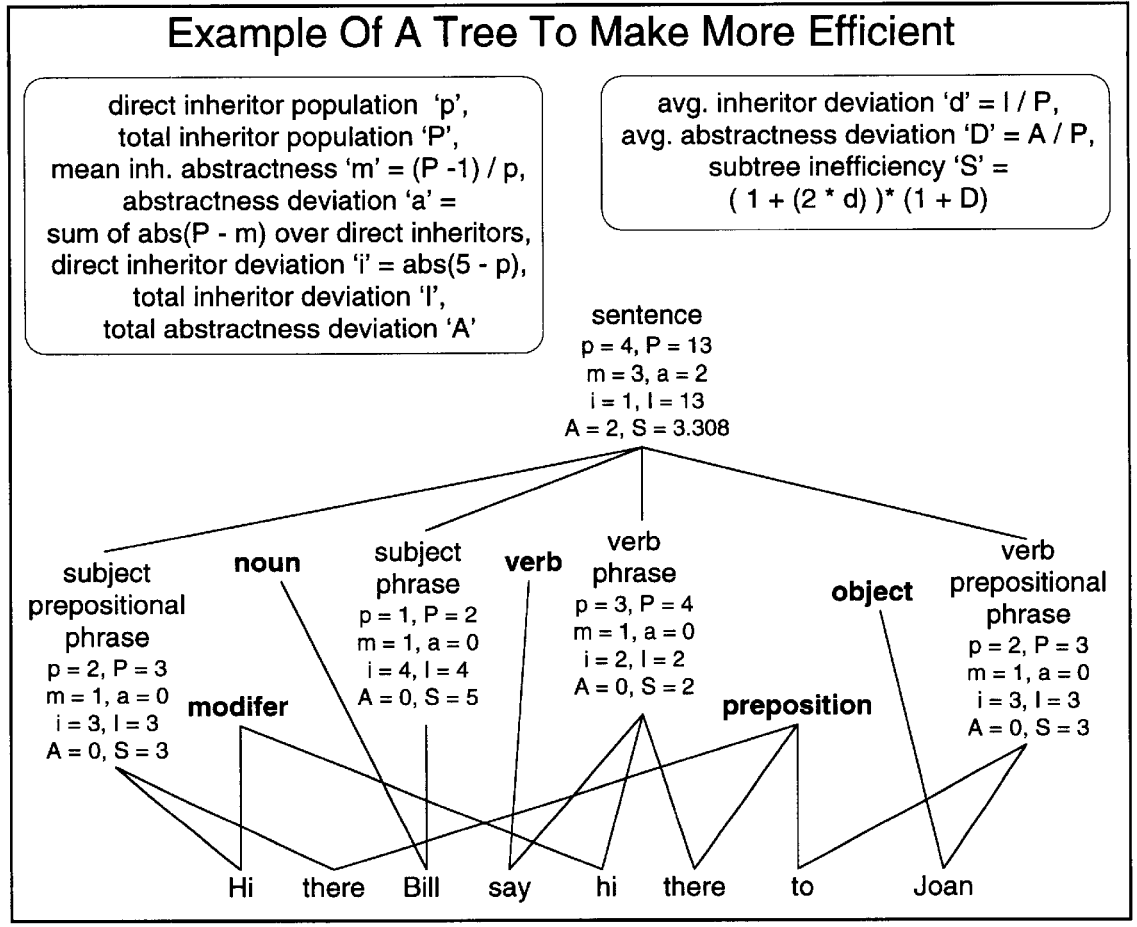
FIG. 47 shows a syntactic representation of sentence consisting of a four phrases, but only one or two words in each phrase; the semantic inefficiency of the representation is caused by the scarceness of words in each phrase.

FIG. 47 gives an example of an analysis subtree from a conversation. Analysis subtrees contain the results of parsing an input stream, as in FIG. 44 and FIG. 12. The input stream for FIG. 47 is 'Hi there Bill say hi there to Joan'. This input has been parsed into traditional linguistic syntactic phrases: 'subject prepositional phrase', 'subject phrase', 'verb phrase' and 'verb prepositional phrase'. All these phrases are inheritors of a 'sentence' node, which represents the sentence to which they belong.

As in FIG. 18, FIG. 47 shows inefficiency numbers, so that the inefficiency of the 'sentence' subtree is explicit. Most of the inefficiency of 'sentence' comes from the inefficiency of its inheritors, since its inheritor phrase nodes have far less than the optimal number of word nodes in each phrase. For example, its inheritor 'subject prepositional phrase' has direct inheritor deviation 'i=3', 'subject phrase' has 'i=4', 'verb phrase' has 'i=2' and 'verb prepositional phrase' has 'i=3'. The sum of these direct inheritor deviations is 12; the total inheritor deviation of 'sentence' is the 12 inherited deviations plus its own direct inheritor deviation of 'i=1', which totals 13. The node 'sentence' also has a total abstractness deviation of 'A=2', which is small since all of its inheritor phrase nodes have no abstractness deviation, and it has just a little deviation, due to low abstractness of 'subject phrase' (P=1) and high abstractness of 'verb phrase' (P=4). Hence the majority of the inefficiency of 'sentence' come from it total inheritor deviation 'I=13'.

Figure 48:
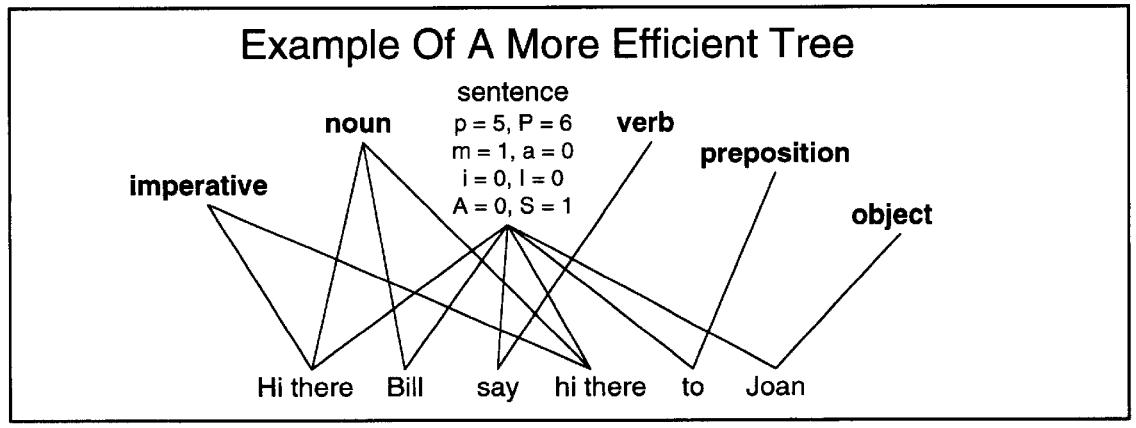
FIG. 48 shows the same sentence as in FIG. 47, but syntactically arranged into a more efficient representation, by grouping 'hi' and 'there' into the phrase 'hi there' and by grouping phrases and words directly under the 'sentence' node.

FIG. 48 shows an alternate way of parsing the same input stream of FIG. 47 into a more efficient analysis subtree. Instead of traditional linguistic analysis, which classifies input streams into small specific phrases, a more general and looser analysis is used, which classifies input phrases into broader and fewer phrases. For instance, instead of classifying 'Hi' and 'there' into modifier and preposition, 'Hi' and 'there' are classified into a single imperative 'Hi there' which is also a noun. Since 'Hi there' occurs again in the input stream as 'hi there', its second occurrence (even though the 'H' is lower-cased) is classified the same way, inheriting from imperative and noun. The rest of the input stream is classified as single words: Bill inherits from noun, 'say' inherits from verb, to inherits from preposition, and Joan inherits from object. Grouping all these directly under the abstraction node 'sentence' creates a more efficient analysis of the input stream than FIG. 47. The inefficiency caused by direct inheritor deviations in FIG. 47 has been eliminated, along with the lesser inefficiency caused by abstractness deviation; the subtree inefficiency of 'sentence' in FIG. 48 is 'S=1' (the ideal), compared to the subtree inefficiency of 'sentence' in FIG. 47 of 'S=3.308'. The present invention provides a method to choose the best linguistic analysis from large number of alternatives, by choosing the alternative with the most efficient analysis subtree. This technique will be later demonstrated for a variety of application domains, including audio and visual inputs.

Since large-scale semantic networks consume large amounts of memory, especially when dealing with audio and visual input streams, the methods of the present invention include ways to detect and reduce the use of memory. When memory is plentiful, operations can be undertaken which consume large amounts of memory, with little or no bad consequences. However, when memory is scarce, operations which consume large amounts of memory must be avoided, to protect the system from halting due to insufficient memory. In FIG. 49, the concept of 'capacity deviation' is defined to quantify the importance of memory conservation, for use in a multiplicative product together with inefficiency numbers. Since capacity deviation is defined as the multiplicative inverse of the fraction of free space, when 100% of the memory is free, the capacity deviation number is 1, which is the multiplicative identity and the same number as the ideal inefficiency number. As memory is consumed, the fraction of free space drops, and when 80% of memory is free, the capacity deviation number is 1.25, still a modest number relative to the typical semantic inefficiency numbers. Further consumption of memory will cause the fraction of free space to drop further, so that when 60% of memory is free, the capacity deviation number is 2.5, which begins to loom over the average inefficiency number, thus meriting some operation to free up memory. If even more memory is consumed, so that only 20% of memory is free, the capacity deviation number is 5.0, which is greater than almost all inefficiency numbers (for a typical semantic network); at this point, the highest priority of the system is to increase its free memory space. If free memory were continue to vanish, capacity deviation numbers would approach infinity, conveying the importance of protecting the system from halting due to insufficient memory.

A number of established methods exist to increase memory for semantic networks; most of these methods are borrowed from operating systems architecture. The most expensive option is to add more physical memory. Another option is to add virtual memory by mapping pages of physical memory to a slower, cheaper secondary storage device such as magnetic disk. When implementing semantic networks, the technique of mapping pages to disk has a major drawback: since there is no explicit conceptual mapping of pages, portions of pages are often needed which have been swapped out to disk. By swapping clusters of semantic nodes to secondary storage, instead of arbitrary memory pages, the present invention can keep in memory the nodes which have been marked as meaningful to current activity, and archive clusters of nodes which have been marked as irrelevant. Typically, leaf nodes containing specific meanings are archived before abstract nodes, when they contain meanings in specific areas irrelevant to the current semantic activity. For instance, the input and output buffers contents and the fluidity subtree from prior dormant conversations are generally irrelevant, although the new general vocabulary created during those conversations will usually continue to have meaning.

Figure 50:
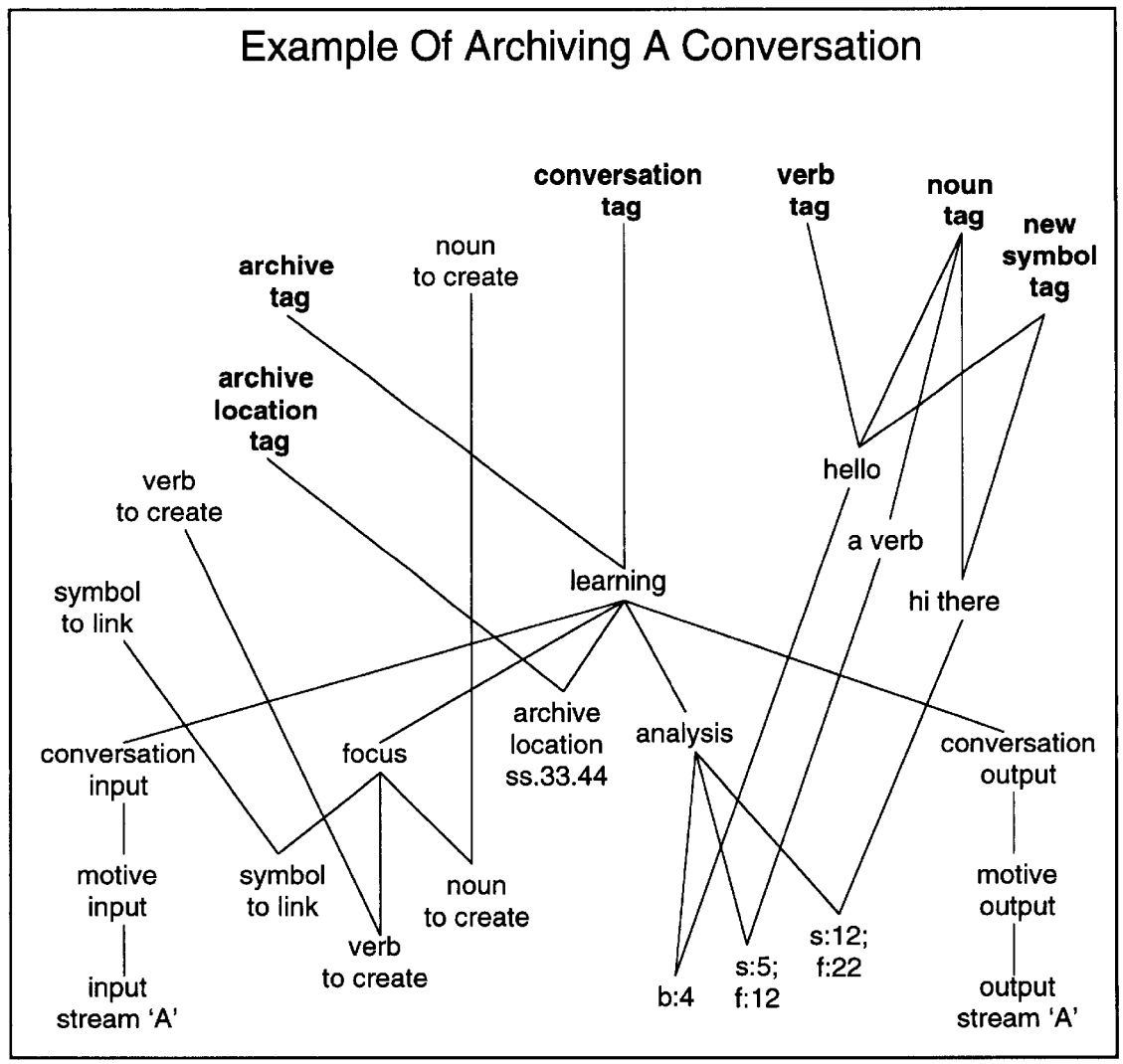
FIG. 50 shows how memory space reserves can be reclaimed by archiving various subtrees of conversations; these subtrees are replaced by small tags pointing to the archived copies of the subtrees.

FIG. 50 shows an example of the conversation of FIG. 12 archived to conserve memory. The cluster of nodes which has been archived is defined by the conversation-level verb 'learning'; only some links to the inheritors of 'learning' remain, such as the 'focus' and 'analysis' links which serve as reminders of the general meaning of the conversation-level verb 'learning' as it was before archiving. The conversational input and output buffers have been archived, as well as all nodes in the fluidity subtree. The archive location 'ss.33.44' describes a physical address for the archived information, an address from which the archived nodes of the 'learning' subtree can be fetched, to be read back into memory when needed.

By archiving these 'learning' subtree nodes from memory, roughly half of the memory consumed by the 'learning' subtree can be freed. When even a more memory must be freed, the focus and analysis subtree nodes can also be archived, so that traversals from dictionary nodes such as 'hi there' to nodes such as 's:12;f:22' cause the node 's:12;f:22' to be read from archive. Reading such nodes from archives can slow down traversal, but frees memory by releasing the memory consumed by other analysis nodes which may not be needed, such as 'b:4' inheriting from 'hello' and 's:5;f:12' inheriting from 'a verb'.

In some cases, entire experiential groups of nodes may be archived, such as a series of conversations and all the new vocabulary generated during that series. This may be done to conserve a large amount of memory when highly specialized experiences have occurred. Conversations about parking cars or making pancakes may be classified as special categories, so that all their conversations and their vocabulary are archived unless cars or pancakes are involved in active conversations. This would mean that nodes such as 'parking ticket' and 'pancake batter' would be archived, slowing down traversals through such nodes, but conserving memory until they are explicitly needed.

Figure 51:
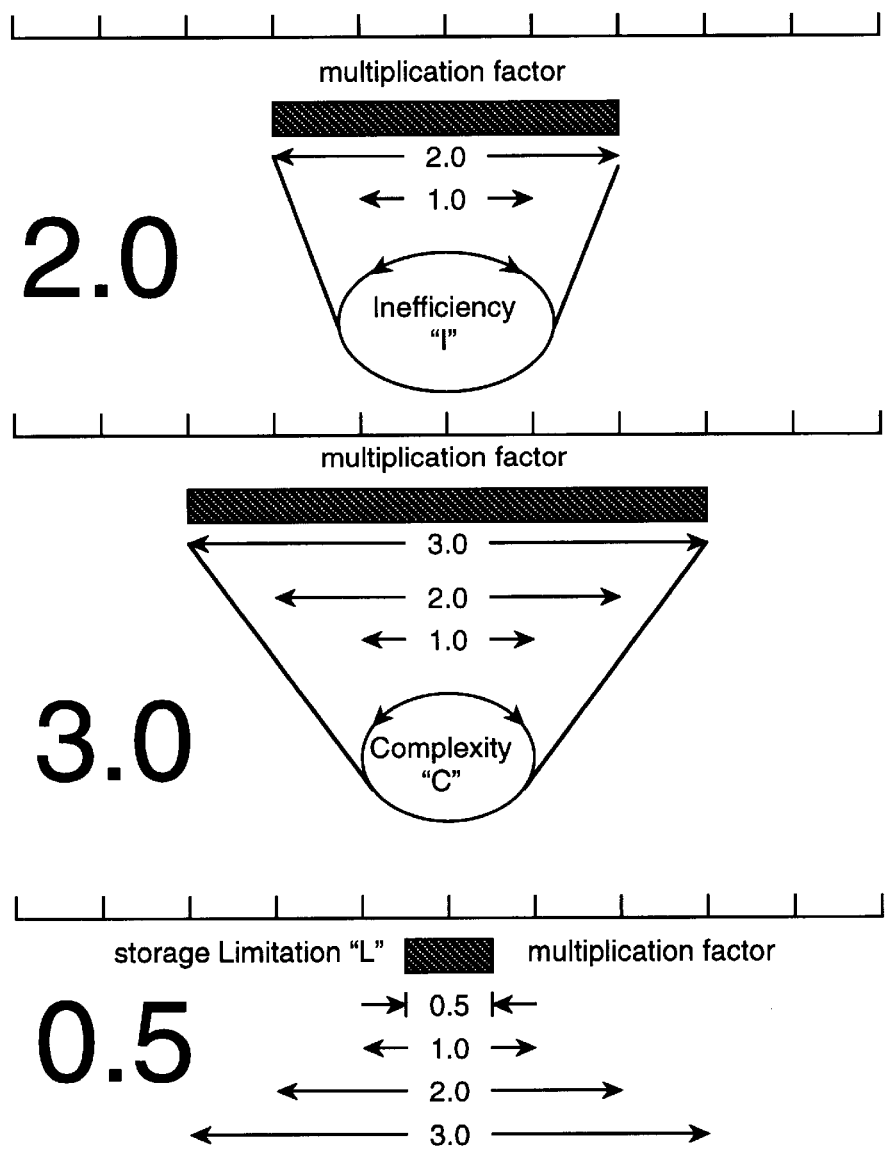
FIG. 51 shows the how the inverse of system fluidity can be defined based on efficiency, complexity and capacity deviation which were defined in FIGS. 13, 19 and 49; system fluidity is defined by its inverse, called rigidity.

FIG. 51 shows how the overall fluidity of a conversational semantic network system can be quantified, by combining the multiplication factors from inefficiency (from FIG. 13) with the multiplication factor of complexity (from FIG. 19) and the multiplication factor of capacity deviation (from FIG. 49). The combined product of these three multiplication factors describes an overall figure of merit for a conversational semantic network system, in which a percentage change in any of the three factors changes the overall figure of merit for the system. Since increases in inefficiency, complexity and capacity deviation are all descriptive of unwanted conditions, the figure of merit composed of the their multiplicative product also describes an unwanted quantity, which in the present invention is called 'rigidity'. In the numeric example given in FIG. 51, a conversational semantic network system has inefficiency of 2.0, complexity of 3.0 and capacity deviation of 0.5, which when multiplied together describes a rigidity of 3.0. Since the lowest, ideal inefficiency, complexity and capacity deviation are all equal to one (the multiplicative identity) ideal rigidity is also equal to one. This ideal condition, which in active practice cannot be achieved because every active semantic network consumes at least some free memory, is the ideal condition of fluidity, the opposite of rigidity.

In FIG. 10, the rigidity of the 'learning' conversation is shown as '[ri]92.106', which is the complexity '17' multiplied by the inefficiency of '5.418'; the capacity deviation is approximated by the ideal of one, for simplicity, so it doesn't affect the conversational rigidity for the example of FIG. 10. In FIG. 11, the rigidity of the conversation is shown as '[ri]71.775, which is the complexity of '15' multiplied by the inefficiency of '4.785'; the drop in rigidity is due mostly to the drop in need for complexity. In FIG. 12, the rigidity of the conversation is shown as '[ri]53.976, which is the complexity of '13' multiplied by the inefficiency of '4.152'; the drop in rigidity is due mostly to a further drop in need for complexity.

By optimizing a conversational semantic network system for least rigidity, it becomes the more fluid, in terms of the abstract quantity of rigidity as described in FIG. 51. A more fluid system is easier to traverse (because of its semantic efficiency), has an ongoing cycle of conversation/ contemplation (because of need for complexity) and has spare memory for continuing its activity (because of increases on free space). The minimization of rigidity is thus an abstract intention capable of arbitrating between all specific motivations, by choosing the specific motivation which will yield maximum reduction in system rigidity. The expectations of yield can be continuously correlated to actual yields, so that the accuracy of expectations can be credited or discredited.

In natural language conversations, expectations are often monitored in an emotional setting, which gives a familiar context to fluctuations in fluidity which generally occur during conversations. For instance, if the emotional state of the conversant shifts from simple to great complexity, the complexity of the conversation is generally satisfied, thus initiating a drive towards greater simplicity. Shifts in emotional state thus often foreshadow shifts in fluidity; by carefully tracking emotional states the fluidity of a system can be more accurately predicted, thus enhancing the accuracy of expectations associated with specific motivations. One such emotional state is 'conversational extent'; this is a measure of the population of nodes involved in connecting conversational focus inheritor nodes with conversational analysis nodes. Conversational extent differs from the conversational inheritor population which satisfies conversational complexity, as shown in FIG. 21, because extent includes the inherited nodes which bridge between focus and analysis nodes, in the sense of bridge path topologies as shown in FIG. 33. Another difference is that complexity-type inheritors include conversational input and output nodes, whereas extent nodes are only concerned with focus and analysis nodes and their inherited nodes. Extent thus quantifies the extent of analyzed meaning in the conversation, rather than its sheer bulk. Extent also differs from semantic inefficiency, since it counts inherited nodes rather than just inheritor nodes; by counting inherited nodes quantifies bottom-up, rather than top-down complexity.

Figure 52:
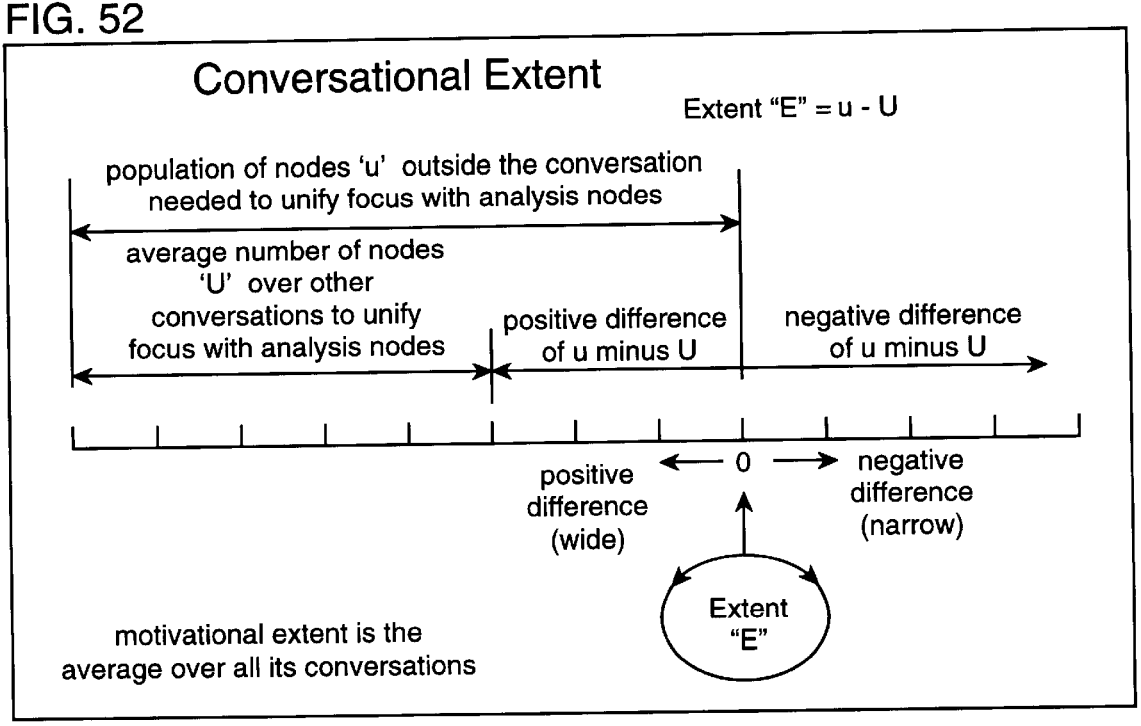
FIG. 52 shows how conversational extent (defined later in FIG. 53) can be defined relative to the average extent of all conversations, so that as a semantic network's conversations grow in size, its baseline sense of conversational extent shifts to a greater size.

FIG. 52 shows how conversational extent can be normalized around a consistent basis over all conversations. Since average conversational extent may vary from system to system, it is important to establish the average as a baseline. This baseline can then be compared to each conversation; conversations which have greater extent than the baseline can then be identified as conversations of wide extent, and conversations which have lesser extent than the baseline can be identified as conversations of narrow extent.

For instance, in a mature semantic system where complex conversations are the norm, the average population 'U' connecting focus to analysis nodes might be as much as 20, but in a newer, smaller semantic system the average population 'U' connecting focus to analysis nodes would probably be closer to 10.

Figure 53:
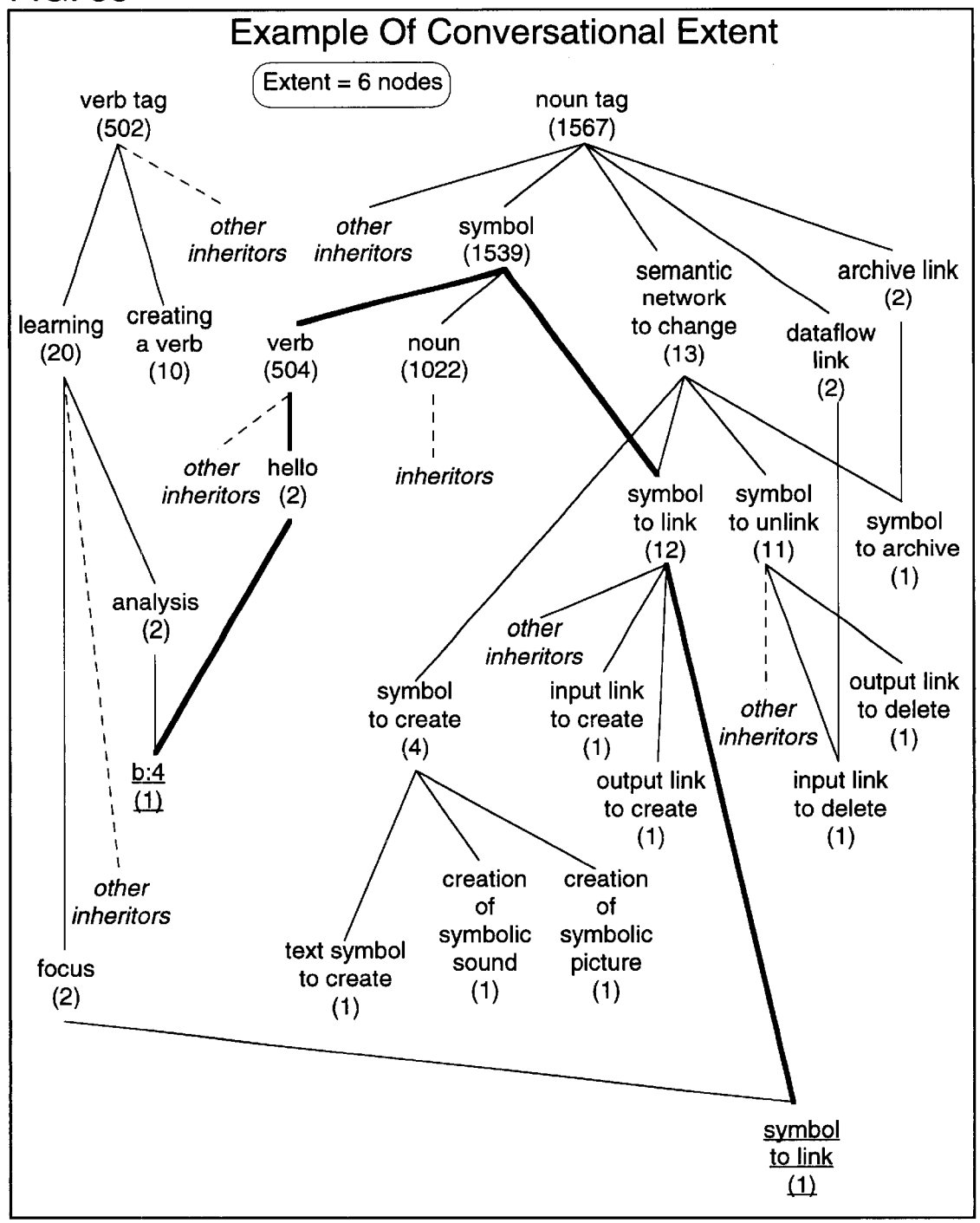
FIG. 53 shows an example of the calculation of conversational 'abstractness' and 'extent'; abstractness is averaged from the abstractness of focus and analysis inheritor node's inherited nodes, and extent is the total number of nodes needed to link together all focus and analysis node inheritors.

FIG. 53 shows an example of conversational extent for a conversation similar to FIG. 10. On the left side of FIG. 53, the node 'learning' is inherited by 'analysis' and 'focus'. The symbol for each node is followed by a number in parenthesis indicating the population of inheritor nodes for that node. For instance, on the left side of FIG. 53, the node 'focus' is followed by a (2), indicating that the inheritor population for 'focus' is two, including 'symbol to link' at the right side of FIG. 53, and 'focus' itself. Another example is 'b:4' on the left side of FIG. 53, which is followed by a (1), indicating the its inheritor population includes only itself. As in FIG. 23, the inheritor population numbers show the relative abstractness of each node, even where there is no room in the drawing to draw all of a node's inheritors. For instance, 'learning' has an inheritor population of (20), but only its 'focus' and 'analysis' subtrees are shown; the other inheritors are indicated only by a dashed line under 'learning' linking to other inheritors. Similarly, the node 'noun tag' at the top of FIG. 53 has (1567) inheritors, most of which are not shown, except for a reference to other inheritors inheriting from 'noun tag'.

Figure 54:
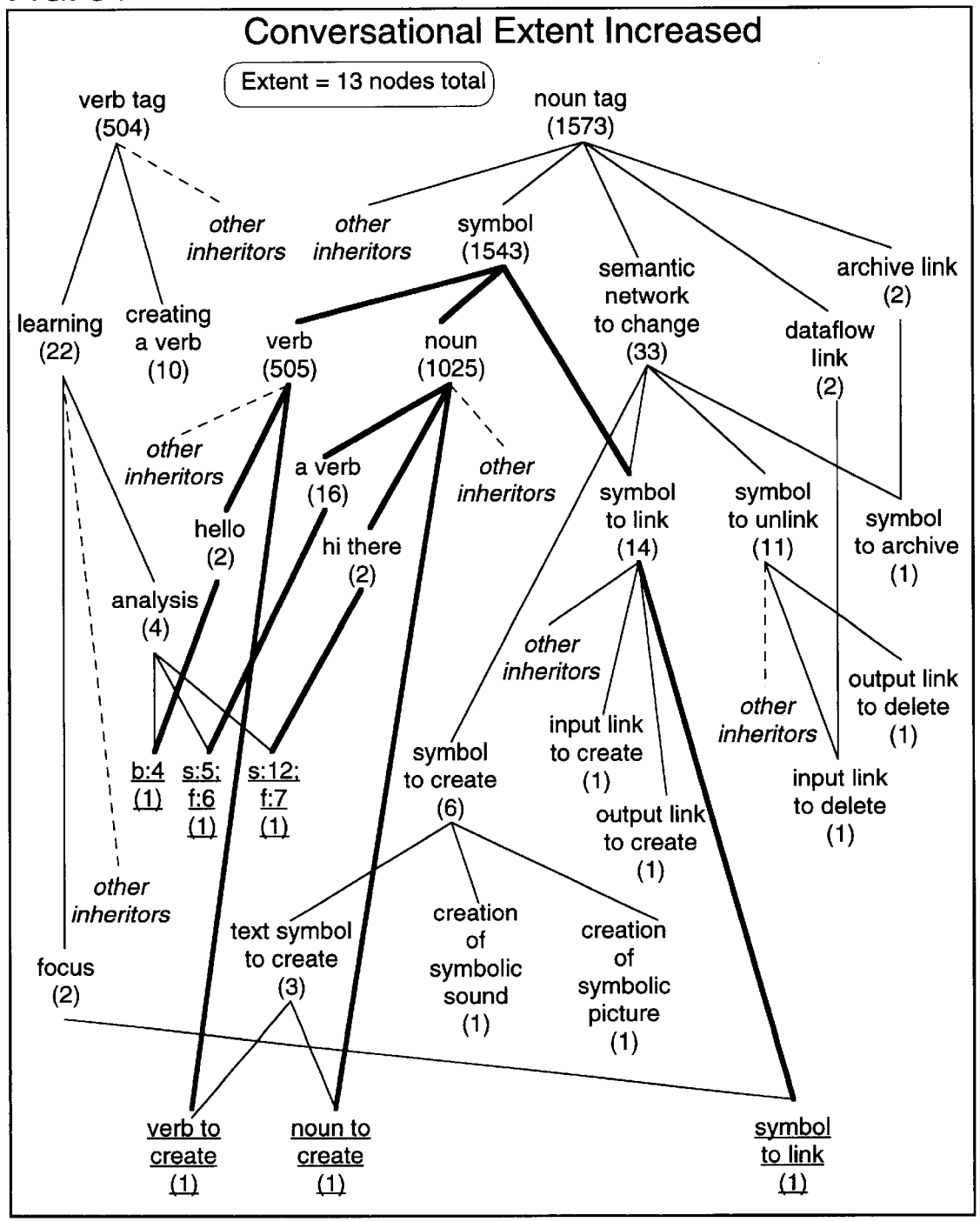
FIG. 54 shows how conversational extent increases from FIG. 53 by increasing the number of nodes needed to link together all focus and analysis node inheritors, during the development of the conversation.

A path of meaning indicated by a bold line links the 'analysis' node 'b:4' to the 'focus' node 'symbol to link', by way of the peak abstraction node 'symbol'. This path of meaning is a similar to the 'most specific' universal index paths of FIG. 30, which are found by the method outlined in FIG. 35. In FIG. 53, the universal index path from the 'analysis' subtree node 'b:4' to its inherited 'hello' node, to 'verb', to the peak abstraction 'symbol', to the general 'symbol to link (12)' and finally to the specific 'symbol to link (1)' in the 'focus' subtree. Using the method of FIG. 35 to determine this path ensures that the intermediary nodes of the path are most likely to be relevant to the conversation; at the same time the method of FIG. 35 provides a set of extent starting point nodes for linkage to future focus and analysis nodes, when the extent of the conversation must be increase to cover them. In FIG. 53, the six nodes along the path indicated by bold lines comprise the extent of the conversation 'learning'. The extent size of the conversation, at that point, is therefore six. Later, when additional focus and analysis nodes are added to the conversation, the extent must be expanded to cover these new nodes. FIG. 54 shows an example of conversational extent for a conversation similar to FIG. 12. The additional 'analysis' nodes of 's:5;f:6' and 's:12;f:7' must be covered, as well as the additional 'focus' nodes of verb to create and noun to create. In order to identify a minimal cover for these new nodes, the original six extent nodes b:4, 'hello', 'verb', 'noun', 'symbol', 'symbol to link' and symbol to link(1) can be used as possible starting points for bridge paths, via the universal index of FIG. 35, to the new nodes.

Once a set of most specific bridge paths is generated, bridge paths can be chosen to cover the new nodes, while adding a minimal number of nodes to the extent population. In the example of FIG. 54, these bridge paths are shown with bold lines. The new analysis nodes of s:5:f:6 and s:12:f:7 are covered by inheritance links to the node 'noun (1025)': the new focus node noun to create is also covered by an inheritance link to the node 'noun (1025)'. The new focus node verb to create is covered by an inheritance link to the original extent node 'verb'. By adding bridge paths in such as way as to minimize the extent needed to cover the new nodes, the extent has increased from six nodes in FIG. 53 to 13 nodes total in FIG. 54; the new extent nodes added are 'symbol', 'a verb', 'hi there', s:5:f:6, s:12:f:7, verb to create and noun to create.

While parsing new conversational input, the method of universal indexing in the present invention has to consider candidate paths for every possible combination of 'focus' subtree nodes and input spellings; this overhead can be prohibitive if the 'focus' subtree has too many nodes. Consequently, for parsing efficiency, the 'focus' subtree should be periodically pruned, to simplify the parsing. This pruning also affects the meaning of previously parsed analysis nodes, since the removed 'focus' subtree nodes no longer serve as starting points for bridge paths between 'focus' subtree and 'analysis' subtree nodes. If too much 'focus' subtree is pruned, some 'analysis' nodes may be difficult to bridge, causing extent to suddenly widen. By keeping track of conversational extent, as shown in FIG. 54, the effect of pruning can also can be monitored, to make sure that pruning does not dilute the meaning of previous analyzed nodes.

Figure 55:
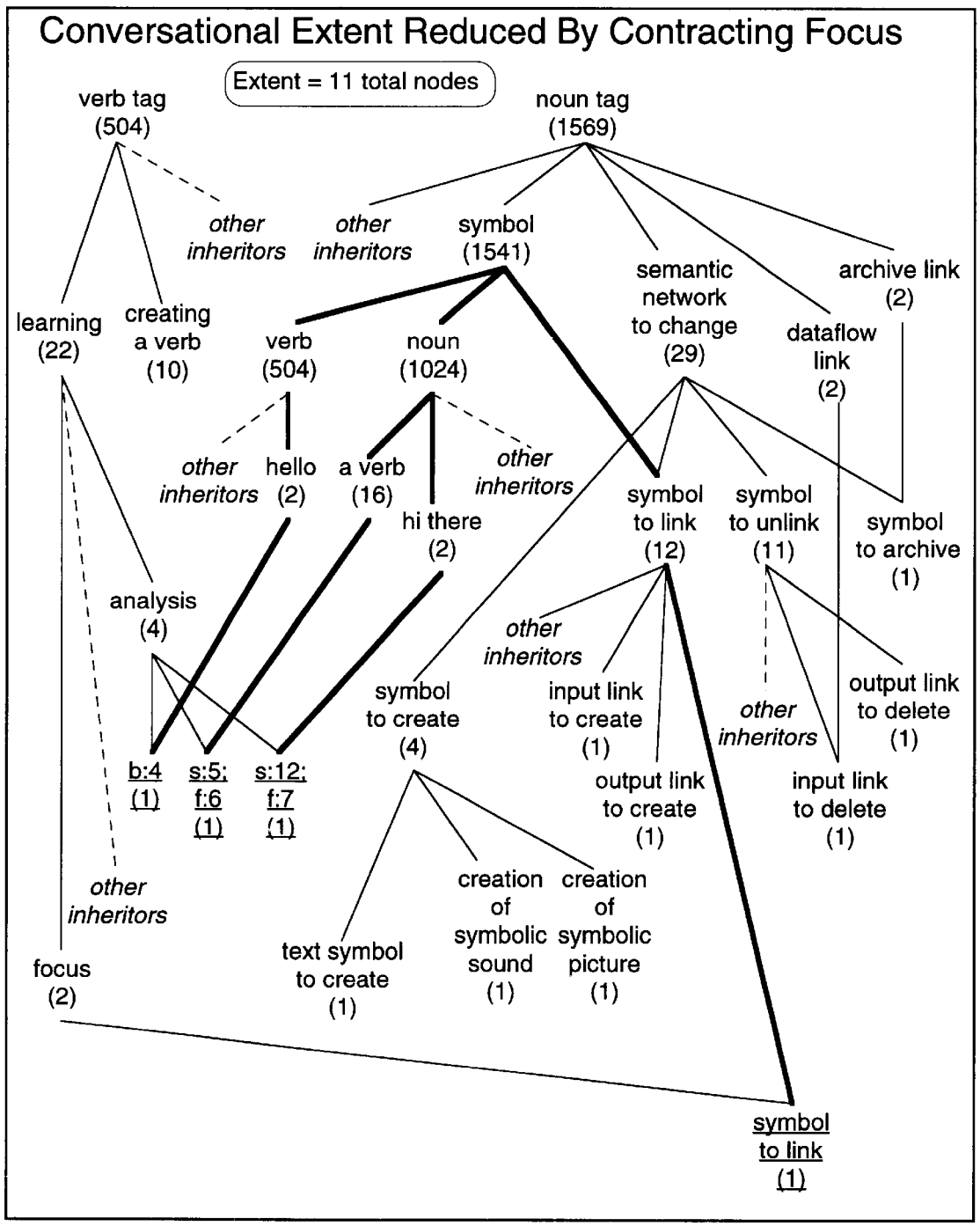
FIG. 55 shows how conversational extent decreases from FIG. 54 during the development of conversation by decreasing the number of nodes needed to link together all focus and analysis node inheritors.

For instance, in FIG. 54, two of the focus nodes verb to create and noun to create could be removed, narrowing the focus, without causing any bridging problems for previously analyzed nodes. In FIG. 55, the resulting semantic network is shown, where the extent contracts along with the focus, since all three previously analyzed nodes (b:4, s:5:f:6 and s:12:f:7) inherit from 'symbol'. Since 'symbol', 'verb' and 'noun' were already within the extent in FIG. 54, no new nodes were added into the extent in FIG. 55; the focus nodes verb to create and noun to create were not needed for bridging analysis nodes to the focus nodes. Sometimes, however, removal of focus nodes forces the bridging to occur at a more abstract level, adding nodes such as 'noun tag (1573)' to the extent, or forces the creation of new nodes specifically for bridging.

Generally, in the present invention, all input into conversations is analyzed without dropping any input. However, when a conversation is long the input and output buffers become very large and the conversational analysis subtree becomes very large. The content of long conversations can be summarized for archiving, even before such conversations have ended, by creating new summary nodes. These new summary nodes are phrases descriptive of entire sections of conversation, such as 'talking about my generation' or 'chit-chat about yesterday', phrases which simplify the analysis tree by summarizing entire paragraphs of conversational input or output.

Figure 56:
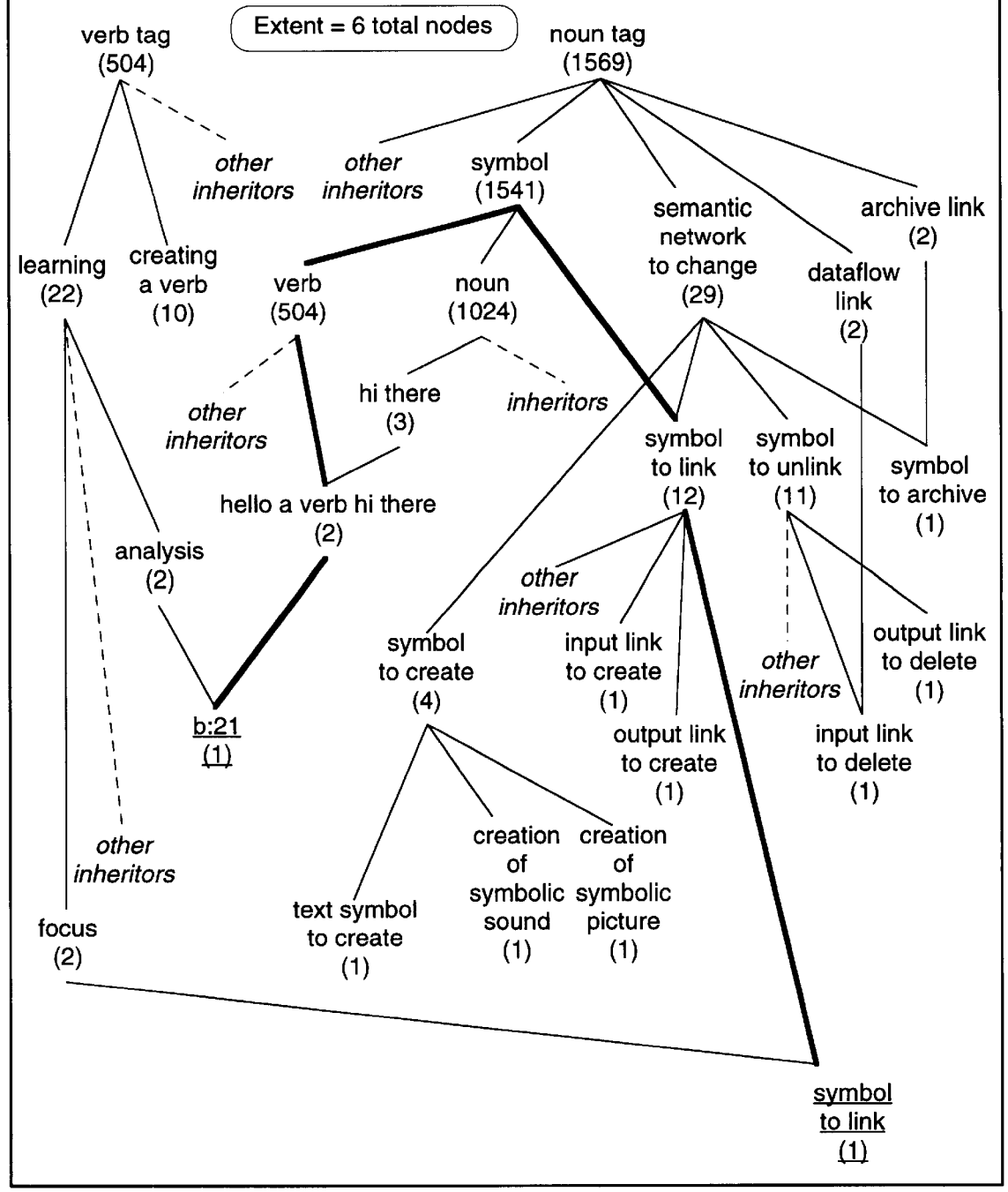
FIG. 56 shows how conversational extent decreases from FIG. 55 by substituting a single newly defined phrase 'hello a verb hi there' in place of an analysis subtree; this coining of new phrases is generally done for efficiency or to free memory.

FIG. 56 shows an example of a summary nodes created to analyze the conversation shown in FIG. 55. The new summary node is 'hello a verb hi there' which covers the entire input of the conversation through the analysis node 'b:21'. The meaning of this new summary node inherits from 'verb', and the noun 'hi there'. By defining analysis of the conversation in this way, the meaning of the input is associated with a greeting 'hi there' presented as a verb for some kind of action (unspecified). The new summary node is 'hello a verb hi there' could inherit from other more specific meaning (not shown).

By analyzing the input of the conversation with a single node, the input can be more easily archived, since the number of links which would point to the archive have been reduced. Memory is also freed by summarizing the conversational analysis, since less nodes are needed for the analysis. At the same time, the meaning of the conversation is simpler, stripped of its details.

The effect of these operations can be tracked by the extent of the conversations. In FIG. 56, the extent connects just one analysis node 'b:21' to one focus node symbol to link; only four intermediary nodes 'hello a verb hi there', 'verb', 'symbol' and 'symbol to link(12)' are needed to bridge them, so the total extent is just six. The reduction of extent from 11 down to six reflects the drastic simplification of the conversation caused by summarizing the conversational analysis.

In natural language conversations, people often have sudden insights during a conversation, which explain or summarize the crucial meaning of that conversation. Sometimes the insights are deeply correct, in which case the explanation or summary is more useful than the prior analysis; sometimes the insights are merely glossing over important details, in which case the prior analysis is better. In either case, a large reduction in extent occurs, which can be passed on to the conversational partner as emotional feedback. Presentation of this kind of feedback will be discussed later.

Figure 57:
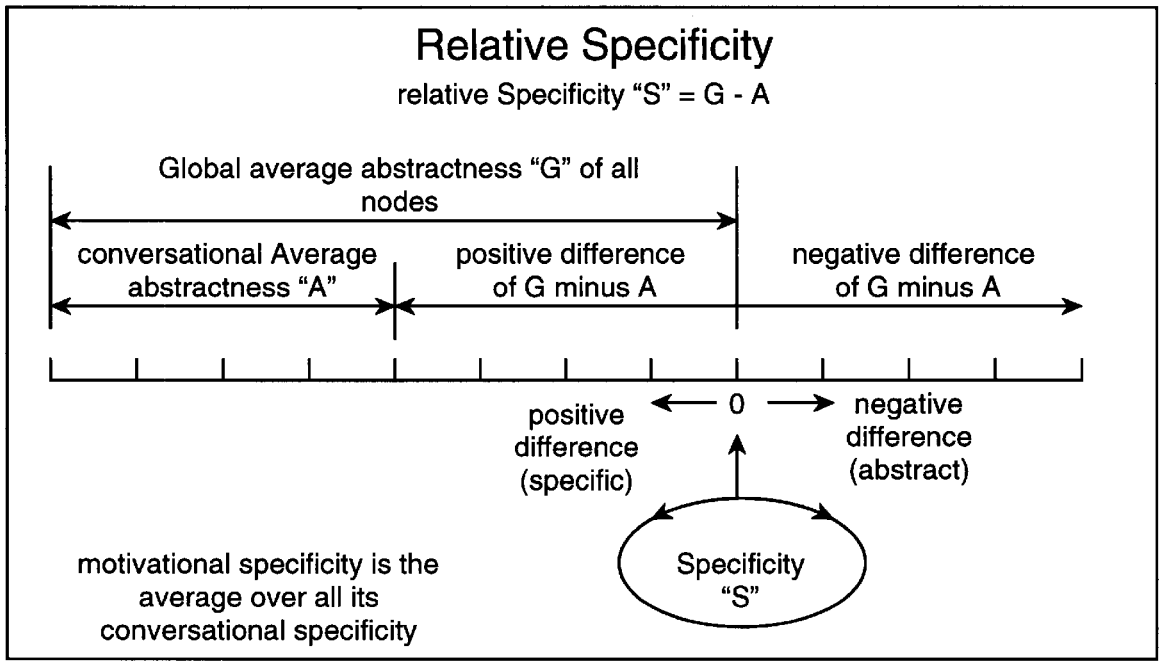
FIG. 57 shows how conversational abstractness can be defined relative to the average abstractness of all peak abstractions in a semantic network, so that as a semantic network matures, its baseline sense of abstractness shifts.

FIG. 57 shows how conversational abstractness defined in FIG. 23 can be normalized over the average conversational abstractness, to determine the relative abstractness, or 'specificity' of individual conversations. The normalization is important when passing specificity to a conversational partner as emotional feedback; it is necessary to establish a baseline median value for which conversations are neither specific nor abstract so that absence of emotion can be associated with those values. Without the normalization, there is no way to define a non-emotional quiet state.

For motivations invoking a set of conversations, the motivational specificity can be computed as the average of conversational specificity over its set of conversations. For an entire semantic network system, the average specificity over all of its active motivations is the specificity value usually passed on to the conversational partner. Very large semantic networks which engage multiple simultaneous unrelated partners (as an Internet Web server) may implement variations from this by passing specificity values to particular conversants only when those specificity values are from conversations which have meaning to those conversants.

Since motivations are responsible, in the present invention, for improving fluidity of the semantic network, each motivation becomes active only when there is some expectation that activity of the motivation will improve fluidity, as shown in FIG. 4. This is similar to the design concept of 'circulation of value' as described in Wright's paper *Reinforcement Learning and Animat Emotions:*

> The phrase circulation of value denotes a general design principle, and refers to any mechanism that alters the dispositional ability of agents in a multi-agent system to gain access to limited processing resources, via exchanges of quantitative, domain-independent representation of utility . . . the circulation of value implements a type of adaptation. This is not inductive learning of new hypotheses about a domain, but an ordering and reordering of the utility of control substates to dispositionally determine behavior. In a classifier system, the circulation of value adaptively changes the ability of classifiers to buy processor power.

The expectation that motivated activities can improve semantic network fluidity is related to circulation of value, since fluidity is a quantitative, domain-independent representation of utility. In the present invention, the expectation associated with motivations determines behavior, because the more a motivation is expected to improve fluidity, the greater the priority of its activation. In turn, improvements in fluidity, as a general measure of utility, result in improvements which benefit all classifier activity, by increasing free space, by reducing inheritance traversal overhead via efficiency, and by increasing the variety of vocabulary via need for complexity.

In the present invention, the expectation associated with each motivation is called motivational outlook. This outlook is based upon comparing the effect of activating a motivation and the effect of leaving it dormant. Since all motivations have finite attention spans, activation typically lasts as long as its attention span. For comparison purposes, to compare the effect of dormancy on system fluidity, period of dormancy should also be as long as the attention span. The motivational outlook is the maximum fluidity change from either activating a motivation or leaving it dormant, a maximum which can be estimated and then later confirmed by alternately activating the motivation and leaving it dormant.

Figure 58:
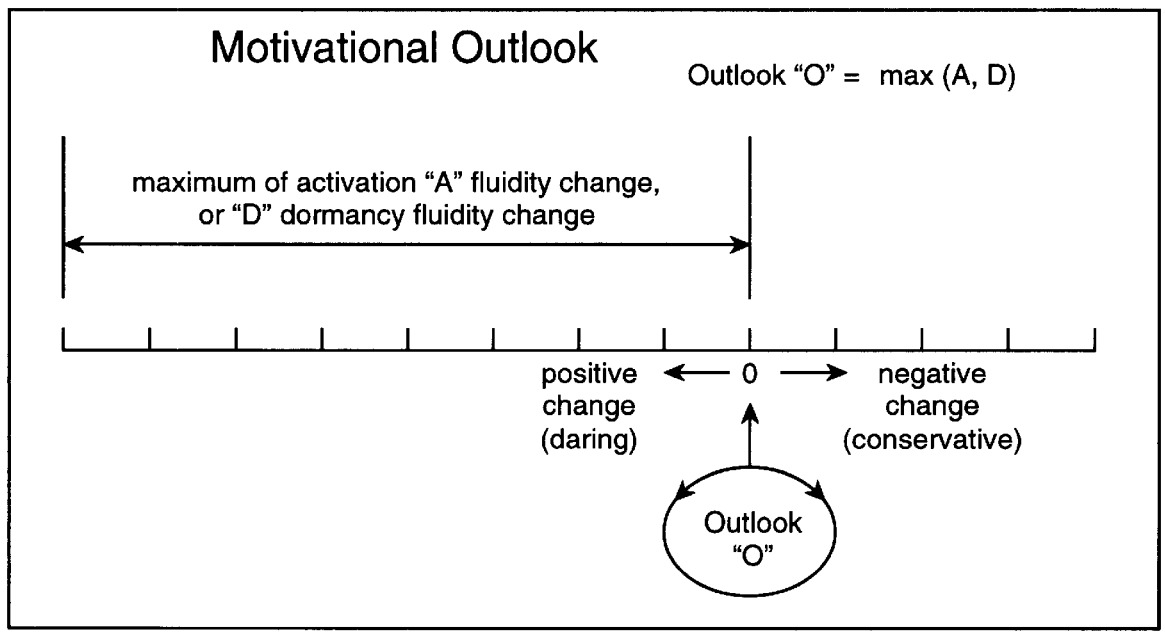
FIG. 58 shows how semantic verbs at the level of concrete motives described in FIGS. 3, 4 and 5 can be characterized by the change in system fluidity expected upon completion of the motive-verb's actions; this expectation of fluidity (or its equivalent rigidity change) is the 'outlook' number of the motive.

FIG. 58 shows how that maximum change can be calculated, and how it characterizes motivations. The change in system fluidity from activating a motivation is 'A', and the change in system fluidity from leaving it dormant for the same span of time is 'D'. If 'A' is larger than 'D', the motivation can be activated and the outlook has real meaning, if not, the motivation stays dormant and its outlook is meaningless. If the motivation can be activated and if the maximum change is positive, the motivation is 'daring' in the sense that overall system fluidity is expected to increase after activation. Daring motivations might include rearranging inheritance trees for greater efficiency by creating new abstractions, or initiating internal conversations to test related concepts.

If the motivation can be activated and if the maximum change is negative, the motivation is 'conservative' in the sense that overall system fluidity is expected to decrease after activation, but to decrease less than if activation had not been done. A conservative motivation is activated to conserve an already diminishing system fluidity. Conservative motivations might include memory conserving activities such as archiving or curtailment of overextended curiosity by limiting conversational focus.

Figure 59:
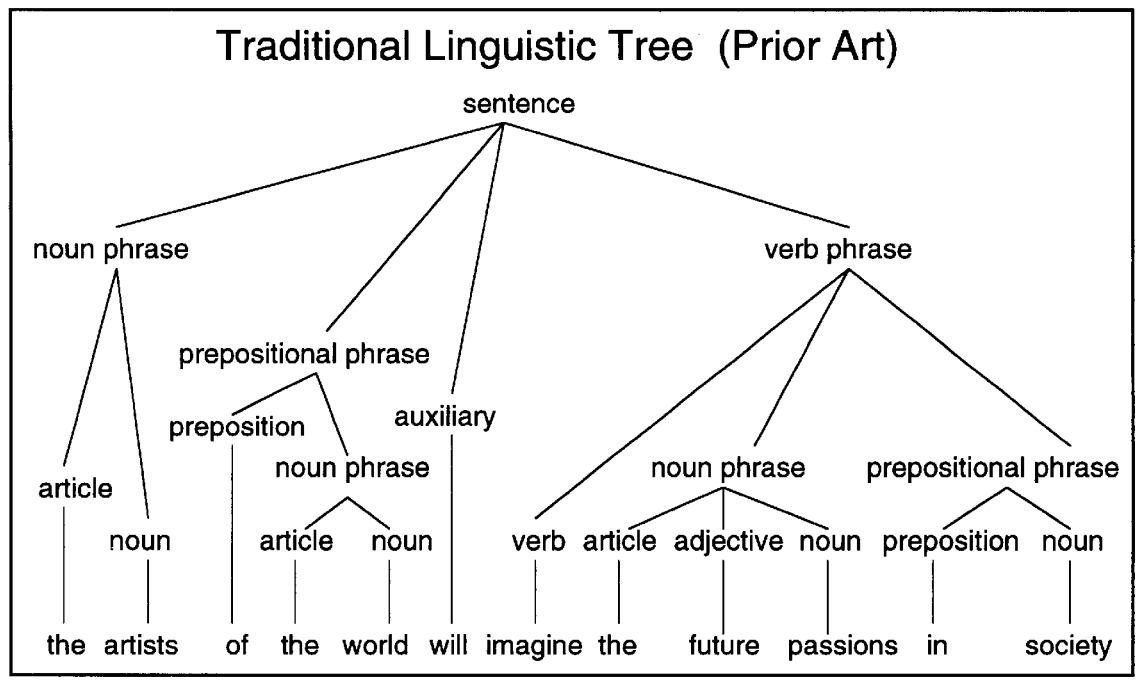
FIG. 59 shows an example of prior art in the linguistic analysis of a sentence into parts of speech; this linguistic analysis follows the tradition of organizing word-categories into phrase-categories, where categories are as concrete as possible.

All of the drawings from FIG. 1 to FIG. 58 describe design concepts of the present invention as applied to conversations in general. In FIG. 59 to FIG. 81, specific applications of the concept of semantic efficiency are shown in areas of text parsing, speech recognition and image recognition. In FIG. 59, an example of prior art is given, in which the sentence 'the artists of the world imagine the future passions in society' is parsed into syntactic linguistic components of meaning. The traditional linguistic tree is composed of highly specific classification elements such as 'article', 'prepositional phrase' and 'auxiliary' which are grouped together into more general classifications such as 'noun phrase' and 'verb phrase'.

An example of the use of traditional specific parsing elements is given in Pinker, *The Language Instinct*., pages 196–201. Unfortunately, traditional specific linguistic elements such as 'article' and 'auxiliary' are extremely difficult to implement when parsing, even though most natural language dictionaries are structured around such elements. As Pinker writes on page 201:

> Why is it so hard to program a computer to do this? And why do people, too, suddenly find it hard to do this when reading bureaucratese and other bad writing? As we stepped our way through the sentence pretending we were the parser, we face two computational burdens. Once was memory: we had to keep trace of the dangling phrases that needed particular kinds of words to complete them. The other was decision-making: when a word or phrase was found on the right-hand [antecedent] side of two different [logical] rules, we had to decide which [rule] to use to build the next branch of the [parse] tree.

The computational burdens of parsing can be greatly reduced by optimizing parses for semantic efficiency, thus guiding the overall construction of phrase trees, and by reducing the number of specific linguistic elements such as 'article' and 'auxiliary' which are to be identified, thus simplifying the logical rules involved in parsing. In FIG. 59, the word 'will' is parsed as an 'auxiliary', but it could instead be parsed as member of a general class of 'tense' symbols. Similarly, the word 'the' is parsed as an 'article', but it could instead be parsed as a member of a general class of 'adjective' symbols. By applying general rules about 'tense' and 'adjective' symbols, parse decision-making can be simplified, as long as the overall phrase trees are optimized for semantic efficiency.

Figure 60:
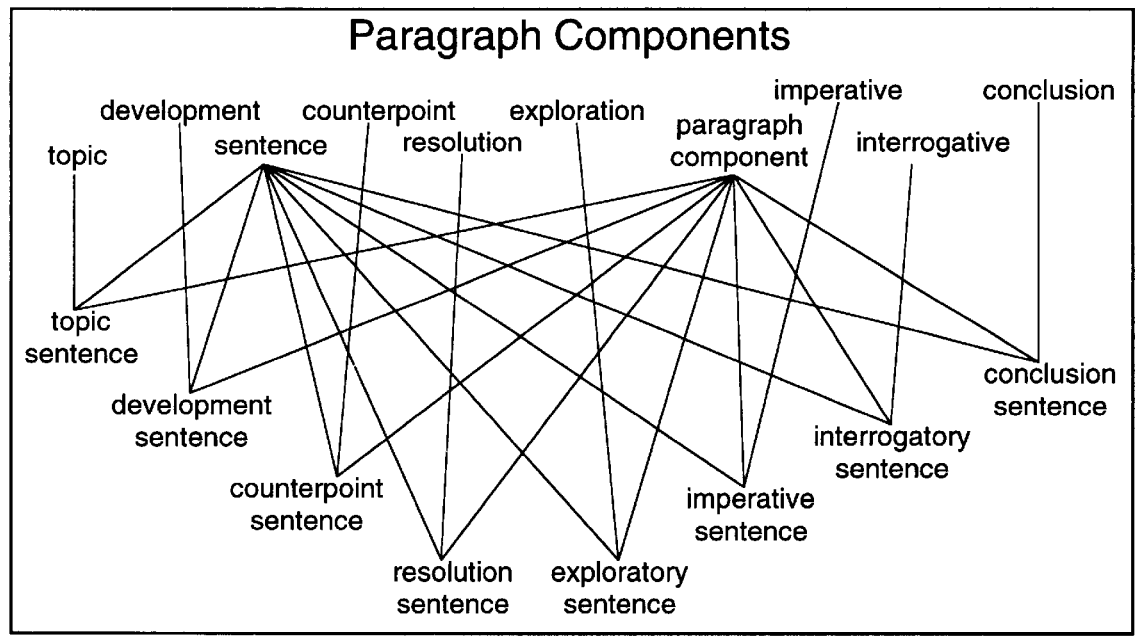
FIG. 60 shows an example of the types of sentences which can make up a paragraph; this hierarchy can be used to define semantic representation alternatives which compete on the basis of efficiency.
Figure 61:
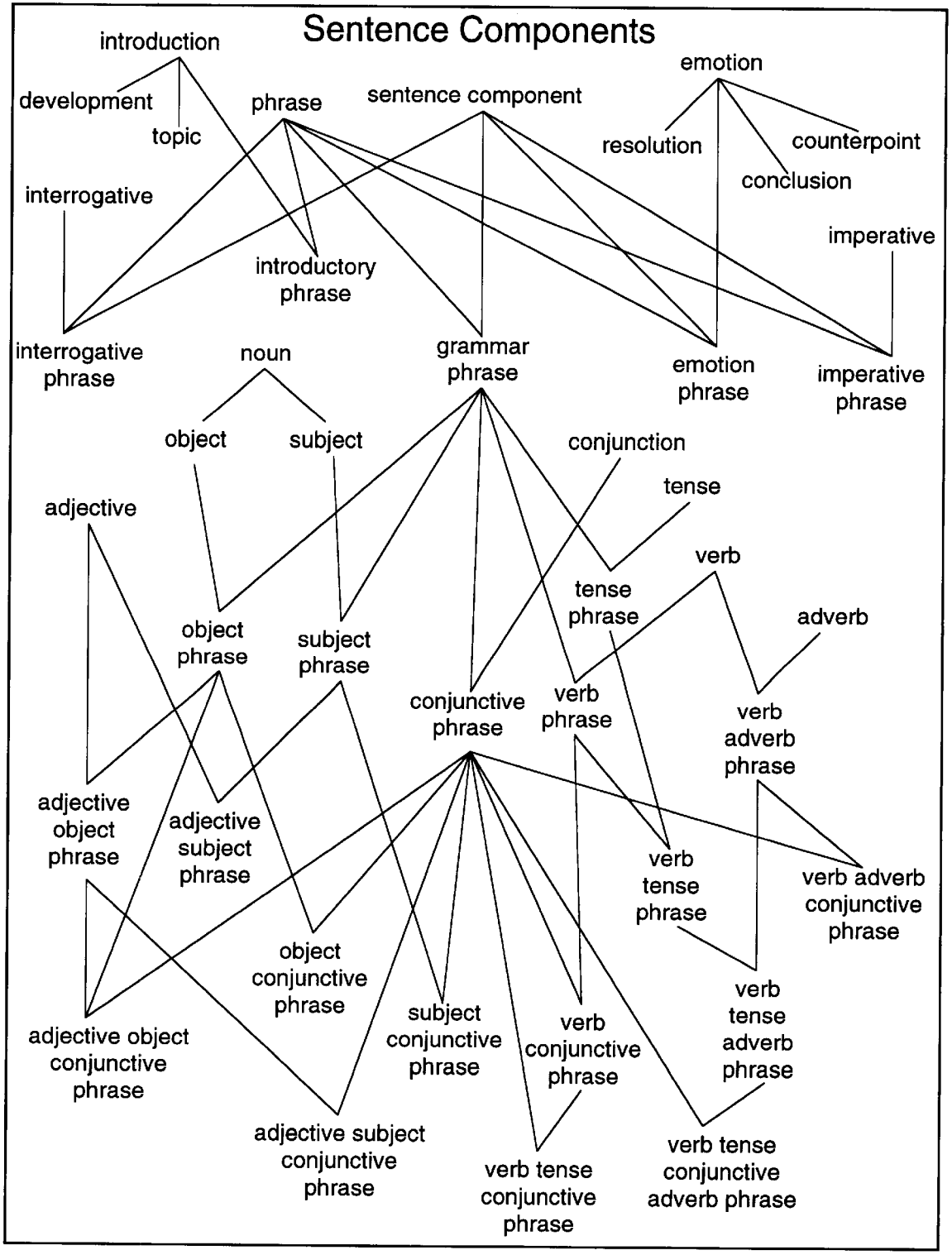
FIG. 61 shows an example of the types of phrase components which can make up a sentence; like FIG. 60 this generic sentence hierarchy can be used to define semantic representation alternatives which compete on the basis of efficiency.
Figure 62:
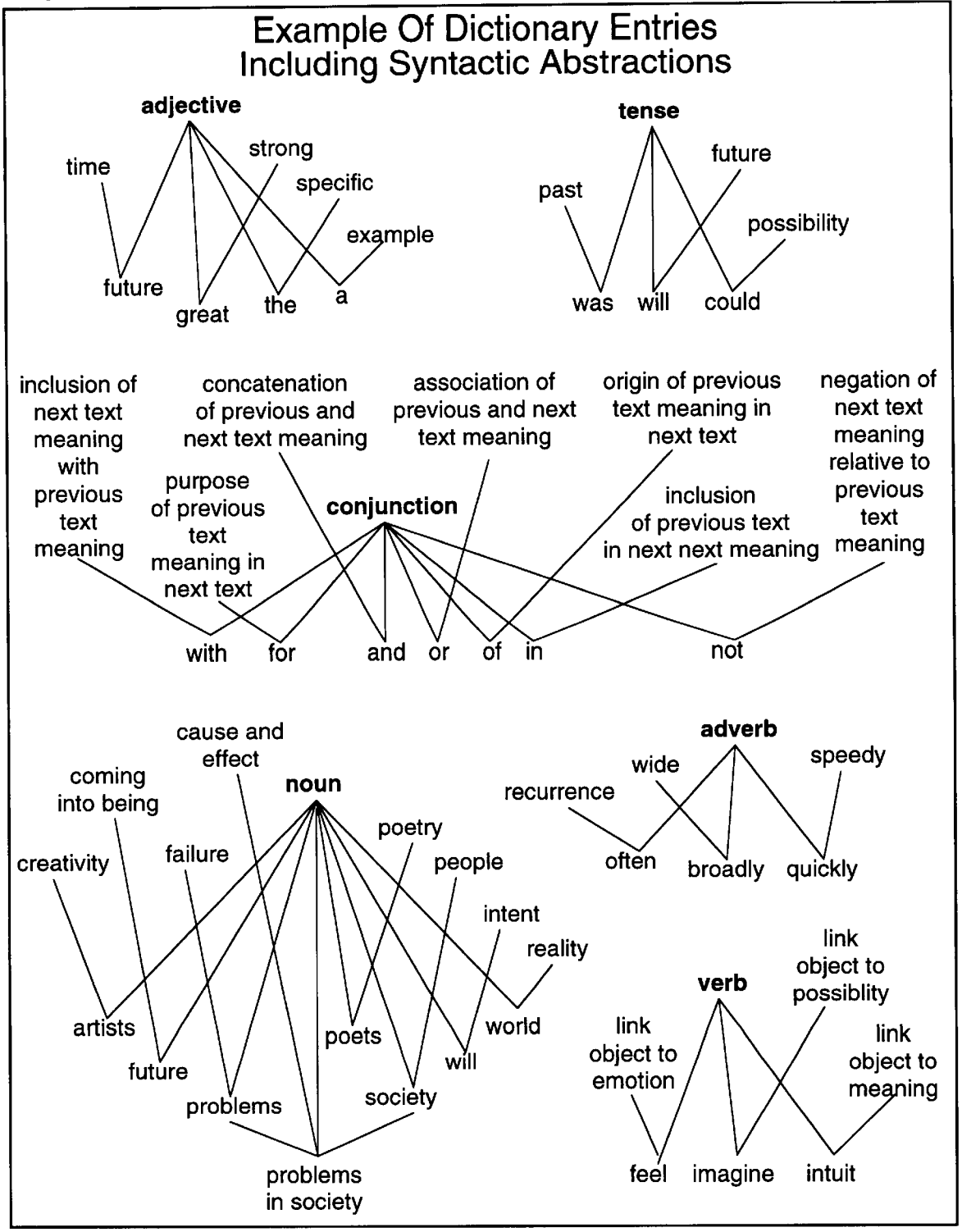
FIG. 62 shows an example of semantic dictionary entries organized under syntactic abstraction categories; these dictionary entries can be used to propose semantic representation alternatives which compete on the basis of efficiency.

The present invention provides enough ordering by way of semantic efficiency to permit a vastly simpler classification of symbols to parse natural language text, which in turn simplifies the decision-making rules needed while parsing. The inherent order of semantically efficient inheritance trees provides a natural framework for identifying dangling phrases, since unresolved dangling phrases can be identified as any nodes which have more than zero and less than the optimal number of inheritors. Phrase subtrees which are overloaded with complexity, such as run-on sentences, can be identified as nodes having more than the optimal number of inheritors. By optimizing for semantic efficiency, the power of a few syntactic symbol classes can be extended to the cover all text compositional themes. In FIG. 60, FIG. 61, and FIG. 62, the paragraph, sentence and dictionary level symbol classes are described, which cover the range of syntax from paragraphs to individual words.

FIG. 60 shows a classification of the types of sentences which make up a paragraph. These sentence types are shown as the eight leaf nodes from 'topic sentence' on the lower left side of the drawing to 'conclusion sentence' on the lower right side of the drawing. Since semantic efficiency usually requires the optimal number of inheritors of any node to be five, optimal paragraphs will usually have five sentences, each of which, in order to be distinct from the others, must be a unique selection from FIG. 60. Although it is possible for writers to include two development sentences in the same paragraph, in the present invention the meaning contained in those development sentences would be parsed into a single 'development' semantic sentence. Text is thus parsed into semantic paragraphs having five of the eight types of semantic sentence nodes in FIG. 60; by parsing text for semantic efficiency combined with the general classification of semantic sentences within paragraphs, good compositional style is ensured by parsing text into a variety of semantic sentence types within each semantic paragraph.

Since text to be parsed may be contain actual paragraphs, as delineated by formatting such as tabs and blank lines, actual paragraphs may be missing the variety of sentences required for a semantic paragraph. An actual paragraph to be parsed may have only a 'topic sentence' and an 'interrogatory' sentence. For example, here is a section of text containing two paragraphs:

> At ninety-five degrees, it was a hot day in July. But why would so many people succumb to heat stroke?
>
> Carlo, the ambulance driver, glanced at his watch, nervously. He saw that over ten minutes had passed since the call went out, and here he was still stuck behind a lined of cars bumper-to-bumper for miles. He slowly drove the ambulance forward, sirens blaring and lights flashing, as cars in front of him reluctantly drove off the pavement, becoming stuck down in the drainage ditch on either side of the road. Would he get there in time?

In the above example, the first paragraph was written as a very short paragraph. Even though it has just a topic sentence '. . . a hot day in July' and an interrogatory sentence '. . . why would so many people . . . ', the shortness of the paragraph is useful because it adds dramatic emphasis to its two sentences. The first sentence in the second paragraph 'Carlo, the ambulance driver . . . ' is a good development sentences for the first paragraph, and the second sentence of the second paragraph 'He saw that over ten minutes had passed . . . ' is a good counterpoint sentence for the second paragraph. In the methods of the present invention, both the first and second sentences of the second paragraph could be parsed as semantically belonging to the first paragraph, to increase the efficiency of the first semantic paragraph by adding two more sentence node inheritors, thus bringing the total number of sentence node inheritors up to four. At the time the first paragraph has been parsed, but the second paragraph has not yet been parsed, since the first paragraph has only two sentences, additional meaning has to be associated with the first paragraph in order to make it semantically more efficient. This additional meaning can come from the next text to be parsed, but it could also come from text that was parsed earlier, or from common sense associated by dictionary nodes bridging the parsed dictionary entries associated with the first paragraph's words, found by the universal index bridge described by FIG. 35.

In order to determine which source of additional meaning yields the most efficient semantic interpretation, it is necessary to have classification definitions for semantic structures more specific than paragraphs. FIG. 61 shows an example of semantic component classes for sentences, which could be used by the present invention. In this drawing, the phrase components which can be associated together into sentences are described, just as in FIG. 60 the sentence components which can be associated together into paragraphs can be described. Some of the phrase types of FIG. 61 are related directly to sentence types in FIG. 60, such as 'interrogative phrase' and 'imperative phrase'. An 'interrogative sentence' of FIG. 60 should contain an 'interrogative phrase' in the sense of FIG. 61. Similarly, an 'imperative sentence' of FIG. 60 should contain an 'imperative phrase' in the sense of FIG. 61.

Some of the phrase types of FIG. 61 are only indirectly related to sentence types in FIG. 60, such as 'introductory phrase' and 'emotion phrase'. A 'topic sentence' of FIG. 60 should contain an 'introductory phrase' in the sense of FIG. 61, an 'introductory phrase' which contains some kind of topic which is in the conversational focus. In FIG. 61, the concept of 'introductory phrase' has sibling nodes of 'development' and 'topic' which allow introductory phrases to be linked via the universal index of FIG. 35 to either topic or development concepts. Similarly, a 'development sentence' of FIG. 60 should contain an 'introductory phrase' in the sense of FIG. 61, an 'introductory phrase' which contains some kind of development concept which is in the conversational focus.

The 'emotion phrase' type of FIG. 61 is even more indirectly related to sentence types of FIG. 60. Although a 'counterpoint' sentence of FIG. 60 should contain an 'emotion phrase' in the sense of FIG. 61, the mapping of via the universal index from 'emotion phrase' to the sibling node 'counterpoint' under 'emotion' requires not only the use of the universal index of FIG. 35, but also may require that emotional values be calculated for the conversation, so that the emotional sense of 'counterpoint' can be associated with the parsing of a particular phrase, similar to the way people feel an emotional sensation when reading particularly meaningful phrases from a book. The quantification of such emotions is discussed later for FIG. 86.

FIG. 60 shows other sentence types of 'resolution sentence' and 'conclusion sentence' which relate to the 'emotion phrase' of FIG. 61. These other emotional sentence types must also be identified using the universal index of FIG. 35, often in combination with calculated emotional values for the conversation which is parsing the text.

The grammar phrase types of FIG. 61 do not have a particular abstractward mapping to sentence types of FIG. 60. Instead, grammar phrase types describe the complex syntax which enables specific shades of logical meaning to be embedded within sentences. For instance, grammar phrases consist of either an 'object phrase', 'subject phrase', 'conjunctive phrase' or 'verb phrase'. As noted by Pinker in *The Language Instinct*, page 234, all human language grammars are composed from objects, subjects and verbs:

> . . . subjects normally precede objects in almost all languages, and verbs and their objects tend to be adjacent. Thus most languages have SVO [subject-verb-object] or SOV [subject-object-verb] order; fewer have VSO; VOS and OVS are rare (less than 1%); and OSV may be nonexistent . . .

The present invention includes 'conjunctive phrase' as a grammatical construct on par with 'object phrase', 'subject phrase' and 'verb phrase' because conjunctions are the operators which compose textual sequences together. For example, conjunctions such as 'and', 'or' and 'not' compose sequences into logical meaning; conjunctions such as 'for', 'with' and 'in' compose sequences into prepositional meaning; and punctuation conjunctions such as '.', ':' and ';' compose sequences into the meaning of sentences. As a class, conjunctions are the compositional operators of textual language, and composition gives natural language its ability to express so many different sentiments. As Pinker notes, on page 85:

> The fact that grammar is a discrete combinatorial system has two important consequences. The first is the sheer vastness of language. Go into the Library Of Congress and pick a sentence at random from any volume, and chances are you would fail to find an exact repetition no matter low long you continued to search. Estimates of the number of sentences that an ordinary person is capable of producing are breathtaking. If a speaker interrupted at a random point in a sentence, there are on average about ten different words that could be inserted at that point to continue the sentence in a grammatical and meaningful way . . . assume that a person is capable of producing sentences up to twenty words long. Therefore the number of sentences that a speaker can deal with in principle is at least $10^{20}$ (a one with twenty zeros after it).

Since composition is a fundamentally empowering activity of language, just as the concepts of noun, verb and object are, the present invention places conjunctions on par with nouns, verb and objects, rather than including them, as in prior art, as components of noun phrases, verb phrases and object phrases. In FIG. 61, object phrase, subject phrase, conjunctive phrase and verb phrase inheritors of 'grammar phrase' are combined by conjunctive phrases into specific combination phrases, such as 'object conjunctive phrase' and 'verb conjunctive phrase'. Other abstract classes of phrases such as 'adjective', 'tense' and 'adverb' are inheritable, to define even more specific combination phrases such as 'adjective object conjunctive phrase' and 'verb tense conjunctive adverb phrase'. These highly specific phrase types, used with semantic efficiency optimization, take the place of word and phrase ordering rules from traditional linguistic analysis. By eliminating traditional word and phrase ordering rules from parsing analysis, the present invention speeds up parsing and allows it to deal with a wider variety of syntaxes, as well as more tolerant of textual errors.

FIG. 62 shows the dictionary meanings of words from the parsed sentence in FIG. 59. FIG. 62 shows the grammatical abstractions of FIG. 61 in bold, such as adjective, conjunction and tense. The dictionary meanings of words in FIG. 62 inherit from these abstractions. For instance, 'the' inherits from adjective and 'imagine' inherits from verb. The words in FIG. 62 inherit additional shades of meanings from abstractions not in FIG. 61. For instance, 'the' also inherits from 'specific' and 'imagine' also inherits from 'link object to possibility'. These additional shades of meaning exist for interpretation by the universal indexing mechanism as described in FIG. 35; by parsing 'the' from the input text, the universal indexing mechanism can then associate meanings through the link to 'specific'. Similarly, by parsing 'imagine' from the input text, the universal indexing mechanism can associate meanings through the link to 'link object to possibility' which may have links to 'object of phrase' and 'possibility' (not shown). By encoding nodes for the universal index to traverse, the dictionary meaning of words can be more succinctly defined in a semantic network than in a textual dictionary, since the linear nature of text is an impediment to describing the inherently tree-like nature of semantic meaning.

Since the dictionary nodes for words shown in FIG. 62 can be used to directly lookup words in the sentence parsed in FIG. 59, the classification of words shown in FIG. 62 can be used as a most-specific level of definitions when parsing text. In fact, for just one sentence parsed in FIG. 59, just the phrase-types of FIG. 61 and the dictionary definitions of FIG. 62 are sufficient to define parsing, when combined with optimization for semantic efficiency.

For parsing very large input texts, higher levels of association could be defined, describing how semantic paragraphs can be associated into semantic pages, and semantic pages into semantic chapters, and semantic chapters into semantic books, semantic books into semantic volumes. All these levels would be useful to the present invention, however for simplicity in this discussion, they are not shown.

Figure 63:
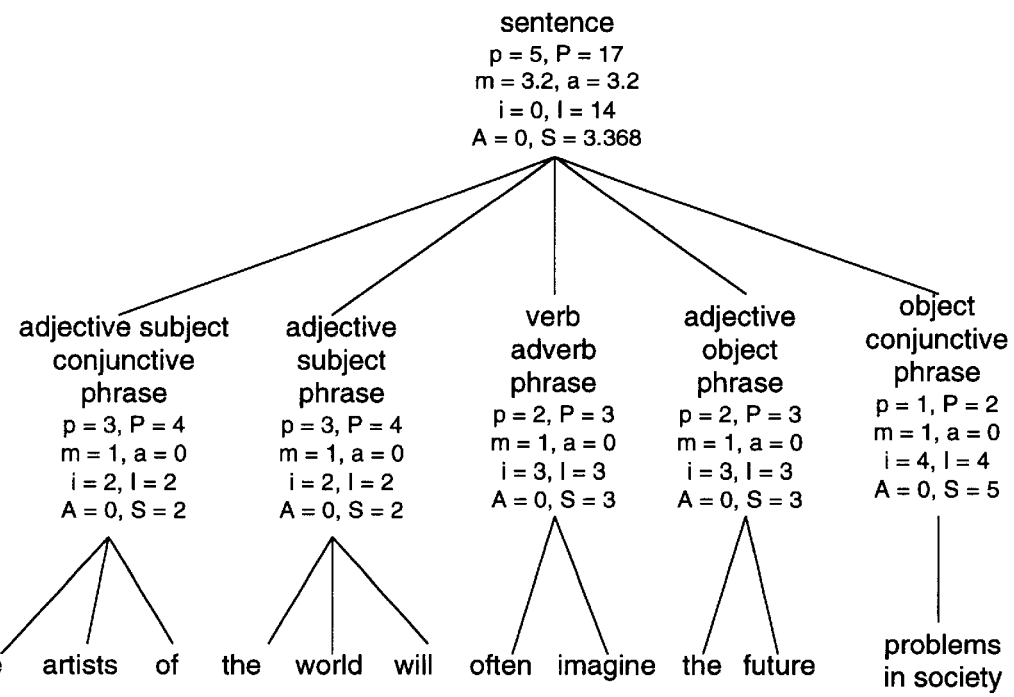
FIG. 63 shows an example of a sentence parsed into phrases by the dictionary entries of FIG. 62 and the sentence components defined by FIG. 61; since English is a subject-verb-object ordered language, the noun phrases which precede the verb are parsed as a subject and the noun phrase which follow the verb are parsed as an object.

FIG. 63 shows a possible interpretation of the sentence from FIG. 59, using the dictionary definitions of FIG. 62 and the phrase-type definitions of FIG. 61. FIG. 63 also shows the semantic efficiency numbers associated with its parse analysis tree. Although the thirteen words of the sentence can be grouped into many sub-sequence combinations, the phrase-types of FIG. 61 greatly constrain which sub-sequence combinations need to be considered. Since the first word of the sentence is 'the' which is an adjective in the dictionary, the first phrase must be either an 'adjective object phrase', an 'adjective subject phrase', an 'adjective object conjunctive phrase' or an 'adjective subject conjunctive phrase'. Since the second word is 'artist' which is a noun in the dictionary, the first phrase can still be any of the above four phrase-types; however, since the third word is 'of' which is a conjunction in the dictionary the first phrase is either an 'adjective object conjunctive phrase' or an 'adjective subject conjunctive phrase', or else the conjunction 'of' belongs to the second phrase and the first phrase ends with 'artist'. Parsing in this fashion, a number of possible interpretation of the sentence can be identified, and each possible interpretation can then be analyzed for semantic efficiency, so that the interpretation with greatest efficiency can be chosen as most meaningful.

The interpretation of the sentence in FIG. 63 has five phrase node components: an adjective subject phrase (containing 'the artists of'), an adjective subject phrase (containing 'the world will'), a verb adverb phrase (containing 'often imagine'), an adjective object phrase (containing 'the future') and an object conjunctive phrase (containing 'problems in society'). Since English is a SVO (subject-verb-object) language, the phrases containing nouns which precede the verb 'imagine' are classed as subject phrases, whereas the phrases containing nouns which follow the verb are classed as object phrases. This application of the English language SVO ordering is the only ordering rule which needs to be applied to the sentence in FIG. 63, so the dictionary shown in FIG. 62 may be used for languages with SOV (subject-object-verb) or VSO ordering by changing the ordering rule used by the parser.

The efficiency numbers of FIG. 63 are calculated bottom-up from the specific phrase node level to the sentence level. Each of the phrase nodes in FIG. 63 has an inefficiency due to missing inheritors; they all have less than the optimal number of inheritors. The worst is the object conjunctive phrase which ends the sentence; since it has just one inheritor, its inefficiency is 5. The other phrase nodes have inefficiency of 2 or 3, which could also be easily improved. Because of the missing inheritors at the phrase node level, the inefficiency of the sentence is 3.368, as calculated by the method discussed for FIG. 13. This inefficiency value of 3.368 could easily be improved by grouping the words of the sentence into fewer but better populated phrases, even though this reduces the number of direct inheritors of the 'sentence' node from the optimal number of five in FIG. 63.

Figure 64:
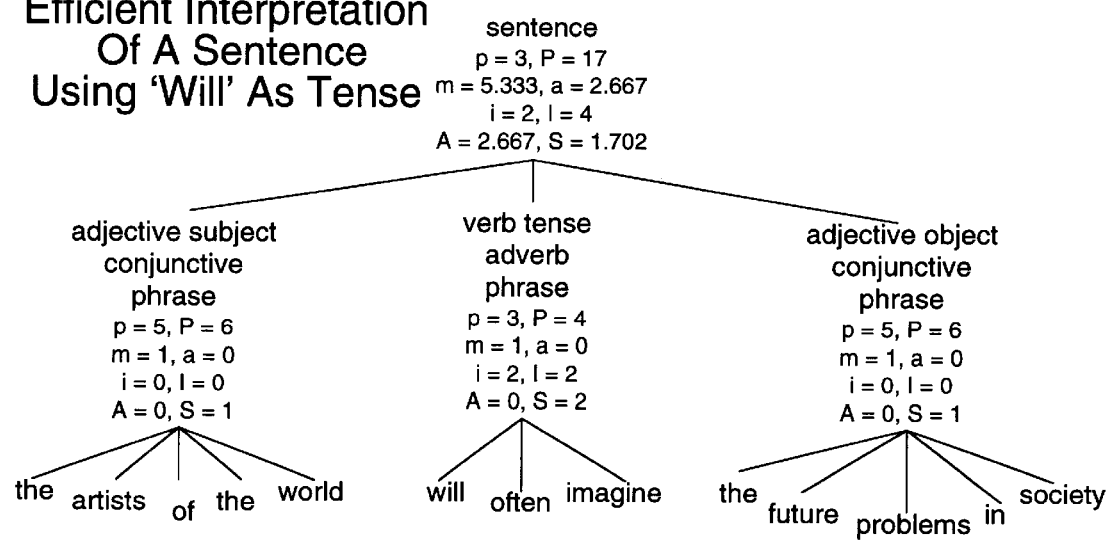
FIG. 64 shows a more efficient interpretation of the same sentence as in FIG. 63; the efficiency is due to improved phrase sizes, at a slight trade-off due to a worse total number of phrases.

An example of a parsing of the sentence with fewer phrases is shown in FIG. 64. The phrases 'the artists of' and part of the phrase 'the world will' have been combined into the larger phrase 'the artists of the world' which has an optimal number of inheritors. Part of the phrase 'the world will' has been combined with the phrase 'often imagine' into the phrase 'will often imagine'. The phrase 'the future' has been combined with the phrase 'problems in society' to make the larger phrase 'the future problems in society'. As a result, the inefficiency values of the phrase node level in FIG. 64 are one (which is ideal) for the adjective subject conjunctive phrase, two for the verb tense adverb phrase, and one (which is ideal) for the adjective object conjunctive phrase. As a result, the inefficiency of the sentence is better (1.702 rounded to three decimals) even though having two less phrase nodes increases the direct inheritor deviation of 'sentence' from zero to two.

The parse interpretation of FIG. 64 uses a different dictionary meaning for 'will' than FIG. 63; in FIG. 63 'will' means the noun of 'intent' whereas in FIG. 64 'will' means the tense of the future. The two figures also differ in which dictionary meaning is associated with 'problems in society'. In FIG. 63 'problems in society' is a defined as a compound noun associated with 'cause and effect', whereas in FIG. 64 the individual words 'problems', 'in' and 'society' are defined, respectively, as the noun associated with 'failure', the conjunction which denotes inclusion of the next text with previous text and the noun associated with 'people'. By optimizing for efficiency, the dictionary definition alternatives can be chosen which have greatest overall meaning; since the efficiency of 'sentence' in FIG. 64 is greater than in FIG. 63, the present invention can determine that the dictionary meanings of FIG. 64 are preferable to the meanings of FIG. 63. In a poetic sense, the interpretation of meaning shown by FIG. 64 is fuller and less fragmented than the interpretation of FIG. 63.

Since the present invention calculates inefficiency numbers for all nodes in a parse analysis tree, nodes which need improved efficiency can easily be located. In FIG. 64, the node 'verb tense adverb phrase' has two less inheritors than optimal, which can be leaf nodes. The node 'sentence' also has two less inheritors than optimal, although any additional direct inheritors of 'sentence' should be of the same abstractness (total inheritor population) as the existing direct inheritors of 'sentence', so additional direct inheritors of 'sentence' should have inheritor populations greater than one. With these improvements as goals, the conversational to which the analysis tree in FIG. 64 is attached can invoke verbs to add specific kinds of nodes to FIG. 64. For example, the verbs could ask 'what else will they do besides imagine', or the verbs could use the universal index of FIG. 35 to associate possible verbs linking the noun(s) of the subject phrase to the noun(s) of the object phrase.

Figure 65:
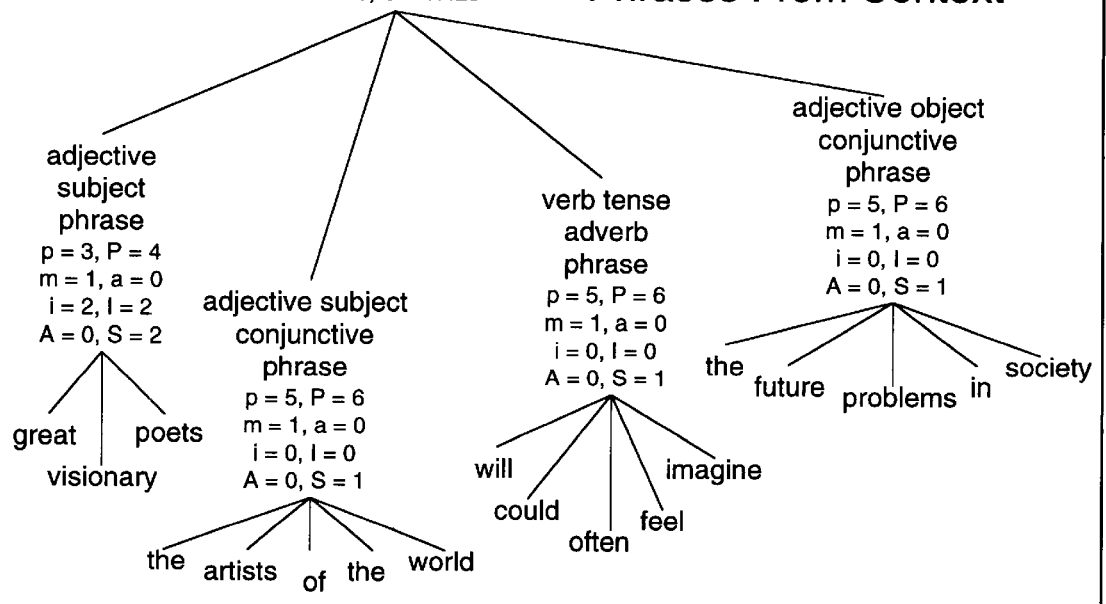
FIG. 65 shows an even more efficient interpretation of the same sentence as in FIG. 64; the additional efficiency comes from associating an additional phrase from context or focus of conversation, as well as associating additional verb phrase words from context or focus of conversation.

FIG. 65 shows the analysis tree of FIG. 64 improved by addition of nodes for greater semantic efficiency. To increase the efficiency of the node 'verb tense adverb phrase', new inheritors leaf nodes of 'could' and 'feel' have been added. The node 'adjective subject phrase' has been added, to increase the efficiency of the node 'sentence'. As a result, the inefficiency of 'sentence' in FIG. 64 has been reduced in FIG. 65 to 1.424 (rounding to three decimals). This reduction reflects the fuller, richer meaning of the interpretation of FIG. 65.

Figures 66, 67:
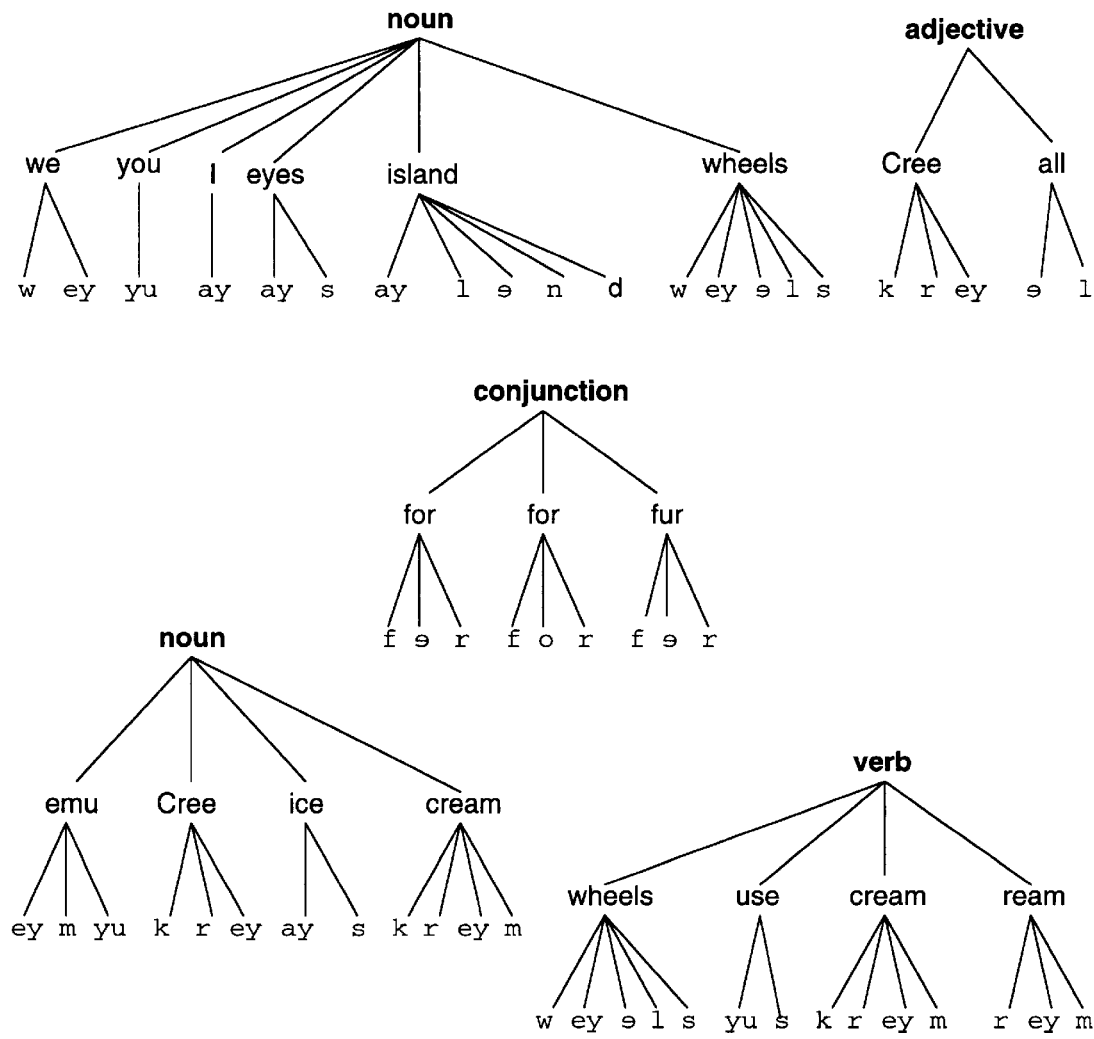
FIG. 66 shows an example of phonemes to be interpreted by a speech recognition system; the phonemes are arranged in a continuous stream with no segmentation markings.
FIG. 67 shows a small semantic dictionary mapping phonemes to words; like the dictionary of FIG. 62 these generic word hierarchies can be used to define semantic representation alternatives which compete on the basis of efficiency.

By parsing for specific classification types, in conjunction with optimizing the parse analysis for maximum semantic efficiency, phoneme streams can be parsed into meaningful sentence trees, for speech recognition applications. FIG. 66 shows the input stream of phonemes associated with the sentence 'I scream, you scream, we all scream for ice cream.' This sentence was chosen for the ambiguity of its phonemes; the phoneme sequence 's k r' can be used to forms the words 'scream' and 'ice cream'. The phoneme 'ay' represents the stressed 'I' vowel; the phoneme 'ey' represents the stressed 'E' vowel, and the backwards ∃ phoneme represents the unstressed vowel.

FIG. 67 shows a small dictionary of phoneme sequences which can be used to look-up the phonemes found in FIG. 66. The word 'Cree' appears as both an adjective and a noun, and the words 'cream' and 'wheels' appear as both a verb and a noun, reflecting the polysemous nature of those words. Two different phoneme sequences both map to the conjunction 'for' since that word can be pronounced both with its vowel stressed and its vowel unstressed.

Figures 68, 69:
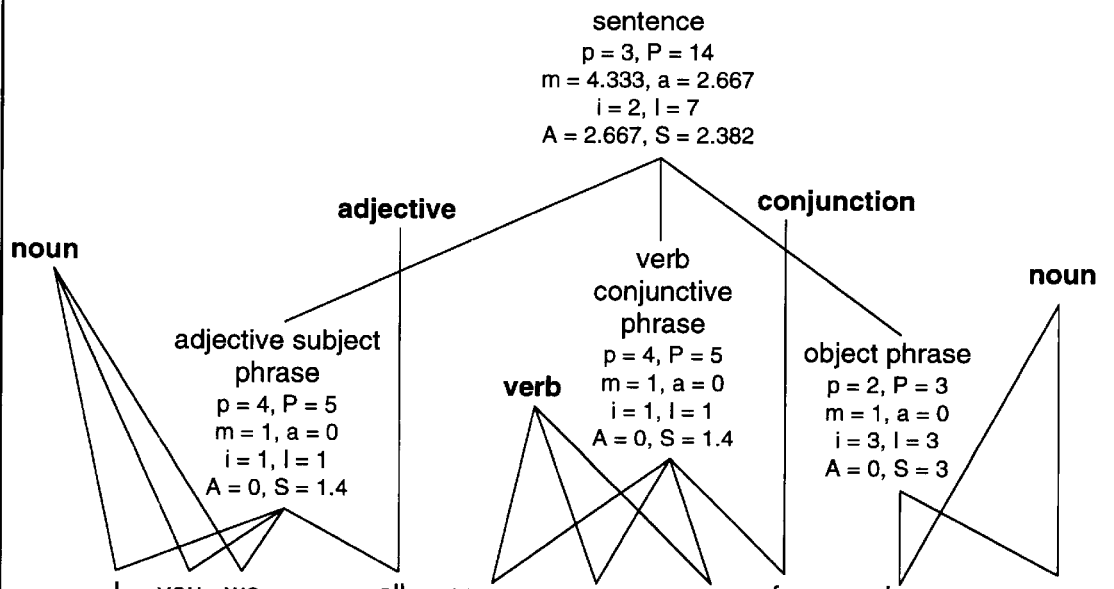
FIG. 68 shows three attempts to parse the phonemes of FIG. 66 into words; the first attempt fails because the phoneme for the second syllable of 'island' cannot be matched.
FIG. 69 shows an efficient representation of the stream of phonemes from FIG. 66; to make this representation even more efficient more phrases would have to be added to the 'sentence' subtree.

The 'ay' phoneme begins the words 'I', 'eyes', 'island' and 'ice'. Consequently, the parser could consider all of these words when beginning to parse the first 'ay' of the input stream of FIG. 66. However, immediately after 'ay' comes the phoneme 's'. At this point, the parser no longer considers 'island' because 'k' the 's' phoneme has appeared in place of the 'I' phoneme of 'island'. When all the phonemes of FIG. 66 have been parsed in this fashion, only some of the words in FIG. 67 can be associated with the stream in FIG. 66. Two of the possible parses are shown in FIG. 68 marked as the encircled 'b' and the encircled 'c' candidates. The 'b' candidate is 'I scream, you scream, we all scream for ice cream.' The 'c' candidate is 'eyes Cree muse cream, wheels cream for ice cream.' By evaluating these candidates for maximal semantic efficiency, the more meaningful candidate can be chosen. FIG. 69 shows the semantic inefficiency numbers for candidate 'c'.

In FIG. 69, the input stream of FIG. 66 has been parsed by recognizing 'I scream', 'you scream' and 'we all scream' as a sequence of noun-verb clauses, all having a common verb 'scream'. Since English is a SVO order language, each of these nouns preceding the verb 'scream' is recognized as a subject noun, and placed in the subject phrase class of FIG. 61. The clause 'we all scream' also contains an adjective 'all', so the 'adjective subject phrase' class of FIG. 61 is used to describe the nouns 'I', 'you', 'we' and the adjective 'all'. The verb 'scream', which appears three times, is placed in the 'verb conjunctive' class of FIG. 61 with the conjunction 'for'. Finally, the clause 'ice cream' containing two nouns following all instances of the verb 'scream' is placed in the object phrase category of FIG. 61.

By grouping the nouns 'I', 'you', 'we' together, and grouping the three instances of 'scream' together, both the adjective subject phrase and verb conjunctive phrase gain considerable efficiency. Thus the overall efficiency of the sentence is 2.974 (rounded to three decimals), despite the fact that the sentence node has only three inheritors (two less than optimal) and that one of its inheritors has a population of only three, thus causing some abstractness deviation. FIG. 69 shows how a continuous stream of phonemes can be assembled into an analysis tree, using efficiency to guide the detection of boundaries between words and phrases, to the point of referring repeating words such as 'scream' back to the same subtree, and referring repeating word-types such as the nouns 'I', 'you', and 'we' back to the same subtree.

Figure 70:
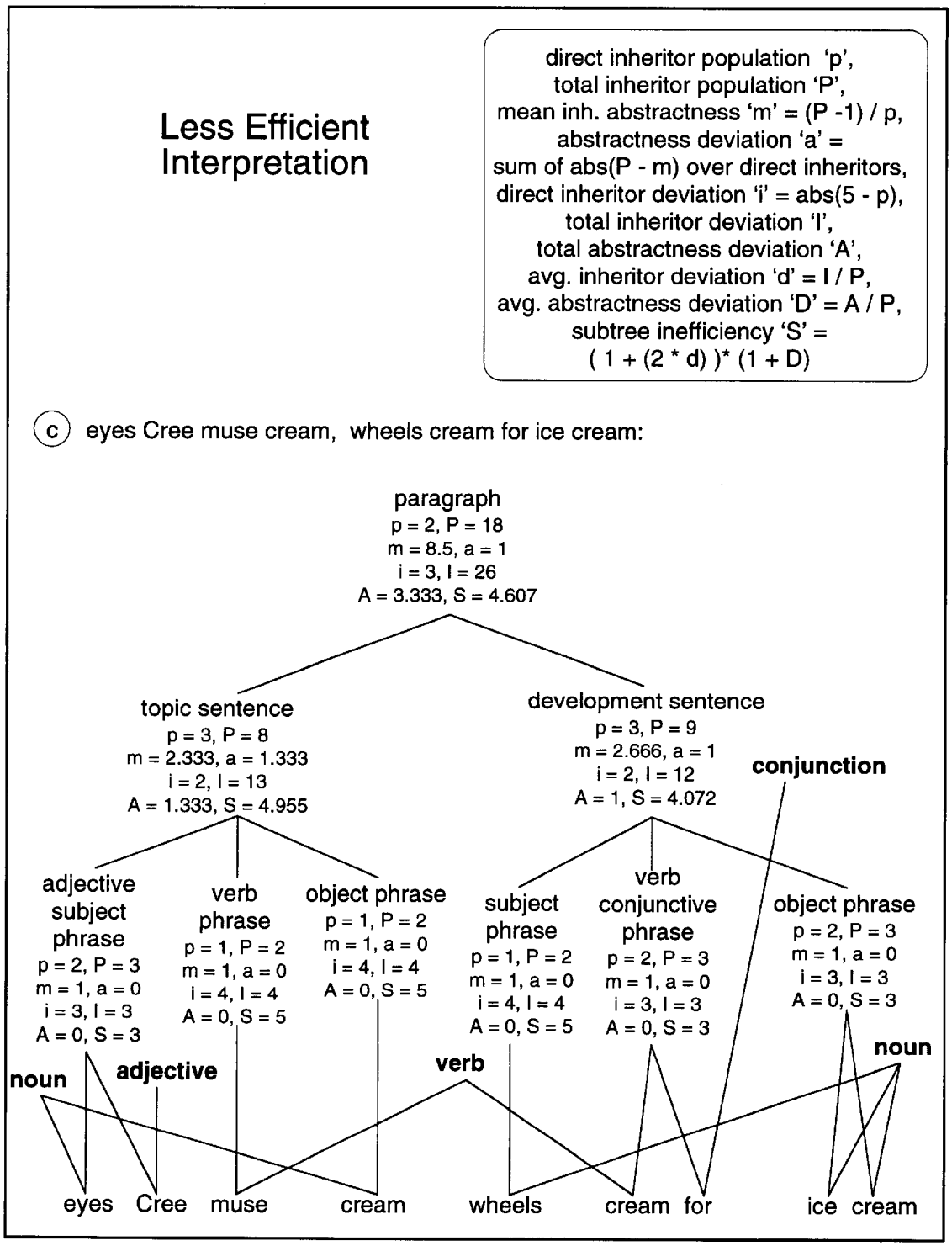
FIG. 70 shows a less efficient representation of the stream of phonemes from FIG. 66; the greater number of subtree nodes at the sentence level results in an overly deep, sparsely populated hierarchy.

In contrast, FIG. 70 shows how the same continuous stream of phonemes can be assembled into an analysis tree, without referring any repeating words or word-types back into the same subtree. Two complete sentences emerge, each with subject, verb and object phrases. The sentences are classed into a paragraph as a topic sentence 'eyes Cree muse cream' and a development sentence 'wheels cream for ice cream'. Although this interpretation has acceptable grammar, by recognizing the stream of FIG. 66 as six phrase-level nodes, each phrase-level node only has one or two inheritors, causing a very large total inheritor deviation of 26 for the paragraph, and an inefficiency of 4.607 (rounded to three decimals). Thus the interpretation of FIG. 69, whose inefficiency is only 2.382, would be greatly preferred to the interpretation of FIG. 70. This preference reflects the fuller meaning of FIG. 69 at the phrase-level. If the stream of phonemes had been parsed by a conversation which already had focus and analysis words relating to 'eyes', 'Cree', 'wheels' and 'cream', the universal index method of FIG. 35 could be used to add inheritors to the phrase-level nodes of FIG. 70, increasing efficiency and shifting the interpretation to a fuller meaning. If the phrase-level subtrees of FIG. 70 could be merged with similar pre-existing analysis subtrees, the result might be a paragraph even more efficient than the sentence of FIG. 69. This would be an example of how pre-existing contexts can give credence to unusual parse interpretation, just as they do in normal conversations.

The method of combining semantic dictionary look-ups with optimization of analysis trees can be applied to image recognition as well as speech recognition, even though image recognition operates on two-dimensional input pictures instead of one-dimensional input streams. Both images and speech contain recognizable patterns which can be described in terms of locality; patterns where are adjacent to each other can be recognized as belonging to the same locality. In speech recognition, the order in which patterns occur can convey crucial information, such as subject-verb-object order, but in image recognition, patterns of objects need to be recognized even when objects have been turned around and inverted. Since the method of combining semantic dictionary look-ups with optimization of analysis trees is only minimally dependent upon ordering information, it can be applied successfully to image recognition problems, by creating analysis trees which describe local image features, and then grouping these analysis trees to describe the whole of an image.

Figure 71:
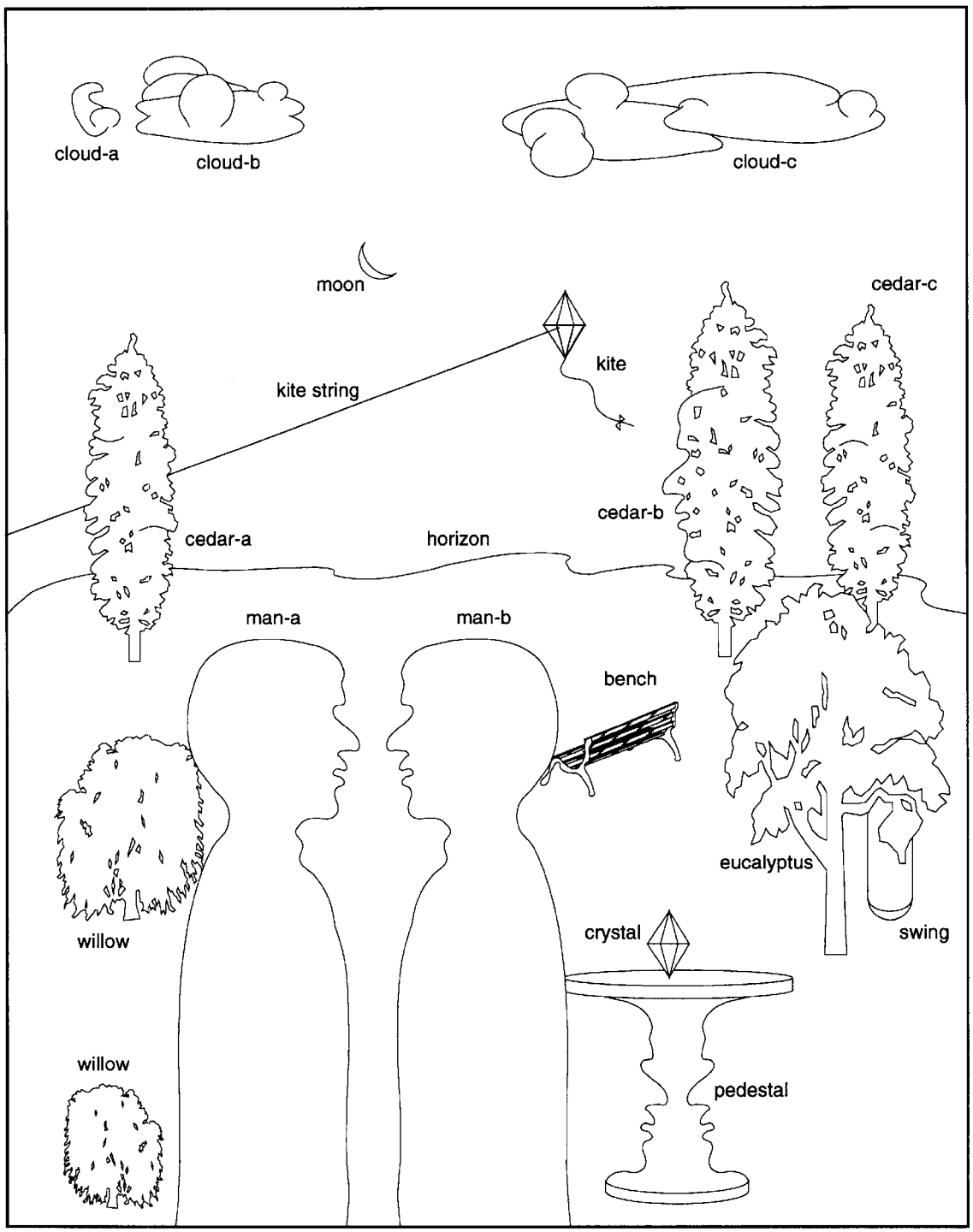
FIG. 71 shows a picture composed of semantically different objects composed of identical geometric features; these different objects can be identified by choosing semantic representations for maximum semantic efficiency.

FIG. 71 shows a drawing of a garden scene in which components of the scene have been labeled, such as 'willow' on the lower left, 'cloud-c' on the upper right, and 'horizon' in the center. These labels serve to identify parts of the drawing for discussion; the method of combining semantic dictionary look-ups with optimization of analysis trees can ignore these labels, instead using only the pictorial lines of the drawing as input.

Figure 72:
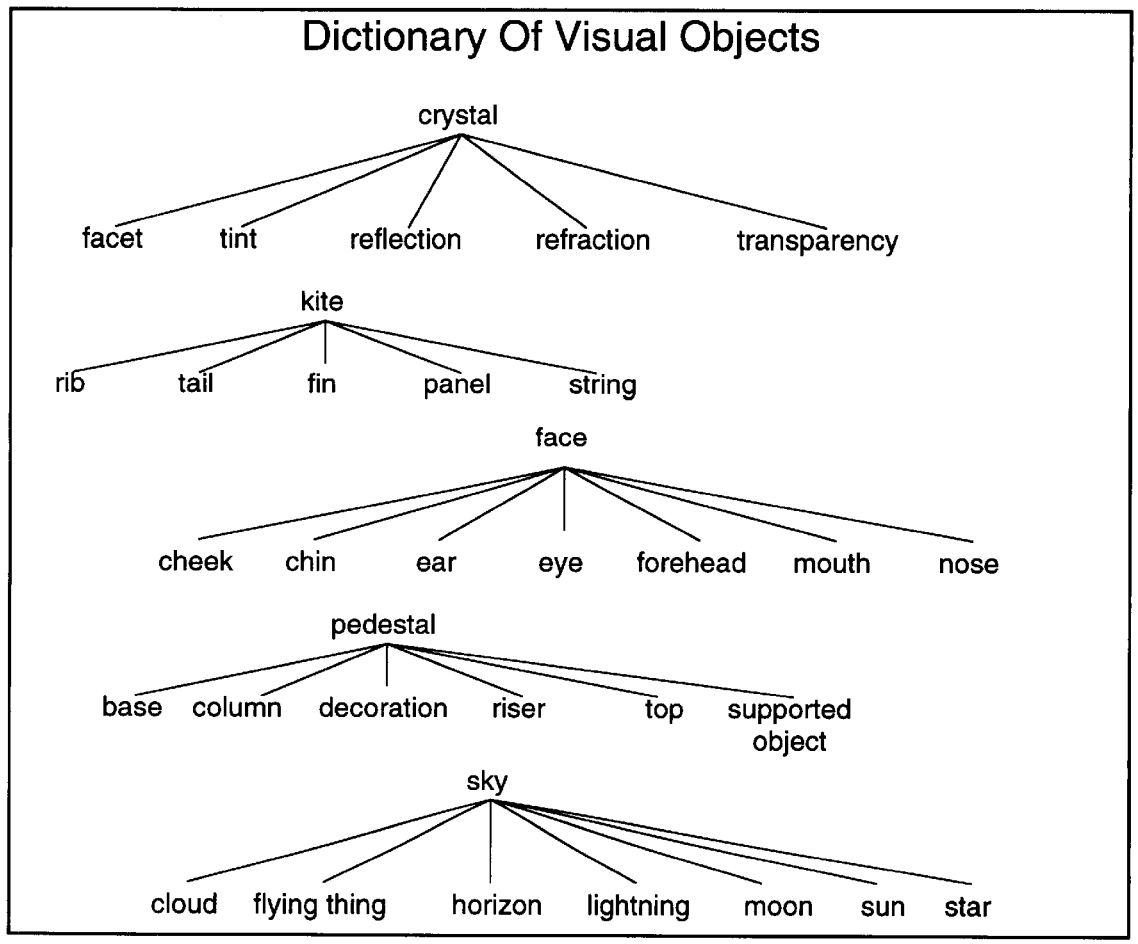
FIG. 72 shows a small semantic dictionary of visual objects in terms of geometric features; like the dictionary of FIG. 67 these generic visual hierarchies can be used to define semantic representation alternatives which compete on the basis of efficiency.

FIG. 72 shows a semantic dictionary of visual objects, with four peak abstractions of 'crystal', 'kite', 'face', 'pedestal' and 'sky'. Each of these peak abstractions has inheritors symbols which describe visual features which represent components of the abstraction. For instance, a crystal may be composed of features of facet, tint, reflection, refraction and transparency, whereas a kite may be composed of the features of rib, tail, fin, panel and string.

Figure 73:
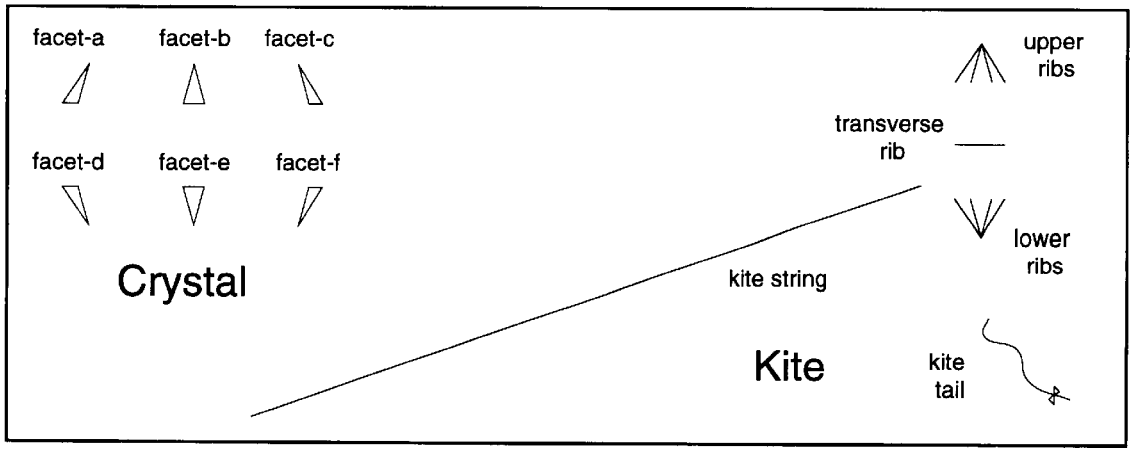
FIG. 73 shows the features which are identified as a 'crystal' in FIG. 71, as well as the features which can be identified as a 'kite' in FIG. 71.

FIG. 73 shows drawings of actual visual features which may be recognized using a properly trained neural network or other visual pattern matcher. Six kinds of crystal facets are shown as exemplar images, and the various components of kite are each shown as exemplar images. By using a neural network or other visual pattern matcher, these features can be detected in pictures even if they appear at different scales, orientations, proportions, or appear partly occluded.

Figure 74:
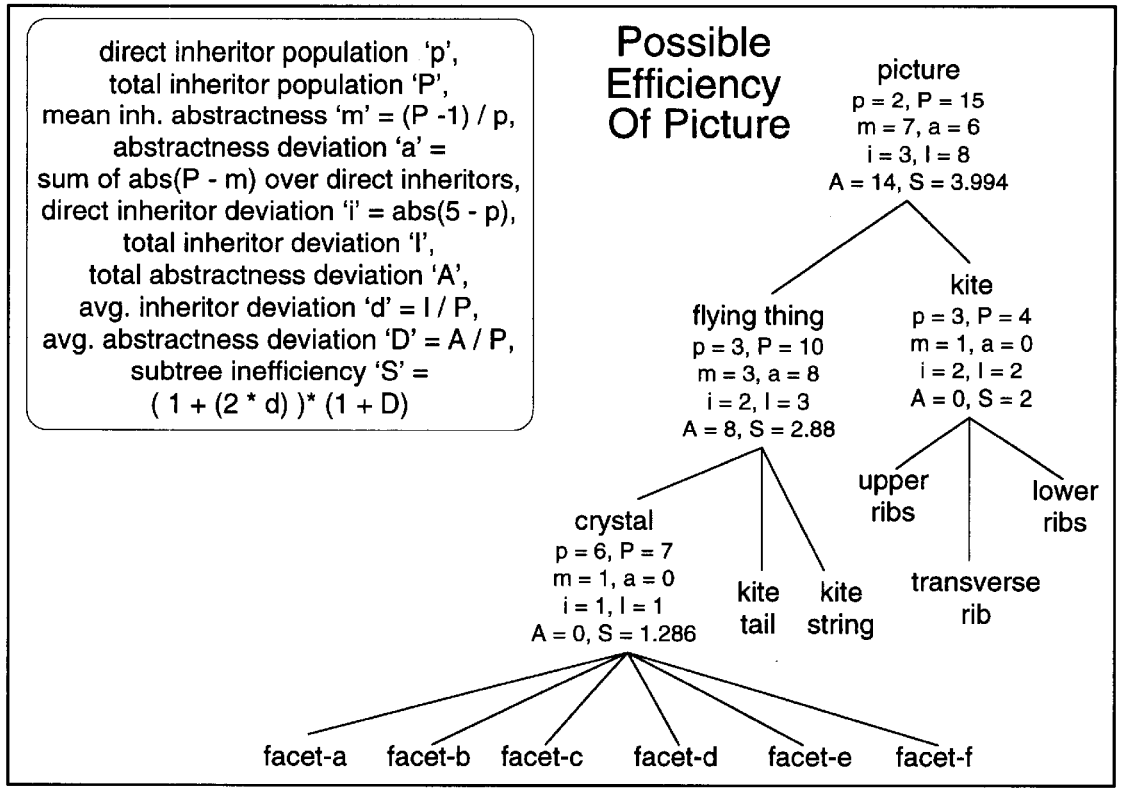
FIG. 74 shows how features in the sky of the picture in FIG. 71 can be interpreted as a flying crystal with kite tail and kite string.

FIG. 74 shows a possible interpretation of two locales of the picture in FIG. 71: the locale around the area labeled 'kite' and the locale around the area marked 'crystal'. Since the facets of the area 'crystal' have a geometry similar to the kite rib features of FIG. 73, the visual pattern matcher could recognize them as kite ribs rather than crystal facets. This interpretation is shown in FIG. 74 by the 'kite' subtree which has three inheritors: 'upper ribs', 'transverse rib' and 'lower ribs'. Similarly, since the kite ribs around the locale labeled 'kite' have a geometry similar to the crystal facet features of FIG. 73, the visual pattern matcher could recognize them as crystal facets rather than kite ribs. The kite tail and kite string in this locale, however, would not be ambiguous. Consequently, the locale around kite which begins above the horizon in the sky part of the picture would be interpreted as a 'flying thing' having direct inheritor nodes of 'crystal' which itself is a subtree of facets, and leaf nodes of kite tail and kite string. Both the 'flying thing' subtree and the 'kite' subtree are grouped together under a 'picture' node, so that an overall inefficiency number can be calculated for the interpretation of FIG. 74. There are five sources of inefficiency in FIG. 74. First, the 'kite' and 'flying thing' subtrees have only three direct inheritors instead of the optimal five. Second, the 'crystal' subtree has six direct inheritors instead of the optimal five. Third, the 'flying thing' and 'kite' subtree have population differences in their direct inheritors, causing abstractness deviations. Fourth, the node 'picture' has only two direct inheritors, causing an inheritor deviation, and they differ in abstractness, causing an abstractness deviation.

Figure 75:
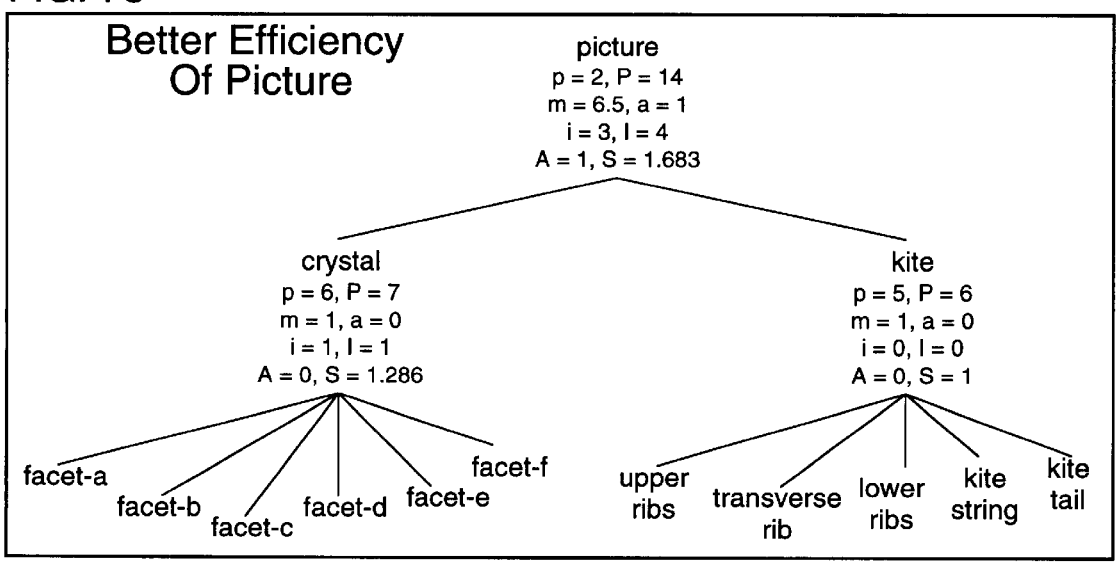
FIG. 75 shows how features of faces in FIG. 71 can be reclassified as features of a table for greater semantic efficiency.

FIG. 75 shows a more efficient interpretation of the same two locales from FIG. 71, in which the locale labeled 'crystal' is recognized as six crystal facet features from FIG. 73, and the locale labeled 'kite' is recognized as five kite features from FIG. 73. By eliminating the mid-level concept of 'flying thing' from FIG. 74, the kite features which did not belong with crystal facets can be incorporated together under a single node 'kite' in FIG. 75. As in FIG. 74, the 'kite' and 'crystal' subtrees are grouped together under a single subtree 'picture' in FIG. 75, so that an overall efficiency number can be calculated.

There are only two sources of inefficiency in FIG. 75. First, the node 'crystal' has six direct inheritors instead of the optimal five. Second, the node picture has only two direct inheritors instead of the optimal five, and its two directly inheritors differ slightly in population, causing a slight abstractness deviation. By greatly reducing the number and severity of sources of inefficiency in FIG. 74, the inefficiency of 'picture' in FIG. 75 is only 1.683 (rounded to three decimals) making the interpretation in FIG. 75 greatly preferable to the interpretation in FIG. 74. This reflects the fact that in pictorial terms, it is more meaningful to see a kite (in the sky) and a crystal (on the table) than to see a crystal attached to a kite-tail and kite-string (in the sky) and tail-less kite (on the table).

Even finer shades of meaning can be graded using the method of the present invention. Optical illusions provide good test cases for grading alternative interpretations of pictorial features. In the middle of the picture of FIG. 71, there are a pair of human silhouettes labeled 'man-a' and 'man-b'. The faces of these paired silhouettes contain features of paired forehead, nose, mouth and chin shapes, which are exactly the same geometry as features which compose the pedestal in the lower right side of FIG. 71. Consequently, the pedestal as shown can be seen as an optical illusion in which the two sides of the pedestal may be instead have meaning as a pair of faces facing each other.

Figure 76:
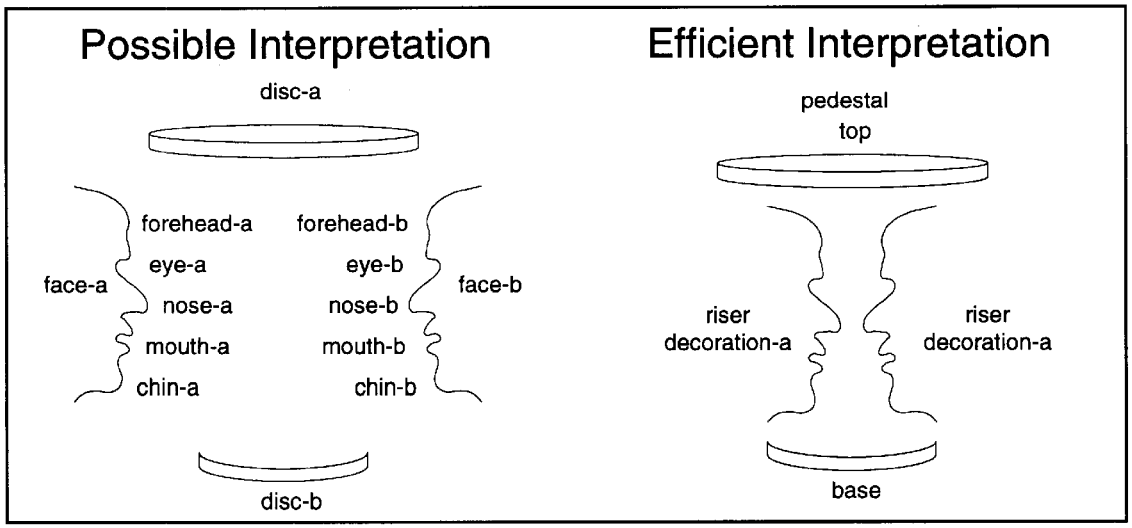
FIG. 76 shows the two competing interpretations of the pedestal portion of FIG. 71.

FIG. 76 shows the exemplar features which a visual pattern matcher can use to detect the features composing a face (on the left side of the drawing) and a pedestal (on the right side). To make a complete analysis of the features in the pedestal locale of FIG. 71, 'disc-a' and 'disc-b' features are included as exemplars (on the left side of the drawing) and pedestal 'riser decoration-a' and 'riser decoration-b' features are included as exemplar features (on the right side). The 'disc-a' and 'disc-b' features (on the left side) have a similar geometry to the 'pedestal top' and 'base' features respectively (on the right side).

Figure 77:
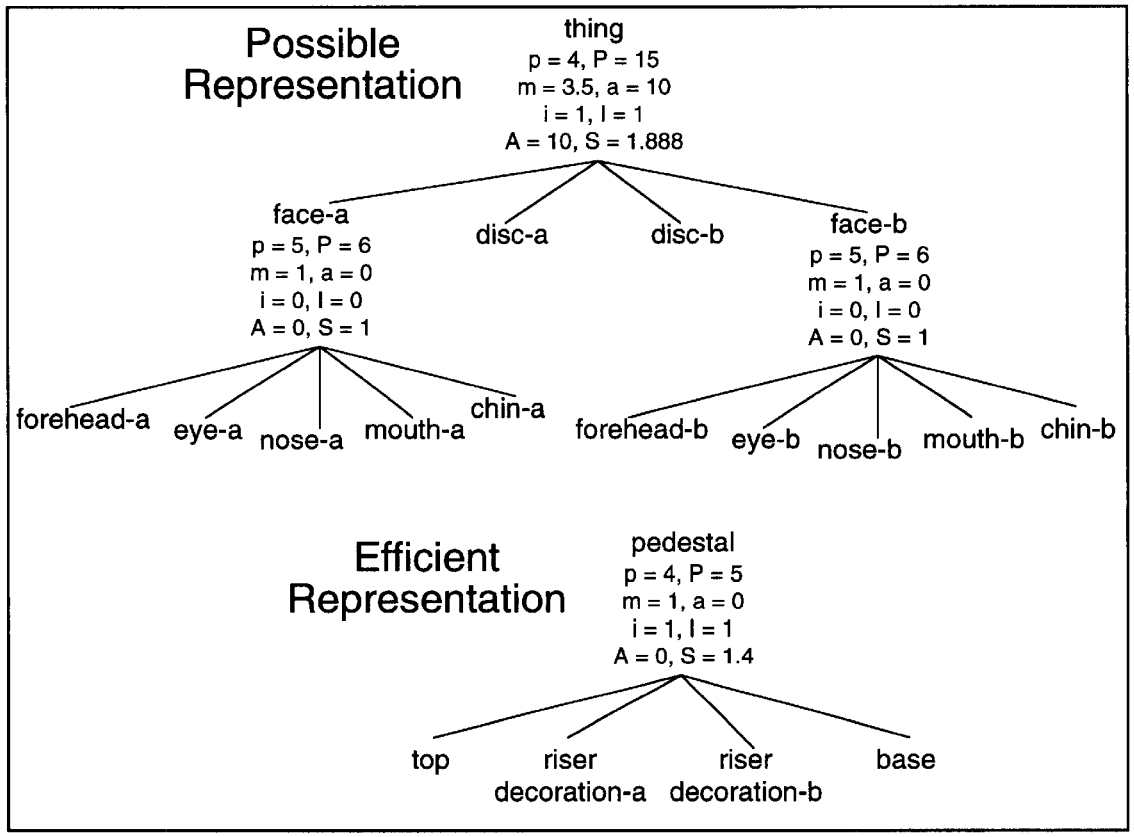
FIG. 77 shows how the preferred interpretation from FIG. 76 has the smallest overall calculated semantic inefficiency number 'S'.

FIG. 77 shows the semantic analysis trees and corresponding efficiency numbers for two optical illusion interpretations of the pedestal locale of FIG. 71. The upper part of FIG. 77 shows a semantic tree interpreting the pedestal locale as a pair of faces connected by a disc above the foreheads and connected by a disc below the chins. The lower part of FIG. 77 shows an alternative semantic network interpreting the same locale as a pedestal. The upper tree has inefficiency of 1.888 due mainly to the differing populations of the direct inheritors of 'thing', whereas the lower tree has inefficiency of 1.4 due the four direct inheritors of 'pedestal' (one less than optimal). The closeness in inefficiency between the upper and lower tree contrasts with the wide spread in inefficiency (3.994 versus 1.683) between FIG. 74 and FIG. 75. The closeness of inefficiency between the lower and upper semantic trees of FIG. 77 quantifies the viability of the optical illusion, in which the pedestal becomes a pair of faces. For semantic interpretations which are nearly equal in inefficiency, the viewer can alternate easily between one semantic interpretation and the other. Although the interpretation of the lower tree is slightly more desirable, that could be different if the picture had additional features which would interpret the 'disc-a' and 'disc-b' as belonging to some other object, removing them from the 'thing' subtree to zero the abstractness deviation of that subtree.

When people look at pictures, they can reference individual ambiguous features against the broader context of the picture's overall content, in order to more accurately recognize objects composed of ambiguous features. For example, the presence of the crystal on top of the pedestal in the pedestal locale of FIG. 71 lends credence to the interpretation of that locale as a pedestal, since one of the features inheriting from 'pedestal' in FIG. 72 is 'supported object'; the crystal can be a supported object grouped with the pedestal.

Figure 78:
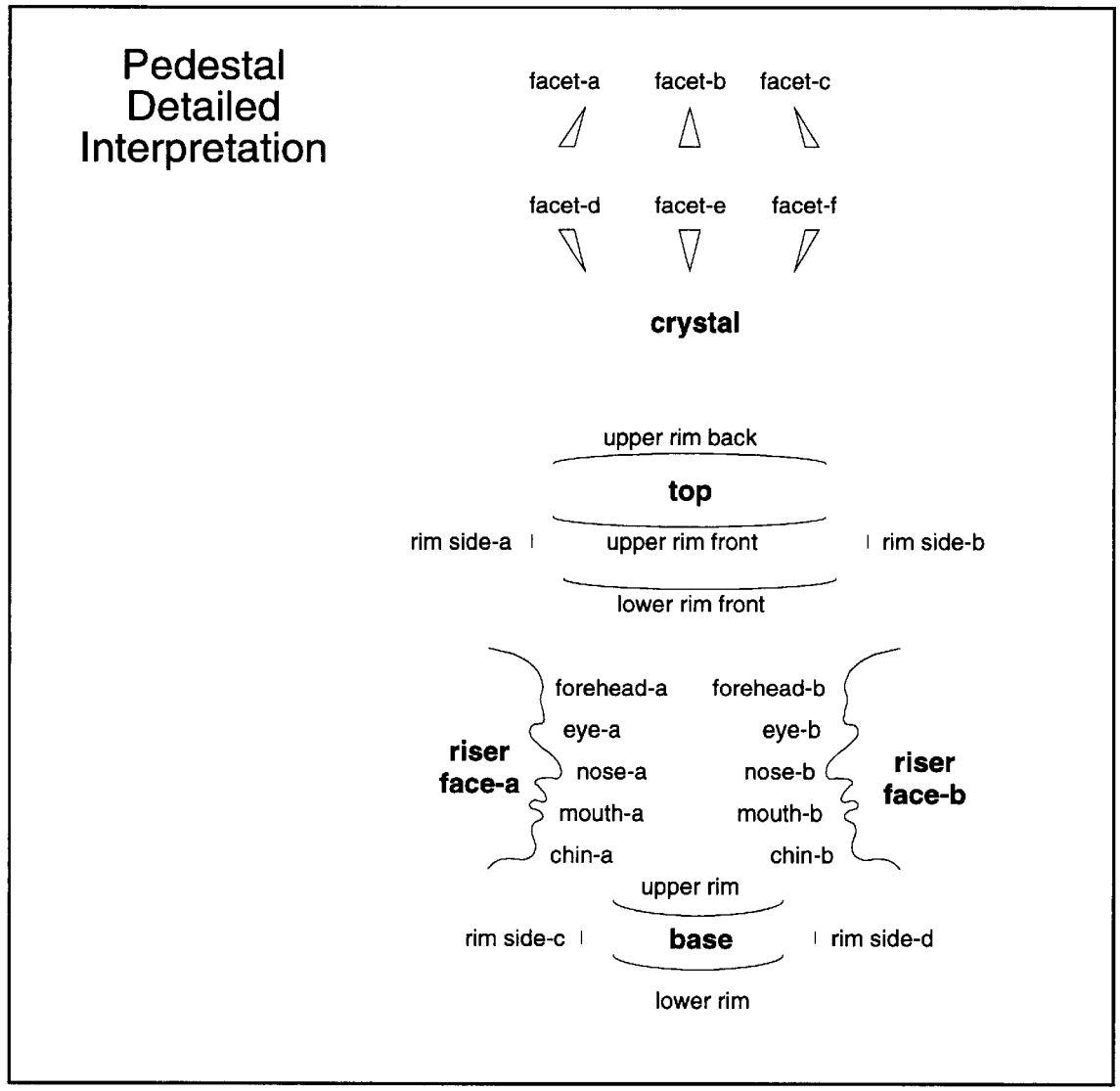
FIG. 78 shows how increasing the number of features sampled from FIG. 71 provides a semantic representation which has even greater efficiency, by adding the crystal's features to the tabletop and integrating the concept of a face into the concept of a table.

FIG. 78 shows the complete set of exemplar features which a visual pattern matcher can use to detect features composing a crystal supported by a pedestal. In the upper part of FIG. 78 are the crystal facet features, as in FIG. 73. In the middle of FIG. 78 are the rim features, which formerly were the pedestal top feature in FIG. 76. In the lowest part of FIG. 78 are the rim features which formerly were the 'base' feature in FIG. 76. The forehead, eye, nose, mouth and chin features from FIG. 76 are shown as riser face-a and riser face-b features in FIG. 78. When all these features are recognized together under a single semantic grouping, even more efficiency can be achieved than the lower tree of FIG. 77.

Figure 79:
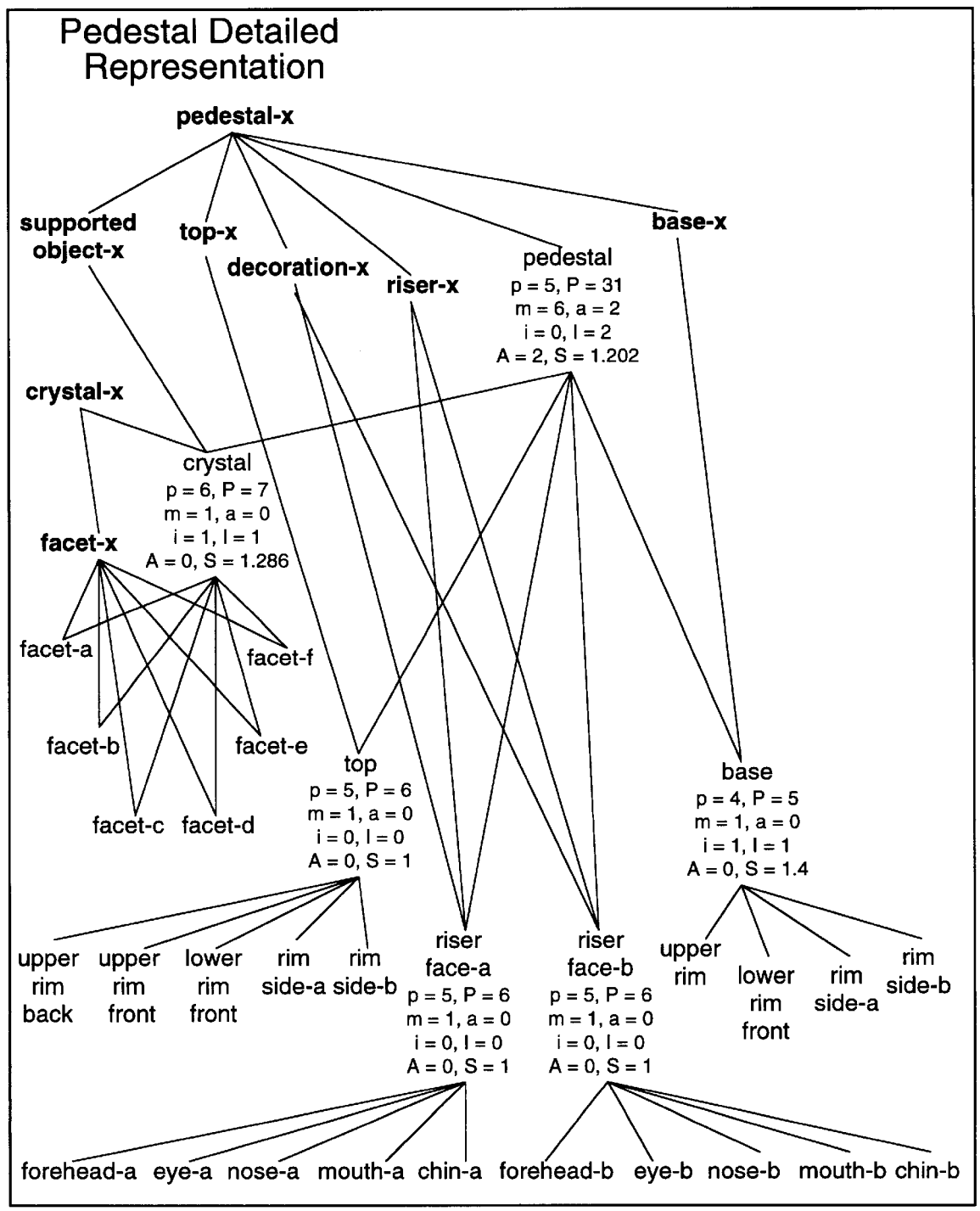
FIG. 79 shows the calculation of semantic inefficiency numbers for the interpretation of features in FIG. 78; the overall inefficiency of 'pedestal' has been reduced from 2 in FIG. 77 to 1.68.

FIG. 79 shows the features of the 'crystal' and 'pedestal' locales of FIG. 71 analyzed as a single semantic tree. The 'pedestal' node has an optimal number of direct inheritors: the 'crystal', 'top', 'face-a', 'face-b' and 'base' nodes. Each of these nodes also have optimal or nearly optimal numbers of direct inheritors. By interpreting the features of the 'crystal' and 'pedestal' locales into nearly optimal subtrees at all levels, the inefficiency of 'pedestal' in FIG. 79 in only 1.202 (rounded to three decimals), making it preferable to the interpretation of 'pedestal' in FIG. 77 which has a inefficiency of 1.4, and greatly preferable to the interpretation of 'thing' in FIG. 77 which has a inefficiency of 1.888. This reflects the fact that in pictorial terms, it is more meaningful to see crystal and face features combined at appropriate levels of detail into a single complex object, than to gloss over the analysis of the pedestal riser detail as in the lower tree interpretation of FIG. 77. By bringing forth an analysis of facial detail for the pedestal riser in FIG. 79, the efficiency of the 'face-a' and 'face-b' subtrees of the upper tree of FIG. 77 can be incorporated into the single complex object 'pedestal' in FIG. 79. In addition, the 'crystal' node adds credence to the 'pedestal' node in FIG. 79 by decreasing the direct inheritor deviation of 'pedestal'; without 'crystal' as a direct inheritor node, 'pedestal' would have a non-optimal number of direct inheritors.

The method of the present invention can also be used to analyze locales within pictures which are not composed of contiguous features. Any features which can be semantically related can be considered a locale; people often group together objects that have a common feature or common geometry. For instance, when looking at pictures of large parties, people will group members of a family together, even if they are not posing next to each other. When engineers examine pictures of buildings to inspect their structural integrity, they will group features of supporting structures together, even if they appear noncontiguous because they are mostly covered by non-supporting decorative structures.

Figure 80:
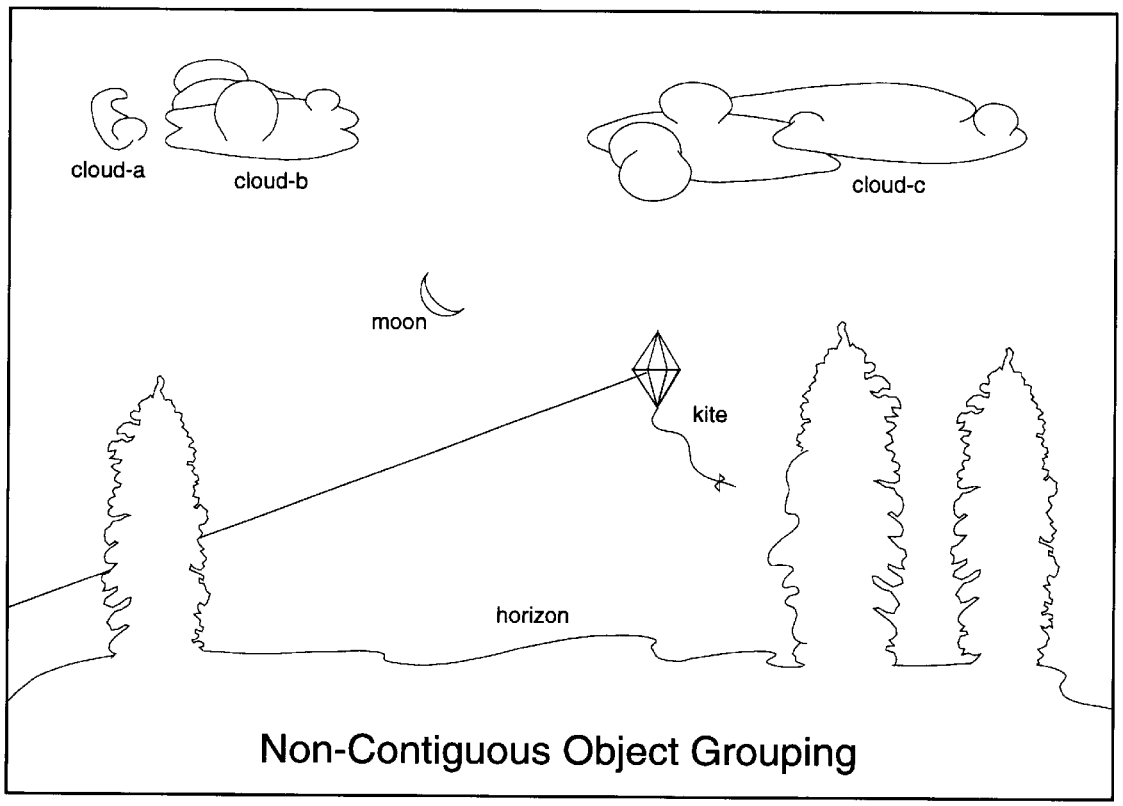
FIG. 80 shows how non-contiguous objects can be added to a grouping, to increase efficiency; this is similar to the way conversational context or focus symbols can be added to the interpretation of a sentence to increase efficiency.

FIG. 80 shows features from FIG. 71 grouped together because they occur above the horizon; they are features which compose objects which define or appear in the sky. It is difficult to define sky portions of outdoor pictures in terms of color, since skies vary greatly in color. Sky portions of pictures can be generally defined by the presence of a horizon boundary, which divides outdoor pictures into an upper sky portion above the horizon, and a lower earth portion below the horizon. In FIG. 80 the line labeled 'horizon' divides the picture this way; the outline of each of the cedar trees continues the horizon line upward from the ground and back down again, so that the cedar trees themselves are part of the lower earth portion of the picture.

Features appearing in the sky portion can be grouped together as sky objects; they are objects which appear to be floating in some sense, because they are not firmly connected to the earth, as are the cedar trees. These floating sky objects include the objects labeled kite, moon, cloud-a, cloud-b and cloud-c. A neural network or other image pattern matcher could be used to identify the disconnectedness of these objects relative to the horizon, and then they could be semantically recognized as 'sky' objects. As with any other analyzed group of objects, their semantic analysis tree would be optimized for efficiency.

Figure 81:
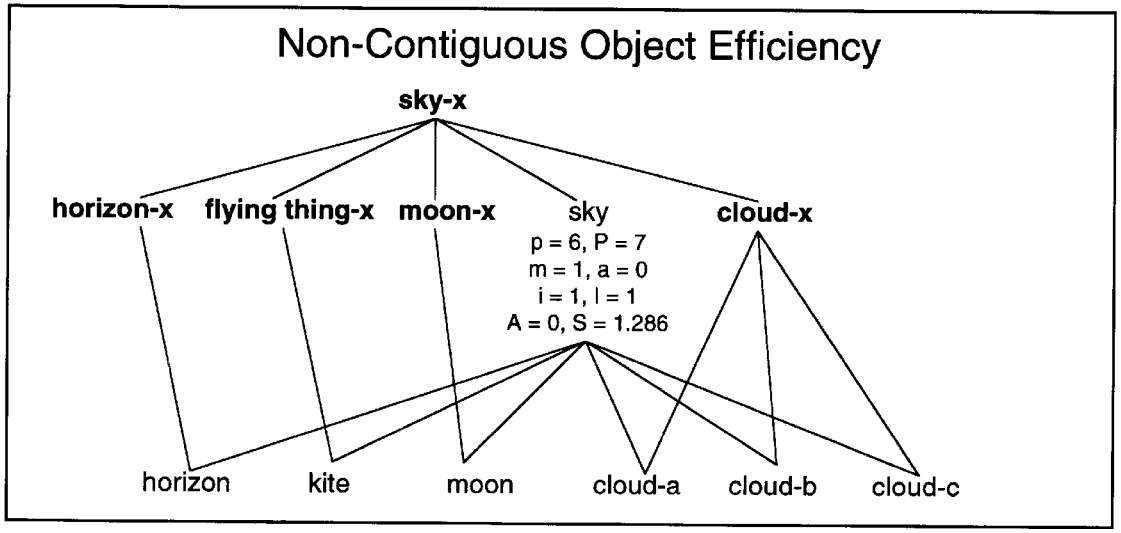
FIG. 81 show the calculation of inefficiency for the object 'sky' which is composed of non-contiguous objects which otherwise might not belong to any grouping, causing inefficiency in the interpretation of the overall picture from FIG. 71.

FIG. 81 shows the analysis tree of sky objects from FIG. 80, grouped under the node 'sky'. Since there is an almost ideal number of direct inheritors of 'sky', the inefficiency of 'sky' is a low 1.286 (rounded to three decimals). If there had been less objects in the sky, for instance if moon and kite had not been in the picture, an alternative analysis tree could have been created, made from individual features from the horizon, cloud-a, cloud-b and cloud-c locales. Just as in FIG. 79 where the individual facial features were added to the lower tree analysis of 'pedestal' from FIG. 77, additional features from the horizon locale in FIG. 80, such as the individual cedar tree outlines, could be used to create a more efficient analysis.

The analysis of text, sounds and images as described in FIG. 60 through FIG. 81 can be combined to cover a broad spectrum of complex applications. For instance, Web pages on the Internet contain pictures, sounds and text; each Web page could be analyzed for semantic content by combining semantic features of text, sounds and images under the semantic analysis trees optimized for efficiency. When searching a large number of Web pages this way, search feedback should take the form of pictures, sounds and text combined in a way that has maximal meaning to the person conducting the search. To confirm that such search feedback is satisfactory, a sophisticated conversation has to take place between the person and the semantic network system which analyzes Web pages. Prior art has limited these conversations to menu-style choices made by the person, or the person tweaking the search parameters at the level of keyword search in order to get a new set of search results. To reduce the human labor content in searching the Internet, the present invention defines an emotional vector space suitable for identifying Web page content which has a positive emotional value to the person conducting the search. This vector space describes the change in fluidity, which is the most central kind of circulation of value within the present invention, and three quantities most closely associated with change in fluidity. These quantities are conversational extent, as earlier described in FIG. 52, relative specificity, as described in FIG. 57, and motivational outlook, as described in FIG. 58. Each of these three quantities are emotional 'appraisal dimensions' as mentioned in Kaiser and Wehrle in their paper *Emotion research and AI: Some theoretical and technical issues*: These appraisal dimensions, together with the central value of change in fluidity provide a consistent basis for primary emotional values.

Figure 82:
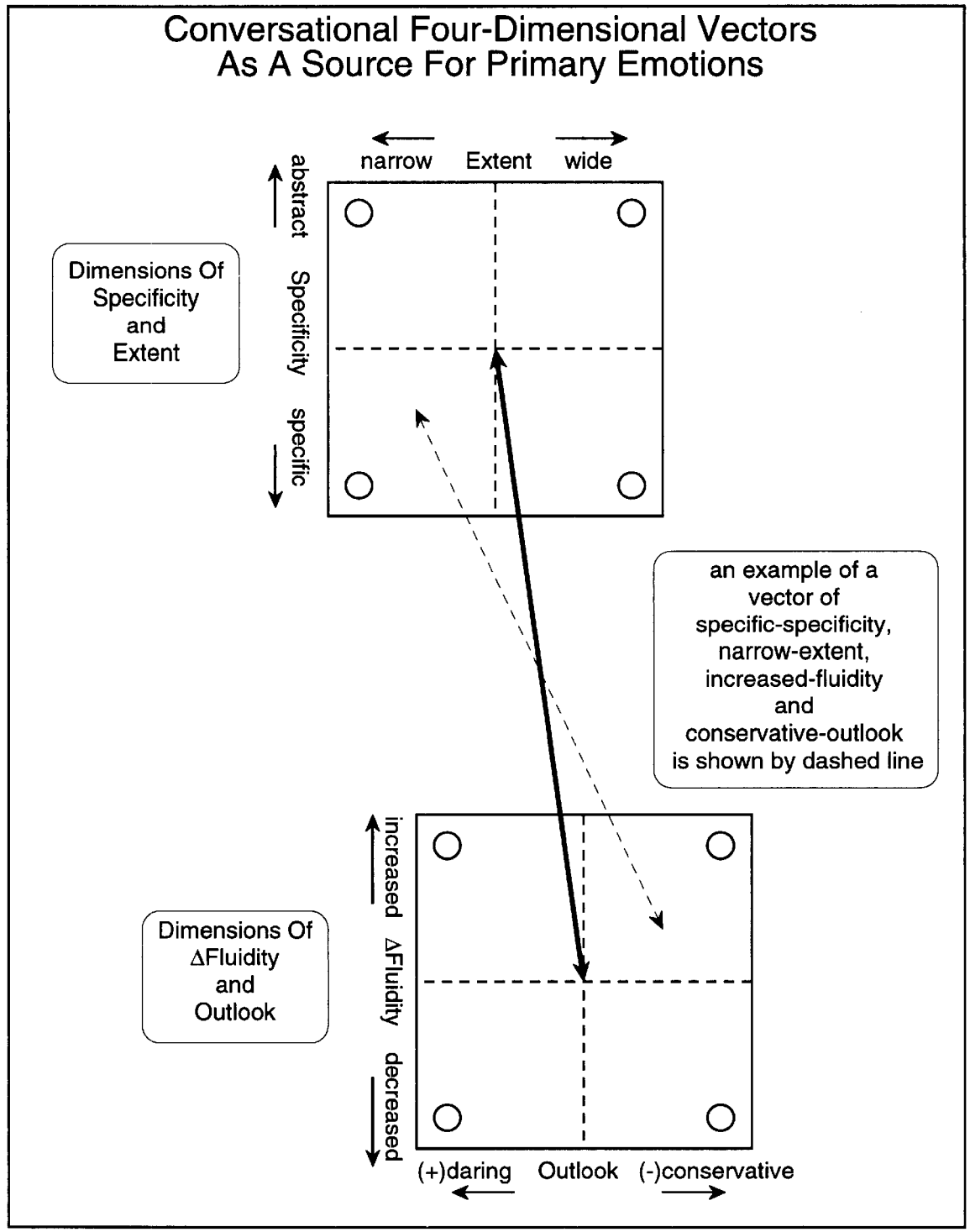
FIG. 82 shows a four-dimensional vector space flattened, for ease of presentation, into a two-dimensional drawing; the dimensions are extent, abstractness, Δfluidity, and outlook.

FIG. 82 shows a diagram outlining the four-dimensional vector space of specificity, extent, Δfluidity, and outlook. Since the diagram is drawn on a two-dimensional surface, the four dimensions of this vector space are represented in two independent planes linked by a bold vector line. Each of the two independent planes shows two of the vector's four dimensions; the bold line linking the two planes describes a single point in four-dimensional space. Each of the two planes contains dashed lines intersecting at the origin point (0,0) for that plane; the bold line linking the two planes is describing the origin point of the four-dimensional space since it connects the origin point of the two planes. This origin point of the four-dimensional space represents the vector of no-emotion, associated with an absence of emotion.

Each of the quadrants represents a specific emotional feeling. For instance, the lower left quadrant of the upper plane represents narrow extent combined with specific specificity, the points in this quadrant farther from the origin represent stronger emotional feelings. Similarly, the upper right quadrant of the lower plane represents increased fluidity and conservative outlook, the points in this quadrant farther from the origin represent stronger emotional feelings. By linking these two quadrants with a vector line, shown by the dashed line, a single quadrant of four-dimensional emotional space can be represented. The feeling of this four-dimensional quadrant of narrow extent, specific specificity; increased fluidity and conservative outlook can be characterized by a single word. This feeling could be called 'smoothness', to poetically reflect the vector's narrowness of extent, specific conservative nature and positive effect on fluidity. Similarly, the feelings corresponding to all other quadrants of the four-dimensional space could be labeled by words, to describe them semantically. Since there is a quadrant for every combination of the quadrants in the two planes, there are in all sixteen quadrants to be labeled in the four-dimensional space.

FIG. 83 shows examples of feeling labels given to these sixteen quadrants in the present invention. Although the sixteen quadrants are fundamental constructs from topology, it can be useful to label them with terms from English in order to relate them through semantic network links. They could also be labeled by terms from any other language, or by completely new semantic terms made from characters which do not appear in most languages, such as vertical bar '|' or backslash '\'. Since the meaning of semantic nodes is depending upon all the links which connect them to every other node in the semantic network, as semantic networks evolve, the semantic meaning of these labels will shift; in order for a semantic network to precisely describe the meaning of each of the sixteen quadrants, more than one label will have to be defined for each quadrant, so that an overall precise meaning is defined by successive approximation by individual labels. The labels given by FIG. 83 therefore are not definitive in a final sense, but are a starting point for accurate composite semantic description of primary emotions and feelings.

Since the topological central circulation of value within the present invention is change in fluidity, all the rows of the table in FIG. 83 are divided into two major groups of values according to fulfillment, which is described in the column headed by 'Fulfillment'. This column describes global fluidity relative to target value of a motivation or set of motivations. For instance, if the target value is 10, and the observed fluidity is 9, the fulfillment is −1; if the observed is 11, the fulfillment is +1. The upper group of rows have a positive fulfillment marked by a 'P' in this column, whereas the lower group of rows have a fulfillment marked by an 'N'. The upper group of rows describe quadrants labeled as positive feelings, because positive fulfillment is the internal hedonistic fundamental purpose of the system; the lower group of rows describe quadrants labeled as negative feelings, because negative fulfillment is internally undesirable.

Each of the rows of positive feelings of FIG. 83 belong to two subgroups according to motivational outlook, with values of 'D' and 'C' in the column 'Outlook' which is the quantity described in FIG. 58. The rows labeled 'D' have daring outlook, whereas the rows labeled 'C' are have conservative outlook. The rows of negative feelings are similarly divided into 'D' and 'C' subgroups. The daring feelings, whether observed Δfluidity is positive or negative, are associated with an expected target value improved fluidity; conservative feelings, whether Δfluidity is positive or negative, are associated with an expected target value of deteriorated fluidity.

Each of the classification row of FIG. 83 also belong to two subgroups according to conversational specificity, with values of 'S' and 'P' in the column 'Specificity' which is the quantity described in FIG. 57. The rows labeled 'S' have are more specific than average, whereas the rows labeled 'A' are more abstract than average. The specific feelings, whether positive, negative, conservative or daring are more localized than their corresponding abstract feelings. For instance, 'choosiness' is more localized than 'sensibility', and 'naivete' is more localized than 'disillusionment'.

Every classification rows of FIG. 83 also belongs to one of two subgroups according to conversational extent, with values of 'N' and 'W' in the column 'Extent' which is the quantity described in FIG. 52. The rows labeled 'N' have are associated with conversations narrower than the average conversational extent, whereas the rows labeled 'W' are associated with conversations that are wider than the average conversational extent. The feelings with wider extent, whether positive, negative, conservative, daring, specific or abstract are more complex than their corresponding narrower feelings. For instance, 'comprehensiveness' is more complex than 'choosiness', and 'disorientation' is more complex than 'error'.

Each of the positive feelings is observed when motivations deliver a greater fluidity than their expected target. In such cases, greater priority can be given to these motivations, seeking further enhancements in fluidity. Each of the positive daring feelings can be given process labels symbolizing their enhancement process: enhanced sweetness is the process of perfecting, enhanced expansiveness is the process of enlightenment, enhanced pleasure is the process of patience, and enhanced joy is the process of romance. Similarly, each of the positive conservative feelings can be given emotional process labels symbolizing their enhancement process: enhanced sensibility is the process of wholesomeness, enhanced comprehensiveness is the process of elegance, enhanced choosiness is the process of determination, and enhanced clearness is the process of precision.

Each of the negative feelings is observed when motivations deliver a lesser fluidity than their expected target. In such cases, means to correct the system must be activated, both to lower their expected targets and to seek alternative or create new motivations for activation. Since negative feelings result from some kind of imbalance, either in fluidity or awareness, the processes which correct negative emotions are a way of achieving better balance. Each of the negative daring emotions can be given process labels symbolizing their balancing process: balancing bitterness is the process of thankfulness, balancing disillusionment is the process of realization, balancing pain is the process of flexibility, and balancing naivete is the process of studiousness. Similarly, each of the negative conservative feelings can be given emotional process labels symbolizing their balancing process: balancing annoyance is the process of adaptability, balancing disorientation is the process of principledness, balancing error is the process of understanding and balancing confusion is the process of carefulness.

The conversations described by FIG. 10 through FIG. 12 can be emotionally mapped using the criteria described in FIG. 82 and FIG. 83, even though these criteria are designed for sets of motivations which simultaneously drive many conversations. By providing fixed approximate values for global conversational average abstractness and extent, as well as a fixed value for the targeted fluidity, the emotional quality vectors of a single conversation can be approximated.

FIG. 84 shows an example of equations for approximating the emotional quality vectors for the single conversation described by the dialog in FIG. 25. The quantities of relative specificity, relative extent, initial global rigidity, global rigidity and global outlook can all be approximated to show the effect of a single conversation on emotional vectors for a complete semantic network system.

Relative specificity is usually calculated as a deviation from average conversational specificity as shown in FIG. 57; for approximation purposes the global average abstractness over all network nodes can be set to an estimated constant of 30, since this number is only slightly affected by any one conversation's activity. The relative specificity, which normally would be averaged over all active motivations' conversations can then be approximated for the single active conversation described by FIG. 25 by the 'relative specificity' equation marked by the bold numeral 1 in FIG. 84; the specificity extent will be approximately 30 minus the conversational abstractness.

Relative extent is usually calculated as a deviation from the average extent over all conversations, including both active and inactive conversations, as shown in FIG. 52; for approximation purposes the average extent over all conversations can be set to an estimated constant of 20. The relative extent, which would normally be averaged over all active motivations' conversations, can then be approximated for the single active conversation described by FIG. 25 by the 'relative extent' equation marked by the bold numeral 2 in FIG. 84; the relative extent will be approximately the conversational extent minus 20.

Global rigidity and initial global rigidity are usually calculated for all active motivations' conversations; it can be approximated for the single active conversation of FIG. 25 by the rigidity of that one conversation, as defined by FIG. 51, based on the conversation's inefficiency, complexity and capacity deviation. For approximation purposes, the capacity deviation factor can be a constant of one (the ideal) because the amount of memory consumed by the conversation of FIG. 25 will only slightly affect the amount of free space in a large semantic system. Thus, as shown by the equation marked by the bold numeral 3 in FIG. 84, the initial global rigidity will be [ri]84.15 as shown inheriting from the rigidity tag in FIG. 10.

The subsequent global rigidity numbers, as shown by the equation marked by the bold numeral 4 in FIG. 84, will be [ri]69 as shown inheriting from the rigidity tag in FIG. 11, and [ri]56.55 as shown inheriting from the rigidity tag in FIG. 12. These changes in global rigidity are expected by the motivational outlook which authorizes the conversation; a positive, favorable outlook corresponds to a drop in rigidity, whereas a negative outlook corresponds to a rise in rigidity. For approximation purposes, an example of motivational global outlook can be a constant of 13, as shown by the 'global outlook' equation marked by the bold numeral 5 in FIG. 84. Usually, the global outlook is a fluctuating quantity; when motivations are activated their outlooks are included in the global average, and when motivations are deactivated, their outlooks are excluded from the global average. In variations of the present invention, motivational outlooks can also fluctuate during a motivation's attention span of activity, reflecting frequent re-estimates of the effect of the motivation's activity on global rigidity. However, for simplicity, the global outlook is approximated as a constant in FIG. 84.

The degree to which a motivation has succeeded is described by fulfillment of its expected motivational outlook. When rigidity drops, as it does from FIG. 10 to FIG. 11 to FIG. 12, motivational outlook is being fulfilled. When the drop exceeds the outlook, the fulfillment becomes positive, when the drop is less than the outlook, the fulfillment is negative. This relationship, expressed by the equation marked by the numeral 6 in FIG. 84, is true both as an approximation and as an accurate quantification of fulfillment in the present invention. Fulfillment, quantified in this manner, keeps track of how well each active motivation has lived up to its expected outlook.

FIG. 85 shows the shifting of emotional values for the conversational dialog in FIG. 25. The numbered dialog stages shown in bold numerals correspond to each exchange of dialog from FIG. 25. The rigidity, fulfillment, relative specificity and relative extent numbers for stage 1 come from FIG. 10; these same numbers for stage 2 come from FIG. 11 and the same numbers for stage 3 come from FIG. 12. The numbers from stages 4 through 10 come from changes to the nodes of the FIG. 12 conversational subtree corresponding to the dialog of FIG. 25; for simplicity these changes have not been shown in any diagram.

In stages 1 through 3, the rigidity drops, mainly because need for complexity is being satisfied, but also because the efficiency has increased by adding focus and analysis nodes. This drop in rigidity shifts fulfillment from an initial negative value to a solidly positive value. At the same time, relative specificity drops from a positive 10 to a negative 1, because of the linking of highly abstract terms such as 'verb'. Relative extent has increased from negative 14 to negative 8, because of the added focus and analysis nodes.

In stages 4 through 6, rigidity drops and then increases again; now that need for complexity has been satisfied, the adding more nodes to the conversational tree has the effect of increasing instead of decreasing conversational rigidity. In order for the conversational rigidity to continue dropping, either the node population has to be reduced, as shown in FIG. 55 or FIG. 56, or the input streams have to be re-parsed for much greater efficiency. FIG. 85 shows the effect of doing neither, and simply allowing rigidity to rise again. Since there is a surplus of fulfillment, the rigidity can rise for a while without causing negative fulfillment and its associated negative emotions. In stages 7 through 9, rigidity rises because of nodes added to the conversational analysis subtree, reducing fulfillment to only 1.15 in stage 9. In stage 9, further nodes are added to the analysis subtree for linking the phrase 'output'. These extra nodes increase rigidity to 80 in stage 10, causing a negative fulfillment of 8.85, the first negative fulfillment since stage 1.

In stage 4, relative specificity continues to drop as it did in stage 3. This caused by the addition of other abstract terms to the conversation, related to abstract terms for gathering information about 'verb'. However, as more and more of the specific information is gathered for the new verb 'hello', the new specific nodes created to describe 'hello' each increase the specificity of the conversation. In stage 5 the specificity increases back to negative 1, and in stage 6 specificity increases to 2. These increases continue through stage 10 where relative specificity becomes 6, reflecting all the specific information gathered about the new verb 'hello'.

In stage 4, relative extent continues to rise as it did in stage 3, due to the analysis nodes added to the conversation to parse the input phrase 'hi there' from stage 3. Since analysis nodes are added in each stage from 4 to 10, the relative extent continues to increase at an almost constant rate, reaching 13 in stage 10.

Using the labels for feelings as defined in FIG. 83, feeling labels can be attached to each stage in FIG. 85. Since outlook is approximated using a constantly positive value of 13, it is only the changes in fulfillment, specificity and extent which cause shifts in which feeling label can be applied. In stage 1, the negative fulfillment, positive specificity and negative extent correspond to a label of 'pain'. Since the magnitudes of each of the vector dimensions is moderate, the strength of that feeling is shown as 'moderate' (underlined). The appropriate process for dealing with the emotion of 'pain' is flexibility (italicized). Since 'learning' is a kind of flexible process, no change in the focus is needed to add the process of 'flexibility' to the conversation.

In stage 2, the positive fulfillment, positive specificity and negative extent correspond to a label of 'pleasure'. Since the magnitudes of most of the vector dimensions are slight (except for outlook which is moderate), the strength of that feeling is shown as 'slight' (underlined). This slight feeling of 'pleasure' mainly reflects satisfaction of conversational need for complexity. The appropriate process for dealing with the emotion of 'pleasure' is patience (italicized). Since learning can be a kind of patient process, particularly when it involves a step-by-step dialog to identify semantic structure for the new verb 'hello', no change in the focus is needed to add the process of 'patience' to the conversation.

In stage 3, the positive fulfillment, negative specificity and negative extent correspond to a label of 'sweetness'. Since the magnitudes of most of the vector dimensions are slight (except for fulfillment and outlook), the strength of that feeling is shown as 'slight' (underlined). This slight feeling of 'sweetness' mainly reflects continued satisfaction of need for complexity, as well as the slightly specific nature of the information about the new verb 'hello'. The appropriate process for dealing with the emotion of 'sweetness' is perfecting (italicized). Since learning can be a perfecting process, particularly when it is optimized for creating efficient semantic trees, no change in the focus is needed to add the process of 'perfecting' to the conversation.

In stage 4 and stage 5, the same positive fulfillment, negative specificity and negative extent continue to correspond to a label of 'sweetness'. Since the magnitudes of most of the vector dimensions are slight (except for fulfillment and outlook), the strength of that feeling continues to be 'slight' (underlined).

In stage 6, the fulfillment is still positive, but the specificity and extent are now also positive, corresponding to a label of 'joy'. Since the magnitudes of most of the vector dimensions are very slight (except for fulfillment and outlook), the strength of that feeling is shown as 'slight' (underlined). The appropriate process of dealing with the emotion of 'joy' is romance, meaning a continued delving into the complexity which produced the joy. Since 'learning' is already a kind of delving into complexity, no change in the focus is needed to add the process of 'romance' to the conversation; at the same time, the process of 'romance' gambles more than the process of 'perfecting' on the future value of learning, hence it allows a greater slippage in fulfillment before changing the learning approach.

In stage 7 and stage 8, the fulfillment slips further to 11.15 but remains positive, while specificity and extent increase slightly, also remaining positive. The corresponding emotional label remains 'joy', but with the increase in specificity and extent the strength of that feeling is shown as 'moderate' (underlined). The process for dealing with 'joy' is a again romance.

In stage 9, the fulfillment slips to a very low 1.15 but remains positive, while specificity and extent increase slightly again, also remaining positive. The corresponding emotional label remains 'joy', but with fulfillment almost nil, the strength of that feeling is shown as 'very slight' (underlined). In stage 10, the fulfillment drops to a negative 8.85, while specificity and extent rise slightly again, also remaining positive. The corresponding emotional label is the negative emotion 'naiveté', and since all of the vector dimensions are moderate in magnitude, the strength of that emotion is shown as 'moderate' (underlined).

The appropriate process for dealing with naivete is studiousness, meaning a careful examination of the pros and cons of the process which resulted in the feeling of naiveté. At this point, as part of the process of studiousness, the conversational subtree of 'learning' would be analyzed, to determine that its analysis subtree size was beyond the need for complexity. The analysis subtree would then be reduced in size, using a method similar to that shown in FIG. 56, in which a few new nodes are created to subsume most of the analysis nodes, thereby reducing the population of the analysis subtree to a size optimal for complexity.

Figure 86:
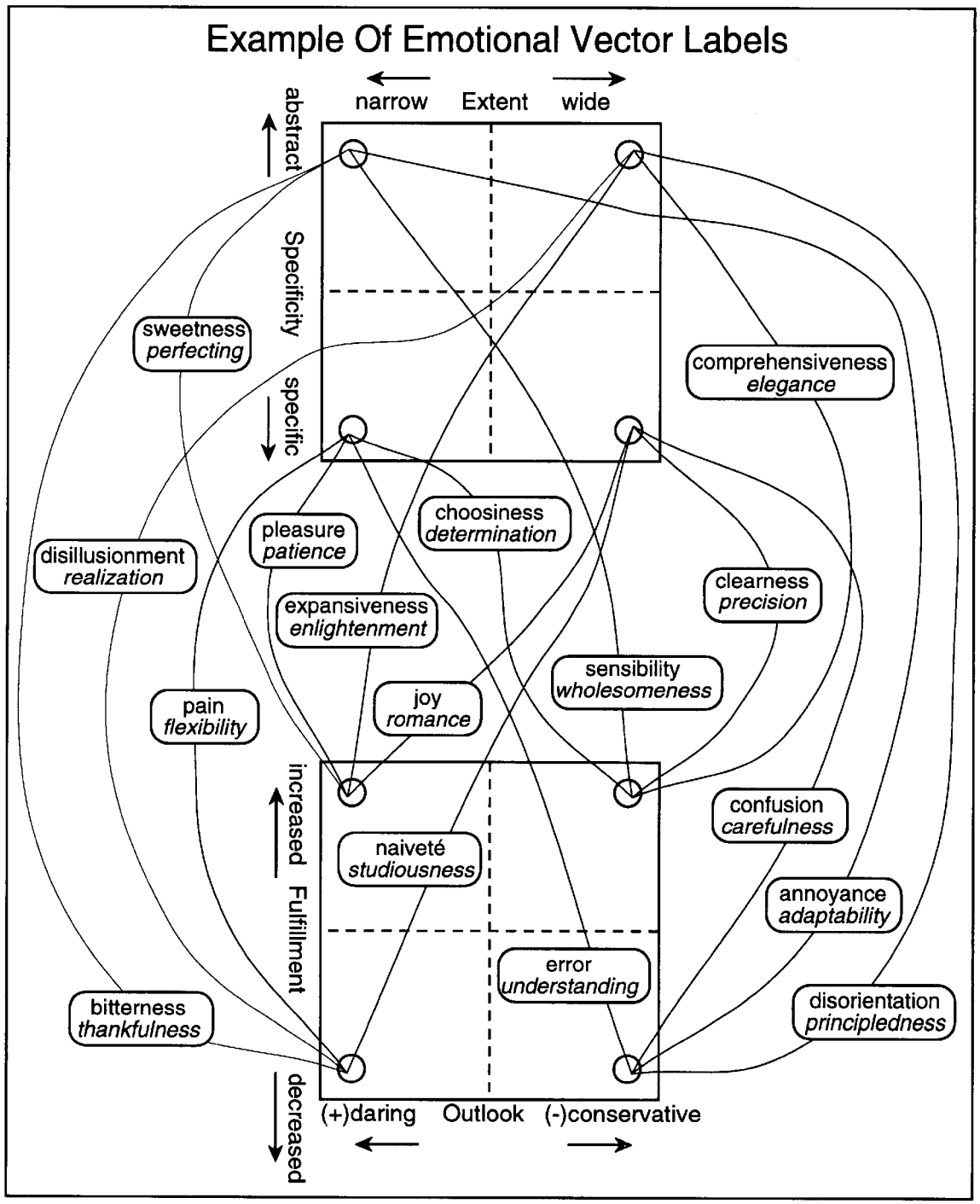
FIG. 86 shows an example a mapping of specific emotional labels from FIG. 83 onto a flattened four-dimensional vector diagram from FIG. 82; the mapping shows the relative positions of these emotions in that vector space.

In a graphical user interface for displaying the emotional shifts in stage 1 through stage 10 of FIG. 85, the magnitudes of each of the vector dimensions are important to display, in order to give feedback to users of the present invention. FIG. 86 shows a visual map of the four-dimensional emotional vector space, using labeled lines to connect two-dimensional points of Specificity-Extent space to two-dimensional points of Fulfillment-Outlook space. These sixteen labels identify a Cartesian product of each of the four quadrants of Specificity-Extent space paired by a connecting line with each of the four quadrants of Fulfillment-Outlook space. Unfortunately, as can be seen in FIG. 86, depiction of a four-dimensional space by flattening it into a paired of two-dimensional space results in a complex visual image.

For simplicity, it may be necessary to use color to represent one of the four dimensions, and intensity of color to represent one of the dimensions, so that the four-dimensional vectors can be displayed on conventional computer monitors without using connecting lines.

Figure 87:
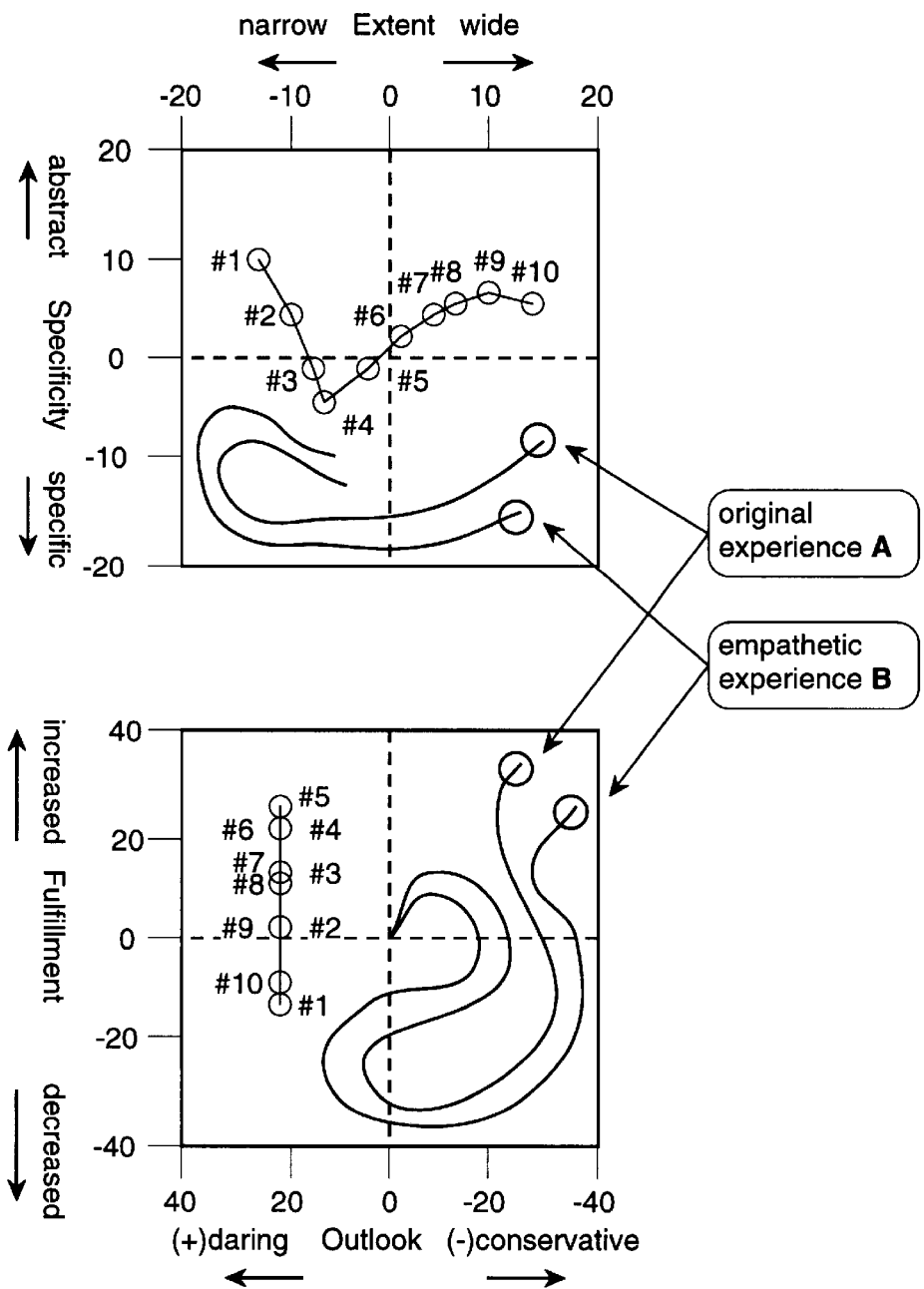
FIG. 87 shows how the shifting four-dimensional vector of the conversation in FIG. 85 can be mapped into the flattened four-dimensional vector diagram from FIG. 82; the mapping shows how the conversation shifts emotionally from points labeled #1 to #10 during the development of the conversation.

FIG. 87 shows the emotional shifts for stage 1 through stage 10 from FIG. 85 plotted on a flattened four-dimensional vector drawing similar to FIG. 86. FIG. 87 uses numbered labels rather than lines for associating points in Specificity-Extent space to points in Fulfillment-Outlook space, so that the emotional vector for stage 1 is marked by points labeled #1 in both the Specificity-Extent space and the Fulfillment-Outlook space; emotional vectors for each numbered stage in FIG. 85 are marked by points labeled by the corresponding number in both the Specificity-Extent space and the Fulfillment-Outlook space in FIG. 87.

Since extent and specificity both initially decrease and then gradually increase for stage 1 through stage 10 from FIG. 85, when plotted on the Specificity-Extent coordinates of FIG. 87, the values for each stage suggest the v-shaped line connecting points labeled #1 to #10. At the same time, the rising and then falling fulfillment values for stage 1 through stage 10 from FIG. 85 plotted on the Fulfillment-Outlook coordinates of FIG. 87 suggest a straight line, since the approximated outlook does not vary from a value of 13. In a fully operational version of the present invention, the global outlook would actually vary, due to the activation and deactivation of various other motivations.

In order to fully characterize emotional shifts, the set of emotional vectors shown in FIG. 87 can be quantified as paths through the four-dimensional vector space of emotion, in the present invention. These shape and orientation of these paths characterize the overall flavor of the conversational emotion over the attention span of their driving motivations. Conversations having only slight deviations from the paths plotted for FIG. 85 would occur only in semantic networks with similar feeling; this similarity of feeling corresponds to the concept of empathy. For instance, the dialog FIG. 25 shows the semantics of the verb 'hello' being taught to a semantic system; if the verb 'hello' were taught, as a similarly brand-new verb, to a second semantic system by the first semantic system, a similar emotional vector path in the second system would be generated by methods of the present invention. However, if the verb 'hello' were already known, the teaching of the meaning of 'hello' would build upon already existing, more abstract classifications, so that at least the specificity would be less, thus shifting the emotional values downward from the path of points #1 to #10 in FIG. 87. The degree to which the second system empathizes with the first system would be the summed deviations between the points plotted for the second system (not shown) and the path of points #1 to #10 in FIG. 87.

The concept of empathy can generally be quantified by summing the deviations in emotional vectors during dialog interactions on similar topics, such as learning about the verb 'hello'. In FIG. 87, the curved lines marked by 'original experience A' show an example of an emotional shift which begins as a fulfilled conservative feeling, progresses to an unfulfilled conservative feeling, then to an unfulfilled daring feeling, and finally becomes a fulfilled, slightly conservative feeling. The curved lines marked by 'empathetic experience B' shows an example of a similar experience from another semantic system, which for the most part closely tracks the emotional vectors generated by experience A. The degree of empathy can be quantified as the aggregate distance of experience A's line from experience B's line, or by the point-by-point distance of each point of experience A from the temporally or sequentially corresponding point of experience B. Since all emotional vectors are related to change in fluidity, which is the topological central circulation of value within the present invention, similar emotion paths are significant regardless of the semantic abstractions they are conversationally involved with. This ability to universally quantify empathy is another important feature of the present invention, which will be later discussed in the context of verifying the accuracy of network communications.

Figure 88:
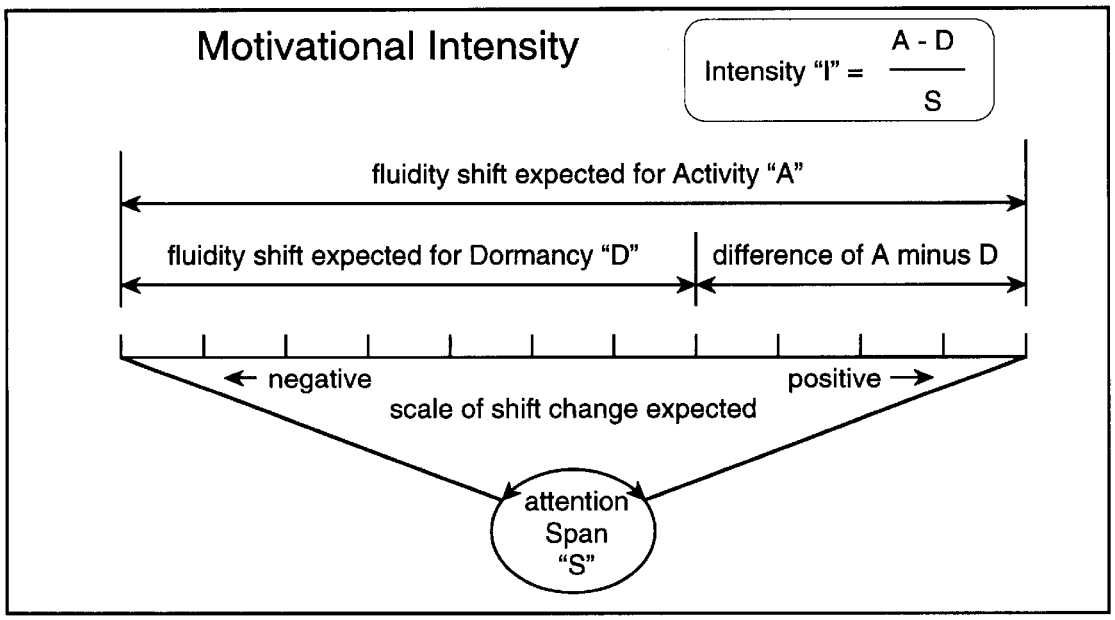
FIG. 88 shows how motivational intensity can be defined in terms of expectations about change in fluidity caused by a particular motivation; this definition of intensity can be used to prioritize motivations.

The universal significance of the topological central circulation of value within the present invention also provides a method for optimizing the priority of motivations. Semantic motivations drive all actions within the present invention, since they activate conversations which in turn activate abstract operators, as earlier outlined in FIG. 5. Since a variety of motivations may be active at any one time within a semantic system, some means to prioritize them is necessary, so that processor power can be correctly allocated. The need to prioritize motivations in the present invention is similar to the need to prioritize multi-tasking threads in traditional computer operating systems; if priorities are poorly assigned, the system may stall important emergency motivations in favor of unimportant mundane motivations. In traditional computer operating systems, badly set priorities are generally adjusted by hand, using passworded or similarly restricted priority override commands. Of course, these manual adjustments are labor-intensive to make, and only highly trained persons are qualified to make them. The current invention provides a more elegant, less laborious method for adjusting priorities, in which the universal significance of fluidity is used as a central value in determining the priority of active motivations. Rather than manually programming these priorities, they can be assigned in the basis of their ability to shift the system to greater fluidity, divided by the length of time that shift occurs. Motivations which achieve a greater shift, or the same shift over a smaller time interval are accorded a greater motivational intensity, as shown in FIG. 88. The shift in fluidity can be estimated by the outlook already assigned to the motivation, and the time interval over which that shift is expected can be estimated from the attention span already assigned to the motivation.

Since the outlook can be verified by measuring the difference between activating a motivation and leaving it dormant, the 'fluidity shift' in FIG. 88 is the shift measured by activating the motivation minus the fluidity for leaving it dormant, both over the same attention-span time interval. Verifications such as these are best done when the system is otherwise unoccupied, otherwise the measurements will be confused by the other activity. Since shortening the amount of time over which the fluidity shift occurs intensifies the motivation's value, the shorter the motivation's attention span, the greater the motivational intensity, as described by the equation in the upper right of FIG. 88, where motivational Intensity equals 'fluidity shift for Activity' minus 'fluidity shift for Dormancy', all divided by length of 'attention Span'.

By prioritizing according to Intensity, so that motivations with greater estimated Intensity are given more processor resources, all important emergency motivations can be given appropriately great processor resources. For instance, if conversational input were parsed as an emergency, the focus of the conversation would shift to that emergency by adding focal nodes which describe it, then these new focal nodes would link to dormant emergency motivations, activating them. In this manner, sudden disruptions in network communications links can be handled, as can important commands issued by persons using the semantic system.

Figure 89:
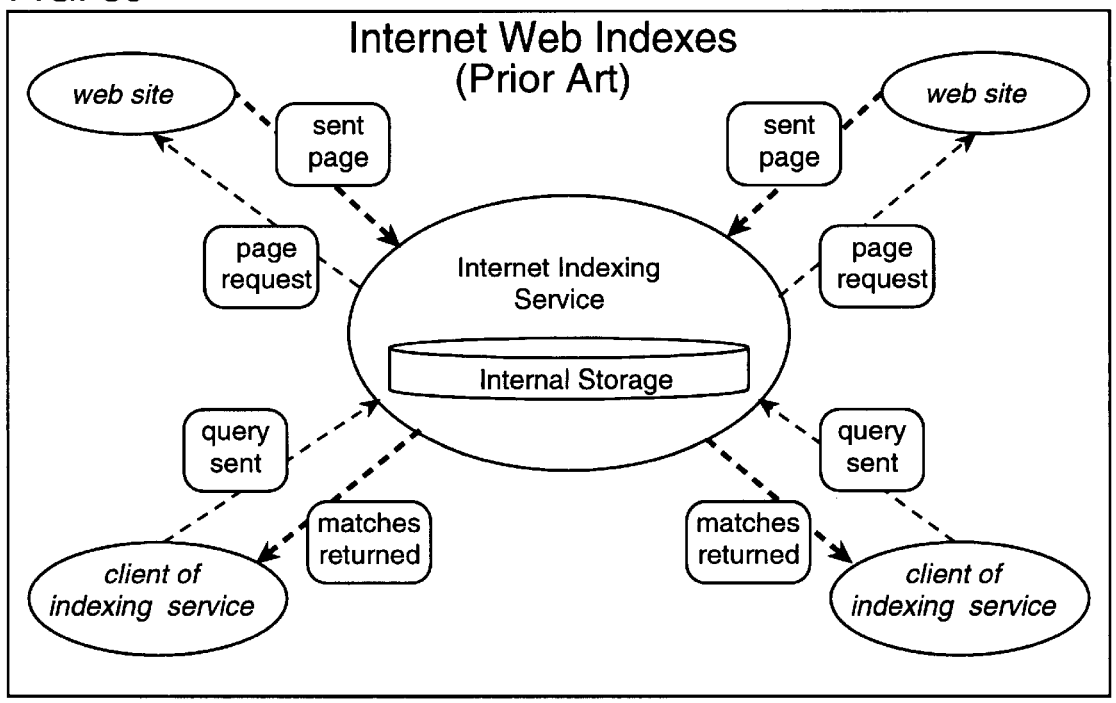
FIG. 89 shows how, in prior art, the Web pages of the Internet have been indexed by large centralized indexing services; these large central services are expensive to maintain and difficult to keep up-to-date with the many changes made to Web pages every day.

Many problems occurring with Internet Web searching applications can be solved by applying a combination of prioritizing motivations by intensity, and verifying transmission by detecting empathy. FIG. 89 shows a diagram of prior art, in which geographically dispersed clients access large centralized Internet search engine services which index web pages by their word content. Since queries consist only of logical combinations of words, the result sets which return from the search engines are often overly large, consisting of thousands of Web pages containing the queried combination of words. For instance, if a person had arthritis, and was curious to see if climate had a helpful effect on arthritis, they would be generally have to submit a logical query such as 'arthritis and better and warmer and climate'. This query could return many unwanted Web pages, describing such as events as nursing conventions which previously convened in Minnesota but now convene in Florida because of the better climate, and where the nurses talked about care of patients having arthritis. In order to filter out such unwanted Web pages, all the pages returning could be quickly scanned by a semantic network reader, to a see if the reader's emotional vectors shift in a path characteristic of reading text which matches semantically to the analysis of a question such as 'What is the effect of climate on arthritis?'.

By eliminating the need to manually read search engine results sets, the labor content in searching the net can be greatly reduced, but an even better way to organize Internet information is possible, one which eliminates search engines and their result sets by storing information on the Internet in the form of distributed semantic systems in place of Web pages. Each business or individual which now sets up a Web page could instead be setting up a semantic system describing the same information as the Web page. Since the indexing methods of the present invention work on semantic topological characteristics common to words, sounds and images, the complete content of Web pages can be stored semantically. With such an architecture, semantic questions could be posted on the Internet, at the local service provider level, which is well connected to the computer which originated the posting. These local service providers can collect questions on similar topics, passing them in summary form via the Internet trunk service providers to other local service providers. The individual computers connected to these local service providers could then read the postings, to see if they have semantic knowledge which might satisfy any posted requests asked for semantic information. If so, they would reply to the postings, and the replies would be summarized by the local service providers and then passed back to the original posting computers. This architecture would replace the low-level traffic which currently dominates the internet with much higher-level descriptive requests and replies; only when information has been correlated semantically would it be passed in detail, to send actual pictures, sounds or texts.

Figure 90:
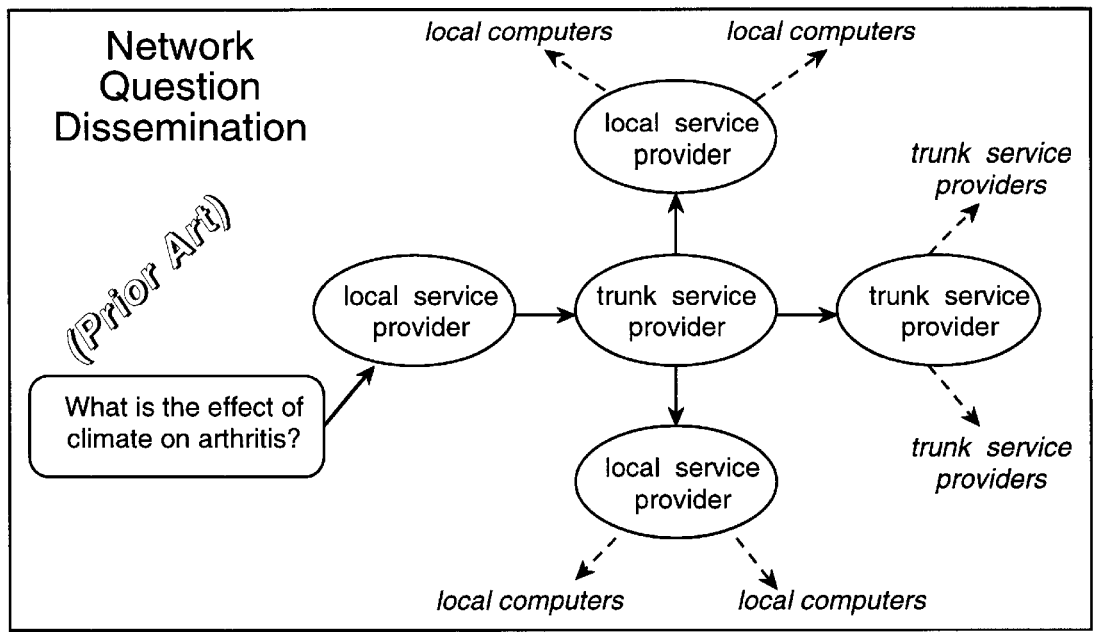
FIG. 90 shows an alternative to FIG. 89 for accessing indices to Web pages or other distributed Internet data; questions and requests for data can be disseminated by major service providers.

FIG. 90 shows a diagram of the movement of requests in the above architecture. On the left side of the diagram, a box contains the question from the originating computer: 'What is the effect of climate on arthritis?'. This question is passed, as indicated by the arrowed line, to the leftmost 'local service provider' shown in the oval circle. There is it is buffered with other questions from locally connected computers, before being passed in summary form to the 'trunk service provider' and onward, possibly via other 'trunk service providers' to other 'local service providers' who post all incoming questions, in summary forms. These summary forms of questions resemble the lists of 'Frequently Asked Questions' (FAQs) which, as prior art, are often posted in network-accessible computer bulletin boards.

Figure 91:
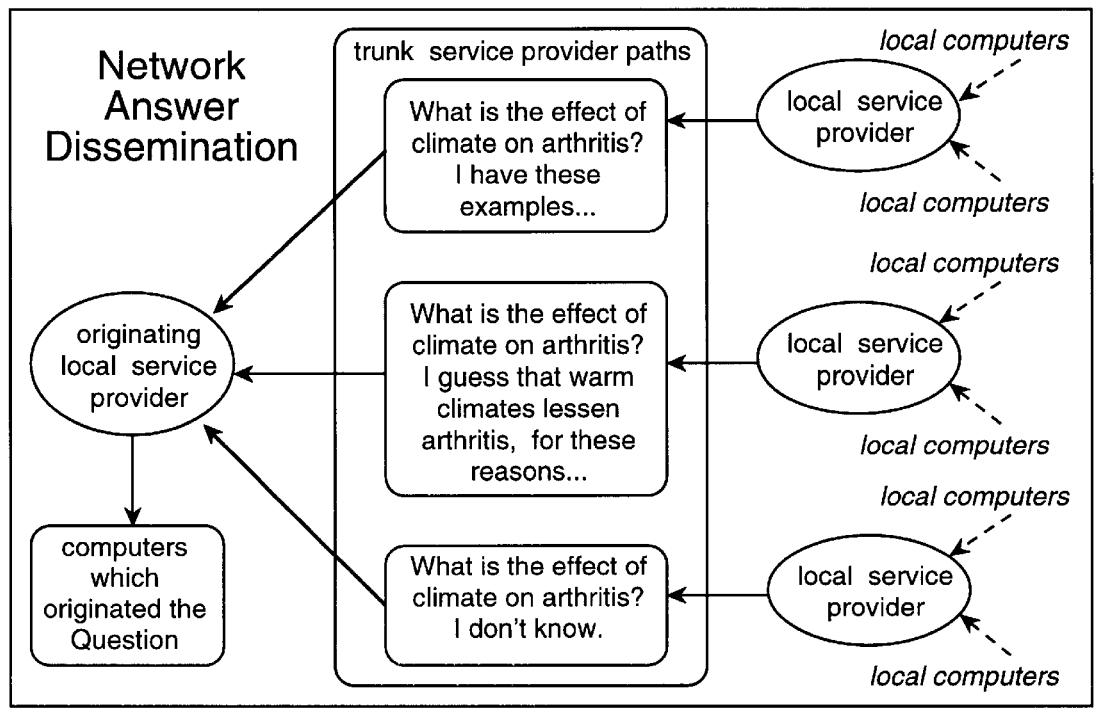
FIG. 91 shows an alternative to FIG. 89 for retrieving Internet data from distributed indices; answers to requests for data in FIG. 90 can be gathered by major service providers.

FIG. 91 shows a diagram of the movement of answers returning from computers which have scanned the bulletin boards of unanswered questions posted at the local service providers. These answers are also summarized, in a form similar to the answers to FAQs which, as prior art, are commonly contained in FAQ postings in computer bulletin boards. The summarized answers are sent back, via 'trunk service provider paths' to the originating local service providers, which post the answers, to be read by computers which originated the question. Since most of the information moved is in summary form, network bandwidth is conserved, saving bandwidth for moving pictures and sounds which have already identified, semantically, as being desirable to move across the network. In order to ensure the accuracy of the semantic identifications, the previously described method of confirming empathic reader response can be applied, to make sure that semantic content evokes a matching emotional experience. Another advantage is that movement of information takes advantage of the natural hardware topology of the network, by concentrating communications primarily between closely connected network computers, instead of trying to directly connect all local computers to a few large search engines, as in the prior art of shown in FIG. 90. By avoiding the concentration of communications around central search engines, the large cost of setting up and connecting such search engine facilities can be avoided; the cost of communications can be allocated across all the 'local service providers', without forcing any of them to bear extra traffic. The small amount of space taken up by bulletin boards of question asked and their corresponding answers consumes very little resources, since all that information can be stored succinctly in semantic form. The method shown in FIG. 90 and FIG. 91 can be implemented using traditional text bulletin boards, as currently exist on the Internet, by conveying emotional vector numbers using ASCII characters. The methods of the present invention could also be applied to new multi-media bulletin boards which contain pictures and sounds as well as text.

The application of Miller's capacity number to semantic network inheritance can be applied not only to the population of a node's directly linked inheritor nodes, but also to its directly linked inherited nodes. As mentioned earlier, the Miller's capacity number is seven plus or minus two, whereas the suggested optimal number of direct inheritors is five, to allow places for the node itself and one direct inherited node.

In semantic systems where the number of direct inheritor nodes tends to be very large, the total number of inherited nodes of a node can be excessive, particularly when applying the universal indexing method of FIG. 35. Since this universal indexing method examines potential paths through all inherited nodes, the existence of a large number of inherited nodes can slow down that indexing method. Therefore, it may be necessary to optimize the branching of inherited trees around the target of Miller's capacity number, similarly to the way inheritor trees are optimized in FIG. 13 through FIG. 16. Optimizing the number of direct inherited nodes to five ensures that complex inherited meaning will be gathered through a few summary nodes, so that potentially redundant inherited meaning can be identified and removed.

In semantic systems where the number of directly inherited nodes tends to be too small, the total number of inherited nodes of a node can also be too small, so that when applying the universal indexing method of FIG. 35, it is difficult to find a path of meaning. Optimizing the number of direct inherited nodes to five helps to ensure that nodes have enough inherited meaning to differentiate them from their sibling nodes, thus giving the indexing method of FIG. 35 more potential paths of meaning to pick from at a more specific level.

FIG. 92 shows an example of applying Miller's capacity number to semantic network nodes similar to those shown in FIG. 13, according a definition of inherited-node semantic efficiency shown in a box. This FIG. 92 definition is similar to the definition of inheritor-node semantic efficiency shown in the box of FIG. 16. In FIG. 92, the symbol 'p' stands for the direct inherited population of a node, rather than the direct inheritor population shown in FIG. 13. The symbol 'P' stands for the total inherited population of a node, rather than the total inheritor population as in FIG. 13. The symbol 'm' stands for the mean inherited abstractness, rather than the mean inheritor abstractness. The symbol 'i' stands for the direct inherited deviation, rather than the direct inheritor deviation. Since FIG. 92 analyzes the inefficiency of inherited inheritance links instead of inheritor inheritance links as in FIG. 13, the symbol 'S' in FIG. 92 stands for inherited (supertree) inefficiency, rather than the inheritor (subtree) inefficiency.

For instance, the node 'breast stroke swimmer' inherits only from 'summer olympic athlete', which is four less than the optimal number of nodes to inherit from, so it has a direct inherited deviation of 4. The node 'discuss thrower' inherits from both 'summer olympic athlete' and 'track and field athlete', so its direct inherited deviation is 3, thus making it semantically more efficient. The node 'summer Olympic athlete' does not inherit from any nodes, so it has no inherited node population to be analyzed. Like the leaf nodes in FIG. 13, its total node population 'P' is just one (including itself) and its semantic inefficiency is 1 (the ideal number). Overall, the inherited node semantic inefficiency calculated in FIG. 92 is like an upside-down version of the calculation in FIG. 13. Similar kinds of numbers are calculated, but the results of the calculations (such as totals and averages) are carried from inherited to inheritor nodes, rather than from inheritor to inherited nodes.

The calculations in FIG. 92 can be used to optimized inherited-link semantic efficiency alone, or they can be used in combination with the calculations shown in FIG. 13 to create a combined figure of merit for both inheritor and inherited link semantic efficiency. The combination can be calculated by totaling the inherited-node inefficiency numbers as described in FIG. 92 for each node in a subtree, and for each subtree, multiplying its average inherited-node inefficiency by the subtree inefficiency number as described in FIG. 13.

The advantage of combining both is that a network which is optimized for both inheritor and inherited links is easier to traverse; the disadvantage of combining both is that semantic efficiency of a given subtree requires extra steps to compute. For many implementations, optimizing for just inherited or inheritor link efficiency is good enough; often there is no need to compute the extra steps needed to combine both metrics.

Figure 93:
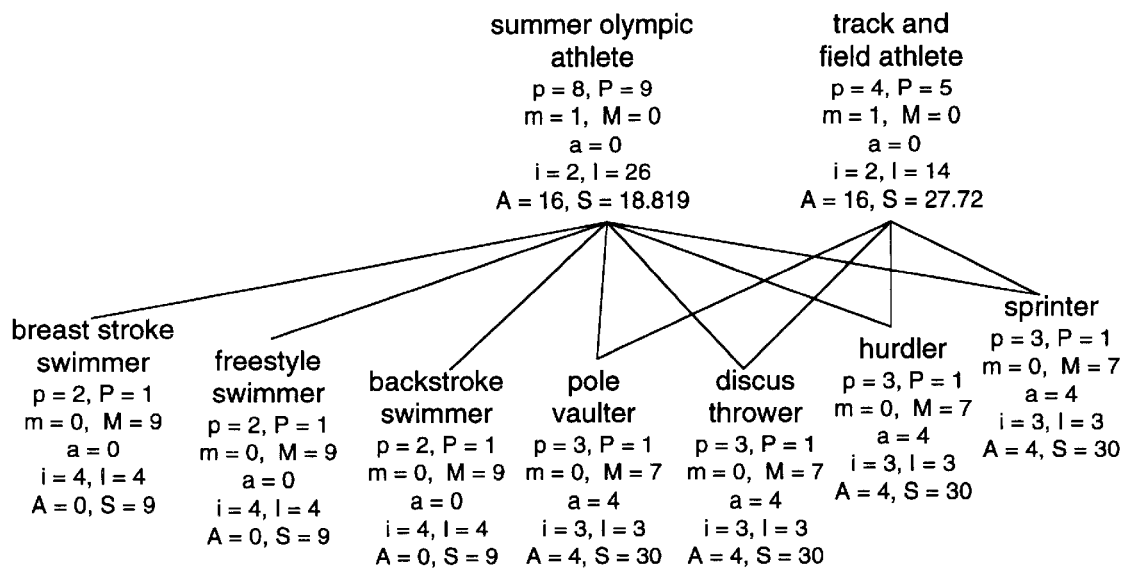
FIG. 93 shows an alternative method for calculating subtree inefficiency, for semantic nodes similar to FIG. 16, where populations of all direct inheritance (instead of just inheritor) links are optimized.

FIG. 93 shows another method of quantifying inheritance-link inefficiency, combining measures of inherited-link inefficiency as soon as possible with measures of inheritor-link inefficiency. By combining these measures sooner, rather than later as suggested by FIG. 92, the computation overhead of computing both measures of inefficiency can be reduced.

In FIG. 93, the symbol 'p' stands for the direct inheritance population of a node, which is the total population of direct inheritance links connected to a node. The symbol 'P' stands for the total inheritor population of a node, just as is did in FIG. 13. The symbol 'm' stands for the mean direct inheritor abstractness of a node, just as it did in FIG. 13. The symbol 'M' stands for the mean direct inherited abstractness of a node, averaged over its directly linked inherited nodes. The symbol 'a' stands for the abstractness deviation from both 'm' and 'M' over the directly linked inheritor and inherited nodes respectively; 'a' is a generalized version of the metric 'a' in FIG. 13, which only described inheritor nodes abstractness deviations. The symbol 'i' stand for the direct inheritance deviation which is the difference between the ideal number of direct inheritance links (6) and the actual number. Since both inherited and inheritor links are counted in this measure, rather than just inheritor links, the ideal number in FIG. 93 is higher than the ideal number (5) for 'i' in FIG. 13. The ideal number (6) allows room for the node itself to be included in the Miller group of seven (plus or minus 2), along with a total of six direct links to the node.

The symbol 'd' stands for the average inheritance deviation in FIG. 93, similar to the average inheritor deviation in FIG. 13. The symbol 'D' stands for the average abstractness deviation in FIG. 93, just as in FIG. 13. The symbol 'S' stands for the subtree inefficiency in FIG. 93 just as in FIG. 13.

The method of calculating subtree inefficiency in FIG. 93 is similar to the method shown in FIG. 13. The calculations start at the leaf nodes and results of the calculations are passed to inherited nodes, culminating in the peak abstraction nodes. For example, 'breast stroke swimmer' has 'p=2' so its inheritance deviation 'i' is 4. These 'p' and 'i' numbers are the same for the 'freestyle swimmer' and 'backstroke swimmer' nodes. Since none of these three nodes has any inheritors, and they each have just one inherited node, they each has abstractness deviation 'a' of zero.

The nodes 'pole vaulter', 'discus thrower', 'hurdler' and 'sprinter' all have the same inheritance configuration, a configuration which is slightly different from the three 'swimmer' nodes. For example, 'pole vaulter' has 'p=3' and 'i=3' because it has two inherited nodes 'summer olympic athlete' and 'track and field athlete'. Since those inherited nodes differ in abstractness, 'pole vaulter' has an abstractness deviation 'a=4'.

The subtree inefficiency of 'summer olympic athlete' is affected by the deviations of all its inheritor nodes. Even though its own abstractness deviation 'a' is zero and its direct inheritance deviation 'i=2', it has a large total abstractness deviation 'A=16' and a large total inheritance deviation 'I=26' from its inheritor nodes. Consequently the subtree inefficiency of 'summer olympic athlete' is 18.819 (rounded to three decimals).

The subtree inefficiency of 'track and field athlete' is even more affected by the deviations of its inheritor nodes. Like 'summer olympic athlete', it has an abstractness deviation 'a' which is zero and a direct inheritance deviation 'i=2'. It also has a large total abstractness deviation 'A=16' and a fairly large total inheritance deviation 'I=14'. Since these total deviations are averaged over a smaller (P=5) population of inheritors, the subtree inefficiency of 'track and field athlete' is a very large 27.72 (rounded to three decimals).

FIG. 93 shows how inherited-link and inheritor-link inefficiency numbers can be combined with less calculation overhead than combining calculations from FIG. 13 and FIG. 92. However, the overhead of calculations in FIG. 93 is still significantly larger than for FIG. 13, when compared on a node-by-node basis. Consequently, when implementing semantic networks with the present invention, the method of FIG. 13 may be preferred to the method of FIG. 93, in order to save processing power even though the method of FIG. 93 is more generally applicable.

Figure 94:
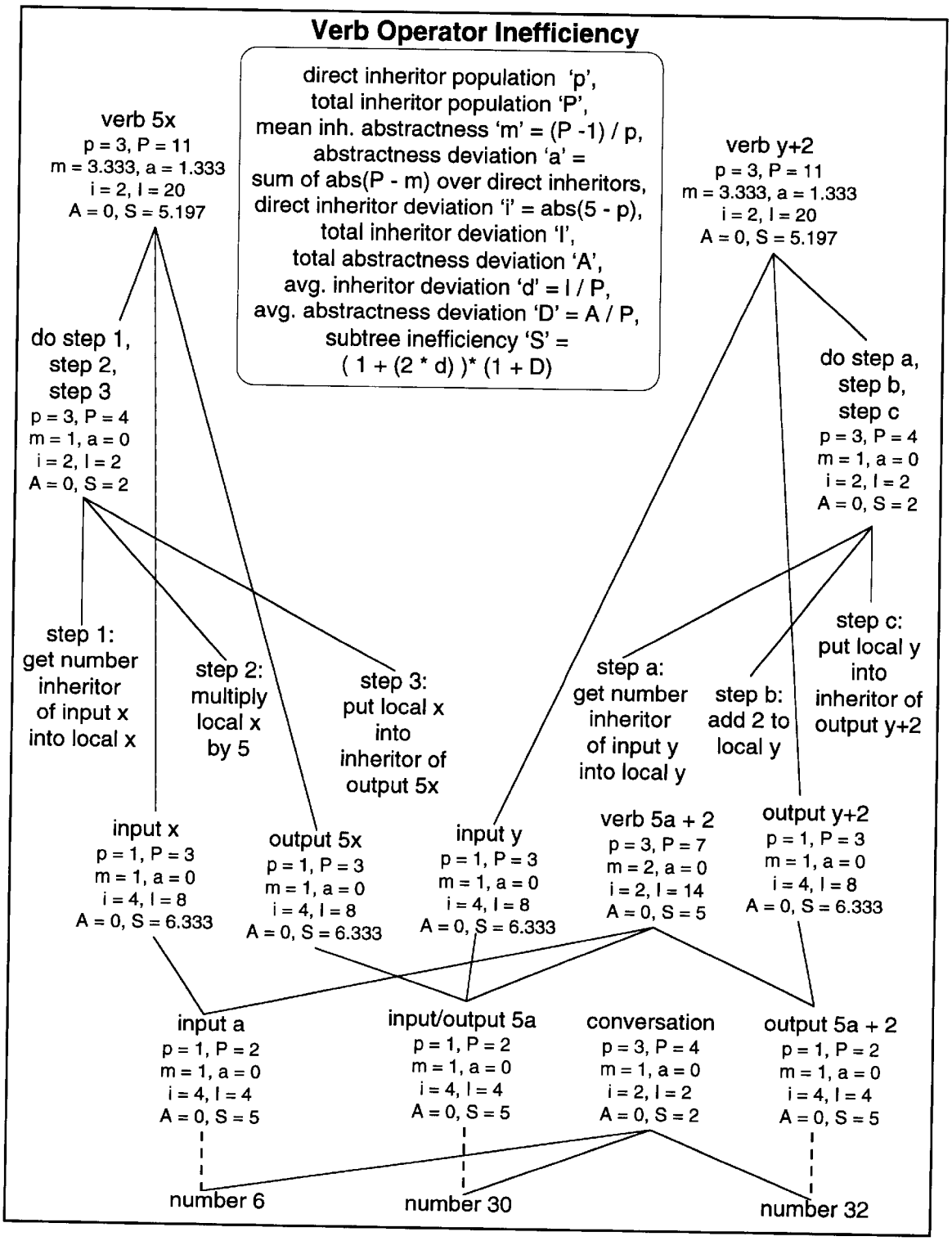
FIG. 94 shows calculations of subtree inefficiency for verb operator subtrees, similar to the subtrees of FIG. 8, using the method of quantifying inefficiency earlier described by FIG. 13.

The ability of the method of FIG. 13 to optimize subtrees is not limited to text, sounds and images. Subtrees which describe computer algorithms can also be optimized by the method of FIG. 13. For instance, FIG. 8 shows a of two verb operators 'verb 5x' and 'verb y+2' whose subtrees can be optimized for semantic efficiency. FIG. 94 shows the calculation of semantic inefficiency numbers for 'verb 5x' and 'verb y+2' subtrees, using the method of FIG. 13. Since inherited-node links do not affect the method of FIG. 13, inherited tag nodes from FIG. 8 have been omitted from FIG. 94.

The subtree inefficiency of 'verb 5x' is partly due to the total inheritor deviation 'I=2' of 'do step 1, step 2, step 3', and mostly due to the total inheritor deviation 'I=8' of 'input x' and 'output 5x'. To improve the semantic efficiency of 'verb 5x', one or two additional steps could be added as inheritors of the 'do step 1, step 2, step 3' node. An even greater improvement in efficiency could be obtained by adding more direct inheritor nodes to 'input x' and 'output 5x', thus reducing their total inheritor deviation.

The subtree inefficiency of 'verb y+2' is likewise partly due to the total inheritor deviation 'I=2' of 'do step a, step b, step 3' and mostly due to the total inheritor deviation 'I=8' of 'input y' and 'output y+2'. To improve the efficiency of 'verb y+2', more direct inheritors nodes should be linked to 'input y' and 'output y+2', to reduce their total inheritor deviation. The only inheritors of 'input y' and 'output y+2' are nodes which are inherit from 'verb 5a+2', which compose of dataflows through 'verb 5x' and 'verb y+2'. By adding other verb nodes which compose of dataflows through 'verb y+2', additional inheritor nodes can be linked to 'input y' and 'output y+2'.

Figure 95:
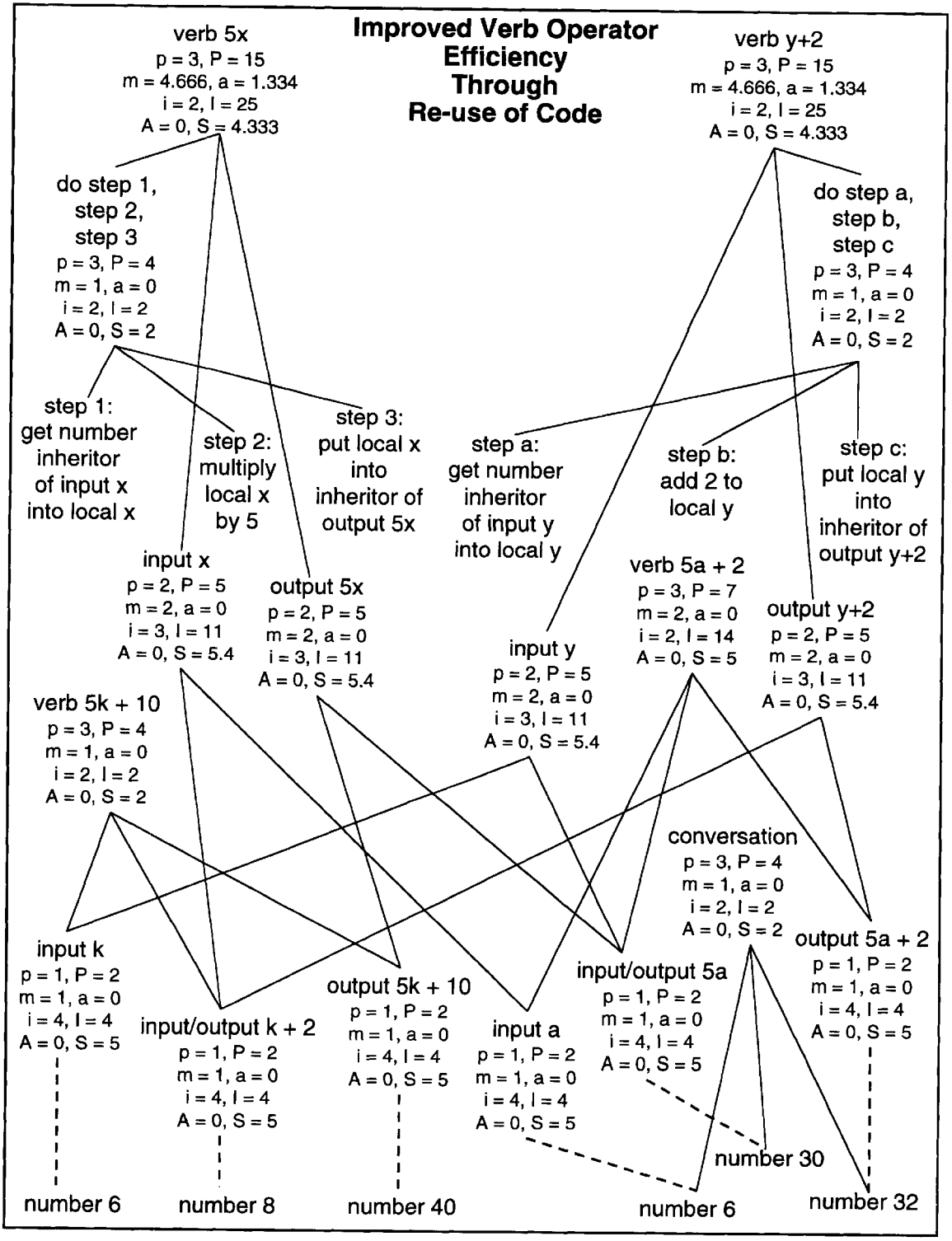
FIG. 95 shows the inefficiency of verb operator subtrees from FIG. 94, improved by adding other inheritors of the operator input and output nodes.

FIG. 95 shows the nodes of FIG. 94, plus a new 'verb 5k+10' which composes dataflows through 'verb 5x' and 'verb y+2'. The new node 'input k' is an inheritor of the node 'input y' in order to send dataflows through that node. The new node 'input/output k+2' is an inheritor of the node 'output y+2' in order to receive dataflows from that node. The new node 'input/output k+2' is also an inheritor of the node 'input x' in order to send dataflows through that node. The new node 'output 5k+10' is an inheritor of the node 'output 5x' in order to receive dataflows from that node. By linking new inheritors to the 'input x', 'output 5x', 'input y' and 'output y+2' nodes, the direct inheritor populations of these nodes increases to 'p=2', the total inheritor populations of these nodes increases to 'P=5'. Even though the total inheritor deviation of these nodes also increases to 'I=11', the net effect on the subtree inefficiency for these nodes is beneficial, decreasing their inefficiency from 6.333 down to 5.4. At the level of the peak abstraction nodes 'verb 5x' and 'verb y+2', the net effect is also beneficial, decreasing their inefficiency from 5.197 down to 4.333.

This improvement in semantic efficiency reflect the beneficial effect of re-use of the code in 'verb 5x' and 'verb y+2' by the new 'verb 5k+10'. The semantic efficiency of 'verb 5x' and 'verb y+2' would continue to increase each time they were re-used, until a total of 5 verbs link inheritors to them. At that point, extra verbs could link inheritors to them, but they should do so indirectly. These extra verbs would not increase the efficiency of 'verb 5x' and 'verb y+2', reflecting that fact that excessive re-use of code is risky, since if the code is faulty, an overly large number of code definitions will also be faulty.

I claim:

1. A method executed by a data processor system for quantifying clarity in a natural language processing system by measuring abstractness deviation for sets of inheritance sibling nodes within a semantic inheritance network, comprising the steps of:
   a) identifying a set of inheritance sibling nodes;
   b) computing an average abstractness for the set of inheritance sibling nodes;
   c) computing an abstractness deviation from the average abstractness, for each inheritance sibling node in the set of inheritance sibling nodes;
   d) summing the abstractness deviations of each inheritance sibling node in the set of inheritance sibling nodes;
   e) comparing the summed abstractness deviation of a set of sibling nodes to a summed abstractness deviation of an alternative topology for the set of inheritance nodes; and
   f) optimizing the semantic network inheritance link topology by selecting the alternative topology with less abstractness deviation.

2. The method of claim 1, further comprising a plurality of inheritance nodes linked to the set of inheritance sibling nodes, wherein the step of computing an average abstractness further comprises counting total population counts of inheritance nodes connected to the set of inheritance sibling nodes.

3. The method of claim 1, further comprising at least one common inheritor node linked directly to each member of the set of inheritance sibling nodes by direct inheritor links to direct inheritor nodes, wherein the step of identifying a set of inheritance siblings nodes further comprises identifying all direct inheritor nodes for the at least one common inheritor node.

4. The method of claim 1, further comprising at least one common inherited node linked directly to each member of the set of inheritance sibling nodes by directly inherited links to directly inherited nodes, wherein the step identifying a set of inheritance siblings nodes further comprises identifying all directly inherited nodes for the at least one common inherited node.

5. The method of claim 1, further comprising a computed abstractness deviation for inheritance sibling nodes representing elements of a visual image, further comprising a step of identifying elements of the visual image to represent as the inheritance sibling nodes.

6. The method of claim 1, further comprising a computed abstractness deviation for inheritance sibling nodes representing elements of a sequence of sounds, further comprising a step of identifying elements of the sequence of sounds to represent as the inheritance sibling nodes.

7. An apparatus in a data processing system for quantifying clarity in a natural language processing system by measuring abstractness deviation for sets of inheritance sibling nodes within a semantic inheritance network, comprising:
   a) a set of inheritance sibling nodes;
   b) a stored computed abstractness for each inheritance sibling node;
   c) a stored computed average abstractness for the set of inheritance sibling nodes;
   d) a stored measured abstractness deviation for each inheritance sibling node, from a difference of the abstractness of the sibling node and the average abstractness of the set of inheritance sibling nodes;

e) a stored measured abstractness deviation, from a sum over each abstractness deviation;

f) a measured abstractness deviation for a set of inheritance sibling nodes and a measured abstractness deviation for an alternative topology for the set of inheritance sibling nodes; and g) an optimized semantic network inheritance link topology selected from an alternative topology with less abstractness deviation.

8. The apparatus of claim 7, wherein the computed abstractness of each inheritance sibling node includes a population count of inheritance nodes.

9. The apparatus of claim 7, further comprising at least one common inheritor node linked directly to each member of the set of inheritance sibling nodes by direct inheritor links to direct inheritor nodes, wherein the sets of inheritance sibling nodes are all direct inheritor nodes of the at least one common inheritor node.

10. The apparatus of claim 7, further comprising at least one common inherited node linked directly to each member of the set of inheritance sibling nodes by directly inherited links to directly inherited nodes, wherein the sets of inheritance sibling nodes are all directly inherited nodes of the at least one common inherited node.

11. The apparatus of claim 1, further comprising a computed abstractness deviation for inheritance sibling nodes representing elements of a visual image, further comprising elements of the visual image represented as inheritance sibling nodes.

12. The apparatus of claim 7, further comprising a computed abstractness deviation for inheritance sibling nodes representing a sequence of sounds, further comprising the sequence of sounds represented as inheritance sibling nodes.

13. A method executed by a data processor system for quantifying clarity in a semantic inheritance network of a natural language processing system by measuring a deviation in branching from an optimal number of inheritance branches for a set of nodes, comprising the steps of:

a) identifying a set of nodes having inheritance links;

b) counting a population count of inheritance links for each of the identified nodes;

c) computing a deviation in branching for each nodes in the identified set of nodes, from a difference between the optimal number of inheritance branches and a population count of inheritance links;

d) comparing the deviation in branching of a set of sibling nodes to deviation in branching of an alternative topology for the set of inheritance nodes; and e) optimizing the semantic network inheritance link topology by selecting the alternative topology with less deviation in branching.

14. The method of claim 13, further comprising a step for computing overall deviation from optimal topology, by combining via multiplication, the summed abstractness deviation with the deviation in branching including:

a) identifying a set of inheritance sibling nodes;

b) computing an average abstractness for the set of inheritance sibling nodes;

c) computing an abstractness deviation from the average abstractness, for each inheritance sibling node in the set of inheritance sibling nodes, d) summing the abstractness deviations of each inheritance sibling node in the set of inheritance sibling nodes; and e) calculating the overall deviation from optimal topology by combining via multiplication, the summed abstractness deviation with the deviation in branching.

15. The method of claim 13, further comprising a set of nodes representing elements of a visual image, further comprising a step of identifying elements of the visual image to represent as a set of nodes.

16. The method of claim 13, further comprising a set of nodes representing elements of a sequence of sounds, further comprising a step of identifying elements of the sequence of sounds to represent as a set of nodes.

17. An apparatus in a data processing system for quantifying clarity in a semantic inheritance network of a natural language processing system by measuring a deviation in branching from an optimal number of inheritance branches for a set of nodes, comprising:

a) a set of nodes having inheritance links;

b) a stored population count of inheritance links for each node having inheritance links;

c) a stored measured deviation in branching for each node in the identified set of nodes having inheritance links, from a difference in magnitude between the optimal number of branches and a population count of inheritance links;

d) a measured deviation in branching for a set of inheritance sibling nodes and a measured deviation in branching for an alternative topology for the set of inheritance sibling nodes; and e) an optimized semantic network inheritance link topology selected from an alternative topology with less deviation in branching.

18. The apparatus of claim 17, further comprising a computed overall deviation from optimal topology, by combining via multiplication, the summed abstractness deviation with the deviation in branching including:

a) a set of inheritance sibling nodes, b) for each inheritance sibling node, a computed abstractness, c) for the set of inheritance sibling nodes, a computed average abstractness, d) for each inheritance sibling node, a computed deviation, computed from a difference of the computed abstractness and the average abstractness, e) a summed abstractness deviation, summed over each computed deviation, and f) an overall deviation from optimal topology computed by combining via multiplication, the summed abstractness deviation with the deviation in branching.

19. The apparatus of claim 17, further comprising a set of nodes representing elements of a visual image.

20. The apparatus of claim 17, further comprising a set of nodes representing elements of a sequence of sounds.

21. A method executed by a data processor system for identifying optimal paths of meaning from a set of shortest inheritance paths between a first node and a second node stored in a semantic inheritance network, comprising the steps of:

a) identifying a first set of inherited nodes of the first node;

b) identifying a second set of inherited nodes of the second node;

c) identifying a set of common nodes including inheritor nodes corresponding to the first set which are also inheritor nodes corresponding to the second set; and d) identifying the optimal paths of meaning by identifying a set of shortest inheritance paths traversing the first node to a node in the first set, to a node in the set of common nodes, to a node in the second set, to the second node.

22. The method of claim 21, further comprising a set of contextual nodes, wherein each shortest inheritance path of step (d) further traverses via inheritance to a node of the set of contextual nodes.

23. The method of claim 21, further comprising a node inheritance index for at least one node, wherein step (c) further comprises using a node inheritance index to identify the common nodes consisting of inheritor nodes of the first set which are also inheritor nodes of the second set.

24. The method of claim 23, further comprising an inheritance distance for each entry in the node inheritance index for at least one node, wherein step (d) further comprises identifying the shortest inheritance paths from the node inheritance index.

25. The method of claim 21, further comprising a node inheritance index for at least one node, wherein step (a) further comprises using a node inheritance index to identify a first set of inherited nodes, and step (b) further comprises using a node inheritance index to identify a second set of inherited nodes.

26. The method of claim 21, further comprising an average path abstractness for at least one of the preferred paths of meaning connecting the first node to the second node, wherein step (d) further comprises a step of resolving ties in the set of shortest inheritance paths by choosing the shortest inheritance paths having the greatest average path abstractness, computed by averaging the abstractness of each node in the path.

27. An apparatus in a data processing system to identify optimal paths of meaning from a set of shortest inheritance paths connecting a first node and a second node stored in a semantic inheritance network, comprising:
 a) a first set of inherited nodes of the first node;
 b) a second set of inherited nodes of the second node;
 c) a set of common nodes including inheritor nodes corresponding to the first set which are also inheritor nodes corresponding to the second set; and
 d) a set of optimal paths of meaning from a set of shortest inheritance paths traversing from the first node to a node in the first set, to a node in the set of common nodes, to a node in the second set, to the second node.

28. The apparatus of claim 27, further comprising a set of contextual nodes, wherein each shortest inheritance path of step (d) further traverses via inheritance to a node of the set of contextual nodes.

29. The apparatus of claim 27, further comprising a node inheritance index for at least one node, the set of common nodes being identified by a node inheritance index to identify inheritor nodes of the first set which are also inheritor nodes of the second set.

30. The apparatus of claim 29, further comprising an inheritance distance for each entry in the node inheritance index, the set of shortest inheritance paths being identified from the node inheritance index.

31. The apparatus of claim 27, further comprising a node inheritance index for at least one node, the first set of inherited nodes being identified by a node inheritance index for the first node, and the second set of inherited nodes being identified by a node inheritance index for the second node.

32. The apparatus of claim 27, further comprising an average path abstractness for at least one of the preferred paths of meaning connecting the first node to the second node, wherein ties in the set of shortest inheritance paths are resolved by choosing the shortest inheritance paths having the greatest average path abstractness, computed by averaging the abstractness of each node in the path.

33. A method executed by a data processor system for quantifying clarity of a concept stored in a natural language processing system semantic inheritance network, by measuring a conceptual extent deviation from a difference between an optimal number of nodes and a population count of nodes linked by inheritance links from a concept node to a set of nodes representing the concept, comprising the steps of:
 a) identifying a set of nodes representing the concept;
 b) counting a population count of nodes linked by inheritance links from the concept node to a set of nodes representing the concept;
 c) computing a conceptual extent deviation from a difference in magnitude between the optimal number of nodes and the population count of nodes;
 d) comparing the conceptual extent deviation of a set of nodes representing a concept to conceptual extent deviation of an alternative topology for the set of inheritance nodes; and
 e) optimizing the semantic network inheritance link topology by selecting the alternative topology with less conceptual extent deviation.

34. An apparatus in a data processing system for quantifying clarity of a concept stored in a natural language processing system semantic inheritance network, by measuring a conceptual extent deviation from the difference between an optimal number of nodes and a population count of nodes linked via inheritance links from a concept node to a set of nodes representing the concept, comprising:
 a) a set of inheritance nodes representing the concept;
 b) a stored population count of nodes linked via inheritance links from the concept node to a set of nodes representing the concept;
 c) a stored measured conceptual extent deviation computed from a difference in magnitude between the optimal number of nodes and the population count of nodes;
 d) a measured conceptual extent deviation for a set of nodes representing a concept and a measured conceptual extent deviation for an alternative topology for the set of inheritance sibling nodes; and
 e) an optimized semantic network inheritance link topology selected from an alternative topology with less conceptual extent deviation.

35. A method executed by a data processor system for quantifying average abstractness of a concept stored in a natural language processing system semantic inheritance network, by measuring the average abstractness of nodes representing the concept, comprising the steps of:
 a) identifying a set of inheritance nodes representing the concept;
 b) counting a population count of inheritor nodes for each node representing the concept;
 c) computing a node abstractness number from a population count of inheritor nodes for each node representing the concept;
 d) computing the average abstractness by averaging the node abstractness numbers;
 e) computing the average abstractness over inheritance sibling nodes of each node representing the concept;
 f) comparing the average abstractness of a set of nodes representing a concept to average abstractness of an alternative topology for the set of inheritance nodes representing a concept; and
 g) optimizing the semantic network inheritance link topology by selecting the alternative topology with average abstractness closest to the average abstractness over inheritance sibling nodes of each node representing the concept.

36. An apparatus in a data processing system for quantifying average abstractness of a concept stored in a natural language processing system semantic inheritance network, by measuring the average abstractness of nodes representing the concept, comprising:
   a) a set of inheritance nodes representing the concept;
   b) a stored population count of inheritor nodes for each node representing the concept;
   c) a stored node abstractness number, measured from a population count of inheritor nodes for each node representing the concept;
   d) an average abstractness computed by averaging the node abstractness numbers;
   e) a measured average abstractness over inheritance sibling nodes of each node representing the concept;
   f) a measured average abstractness for a set of nodes representing a concept and a measured average abstractness for an alternative topology for the set of inheritance sibling nodes; and
   g) an optimized semantic network inheritance link topology selected from an alternative topology with average abstractness closest to the measured average abstractness over inheritance sibling nodes of each node representing the concept.

37. A method executed by a data processor system for quantifying an emotional status of a conversation stored in a natural language semantic inheritance network, processing conversation through a set of processes and representing a conversation as a set of nodes which are mapped to a normalized measure of conversational abstractness, a normalized measure of conversational extent, a normalized measure of conversational clarity, and a normalized measure of achieved conversational clarity which are mapped to quadrants of a multi-dimensional space having an origin point representing an absence of a strong emotional status and having points of the multi-dimensional space far from the origin point representing the presence of strong emotional status, comprising the steps of:
   a) mapping the normalized measure of conversational abstractness, by determining from the topology of the set of nodes, an average abstractness of the set of nodes representing the conversation, and comparing the average abstractness to an ideal average abstractness or to an average abstractness over nodes in the semantic inheritance network;
   b) mapping the normalized measure of conversational extent, by determining from the topology of the set of nodes, a population count of nodes linking nodes sufficient to link each node from the set of nodes to some other node from the set of nodes via semantic inheritance links, and comparing the population count of nodes to an ideal population count or to an average population count over conversations represented by the semantic inheritance network; c) mapping the normalized measure of conversational clarity, by determining from the topology of the set of nodes, an amount of inconsistency in the number of inheritance links connected to sets of sibling nodes within the set of nodes, and comparing the amount of inconsistency to an ideal amount of inconsistency or to the average amount of inconsistency over conversations represented by the semantic inheritance network;
   d) mapping the normalized measure of achieved conversational clarity, by comparing a change in the normalized measure of conversational clarity during the set of processes to an ideal amount of change or to the average amount of change stored from a previous set of processes;
   e) mapping the normalized measure of conversational abstractness, the normalized measure of conversational extent, the normalized measure of conversational clarity, and the normalized measure of achieved conversational clarity each to separate dimensions of the multi-dimensional space;
   f) mapping from quadrants of the multi-dimensional space to a state of emotion; and
   g) confirming from user feedback that the mapping to state of emotion is correct.

38. An apparatus in a data processing system for quantifying an emotional status of a conversation stored in a natural language semantic inheritance network, processing conversation through a set of processes and representing a conversation as a set of nodes which are mapped to a normalized measure of conversational abstractness, a normalized measure of conversational extent, a normalized measure of conversational clarity, and a normalized measure of achieved conversational clarity which are mapped to quadrants of a multi-dimensional space having an origin point representing an absence of a strong emotional status and having points of the multi-dimensional space far from the origin point representing the presence of strong emotional status, comprising:
   a) a stored measured conversational abstractness, calculated from a topology of the set of nodes, calculated from an average abstractness of the set of nodes representing the conversation compared to an ideal average abstractness or to an average abstractness over nodes in the semantic inheritance network;
   b) a stored measured conversational extent, calculated from the topology of the set of nodes, calculated from a population count of nodes linking nodes sufficient to link each node from the set of nodes to some other node from the set of nodes via semantic inheritance links, compared to an ideal population count or to an average population count over conversations represented by the semantic inheritance network;
   c) a stored measured conversational clarity from the topology of the set of nodes, by calculating from an amount of inconsistency in the number of inheritance links connected to sets of sibling nodes within the set of nodes, compared to an ideal amount of inconsistency or to the average amount of inconsistency over conversations represented by the semantic inheritance network;
   d) a stored measured achieved conversational clarity, by calculated from a change in the normalized measure of conversational clarity during the set of processes compared to an ideal amount of charge in the normalized measure of conversational clarity or to the average amount of change in the normalized measure of conversational clarity stored from a previous set of processes;
   e) a multi-dimensional space which maps to separate dimensions the normalized measure of conversational abstractness, the normalized measure of conversational extent, the normalized measure of conversational clarity, and the normalized measure of achieved conversational clarity;
   f) a mapping from quadrants of the multi-dimensional space to a state of emotion; and g) a user feedback confirming that the mapping to state of emotion is correct.

39. A method executed by a data processor system for quantifying empathy between conversations stored in a natural language semantic inheritance network, processing conversational symbols using a set of processes and a set of nodes and emotional path mappings through a multi-dimensional space representing degrees of emotional intensity, storing emotional path mappings for at least a first conversation and a second conversation, comprising the steps of:

a) mapping the emotional path for the first conversation as a sequence of points in the multi-dimensional space by mapping emotional shifts for the set of processes and the set of nodes of the first conversation;

b) mapping the emotional path for the second conversation as a sequence of points in the multi-dimensional space by mapping emotional shifts for the set of processes and the set of nodes of the second conversation;

c) calculating the empathy between the first conversation and the second conversation by calculating the distance through the multi-dimensional space between the emotional path of the first conversation and the emotional path of the second conversation; and d) confirming from user feedback that the calculated empathy is correct.

40. An apparatus in a data processing system for quantifying empathy between conversations stored in a natural language semantic inheritance network, processing conversational symbols using a set of processes and a set of nodes, and emotional path mappings though a multi-dimensional space representing degrees of emotional intensity, storing emotional path mappings for at least a first conversation and a second conversation, comprising:

a) a stored map of an emotional path for the first conversation, the map having point sequences in the multi-dimensional space which map emotional shifts for the set of processes and the set of nodes of the first conversation;

b) a stored map of an emotional path for the second conversation, the map having point sequences in the multi-dimensional space which map emotional shifts for the set of processes and the set of nodes of the second conversation;

c) a stored measured empathy between the first conversation and the second conversation, measured from the distance through the multi-dimensional space between the emotional path of the first conversation and the emotional path of the second conversation; and d) a user feedback confirming that the measured empathy is correct.

41. A method executed by a data processor system for verifying successful propagation of meaning from a first conversation between distributed semantic network servers to a second conversation between distributed semantic inheritance network servers by comparing a distance between an emotional path stored for the first conversation to an emotional path stored for the second conversation, comprising the steps of:

a) mapping the emotional path for the first conversation as a sequence of points in the multi-dimensional space by mapping emotional shifts for the set of processes and the set of nodes of the first conversation;

b) mapping the emotional path for the second conversation as a sequence of points in the multi-dimensional space by mapping emotional shifts for the set of processes and the set of nodes of the second conversation; c) calculating the distance through the multi-dimensional space between the emotional path mapping of the first conversation and the emotional path mapping of the second conversation; and d) verifying that the distance is not more than a maximum acceptable distance between emotional paths or an average amount of distance for conversations where meaning was successfully propagated.

42. An apparatus in a data processing system for verifying successful propagation of meaning from a first conversation between distributed semantic network servers to a second conversation between distributed semantic inheritance network servers by comparing a distance between an emotional path stored for the first conversation to an emotional path stored for the second conversation, comprising:

a) a stored map of an emotional path for the first conversation, the map having a sequence of points in the multi-dimensional space mapping emotional shifts for the set of processes and the set of nodes of the first conversation;

b) a stored map of an emotional path for the second conversation, the map having a sequence of points in the multi-dimensional space mapping emotional shifts for the set of processes and the set of nodes of the second conversation;

c) a stored measured distance through the multi-dimensional space between the emotional path mapping of the first conversation and the emotional path mapping of the second conversation; and d) a generated confirmation of successful propagation of meaning, if the stored measured distance is not more than a maximum acceptable distance between emotional paths or an average amount of distance for conversations where meaning was successfully propagated.

* * * * *